United States Patent
Bansal et al.

(10) Patent No.: US 12,304,628 B1
(45) Date of Patent: May 20, 2025

(54) AEROLIFT SYSTEMS AND METHODS USING AIR DUCTS AND LIFTING BODIES

(71) Applicant: Bansi Aviation, LLC, Sunrise, FL (US)

(72) Inventors: Atal Bansal, Southwest Ranches, FL (US); Todd R. Quackenbush, Ewing, NJ (US); Mayank Tyagi, Baton Rouge, LA (US)

(73) Assignee: Bansi Aviation, LLC, Sunrise, FL (US)

( * ) Notice: Subject to any disclaimer, the term of this patent is extended or adjusted under 35 U.S.C. 154(b) by 0 days.

(21) Appl. No.: 18/766,413

(22) Filed: Jul. 8, 2024

Related U.S. Application Data

(60) Provisional application No. 63/587,605, filed on Oct. 3, 2023, provisional application No. 63/581,086, filed on Sep. 7, 2023, provisional application No. 63/512,834, filed on Jul. 10, 2023.

(51) Int. Cl.
  *B64C 39/06* (2006.01)
(52) U.S. Cl.
  CPC ................. *B64C 39/064* (2013.01)
(58) Field of Classification Search
  CPC .................................................. B64C 39/064
  See application file for complete search history.

(56) References Cited

U.S. PATENT DOCUMENTS

| | | |
|---|---|---|
| 2,972,455 A | 2/1961 | George |
| 3,126,171 A | 3/1964 | Stepniewski et al. |
| 3,276,723 A * | 10/1966 | Miller ................. B64C 29/0025 244/23 C |
| 3,785,592 A * | 1/1974 | Kerruish ............... B64C 39/064 244/34 A |
| 5,170,963 A * | 12/1992 | Beck, Jr. ............... B64C 39/064 244/73 C |

(Continued)

FOREIGN PATENT DOCUMENTS

| | | |
|---|---|---|
| CN | 112722243 B | 11/2022 |
| RU | 2752276 C1 | 7/2021 |
| RU | 2766020 C1 | 2/2022 |

OTHER PUBLICATIONS

Avro Canada VZ-9 Avrocar, Wikipedia, available at https://en.wikipedia.org/wiki/Avro_Canada_VZ-9_Avrocar, accessed Aug. 26, 2024 in 13 pages.

(Continued)

*Primary Examiner* — Justin M Benedik
(74) *Attorney, Agent, or Firm* — Knobbe Martens Olson & Bear LLP

(57) ABSTRACT

Aerolift systems and methods using one or more air ducts and one or more lifting bodies. The duct may have a turn angle from the inlet to the outlet. The duct may have a variable cross-sectional area, such as increasing from inlet to outlet. The lifting body may be an airfoil. A propulsion unit, such as an electric motor and rotating blades, moves air through the duct and to the lifting body. The flow of air against and/or over the lifting body creates an aerodynamic lifting force. The flow of air downward may provide lift. The total lifting force may be used to move a moveable component. The aerolift system may be used in various applications, including aircraft and industrial systems. An aircraft may include the lifting body, or multiple lifting body segments, defining an annular shape, such as rounded or polygonal.

25 Claims, 95 Drawing Sheets

(56) References Cited

U.S. PATENT DOCUMENTS

| | | | |
|---|---|---|---|
| 6,547,180 | B1 | 4/2003 | Cassidy |
| 6,572,053 | B2* | 6/2003 | Salas .................... B60V 1/02 244/73 C |
| 6,616,094 | B2* | 9/2003 | Illingworth ............ B64C 27/20 244/12.1 |
| 7,798,448 | B2 | 9/2010 | Bilanin et al. |
| 8,262,016 | B2 | 9/2012 | Gosling |
| 9,429,071 | B2 | 8/2016 | Quackenbush et al. |
| 9,487,286 | B2 | 11/2016 | Simon |
| 9,694,907 | B2* | 7/2017 | Simon ................ B64C 29/0025 |
| 9,975,633 | B1 | 5/2018 | Johnson et al. |
| 11,104,432 | B2* | 8/2021 | Rivellini ............... B64U 10/13 |
| 11,136,115 | B2 | 10/2021 | Fenny et al. |
| 11,242,146 | B2 | 2/2022 | Geng |
| 11,279,478 | B2 | 3/2022 | Fenny et al. |
| 11,591,087 | B2* | 2/2023 | Chalker ................ B64D 25/00 |
| 11,597,512 | B2 | 3/2023 | Randall |
| 2012/0237341 | A1* | 9/2012 | Simon ...................... B64C 3/14 415/211.2 |
| 2022/0119112 | A1 | 4/2022 | Obermoser et al. |

OTHER PUBLICATIONS

Aftosmis, "Adaptive Cartesian Mesh Generation", CRC Handbook of Grid Generation, 35 pages, 1998.

Aftosmis, "Solution Adaptive Cartesian Grid Methods for Aerodynamic Flows with Complex Geometries", von Karman Institute for Fluid Dynamics, 108 pages, 1997.

Berger et al., "An ODE-based Wall Model for Turbulent Flow Simulations", 55th AIAA Aerospace Sciences Meeting, 2017, American Institute of Aeronautics and Astronautics, Grapevine, TX, 11 pages.

Berger et al., "Progress Towards a Cartesian Cut-Cell Method for Viscous Compressible Flow", 50th AIAA Aerospace Sciences Meeting, 2012, AIAA: Nashville, TN, 81 pages.

Boschitsch et al., "Aeroelastic Analysis Using Deforming Cartesian Grids", AIAA Journal, 2023, vol. 61, pp. 1095-1108.

Boschitsch et al., "Flow Induced Vibration Analysis and Remediation Using a Cartesian Grid Flow Solver", in 28th International Conference on Nuclear Engineering (ICONE), 2021, Virtual: ICONE28-64842.

Boschitsch et al., Low Mach No. Acoustics in Nuclear Piping Systems. ANS Transactions, 118(1), pp. 1185-1188.

Boschitsch et al., "Relative Rotation On Cartesian Grids", 56th AIAA Aerospace Sciences Meeting, AIAA SciTech Forum 2018: Kissimmee, FL., p. 25, doi: 10.2514/6.2018-0921.

Courtin et al., "Flight Test Results of a Subscale Super-STOL Aircraft, ICAT-2020-01," MIT International Center for Air Transportation (ICAT), Cambridge, Massachusetts, 2020, 17 pages.

Danilov et al., "Flow distortion reduction by blade cascades, Part 1: Adjoint optimization", SciTech 2024 Forum, AIAA 2024-1197.

Deere et al., "Computational Analysis of Powered Lift Augmentation for the LEAPTech Distributed Electric Propulsion Wing", AIAA Aviation Forum, Denver, Colorado, 2017, 20 pages.

Ding, "Fundamentals and Applications of N-pulse Particle Image Velocimetry-accelerometry: Towards Advanced Measurements of Complex Flows and Turbulence", PhD Thesis, Arizona State University, 2018. (2 Parts).

Ding et al., "N-pulse particle image velocimetry-accelerometry for unsteady flow-structure interaction", Measurement Science and Technology, 28(1), 2016, 20 pages.

Ding et al., "Surface segmentation technique for tomographic PIV: Adaptive surface and iterative 2-D interrogation", In 17th international symposium on applications of laser techniques to fluid mechanics, Lisbon, Portugal, Jul. 2014, pp. 7-10.

Holden et al., "Fast-Forwarding to a Future of On-Demand Urban Air Transportation", Uber Elevate, 2016.

Johnson et al., "Velocity measurements of gas escaping a particle bed during shock-driven expansion", Experiments in Fluids, 61:236, 13 pages.

Karim et al., "Flow distortion reduction by blade cascades, Part 2: Experimental validation", SciTech 2024 Forum, AIAA, 2024-1198.

Leishman et al., "Principles of Helicopter Aerodynamics", Cambridge: Cambridge University Press, 2006.

McCormick et al., "Aerodynamics, Aeronautics, and Flight Mechanics", New York, John Wiley & Sons, Inc., 1995. (3 Parts).

Means et al., "Analytical Investigation of Conical Diffusers," NASA, Cleveland, 1972, 28 pages.

Pereira, "Hover and Wind-Tunnel Testing of Shrouded Rotors for Improved Micro Air Vehicle Design", PhD Thesis, Department of Aerospace Engineering, University of Maryland, College Park, Maryland, 2008, 351 pages.

Perkins et al., "Coupled Analysis of a Slotted Natural-Laminar-Flow Transonic Truss-Braced Wing Aircraft Configuration", AIAA SCITECH 2022 Forum, 20 pages.

Perkins et al., "Effect of Transition Modeling for Analysis of a Slotted, Natural-Laminar-Flow Transonic Truss-Braced Wing Aircraft Configuration", AIAA SCITECH 2023 Forum, 44 pages.

Quackenbush et al., "Analysis of Download and Rotor/Airframe Interactions in Hover", American Helicopter Society 73rd Annual Forum 2017, Fort Worth, TX.

Quackenbush et al., "Analysis of Rotor Configuration and Ground Proximity Effects on Hover Download", American Helicopter Society 74th Annual Forum, 2018.

Quackenbush et al., "Analysis Methods for Advanced V/STOL Configurations," Proceedings of the 72nd Annual American Helicopter Society Forum, May 2016, 17 pages.

Quackenbush et al., "Analysis Methods for Tilting Wing and Tailsitter e-VTOL Configurations", Proceedings of the Vertical Flight Society Autonomous VTOL Technical Meeting and Electric VTOL Symposium, Mesa, Arizona, UAS, Jan. 29-31, 2019.

Quackenbush et al., "Design and Testing of a Variable Geometry Ducted Propulsor using Shape Memory Alloy Actuation.", AIAA 43rd Aerospace Sciences Meeting, AIAA Paper 2005-1077, Jan. 2005.

Quackenbush et al. "Development and test of an HTSMA supersonic inlet ramp actuator", Proc. SPIE, Smart Structures and Materials, Mar. 2008, 11 pages.

Quackenbush et al., "Download and Rotor Installed Performance in Hover and Low Advance Ratio Flight", 2020 AIAA Aerospace Sciences Meeting, AIAA Paper 2020-0772, 2020.

Quackenbush et al., "Full Vehicle Flight Simulation with Real Time Free Wake Methods", AHS Aerodynamics, Acoustics, and Test and Evaluation Technical Specialists Meeting, 2002, San Francisco, CA.

Quackenbush et al., "Further Assessment of Analysis Methods for Rotor/Airframe Interaction in Hover", 2018 AIAA Aerospace Sciences Meeting, AIAA Paper 2018-1783. 2018. p. 1783.

Quackenbush et al., "Initial Development of Physics-Based Aeroanalysis Methods for Open Rotor Conceptual Design", 55th AIAA Aerospace Sciences Meeting, AIAA Paper 2017-0053. Jan. 2017.

Radespiel et al., "Fundamentals in Coanda Flap Design," Active Flow and Combustion Control, pp. 101-114, 2014.

Saeed et al., "Exploring the aerodynamic characteristics of a blown annular wing for vertical/short take-off and landing applications", School of Engineering & Design Brunel University, Sep. 2010, in 206 pages.

Saeed et al., "Exploring the aerodynamic characteristics of a blown annular wing for vertical/short take-off and landing aircraft", Journal of Aerospace Engineering, vol. 225, No. G, pp. 689-707, 2011.

Shim et al., "Weight Fraction Estimation for eVTOL Vehicle Sizing", AIAA Aviation Forum, San Diego, California, 2023.

Stein-Montalvo et al., "Kirigami-Based Design of Wind-Steering Shading Structures for Urban Ventilation", In 103rd AMS Annual Meeting, AMS, Jan. 2023.

Van Buren et al., "Turbulent pipe flow response to a step change in surface roughness", Journal of Fluid Mechanics, vol. 904, A38, 2020, 26 pages.

Volocopter GmbH, "The Roadmap to Scalable Urban Air Mobility," Volocopter GmbH, 2021.

Wachspress et al., "Rotorcraft Interactional Aerodynamics with Fast Vortex/Fast Panel Methods", Journal of the American Helicopter Society, vol. 48, No. 4, 2003.

(56) References Cited

OTHER PUBLICATIONS

Wang et al. "Study on Ducted Vertical Take-Off and Landing Fixed-Wing UAV Dynamics Modeling and Transition Corridor" Applied Sciences, 2021, vol. 11, No. 21, pp. 1-15.

Whitehouse et al., "Development and Testing of a Low Cost CFD Based Analysis for Surface Mesh Interrogation & Refinement for Applied Aerodynamics Applications in 56th AIAA Aerospace Sciences Meeting", AIAA SciTech Forum 2018, Kissimmee, FL.

Whitehouse et al., "Efficient Cartesian grid CFD-based methods for aeroelastic analysis of wind turbines." SciTech 2022 Forum, AIAA, 2022-1017.

Yadlin et al., "Lift Enhancement for Upper Surface Blowing Airplanes", 31st AIAA Applied Aerodynamics Conference, San Diego, California, 2013, 18 pages.

Hendry, "World's First 'Flying Car' Gets Special Airworthiness Certification From FAA", SimpleFlying.com, Jun. 2023, available at https://simpleflying.com/alef-model-a-flying-car-evtol-faa-certification/ accessed Aug. 26, 2024 in 5 pages.

Alund, "First flying electric car approved by the FAA", USAToday.com, Jun. 30, 2023, available at https://www.usatoday.com/story/money/cars/2023/06/30/first-flying-car-approved-by-faa-available-for-preorder-70372117007/ accessed Aug. 26, 2024 in 12 pages.

Whittaker, "US Patent and Trademark Office notifies filers of years-long data leak", TechCrunch.com, Jun. 28, 2023, available at https://techcrunch.com/2023/06/28/upsto-trademark-data-apl-leak/ accessed Aug. 26, 2024 in 13 pages.

Hirschberg, "Commentary: Electric VTOL Wheel of Fortune" Evtol.com, Mar. 2017, available at https://evtol.news/news/commentary-electric-vtol-wheel-of-fortune accessed Aug. 26, 2024 in 13 pages.

Screen captures from YouTube video clip entitled "Flying a $$495,000 Human Drone" 3 pages, uploaded on May 23, 2023 by user "Supercar Blondie" at https://www.youtube.com/watch?v=uGUCMHJWwbl.

Screen captures from YouTube video clip entitled "How Flight Controls Work | Part 4 : Aileron and Flaperon" 11 pages, uploaded on Jun. 10, 2022 by user Aircraft Science at https://www.youtube.com/watch?v=flEGNnILA8c.

Screen captures from YouTube video clip entitled "How Flight Controls Work | Part 6 : Flap" 3 pages, uploaded Jul. 16, 2022 by user "Aircraft Science" at https://www.youtube.com/watch?v=OarSrdJrGoU&t=237s.

\* cited by examiner $$\frac{T}{T^*} = \left(\frac{A_3}{A_2}\right)^{\frac{1}{3}} \sin(\Phi)$$

$$\frac{T}{T^*} = \left(\frac{A_3}{A_2}\right)^{\frac{1}{3}} \left(\frac{1+\xi^*}{1+\left(\frac{A_3}{A_2}\right)^2 \xi}\right)^{\frac{2}{3}} (\sin(\Phi) - \frac{1}{2} C_d \frac{A_w}{A_3})$$

FIG. 35C

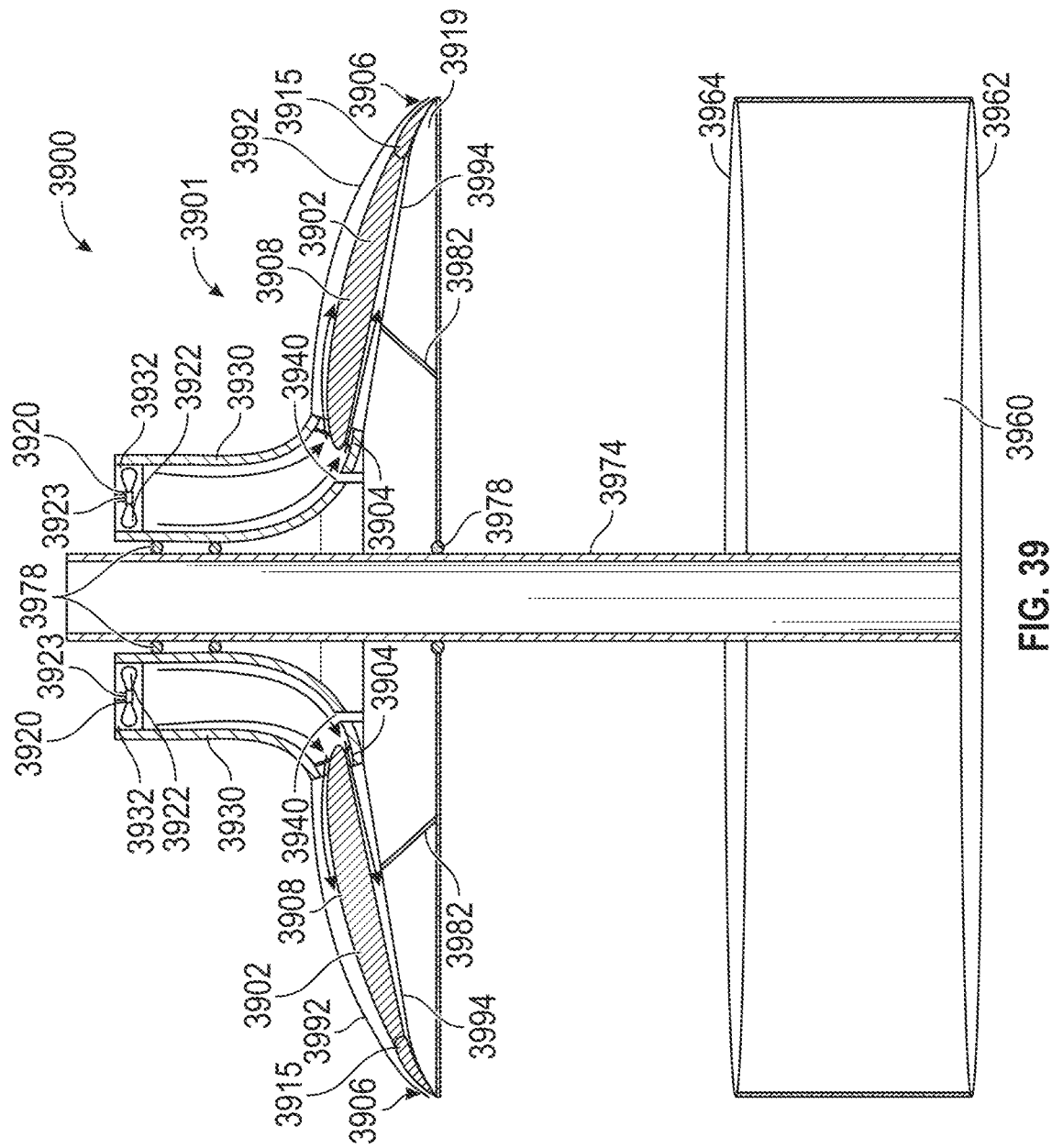

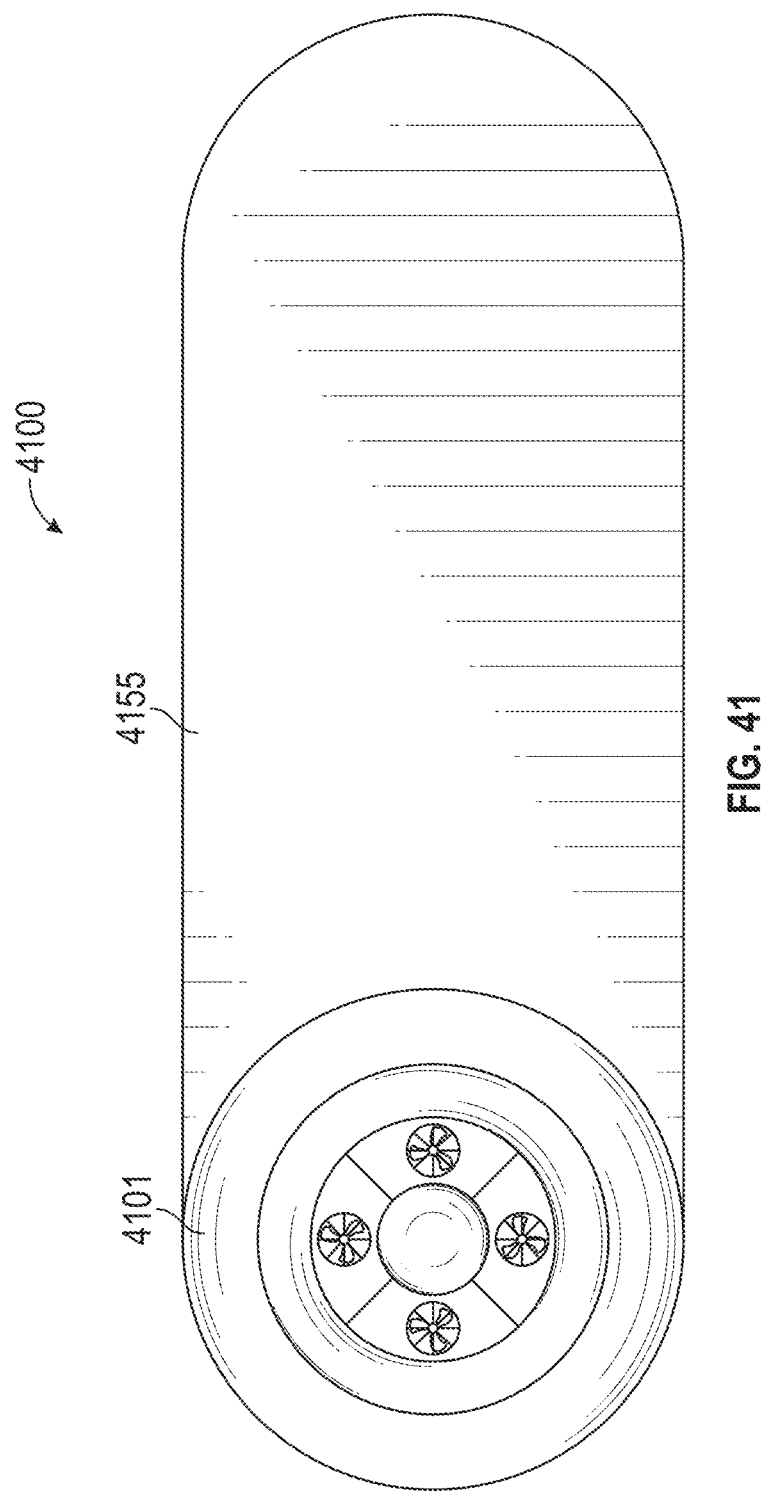

AEROLIFT SYSTEMS AND METHODS USING AIR DUCTS AND LIFTING BODIES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application is a U.S. Non-Provisional Application and claims priority to U.S. Provisional Application No. 63/512,834, filed Jul. 10, 2023, titled FLYING VEHICLE WITH ANNULAR WING AND DISTRIBUTED AIR DUCTS, and to U.S. Provisional Application No. 63/581,086, filed Sep. 7, 2023, titled FLYING VEHICLE WITH ANNULAR WING AND DISTRIBUTED AIR DUCTS, and to U.S. Provisional Application No. 63/587,605, filed Oct. 3, 2023, titled AEROLIFT MACHINES, the entire contents of each of which is incorporated by reference herein and forms a part of this specification for all purposes.

BACKGROUND

Field

The disclosure relates generally to systems for generating forces and movement, and more particularly to systems and methods for various machines and aircraft, that incorporate aerodynamics to create lifting forces and movements by flowing air via a propulsion unit through an angled duct and over a lifting body. Examples of such "aerolift" systems in the context of aircraft and industrial lifting systems are described, and more generally systems and methods of lifting, and example aircraft capable of vertical takeoff and landing (VTOL) with one or more wings surrounding a central portion and one or more distributed air ducts using such lifting systems, are described.

Description

Since the industrial revolution, machines have replaced or supplemented human strength and greatly expanded the amount of work and productivity of humans. Motive power is used to cause the machines to do useful work. Existing machines use electrical generators, chemical combustion, or fluid pressure and hydraulics to provide the motive power for machines to generate forces and movement. These machines all require great cost and complexity and have efficiency limits to create and operate. Greater efficiency in motive power is desirable at reduced cost and improved simplicity and reliability.

Such improvements to existing solutions for motive power would improve many applications where such power is needed. For example, elevator systems, construction vehicles, skycranes, electric vertical take-off and landing (eVTOL) vehicles, helicopters, hovercrafts, hover drones, ski-lifts, power drills, other flying machines, weather drones, and other uses would benefit from improved approaches to motive power for lifting.

For example, aircraft are used for transportation, aerial photography, surveillance, package delivery, and military operations, among other uses. Conventional aircraft (e.g., aerial/aeronautical vehicles and devices) consist of a central longitudinal fuselage with two laterally extending wings having an airfoil shape (e.g., having a curved shape on top and a flatter bottom) to generate lift. As air flows past the leading edge of the airfoil or wing and over the curved upper surface of the wing, the air increases in speed and creates a lower pressure zone at the upper surface. Simultaneously, the air passing under the flatter surface of the wing travels at a slower speed than the upper surface, creating a relatively higher pressure zone at the upper surface. This pressure differential leads to lift which may enable an aircraft to overcome gravity and stay airborne. Such aircraft cannot take off and land vertically, limiting the locations where they may take off and land.

Conventional unmanned aerial vehicles (UAV) or "drones," as well as rotorcraft such as helicopters, use rotors or propellors mounted on the top of the vehicle to expel air in a downward-facing direction to provide lift to the vehicle. The rotors create upward thrust which may counteract the forces of gravity to enable the vehicle to remain airborne. Such vehicles may take off and land vertically, but they require large amounts of power in order to provide the necessary lifting forces. Such vehicles are thereby limited in range, have shorter durations of use between resupplying energy, and limited in payload capacity. There is therefore a need for improvements to these and other drawbacks of existing solutions to generating lifting motive forces for aerial vehicles and other applications.

SUMMARY

The disclosure herein presents various embodiments of "aerolift" systems for generating motive power using aerodynamic lifting forces which may include one or more lifting bodies and one or more ducts. A propulsion unit may be mounted to a rotor attached to the inlet of a duct to draw in air. The rotor can have a plurality of propellor blades configured to rotate and drive ambient air into the duct inlet. The speed of the driven air may increase as it moves from the duct inlet to its outlet. Lifting force may be provided due to the downward flow of air through and out of the duct. The duct may have a turn angle from the inlet to the outlet, for example from 20 to 45 degrees. The duct may have an interior cross-sectional area that is larger at the outlet than at the inlet. The cross-sectional area may increase, for example increase continuously, from the inlet to the outlet or over portions of the duct channel between the inlet and outlet. The lifting body can provide additional lift. The lifting body can be mounted in or outside the duct outlet where the flow of air driven by the rotor may flow around or against the lifting body. There may be multiple lifting bodies at the outlet. The multiple lifting bodies may be staggered, with a main lifting body closer to the outlet and an additional one or more lifting bodies farther from the outlet at a different height than the main lifting body. The one or more lifting bodies may be oriented substantially vertically, for example no more than 45 degrees relative to a reference axis, such as a vertical axis of the system. The lifting body cross section may resemble an airfoil design. For lifting bodies embodied as airfoils and the like, a pressure differential between the air flowing over the upper and lower surfaces of the lifting body may generate additional lift. The flow of air may increase in speed along the curved upper surface and past the leading edge, which may create a lower pressure zone at the upper surface. Simultaneously, the air passing under the flatter lower surface may travel at a slower speed than the upper surface, creating a relatively higher-pressure zone at the upper surface. Various example systems and methods using the "aerolift" lifting technology, such as aircraft, elevators, and other systems, are described.

The disclosure herein further presents the aerolift system as implemented in various embodiments of aircraft having an annular shaped lifting body such as an airfoil or wing (and/or a plurality of lifting body or wing sections arranged in a generally annular configuration and/or positioned generally about a periphery of an aircraft) and a number of propulsion units. As used herein, "lifting body" includes any structure that generates lift in response to airflow against and/or around the structure, and includes but is not limited to wings, airfoils, flow diverters, or segments thereof. The aircraft is capable of vertical takeoff and landing (VTOL) and forward/backward motion. In some embodiments disclosed herein, an aircraft may have an annular shaped wing (e.g., "doughnut" or "toroid" or other circumferential shapes) with the cross-sectional profile of an airfoil. The aircraft may have a plurality of propulsion units, such as rotors or propellors, mounted to the aircraft and distributed along an annular path about a longitudinal area of the main body of the aircraft. Furthermore, the plurality of propulsion units may be mounted onto a plurality of ducts (e.g., tunnels) affixed to the aircraft. The plurality of propulsion units may be mounted to the top/opening of the plurality of ducts (or may be positioned within the ducts) and the bottom/exit of the plurality of ducts may be located at or near the leading edge of the airfoil. Therefore, when the rotors are operating (e.g., spinning), airflow is directed downward through the ducts and to the leading edge of the annular wing to provide lift. The ducts may be distributed about or around a central compartment, such as a passenger compartment, of the vehicle. The annular wing may be transformable, e.g., rotatable and/or shape-changing (e.g., have a flap), to alter its angle of attack relative to the airflow and/or to adjust other lifting characteristics of the airfoil. The annular wing may be segmented with individual segments that are each independently transformable. Some embodiments may position one or more wings or wing segments about or around a central compartment in configurations that generally form an annular shape, a doughnut shape, a toroid shape, a triangular shape, a square shape, a rectangular shape, a polygonal shape, a round shape, and/or the like.

In one aspect, an aerolift system is described. The aerolift systems comprises a propulsion unit, a duct and a lifting body. The propulsion unit is configured to move air. The duct is configured to receive the air moved by the propulsion unit into an inlet of the duct and to expel the air out of an outlet of the duct. The duct inlet extends along an inlet axis and the outlet extends along an outlet axis, and the inlet axis and the outlet axis define a turn angle therebetween. The lifting body is configured to receive the air expelled from the outlet of the duct such that the air imparts a lifting force on the lifting body.

Embodiments of the above and other aspects described herein can have one or more of the following features in any combination: the inlet axis is angled no more than 45 degrees relative to a reference axis; the turn angle is from 20 degrees to 45 degrees; the lifting body defines a chord that is angled no more than 45 degrees relative to a reference axis; the inlet axis is parallel with a reference axis; the lifting body comprises an airfoil cross-sectional shape or the lifting body does not comprise an airfoil cross-sectional shape; the propulsion unit comprises an electric motor configured to rotate one or more blades; the reference axis is parallel with a gravity vector; the outlet extends from a vertically lower portion to a vertically higher portion, and the lifting body comprises a leading edge positioned closer to the vertically lower portion than to the vertically higher portion; the outlet extends from a vertically lower portion to a vertically higher portion, and the lifting body comprises a leading edge positioned closer to the vertically higher portion than to the vertically lower portion; a cross-sectional area of the outlet of the duct is greater than a cross-sectional area of the inlet of the duct; a cross-sectional area of the duct increases along at least one section of the duct in a direction from the inlet to the outlet of the duct; the duct outlet comprises a width that is greater than a height of the duct outlet; the duct outlet is rectangular or rounded; the lifting body is a first lifting body, and further comprising a second lifting body configured to receive the air expelled from the outlet of the duct such that the air imparts a lifting force on the second lifting body; the second lifting body is positioned farther away from the outlet of the duct than the first lifting body; further comprising a third lifting body configured to receive the air expelled from the outlet of the duct such that the air imparts a lifting force on the third lifting body, wherein the third lifting body is positioned farther away from the outlet of the duct than the second lifting body; the duct outlet extends from a vertically lower portion to a vertically higher portion, and wherein the first lifting body comprises a leading edge positioned closer to the lower portion than to the higher portion; the lifting body comprises a stationary inward portion and a moveable outward portion rotatably attached to the stationary inward portion; the duct comprising one or more vents along a portion thereof between the inlet and the outlet and configured to expel part of the air through the vent; the duct comprising a series of openings along a bottom portion thereof at the duct outlet; further comprising one or more vanes within the inlet of the duct; further comprising a sleeve on a top and/or bottom of the lifting body; and/or the duct inlet comprises a rounded lip.

In another aspect, an aircraft is described. The aircraft comprises a central body and one or more aerolift systems. The central body defines a reference axis. The one or more aerolift systems is/are attached with the central body. Each aerolift system comprises a propulsion unit, a duct and a lifting body. The propulsion unit is configured to move air. The duct is configured to receive the air moved by the propulsion unit into an inlet of the duct and to expel the air out of an outlet of the duct. The inlet extends along an inlet axis and the outlet extends along an outlet axis, and the inlet axis and the outlet axis define a turn angle therebetween. The lifting body is configured to receive the air expelled from the outlet of the duct such that the air imparts a lifting force on the lifting body.

Embodiments of the above and other aspects described herein can have one or more of the following features in any combination: the inlet axis is angled no more than 45 degrees relative to a reference axis; the turn angle is from 20 degrees to 45 degrees; the lifting body defines a chord that is angled no more than 45 degrees relative to a reference axis; comprising a plurality of the aerolift systems distributed annularly about the central body; comprising a plurality of the aerolift systems and wherein the lifting body of each aerolift system is a segment of an annular wing of the aircraft; the annular wing is a discontinuous, multi-segment wing of the aircraft; the annular wing is polygonal; comprising a plurality of the aerolift systems spaced outwardly from the central body to define an airflow channel between the central body and the plurality of aerolift systems; comprising a plurality of the aerolift systems spaced circumferentially from each other to define airflow channels between adjacent aerolift systems; further comprising supporting structure attaching one or more of the one or more aerolift systems with the central body; the supporting structure is configured to expand or collapse; comprising a plurality of the aerolift systems and the central body is located at least partially between the plurality of aerolift systems; the central body is located at least partially below the one or more aerolift systems; the outlet extends from a vertically lower portion to a vertically higher portion, and the lifting body comprises a leading edge positioned closer to the lower portion than to the higher portion; the outlet extends from a vertically lower portion to a vertically higher portion, and the lifting body comprises a leading edge positioned closer to the higher portion than to the lower portion; a cross-sectional area of the outlet of the duct is greater than a cross-sectional area of the inlet of the duct; the propulsion unit comprises an electric motor configured to rotate one or more blades; the lifting body is a first lifting body, and each aerolift system further comprises a second lifting body configured to receive the air expelled from the outlet of the duct such that the air imparts a lifting force on the second lifting body, and the second lifting body is positioned farther away from the outlet of the duct than the first lifting body; each aerolift system further comprises a third lifting body configured to receive the air expelled from the outlet of the duct such that the air imparts a lifting force on the third lifting body, and the third lifting body is positioned farther away from the outlet of the duct than the second lifting body; the duct outlet extends from a vertically lower portion to a vertically higher portion, and wherein the first lifting body comprises a leading edge positioned closer to the lower portion than to the higher portion; the lifting body comprises a stationary forward portion and a moveable rearward portion rotatably attached to the stationary forward portion; the duct comprising a series of openings along a bottom portion thereof at the duct outlet; the central body comprises a passenger compartment or a cargo compartment; comprising a plurality of the aerolift systems, and two or more ducts of the plurality of the aerolift systems are fluidly connected to each other; further comprising one or more additional propulsion units configured to provide a thrust force in a direction for forward flight; further comprising landing gear; further comprising one or more deployable parachutes; and/or further comprising one or more solar panels.

In another aspect, a system for generating movement via aerodynamic lifting forces is described. The system comprises a machine structure and an aerolift system. The machine structure has a moveable component. The aerolift system is attached to the moveable component. The aerolift system comprises a propulsion unit, a duct, and a lifting body. The propulsion unit is configured to move air. The duct is configured to receive the air moved by the propulsion unit into an inlet of the duct and to expel the air out of an outlet of the duct. The lifting body is configured to receive the air expelled from the outlet of the duct such that the air imparts a lifting force on the lifting body to thereby cause the moveable component to move.

Embodiments of the above and other aspects described herein can have one or more of the following features in any combination: the inlet extends along an inlet axis that is angled no more than 30 degrees relative to a gravity vector; the lifting body defines a chord that is angled no more than 45 degrees relative to a gravity vector; a turn angle, between an inlet axis defined by the inlet of the duct and an outlet axis defined by the outlet of the duct, is from 20 degrees to 45 degrees; further comprising a plurality of the aerolift systems; each aerolift system is supported outwardly of the moveable component to define an airflow channel between the moveable component and the plurality of aerolift systems; the machine structure includes a supporting structure, and a movable component is configured to move relative to the supporting structure; the supporting structure is an elevator shaft; the moveable component is an elevator cab; the propulsion unit is configured to move varying amounts of air to cause the elevator cab to rise and lower in vertical directions at varying speeds; the supporting structure is a body of a vehicle; the moveable component is a lifting arm; the moveable component is a digger or forklift; the supporting structure is a wall or a building; the moveable component is a cargo compartment; the moveable component is a lifting arm; the movable component is coupled to the supporting structure via a geared system; the propulsion unit comprises a motor configured to spin a plurality of blades; the propulsion unit is configured to move varying amounts of air to cause the moveable component to move at varying speeds; and/or further comprising a control system configured to control the propulsion unit to adjust movement of the moveable component.

In another aspect, an aerolift system is described. The aerolift system may include a propulsion unit configured to move air. The aerolift system may also include a duct configured to receive the air moved by the propulsion unit into an inlet of the duct and to expel the air out of an outlet of the duct. The inlet may extend along an inlet axis that is angled no more than 30 degrees relative to a reference axis. A turn angle may be between the inlet axis and an outlet axis defined by the outlet of the duct. The turn angle may be from 20 degrees to 45 degrees. A lifting body may receive the air expelled from the outlet of the duct such that the air imparts a lifting force on the lifting body. The lifting body defines a chord that is angled no more than 45 degrees relative to the reference axis.

In another aspect, an aircraft is described. The aircraft may include a central body defining a reference axis. The aircraft may also include aerolift systems attached to the central body. Each aerolift system may include a propulsion unit configured to move air. Each aerolift system may also include a duct configured to receive the air moved by the propulsion unit into an inlet of the duct and to expel the air out of an outlet of the duct. The inlet may extend along an inlet axis that is angled no more than 30 degrees relative to the reference axis. A turn angle between the inlet axis and an outlet axis defined by the outlet of the duct and may be from 20 degrees to 45 degrees. Each aerolift system may include a lifting body to receive the air expelled from the outlet of the duct such that the air imparts a lifting force on the lifting body. The lifting body may define a chord that is angled no more than 45 degrees relative to the reference axis.

In another aspect, a system for generating movement via aerodynamic lifting forces is described. The system may include a machine structure having a moveable component. The system may also include an aerolift system attached to the moveable component. The aerolift system may include a propulsion unit configured to move air. The aerolift system may also include a duct configured to receive the air moved by the propulsion unit into an inlet of the duct and to expel the air out of an outlet of the duct. Further, the aerolift system may include a lifting body configured to receive the air expelled from the outlet of the duct such that the air imparts a lifting force on the lifting body to thereby cause the moveable component to move.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The drawings comprise the following figures in which:

FIG. 35C illustrates a set of equations for characterizing thrust based on the selected parameters of the aircraft of FIG. 35A.

FIG. 39 illustrates a cross-sectional view of an alternative embodiment of the aerolift system including the airflow ducts and the lifting body of FIG. 36A, with one or more gears coupled to the system.

FIG. 41 illustrates a top view of an alternative embodiment of the aerolift system including the airflow ducts and the lifting body of FIG. 36A integrated with an end of a building.

FIG. 54D illustrates a graphical representation of analytical data for an amount of thrust generated based on selected parameters of the airflow ducts and lifting bodies.

FIG. 54E illustrates a side view of another embodiment of an airflow duct having a first lifting body positioned at the outlet end, a second lifting body positioned radially outward (rearward) from the first lifting body, and a third lifting body positioned radially outward from the second lifting body.

FIG. 55A illustrates a bottom perspective view of another embodiment of an aircraft having a central body positioned at least partially above the aerolift systems.

FIG. 55B illustrates a cross-sectional view of the aircraft of FIG. 55A.

FIG. 56A illustrates a bottom perspective view of another embodiment of an aircraft having a central body positioned at least partially below the aerolift systems.

FIG. 56B illustrates a cross-sectional view of the aircraft of FIG. 56A.

DETAILED DESCRIPTION

Figure 1A:
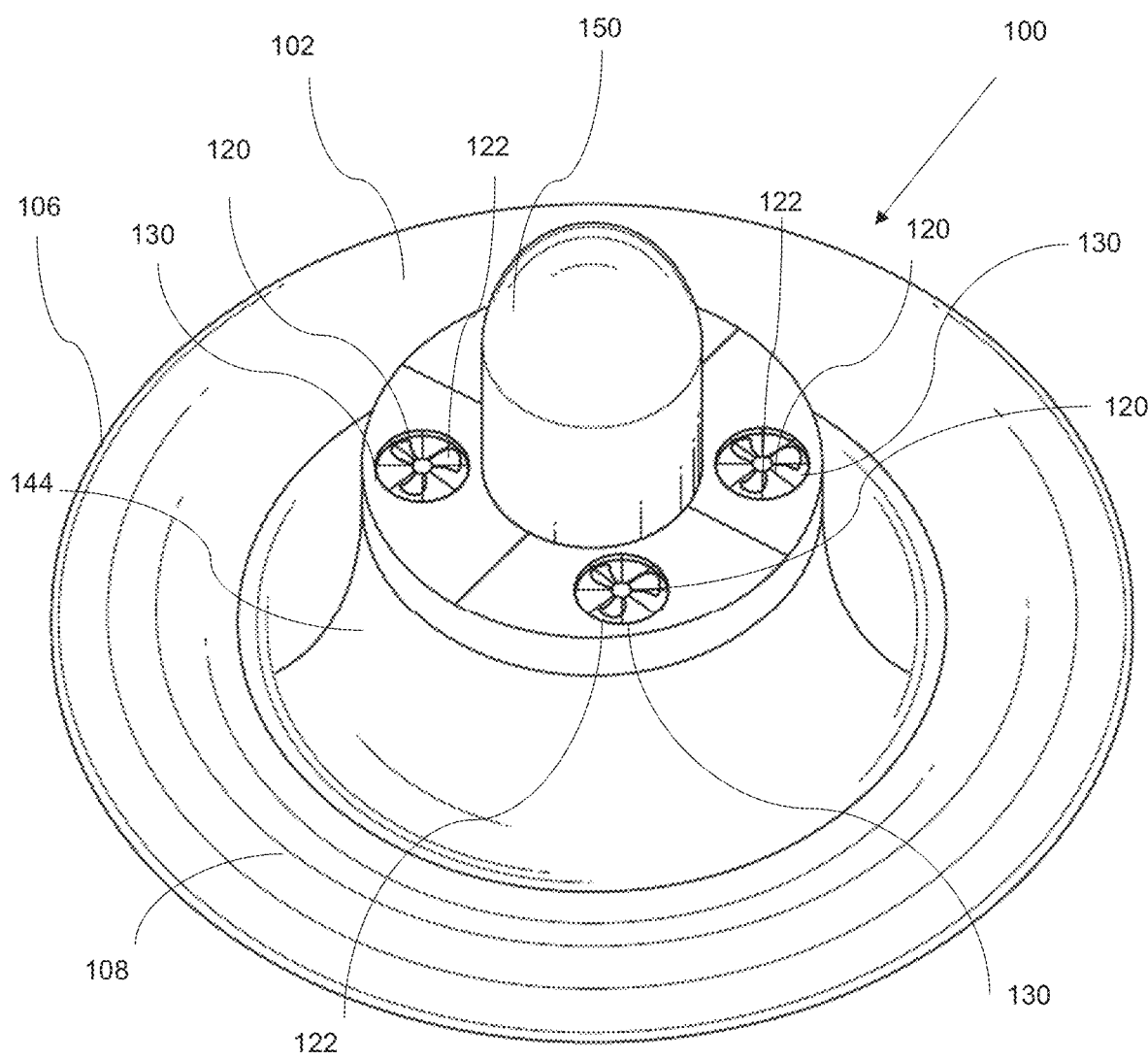
FIG. 1A illustrates a perspective view of an embodiment of an aircraft, having an annular lifting body shown as an annular wing, with a plurality of propulsion units and airflow ducts.

Although embodiments, examples, and illustrations are disclosed below, the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure may comprise several novel features and no single feature is solely responsible for its desirable attributes or is essential to practicing the disclosures herein described unless otherwise indicated as such.

The disclosure herein provides systems, methods, and devices for generating motive power using aerodynamic lifting forces. An aerolift system is included as part of a machine or other system such as an aircraft for generating desired movements. The aerolift system includes one or more propulsion units for moving air, one or more ducts for receiving the moved air, and one or more lifting bodies over which the air is blown from the duct for generating lifting forces to cause movement of the lifting body. The aerolift system is attached to a moveable component in order to move the moveable component relative to a supporting structure. The moveable component may be an aircraft wing, elevator or lift arm and the supporting structure may be an aircraft body, elevator shaft and construction vehicle respectively. These are just some example applications of the aerolift system, and many other applications may incorporate the aerolift system.

In the case of an elevator, the aerolift system may enable an elevator or lift system (e.g., aerolift) to travel vertically within or externally to a building or another structure. Elevators can improve vertical transportation, which can allow people to effortlessly move between floors, which can be important in larger structures (e.g., skyscrapers and high-rise buildings). Traditional elevators or lift systems may consist of cables and pulleys or fluid based hydraulics, along with a motor to move an elevator car upwards or downwards. These traditional elevators can be essential for ensuring accessibility to individuals with disabilities, complying with various regulations, and promoting inclusivity. However, for buildings with different structures, utilizing the aerolift system can improve the efficiency of moving between floors.

The positioning of elevators in different buildings can depend on the structure's design and function. In some residential buildings, elevators may be centrally located or positioned near common areas to provide easy access. In other buildings (e.g., commercial and/or office buildings), the elevators can be placed to better facilitate the flow of people in and out of the buildings. Additionally, in medical buildings or hospitals, elevators or lift systems can be positioned to efficiently move patients to critical areas. The aerolift system may improve the ability to place any elevator in a desired location (internally or externally as an attachment).

The systems disclosed herein may include one or more lifting bodies, a plurality of ducts, and a plurality of rotors. The rotors (e.g., propulsion units) may have a plurality of propellors, which may be configured to rotate to draw external (e.g., environmental) air though an inlet portion or inlet end of the plurality of ducts. The flow of air may then be drawn towards an outlet portion or outlet end of the plurality of ducts and to the leading edge of the lifting body. The propulsion units and ducts may be distributed annularly about an optional central compartment, such as a passenger, payload, or cargo area or above or below the Aerolift systems. While particular example uses of the aerolift machines are shown and described herein, the machine may be used in a variety of other applications and include a variety of other features.

For aircraft, the disclosure herein provides systems, methods, and devices that enable flight for a vertical takeoff and landing (VTOL) aircraft with a wing (e.g., annular wing) which may completely or partially extend around a central main body (and/or a plurality of annular wing segments arranged about a periphery of the aircraft and/or in a generally annular configuration). As used in this document, "annular" includes shapes that are generally circumferential including but not limited to circular, elliptical, triangular, square, rectangular, pentagonal, hexagonal, heptagonal, octagonal, other polygonal or segmented shapes, or combinations thereof. A plurality of propulsion units expel air into a respective airflow duct which directs the air over the wing. The propulsion units and ducts may be distributed annularly about a central compartment, such as a passenger, payload, or cargo area. The annular (e.g., circular) wing may have a cross-sectional shape of an airfoil. The wing may be generally symmetrical about a longitudinal axis. The cross-sectional profile of the airfoil may be configured so that the top (e.g., upper) side of the airfoil is more curved than a bottom (e.g., lower) side of the airfoil. The airfoil configuration may be useful since it may be capable of generating lift in an aircraft. Advantageously, by having an airfoil profile, a flow of air may increase in speed upon reaching a leading edge of the wing and traveling over a top side of the wing. By having this upper, curved shape, a lower pressure zone may be created. Additionally, in some embodiments, the flow of air may decrease in speed (relative to the speed of air traveling over the top side of the wing) when traveling under the lower (e.g., flatter) side of the airfoil profile of the wing (relative to the top surface) and may create a high-pressure zone than at the top side of the wing. Advantageously, a pressure differential between the upper surface and a lower surface may lead to lift which may enable the aircraft to overcome gravity. In some embodiments, having a singular, annular wing may further increase the amount of pressure underneath the wing and may improve the lift/drag coefficient (e.g. similar to "Ground Effect") and may increase flight efficiency.

In some embodiments, the aircraft may have one or more (e.g., a plurality) propulsion units (e.g., rotors, propellers, ducted fans, turbofans, and/or the like) coupled to the aircraft. The propulsion units may be used to direct a flow of air from an upper area (e.g., above the aircraft) through one or more ducts and to a leading edge of the annular wing of the aircraft. In some embodiments, the propulsion units may be oriented in a vertical and/or downward facing direction to provide lift to the device. Other embodiments may orient the propulsion units angled, vertical, or other orientations. The propulsion units may be further mounted to and/or within a single or series of ducts (e.g., tunnels, channels, with or without grooves that streamline airflow and/or the like) which may channel the flow of air being drawn into and propelled out of the propulsion units. The ducts may be designed such that the flow of air from the propulsion units flows to a leading edge of the annular wing. Advantageously, the flow of air which travels past the top surface and lower surface of the annular wing may lift the aircraft. Furthermore, the plurality of propulsion units delivering the flow of air may assist the device in VTOL and/or short takeoff and landing (STOL). It should be noted that, although various embodiments described herein depict the propulsion units at the inlet end of the ducts, other embodiments may position the propulsion units differently. For example, the propulsion units may be positioned within the ducts, such as at an intermediate point between the duct inlet and duct outlet.

The propulsion units may be equidistantly distributed along a circular path around the central area and/or annular wing or may be spaced differently. The series of ducts may be coupled to each of the propulsion units and equidistantly spaced or spaced differently. The propulsion units may be configured, such that a flow of air being drawn into the channels reaches a particular area (e.g., segment) of the annular wing. Therefore, the aircraft may have the optimal amount of airflow drawn to the entire annular wing (and/or to a substantial portion of the annular wing) to maintain optimal lift.

In some embodiments, each of the propulsion units may be independently controlled (e.g., different pitch, spin/rotate to generate a flow of air independently of each other, such that each propulsion unit may generate a different flow level than the others). Independently controlling the propulsion units may allow each propulsion unit to rotate at a particular speed or deliver a different amount of air to a section of the leading edge of the annular wing. Independent control permits the aircraft to ascend, descend, hover, tilt, rotate, or translate based on the amount of flow delivered to each section of the aircraft. For example, in some embodiments, there may be four propulsion units equally spaced around the annular wing. When at least one of the propulsion units either rotates at a different speed or delivers a different flow of air (e.g., environmental air) at a different velocity to a section of the annular wing, the aircraft may rotate, lift and/or tilt. By having each propulsion unit independently controlled, the aircraft may be exceptionally maneuverable while potentially being more efficient than alternative aircraft designs. Furthermore, by varying the individual speed of each propulsion unit, the aircraft may effectively change altitude, pitch, roll, and yaw to make the aircraft capable of navigating complex environments with ease (e.g., improve banking), increase control takeoff and landing, and improve maneuverability during unstable atmospheric conditions (e.g., high winds, humidity, extreme weather conditions). It may be useful for certain types of aircraft to conduct photography, surveillance, cargo, package delivery, transportation and military operations and having increased maneuverability may be advantageous.

In some embodiments, it may be useful for the aircraft to have a main body, which may include a passenger compartment or cockpit. The main body may have flight instruments (e.g., radio communications, transponders etc.) which may be used to fly or operate the aircraft. The main body may be located medially to the leading edge of the annular wing of the aircraft. By placing the main body medially to the leading edge, and in some embodiments, in the center of the aircraft, the center of gravity of the aircraft is located at the true centerline or center point of the device (e.g., the centerline of the annular wing). Therefore, the aircraft may be exceptionally more balanced and stable than alternative aircraft designs.

In some embodiments, the ducts may be configured to thrust the aircraft in a desired direction. For example, the ducts may have a first outlet configured to deliver the flow of air to the leading edge of the annular wing and a second outlet (e.g., hatch, rudder) configured to open when directional thrust is desired. In some embodiments, a hatch or rudder located on each duct configured to open independently of each other may move the device forward (or assist during landing). For example, in embodiments where the aircraft comprises four propulsion units and therefore four ducts equally spaced around the annular wing, by opening the two frontmost ducts the device may thrust in a forward direction.

Various embodiments disclosed herein may be configured for an aircraft which has an empty main portion (e.g., central portion that is radially inward of the propulsion units and/or the ducts). However, the disclosures herein may be used for an aircraft which may be designed to house persons, items, packages, other payloads, and/or the like within the empty main portion or central portion, which may also be referred to as a payload compartment, passenger compartment, and the like). In some embodiments, the aircraft may be designed to lift 50 lbs., to transport packages from one destination to another. Additionally, the aircraft may be designed to assist with farming and agriculture. For example, the aircraft may be designed to pick fruits (e.g., apples, mangos, avocado, etc.) from fruit trees. Furthermore, the device may be designed and sized to hold 2500 lbs., which may include a number of individuals and their personal items. In some embodiments, the aircraft may be designed to hold 25 lbs., 100 lbs., 500 lbs., 1000 lbs., 2000 lbs., and/or 3000 lbs.

Example Aircraft

FIGS. 1A-1C and 2 illustrate an example embodiment of a system, shown as an aircraft 100, that includes a plurality of aerolift systems, with each aerolift system having a propulsion unit blowing air through a duct and over a lifting body, with the lifting body in this particular application shown as an annular wing 102 (shown disc-shaped in this example). Various other systems and applications for the aerolift system are shown and described throughout this disclosure.

Figure 1B:
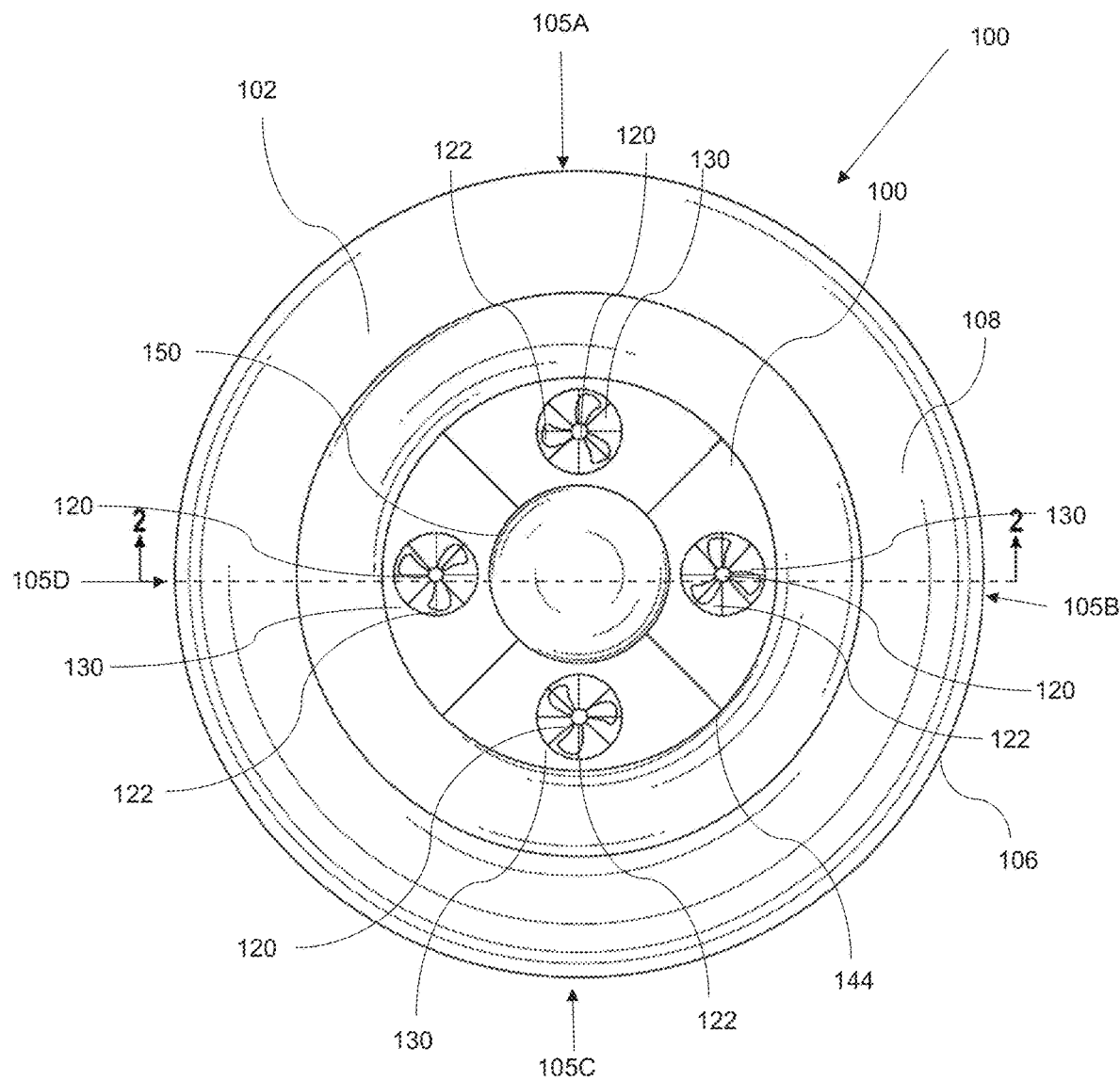
FIG. 1B illustrates a top view of the aircraft of FIG. 1A.
Figure 1C:
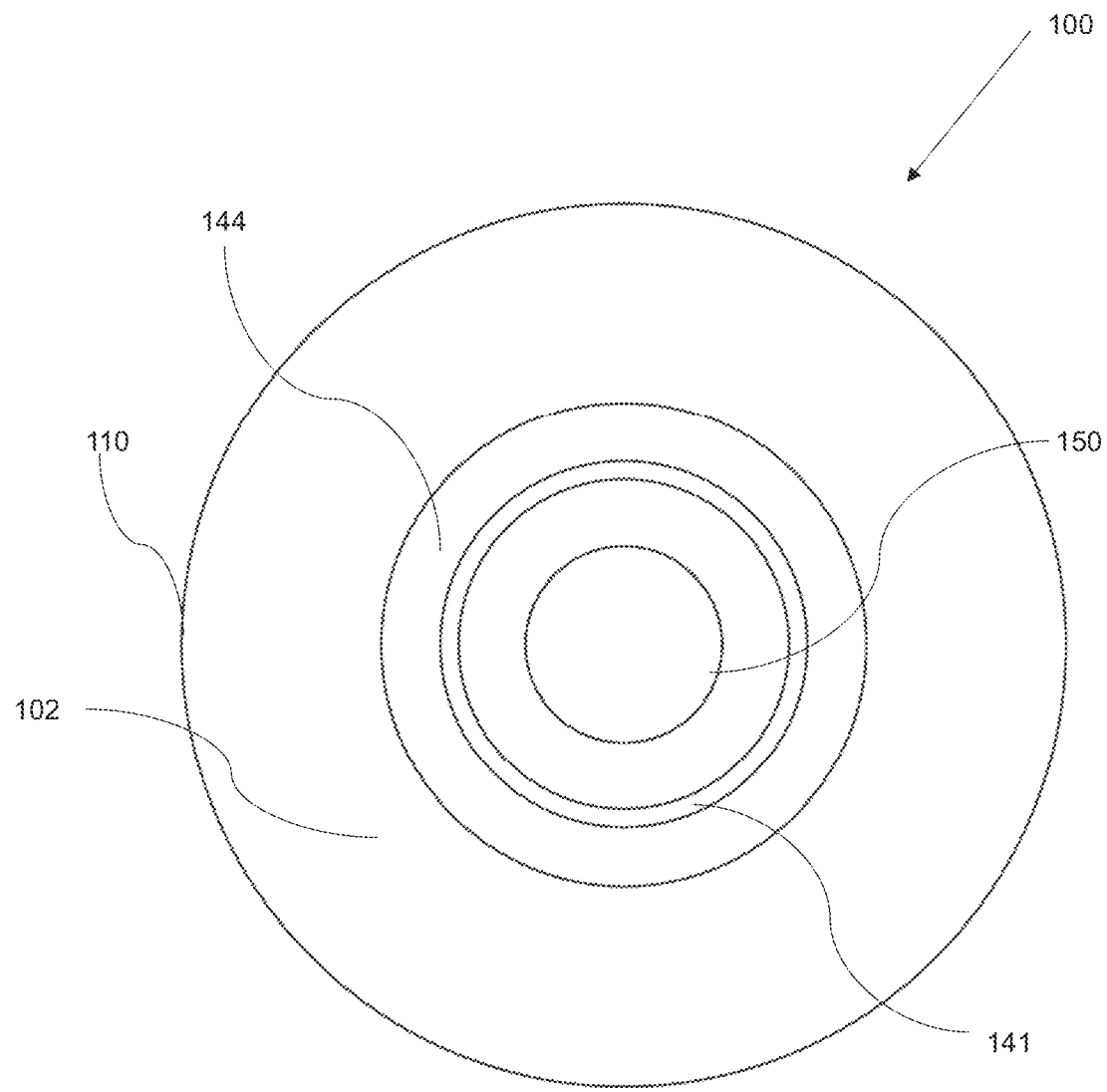
FIG. 1C illustrates a bottom view of the aircraft of FIG. 1A.
Figure 2:
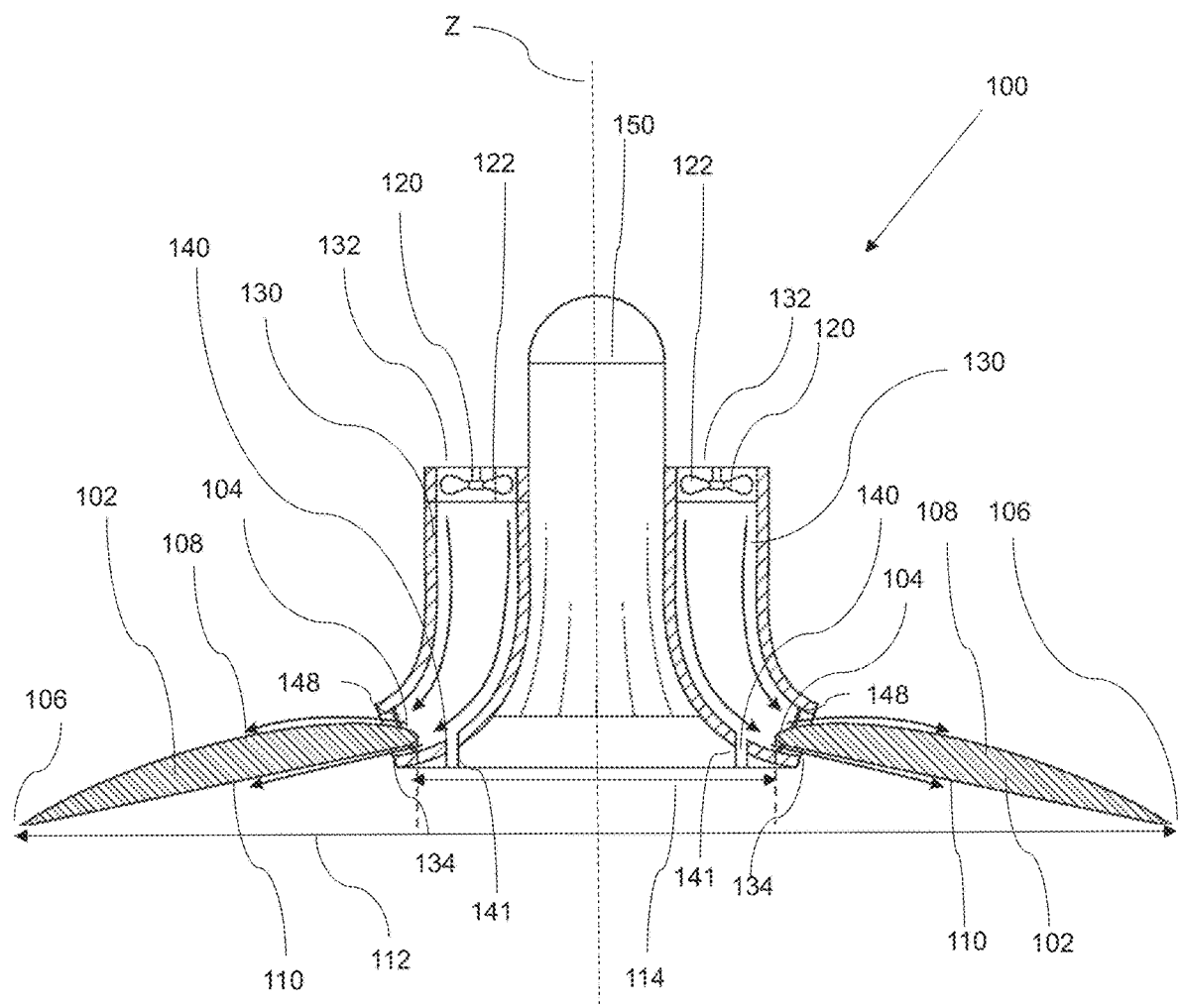
FIG. 2 illustrates a cross-sectional view of the aircraft of FIG. 1A.

FIG. 1A is a perspective view, FIG. 1B is a top view, FIG. 1C is a bottom view, and FIG. 2 is a cross-sectional view as taken along the line in FIG. 1B, of the aircraft 100 having multiple aerolift systems. The aircraft 100 thus may have a plurality of propulsion units 120, a plurality of ducts 130 (e.g., plurality of ducts 130), and a main portion 150 which may be empty, or which may contain a payload compartment, passenger area, cockpit, and/or the like. The main portion 150 may be covered with an ovular or dome shaped covering. The wing 102 may surround the plurality of ducts 130 and may be coupled to a portion of the plurality of ducts 130. Additionally, the wing 102 may have a leading edge 104 and a trailing edge 106 (see, for example, FIG. 2). The leading edge 104 may be located near or within a lower or outlet end 134 of the ducts 130. The wing 102 may have a top surface 108, where the top surface 108 may have a curved profile. The wing 102 may have a bottom surface 110, where the bottom surface 110 has a flatter surface relative to the top surface 108. Therefore, when viewing a cross-sectional profile of the wing 102 (see, for example, FIGS. 2 and 3B), the wing 102 may have the profile of an airfoil. In some embodiments, the wing 102 may be a lifting body with a curved bottom surface 110. Furthermore, the aircraft 100 may be symmetrical about a longitudinal axis Z (see, for example FIG. 2).

In some embodiments, a flow of air (e.g., flow of environmental air) is delivered to the leading edge 104 of the wing 102 from the outlet end 134 of each of the ducts 130. The flow of air may first be delivered to the leading edge 104 and travel over the top surface 108 and the bottom surface 110. The flow of air traveling from the leading edge 104 to the trailing edge 106 along the top surface 108 may flow at a relatively greater speed, compared to air flowing along the bottom surface 110, due to the curved profile of the top surface 108, resulting in a relatively lower air pressure exerted on the upper portion of the wing as compared to the pressure on the bottom surface 110. The flow of air from the leading edge 104 to the trailing edge 106 along the bottom surface 110 may flow at a relatively lower speed, compared to air flowing along the top surface 108, due to the flatter profile (e.g., compared to the top surface 108) of the bottom surface 110, resulting in a relatively greater air pressure exerted on the bottom surface 110 of the wing 102 as compared to the pressure on the top surface 108. The pressure differential between the bottom surface 110 and the top surface 108 causes a lifting force applied upward to the wing 102, which is transferred to the aircraft 100.

The plurality of ducts 130 may be coupled to the wing 102. Additionally, or alternatively, the wing 102 may be coupled to the main portion 150. The plurality of ducts 130 may extend from an inlet end 132 to an outlet end 134. In some examples, the length or shape of the ducts 130 may be configured to provide a desired speed and direction of airflow to provide streamlined airflow, maneuverability to the aircraft 100 and a desired amount of lift necessary for the operational requirements of the aircraft 100 (e.g., size or weight of the payload). The length of the ducts 130 may determine how long of a path the flow of air has to travel from the inlet end 132 to the outlet end 134. The longer the length of the ducts 130, the lower the flow rate of the air is at the outlet end 134 due to friction and turbulence experienced by the air in the ducts 130. Therefore, in some embodiments, the length of the ducts 130 may be configured to be as short as possible to increase the flow rate of air at the outlet end 134. In some embodiments, the extended length of the ducts 130 may be two feet. Additionally, the extended length of the ducts 130 may be ten feet. In some embodiments, the extended length of the ducts 130 may be between one foot and twelve feet. Furthermore, the ratio of length of the ducts 130 to a blade 122 diameter may be 2:1 (e.g., length of the ducts is two times longer than the diameter of the blades 122 of the propulsion units 120). Additionally, in some embodiments, the ratio between the length of the ducts 130 and the blade 122 diameter may be between 1:1 to 4:1.

The inlet end 132 and the outlet end 134 may be circular or generally circular (e.g., ovular). The inlet end 132 and outlet end 134 may be shaped to permit a desired flow of air to enter the propulsion units 120. The inlet end 132 and outlet end 134 of the ducts 130 may have a diameter configured to provide a desired amount of airflow to the leading edge 104 of the wing 102. In some examples, the diameter of inlet end 132 may be approximately two feet. Additionally, in some examples, the diameter of the inlet end 132 may range from eight inches to sixteen inches, from sixteen inches to thirty-two inches, or from thirty-two inches to seventy-two inches. In some embodiments, the diameter of the inlet end 132 of the ducts 130 corresponds to the diameter of the propulsion units 120. In some examples, the diameter of the outlet end 134 may be approximately two feet. Additionally, in some examples, the diameter of the outlet end 134 may range from eight inches to sixteen inches, from sixteen inches to thirty-two inches, or from thirty-two inches to seventy-two inches. The ratio of diameter between the inlet end 132 and the outlet end 134 may be between 1:1 to 4:1. Therefore, the ducts 130 may taper from the inlet end 132 to the outlet end 134.

The plurality of propulsion units 120 may be coupled to the inlet end 132 of the plurality of ducts 130 and be designed such that a flow of air is drawn (e.g., directed, delivered) through the propulsion units 120 to the inlet 132 of the plurality of ducts 130. By mounting the plurality of propulsion units 120 in a vertical and/or downward facing direction, the flow of air may originate from above the wing 102. Advantageously, this may reduce the amount of air pressure above the aircraft 100 and/or at the top surface 108 of the wing, which may improve lift. Furthermore, by delivering the flow of air to the wing 102 the aircraft 100 may vertically takeoff, vertically ascend, vertically descend, and vertically land. In some embodiments, the propulsion units 120 may alternatively be positioned at an intermediate location of the ducts 130 (such as at a location along the length of the duct 130 between the inlet end 132 and the outlet 134). In such a configuration, the flow of air may still originate from above the wing 102, even if the propulsion units 120 are in a different location. Positioning the propulsion units 120 in an intermediate location of the ducts may maintain the flow rate of air at the outlet end 134 of the ducts 130 which may improve operational efficiency of the propulsion units 120. In some embodiments, the propulsion units 120 may be positioned above the inlet end 132 of the plurality of ducts 130, where at least a portion of the propulsion units 120 may extend from the inlet end 132. The propulsion units 120 may be spaced circumferentially around the wing 102 and may be equidistantly separated. Additionally, the propulsion units 120 may be spaced annularly about the longitudinal axis Z of the aircraft 100.

The number of ducts 130 may equal the number of propulsion units 120 (e.g., 1:1 ratio of ducts 130 to propulsion units 120). There may be one propulsion unit 120 providing air to a respective one of the ducts 130. The plurality of ducts 130 may be spaced circumferentially around the wing 102 and may be equidistantly separated. The plurality of ducts 130 may be spaced annularly around the longitudinal axis Z of the aircraft 100. In some embodiments, such as in the aircraft 100 of FIGS. 1A-1C and 2, the number of ducts 130 and the number of propulsion units 120 may be four units/ducts. Further, although FIG. 2 only shows the details of two of the ducts 130, the other two ducts may be the same or similar in design. Alternatively, the number of ducts 130 and the number of propulsion units 120 may be any number which may provide the desired amount of airflow to the leading edge 104 of the wing 102. (e.g., two, four, six, eight, ten, etc.). Further, some embodiments may have a different number of ducts 130 than the number of propulsion units 120 (such as, for example, by having one or more propulsion units 120 sharing a duct and/or by having one or more ducts 130 sharing a propulsion unit 120). For instance, a single propulsion unit 120 may provide airflow to two, three, four or more ducts 130. As another example, a single duct 130 may include two, three, or four propulsion units 120, for instance, at the inlet 132, outlet 134, and/or one or more propulsion units 120 there between.

In some embodiments, the plurality of ducts 130 may be configured such that a flow of air may be delivered to a particular region (e.g., one or more of sections 105A, 105B, 105C, 105D) of the wing 102. For example, in some embodiments, there may be four ducts 130 and four propulsion units 120, where the four ducts 130 deliver a flow of air to the leading edge 104 for four sections (e.g., one or more of sections 105A, 105B, 105C, 105D) of the wing 102. Therefore, the wing 102 may receive flows of air from each of the propulsion units 120. This may be advantageous when the plurality of propulsion units 120 are configured to operate independently. However, this is not limited to embodiments with four ducts 130 and four propulsion units 120. This may include any number of propulsion units 120 and ducts 130.

When the plurality of propulsion units 120 are configured to deliver different speeds (e.g., flows) of air to different sections of the aircraft 100, then the aircraft 100 may have different pressure differentials at each section. Therefore, the aircraft 100 may pitch, yaw, and/or roll. For example, section 105B of the wing 102 may receive a faster flow of air, as compared to section 105D of wing 102 (e.g., the section spaced 180 degrees from 105B), which may cause section 105B to generate more lift and tilt in a forward direction (e.g. towards section 105D) to move the aircraft forward Additionally, in some examples, sections 105A of the wing 102 may receive a faster flow of air, when compared to second 105C of the wing 102 (e.g., the section spaced 180 degrees from section 105A), which may cause section 105A to generate more lift and tilt the aircraft 100 to a side which may move the aircraft towards that side. In some embodiments, the propulsion units 120 may be configured to move the aircraft 100 at slow speeds (e.g., 5-10 mph). However, the aircraft 100 may be configured such that the device may travel at speeds of up to 25-30 mph. In some embodiments, the plurality of ducts 130 may be created in a larger channel (e.g., walled structure) 144, as further described.

In some embodiments, the aircraft 100 may have a main portion 150, such as a body. The main portion 150 may be disposed radially inwardly of the wing 102 and/or ducts 130, for example within a central opening or space defined by the wing 102 and/or ducts 130. The main portion 150 may be located medially (radially inwardly) to the leading edge 104. The main portion 150 may be cylindrical or generally cylindrical as shown, or other shapes. A sidewall of the main portion 150 may extend annularly about the longitudinal axis Z. In some configurations, the main portion 150 may be empty. Additionally, the main portion 150 may extend above the inlet 132 of the plurality of ducts 130. The main portion 150 may also be configured to contain people and/or objects. For example, in some embodiments, the main portion 150 may include a passenger compartment which may comfortably contain one or more persons. The passenger compartment may have an upper room and a lower room. Additionally, the main portion 150 may be configured to contain packages, people, and/or vehicles. In some embodiments, the main portion 150 may be configured to contain 50 lbs. to 100 lbs. Additionally, in some embodiments, the main portion 150 may be configured to contain 25 lbs. (e.g., a package) or 2000 lbs. (e.g., a group of people). The main portion 150 may be configured to contain anywhere between 5 lbs. and 3500 lbs. or more. In some embodiments, the main portion 150 may be configured to hold smaller payloads and/or electronics, for example in smaller "drone" versions of the aircraft 100. The volume of the main portion 150 may thus range from one to ten cubic inches, and up to ten, twenty, thirty, or more cubic feet.

The main portion 150 may be coupled (e.g., rigidly mounted) to an interior wall or walls of the plurality of ducts 130. In some embodiments, the center of gravity of the device is located along the longitudinal axis of the wing 102. Advantageously, this may improve the stability of the aircraft 100 when traveling in the air. In some embodiments, the ducts 130 may extend through the main portion 150. The ducts 130 may extend through radially outward locations of the main portion 150. The ducts 130 may extend through a central location of the main portion 150, with the empty space of the main portion 150 surrounding upper portions of the plurality of ducts 130.

In some embodiments, with reference to FIG. 2, the plurality of ducts 130 may also have a flap 140 positioned along a bottom edge of the ducts 130. The flap 140 may be a hinged member, rudder, etc., that is moveable to reveal a slot or other opening in the duct 130. The flap 140 may allow a flow of air to exit the ducts 130 through an opening 141 before reaching the leading edge 104 of the wing. Therefore, the flap 140 may be configured to create a horizontal directional (e.g., forward/backward) thrust to move the aircraft 100. For example, when the aircraft 100 is traveling through the air, the flap 140 located on at least one of the ducts 130 may be configured to open to direct a flow of air out of the opening 141 in a desired direction to move the aircraft 100 horizontally forward. Additionally, the flap 140 may be configured to open during takeoff or landing to direct a flow of air downward which may achieve a desired amount of lift. For example, directing a desired flow of air downward from the flap 140 can directly generate lift which can supplement the lift generated by directing a flow of air across the wing(s), which may help stabilize the aircraft 100 during landing and/or may increase the net vertical lifting force during takeoff. The flap 140 may be on a vertical portion of the duct 130, on a horizontal portion of the duct 130, or as shown on an angled or curved portion of the duct 130.

With reference to FIG. 2, the ducts 130 may turn or bend from the inlet end 132 to the outlet end 134. The turn may be measured by a "turn angle" as measured between a first longitudinal axis 3537A as defined by the duct channel at the inlet end 132 and a second longitudinal axis 3537B as defined by the duct channel at the outlet end 134 (see, for example, FIG. 35B). This turn angle may be from 10 degrees to 60 degrees, from 15 degrees to 55 degrees, from 20 degrees to 45 degrees, or from 30 degrees to 40 degrees. Further, the first longitudinal axis 3537A may be parallel to or slightly angled or "canted" with respect to a reference axis. The reference axis may be a central longitudinal axis of the vehicle, or an axis aligned with a gravity vector (a vector aligned with the direction of the force of gravity), or a vertical axis (see, for example, FIGS. 51A and 51B). A set of the propulsion units 120 may be mounted at the inlet ends 132 of the ducts 130. The propulsion units 120 may comprise a plurality of blades 122 extending from a central hub. In some embodiments, the blades in the propulsion units 120 may have a variable blade pitch to optimize energy consumption during flight. A motor within each propulsion unit may rotate the blades 122 via the hub. By configuring the plurality of propulsion units 120 to rotate the blades 122 at various, independently controlled speeds, the aircraft 100 may, as mentioned, change altitude, pitch, roll, and yaw to maneuver the aircraft 100 in a desired direction. Operating the different propulsion units 120 independently may also be used to stabilize flight, even in a stationary hover, such as to account for turbulence, wind, movement of payloads and/or passengers, and/or the like.

Figure 7:
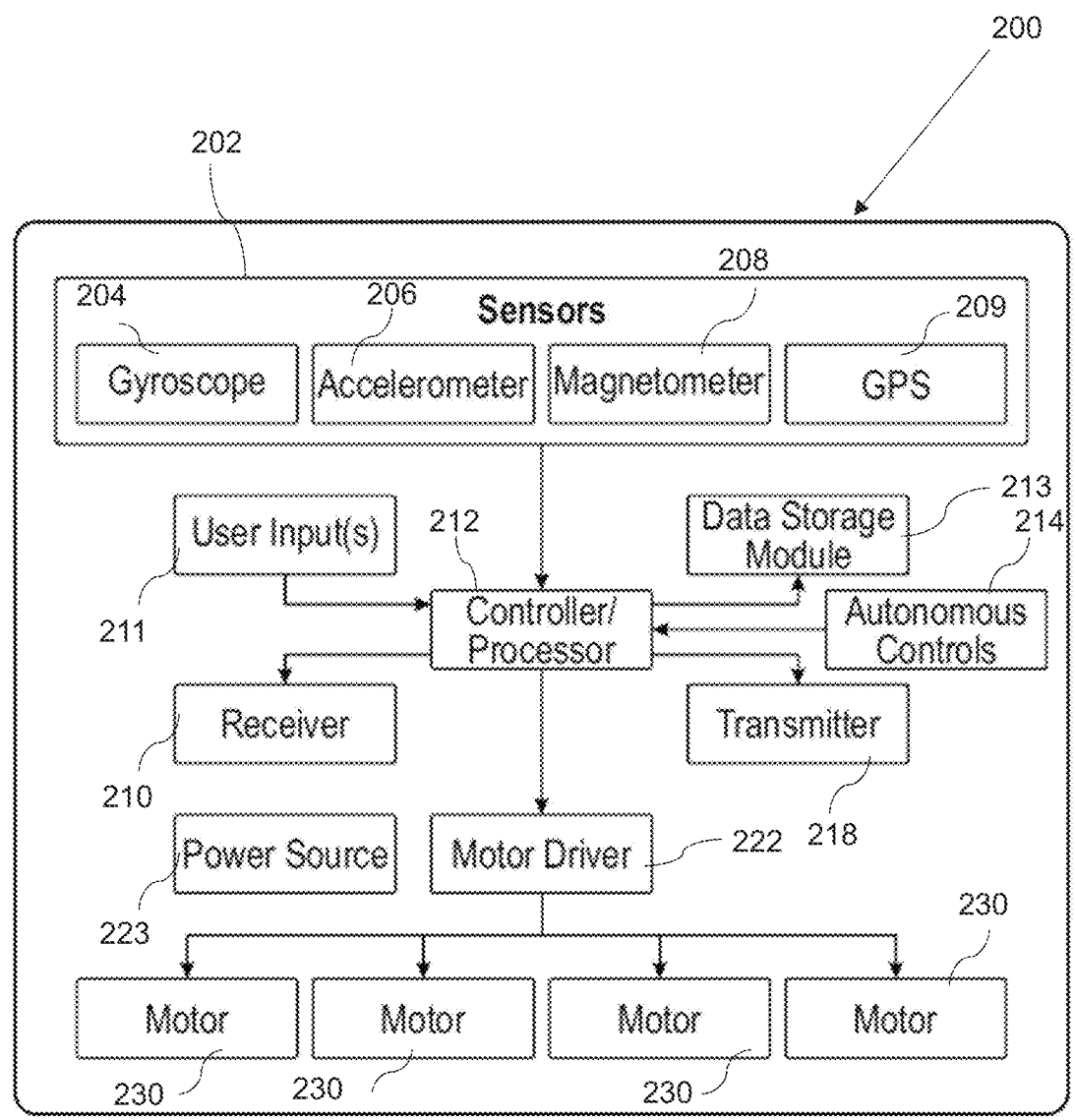
FIG. 7 illustrates a block diagram of an embodiment of hardware and/or software modules that may be included in any of the aerolift, aircraft or other systems described herein.

The plurality of propulsion units 120 may be operated by a controller 212 or processor system based on user inputs 211 and/or autonomous controller (e.g., self-operating mode) 214 and/or sensors 202 (see, for example, FIG. 7). The plurality of propulsion units 120 may be coupled to independently controlled motors 230 that are operated to fly the aircraft 100 through the air. The motors 230 may operate to spin the plurality of blades 122 to deliver air to the ducts 130. The plurality of blades 122 may be coupled to the hub and to the motor 230, which may be configured to rotate or swivel the hub and the plurality of blades 122. The plurality of blades 122 may have a fixed span (e.g., length). In some cases, the plurality of blades 122 may have a length and/or blade pitch that varies to deliver an optimized flow of air to the ducts 130. In some embodiments, rotating or swiveling the propulsion units 120 and therefore the plurality of blades 122, may vary the blade pitch. Additionally, in some embodiments, the blade pitch may be varied by oil pressure or centrifugal weights which may be attached directly to the plurality of blades 122. The plurality of blades 122 may be shrouded in a case which houses the motor 230, blades 122, and hub. Additionally, the plurality of propulsion units 120 may each deliver approximately fifty to two-hundred and fifty N of thrust (e.g., spin the blades 122 at a fast enough speed to generate the desired force). The plurality of propulsion units 120 may have a diameter of about 12 inches. However, in some cases the diameter of the propulsion units 120 (e.g., the diameter of the case or shroud) may range from six inches to sixteen inches, from sixteen inches to thirty-two inches, or from thirty-two inches to seventy-two inches.

The plurality of propulsion units 120 may be coupled to or include an electric motor (e.g., motors 230) or a piston engine (e.g., powered by fossil fuel). In some embodiments, the propulsion units 120 may be electric propulsion units capable of delivering up to 250 Newtons (N) of thrust at 15 kW of power to 1,000 N or more. In some embodiments, the propulsion units 120 may have a casing with an inside diameter of 195 mm. The casing may, in some embodiments, have an inside diameter from 100 mm to 300 mm, or from 100 mm to 600 mm, or from 300 mm to 550 mm, or from 500 mm to 550 mm, or from 520 mm to 530 mm. The total area of the rotating plurality of blades 122 may be approximately 215 cm$^2$ (e.g., thirty-three in$^2$). The amount of input power may range between four kW and 25 kW. Additionally, the static thrust range may be from 50 to 350 N, or from 500 to 700 N. The RPM range of the propulsion units 120 may be 10,000-18,000 RPM (e.g., the plurality of blades 122 spin at 10,000-18,000 RPM), or from 2,000-20,000 RPM. The total weight of each propulsion unit 120 may be from 1000 grams (g) to 3400 g (e.g., about 7.5 lbs.), or from 1000 g to 20,000 g. In some embodiments, the propulsion units 120 may weigh between four lbs. and 40 lbs. The propulsion units 120 may generate a flow of air at speeds from 64 to 128 meters per second (m/s) (e.g., 143 mph to 286 mph), or from 40 to 60 m/s. The total area of the rotating plurality of blades 122 may be from approximately 20 to 50 square inches (in$^2$). The battery (e.g., power source 223) may be a 12-14 S 20000 mAH LiPo battery. The efficiency of the propulsion units 120 may be approximately 78%. Additionally, in some embodiments, the efficiency of the propulsion units 120 may be from 68% to 85%. The propulsion units 120 may be, in some cases, a DS-215-DIA HST electric fan or an eP05-21 electric motor manufactured by Schubeler (Bad Lippspringe, Germany). In some embodiments, the propulsion units 120 may be powered by a hybrid power source that includes two different power sources, such as electric and fossil fuel, etc. It should be noted that, while the above description provides examples of certain specifically configured propulsion units that can be used with at least some embodiments of aircraft disclosed herein, the concepts disclosed herein are not limited to such propulsion units, and any propulsion units capable of performing the functions disclosed herein may be utilized.

Additionally, the air may travel through the opening at the flap 140 to cause the aircraft 100 to tilt and or move forward. Assuming a constant airflow output from a propulsion unit 120, the amount of air that reaches the corresponding leading edge 104 will be reduced when air exits through the flap 140. When air exits the flap 140 the pressure differential on the section of the wing the duct 130 is providing the flow of air to may change relative to the other sections. Therefore, the change in pressure differential on the section of the wing 102 may cause the aircraft 100 to ascend, descend, hover, tilt, rotate, or translate. In some cases, the aircraft may compensate for such change by, for example, increasing the air flow from the propulsion unit 120. The flap 140 coupled to the duct 130 may be angled. By angling the flaps 140, directing air out of the flaps 140 may cause the aircraft 100 to move in a desired direction (e.g., forward/backwards).

In some embodiments, the plurality of ducts 130 may be grooved or include a plurality of grooves on an inner wall of the ducts 130. The grooves may extend from the inlet 132 to the outlet 134 of the ducts 130 and may reduce turbulent flow of air. Advantageously, this may allow for streamlining of airflow (e.g., laminar flow) and better control of the speed of the flow of air as it reaches the leading edge 104 of the device. In some embodiments, the plurality of ducts 130 may taper, (e.g., decrease in cross-sectional area, from the inlet end 132 to the outlet end 134), which may increase the air pressure from the inlet end 132 to the outlet end 134 and increase the speed of the air at the leading edge 104. Advantageously, tapering the ducts 130 may allow the propulsion units 120 to operate at slower speeds to deliver a desired amount of air to the leading edge 104.

The wing 102 may be mounted to the outlet 134 of the ducts 130 via a series of supports 148 (e.g., high strength tie rods, axles, cables, and the like). The supports 148 may also connect to an area adjacent to the leading edge 104 of the wing 102. By using the supports 148, the angle of the annular wing 102 relative to the direction of incoming air from the duct 130 may be varied. As described in further detail below, the supports 148 may be configured to adjust the angle (e.g., angle of attack) of the wing 102 to achieve a desired lift and/or operational profile. The supports 148 may also extend or retract the wing 102 further into or outside of duct 130. Advantageously, using supports 148 to couple the wing 102 to the plurality of ducts 130 may lead to significant weight reduction in the aircraft 100. Additionally, in some embodiments, the supports 148 may further connect the wing 102 to the main portion 150 of the aircraft 100.

Figure 3A:
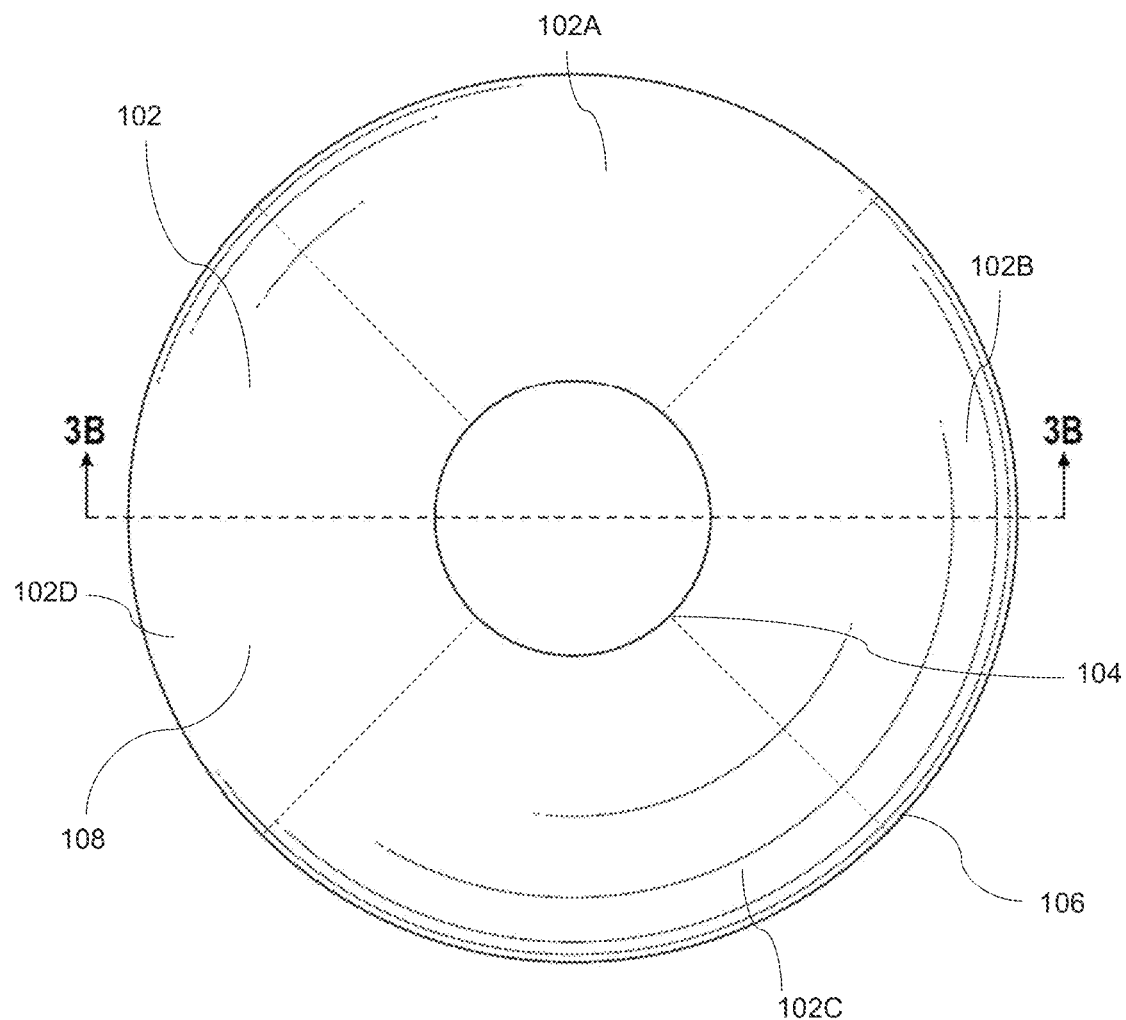
FIG. 3A illustrates a top view of an annular wing shown in isolation from the aircraft of FIG. 1A.
Figure 3B:
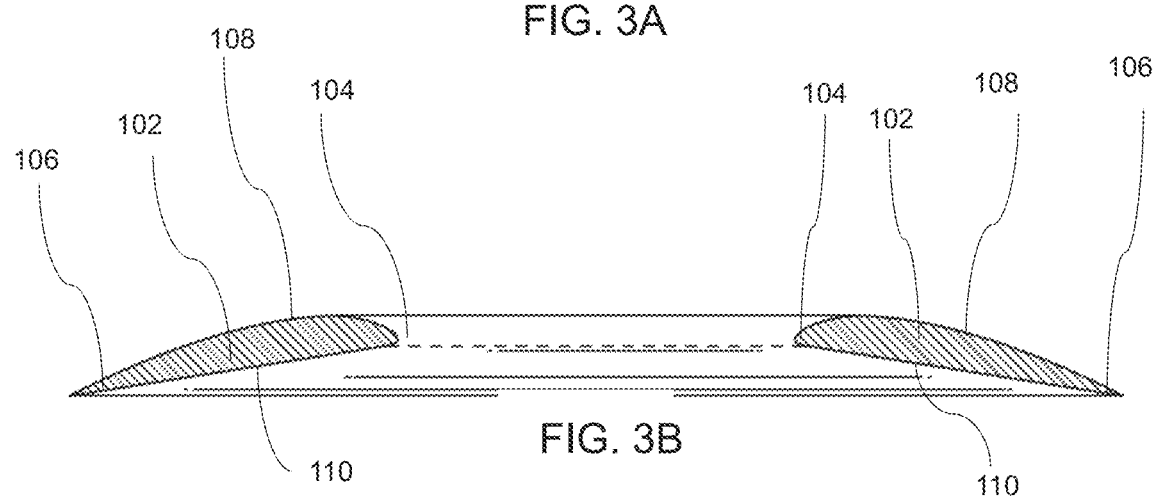
FIG. 3B illustrates a cross-sectional view of the annular wing of FIG. 3A.

FIGS. 3A and 3B illustrate the wing 102 in isolation from the aircraft 100. The wing 102 may be generally symmetrical and extend annularly about the longitudinal axis Z. The wing 102 may have an outer diameter 112 and an inner diameter 114. The ratio of the outer diameter 112 to the inner diameter 114 may be 2:1 or greater, 3;1 or greater, 4:1 or greater, about 3:1, or about 4:1. The outer diameter 112 of the wing 102 may be approximately thirty feet and the inner diameter may be about ten feet. Additionally, in some embodiments, the outer diameter 112 of the wing 102 may be between twenty feet to sixty feet. In smaller versions (e.g., handheld versions) of the aircraft 100, the inner diameter 114 may be from one to ten inches, and the outer diameter 112 may be from three to fifty inches. The main portion 150 may be disposed within the inner diameter 114 of the wing 102. The wing 102 may be made of carbon fiber, aluminum alloy, fabric, wood, magnesium alloy, or any other suitable material.

The wing 102 may also be partitioned (e.g., sectioned) into separately and independently moveable sections. The wing 102 may be broken up into discrete sections (e.g., 102A, 102B, 102C, 102D) with open spaces or slots in between each section instead of being a continuous disc/annular shape. Each of the sections may be independently mounted to the aircraft 100 and the plurality of ducts 130 via the supports 148. The number of wing sections may correspond to the number of ducts 130 (e.g., 1:1 ratio of sectioned wings to ducts 130). Therefore, in some cases, the number of wing sections may also correspond to the number of propulsion units 120 (e.g., 1:1:1 ratio of wing sections to ducts 130 to propulsion units 120).

The individual wing sections (e.g., 102A, 102B, 102C, 102D) may be independently rotatable or actuatable. The individual wing sections (e.g., 102A, 102B, 102C, 102D) may be operated by a controller 212 which can actuate supports 148 to move the wing sections. The supports 148 may be configured to move the leading edge 104 of the wing upwards or downwards (e.g., longitudinally) and/or translate the individual wing section from side to side (e.g., laterally). The individual wing sections (e.g., 102A, 102B, 102C, 102D) may each have a variable mounting angle. The supports 148 may be configured to adjust the angle of each section of the wing 102 independently to achieve a desired lift and/or operational profile. In some embodiments, the individual wing sections can independently rotate from side to side (e.g., horizontally) within the ducts 130. Therefore, the majority of the wing 102 area (e.g., the total surface area of the individual wing sections 102A, 102B, 102C, 102D) could shift from a front side of the aircraft 100 to a rear side of the aircraft 100.

Figure 4A:
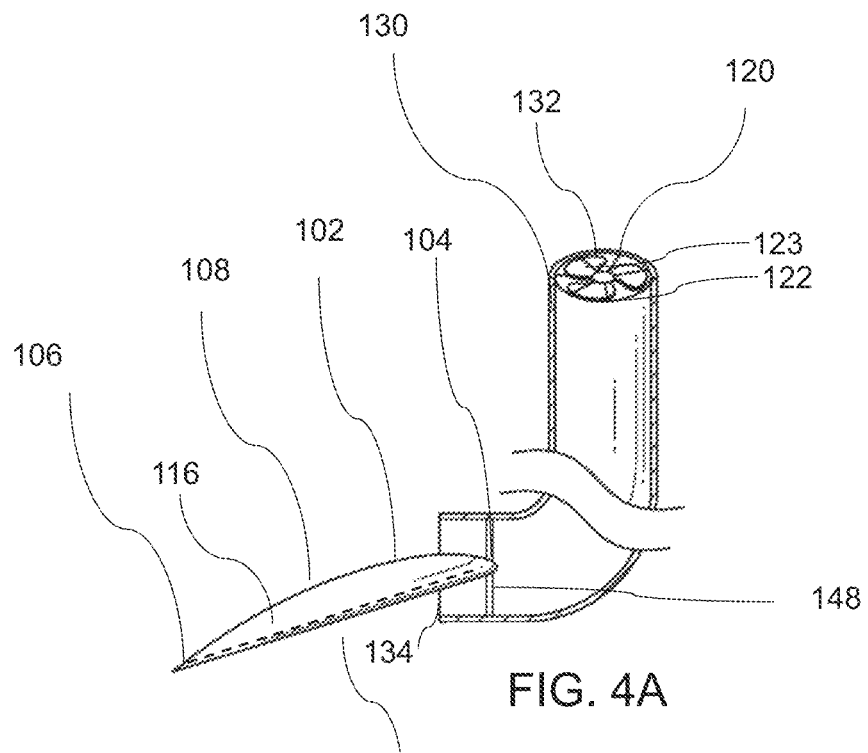
FIGS. 4A and 4B are cross-sectional views of embodiments of one of the airflow ducts and annular wing of the aircraft of FIG. 1A, showing the wing in two rotational positions.
Figure 4B:
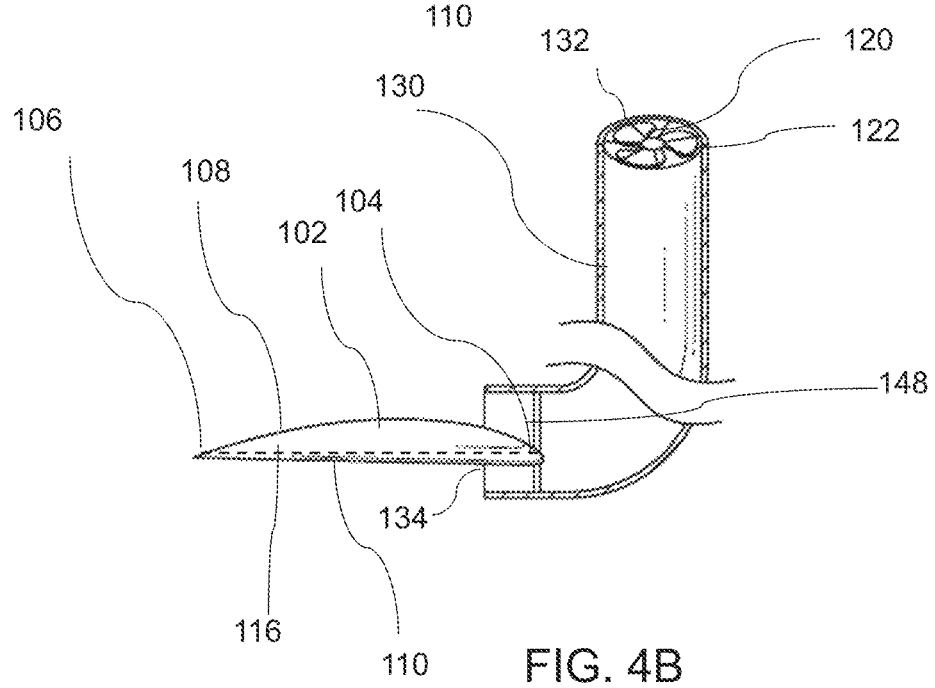

FIGS. 4A-4B illustrate an example cross section of one of the ducts 130 coupled to the wing 102 of the aircraft 100, with the wing 102 shown in different angular orientations. The wing 102 may have a first mounting angle proving a first angle of attack (e.g., 0 degrees, 5 degrees) which may be used, for example, to assist in the vertical lift of the aircraft 100. The angle of attack is the angle at which air exiting the duct 130 meets the airfoil. The angle is formed between the chord 116 of the airfoil and the direction of the relative air. The first mounting angle as shown in FIG. 4A may provide a first angle of attack that provides a first amount of lift and allows the plurality of propulsion units 120 to operate at an optimal speed to vertically lift the aircraft 100. The wing section may then be rotated to a second mounting angle as shown in FIG. 4B to provide a second angle of attack that is less than the first angle of attack and which may provide a relatively smaller lifting force as compared to the first angle of attack.

Furthermore, by changing the mounting angle (e.g., from 0 degrees to ten degrees) of the wing 102, and thus the angle of attack, the aircraft 100 may move in a forward direction. For example, after vertically lifting the aircraft 100 at a desired first mounting angle, the mounting angle of one or more sections of the wing 102 may change to tilt (e.g., move) to alter its angle of attack and the associated lifting force. Due to the uneven lifting forces, the wing 102 now tilts in a forward direction (e.g., a leading edge of the wing 102 is relatively lower than in the first position) and the aircraft 100 may move in a forward direction as the plurality of propulsion units 120 delivers a flow of air to the leading edges 104 of the various sections of the wing 102. As described in more detail below, the supports 148 may be connected to a controller or processor which may be configured to change the mounting angle of the one or more sections of the wing 102.

Additional Duct Examples

FIGS. 5A-5E illustrate examples of different shapes that the ducts 530 may utilize. The ducts 530 may operate similarly to the ducts 130 of aircraft 100, discussed above, and may be used with any aircraft described herein, including aircraft 100. The ducts 530 may be J-shaped (see, for example, FIG. 5B), C-shaped (see, for example, FIG. 5C), L-shaped (see, for example, FIG. 5A) or any other orientation which may effectively deliver a flow of air to a wing (such as to wing 102 discussed above) for optimal angle of attack to cause optimal lift while optimizing energy usage. The L-shape may be an angled L-shape where the angle of the turn from inlet to outlet is from thirty to forty-five degrees, or from thirty-five to forty degrees, for example, thirty-one, thirty-two, thirty-three, thirty-four, thirty-five, thirty-six, thirty-seven, thirty-eight, thirty-nine, forty, forty-one, forty-two, forty-three, forty-four, or forty-five degrees. This angle may be between an inlet longitudinal axis and an outlet longitudinal axis. In some embodiments, the inlet end 132 of the ducts 530 may be configured to extend in a horizontal direction, and the propulsion unit 120 mounted to the aircraft may be horizontal. The airflow may be directed to the wing along the curved path (e.g., L-, J-, or C-shape) of the duct to deliver the desired amount of lift.

Any ducts described herein, including ducts 130 and 530, may be made of a metal frame or another suitable frame to optimize the flow of air to the wing 102 and the weight of the aircraft 100 (e.g., carbon fiber, aluminum alloy, etc.). In some embodiments, the ducts may have a smooth exterior surface to reduce the amount of drag exerted on the aircraft 100 and the duct. Although not shown, the ducts may be configured to move (e.g., change angle relative to main portion 150 of aircraft 100) to deliver a desired amount of airflow to the wing 102 or receive an optimal amount of air through the propulsion units 120. Additionally, each of the propulsion units 120 may be mounted on a swivel and configured to be rotated along multiple axis when mounted to plurality of ducts 130.

The ducts 130, 530 in some cases may extend across the span of the wing 102. At least one of the plurality of ducts 130 may extend from the inlet end 132 at a first side of the wing 102, past the main body, and to the outlet end 134 located at the leading edge 104 of the wing 102 (see, for example, FIG. 5D).

Figure 5A:
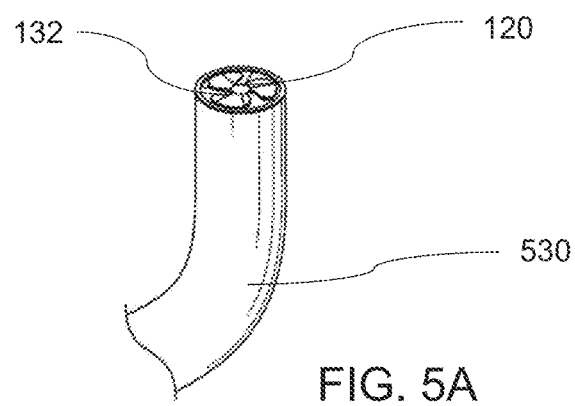
FIGS. 5A, 5B and 5C illustrate partial perspective views of different embodiments of ducts that may be used with the aircraft of FIG. 1A and having, respectively, a J-shape, a hook shape, and a C-shape.
Figure 5B:
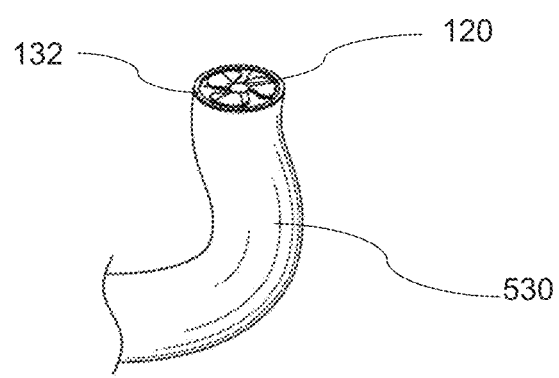
Figure 5C:
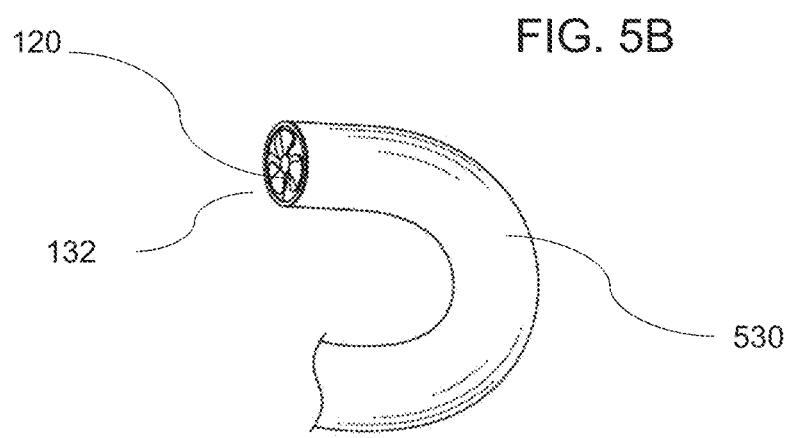
Figure 5D:
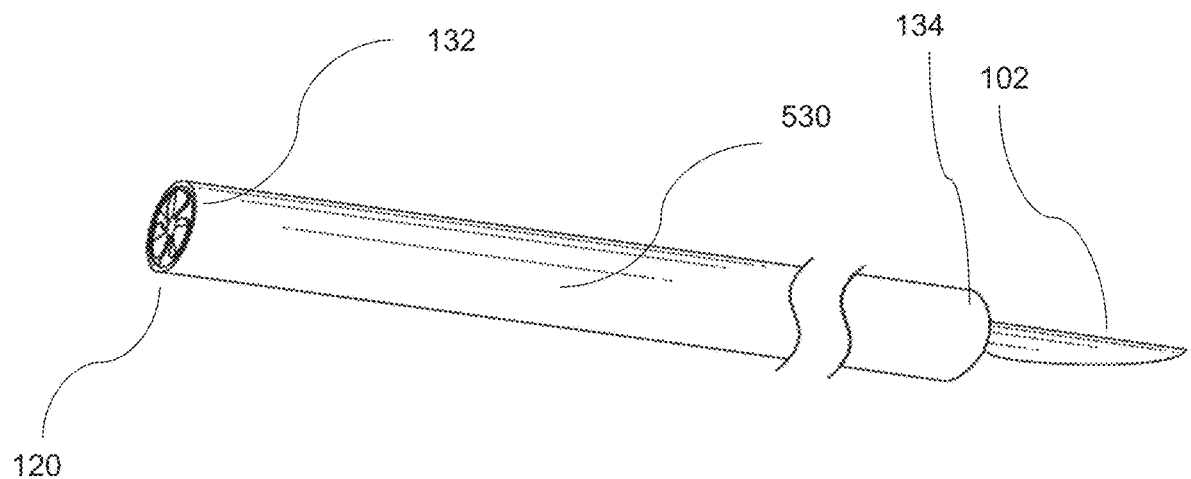
FIG. 5D illustrates a partial perspective view of a duct which may be used with the aircraft of FIG. 1A which may extend longitudinally past a main body and to an annular wing.
Figure 5E:
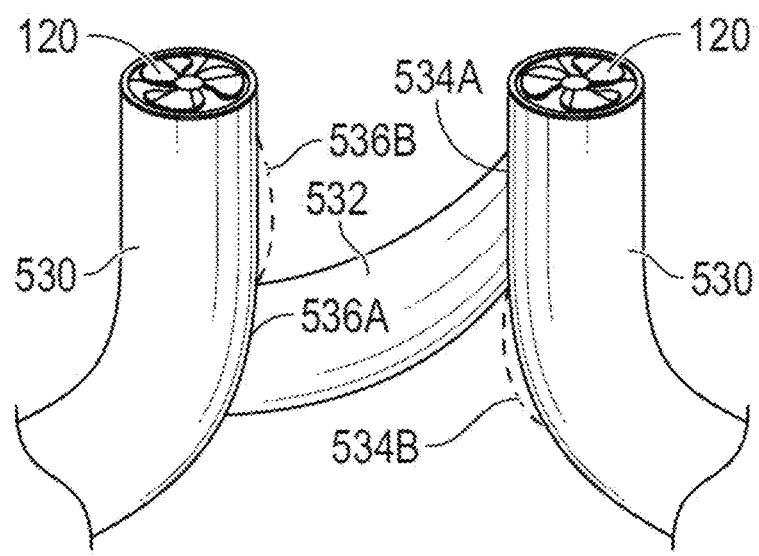
FIG. 5E is a partial perspective view of two ducts having a connecting duct that may selectively connect the airflow paths of the two ducts together.

FIG. 5E is a partial perspective view of two ducts 530 having a connecting duct 532 that may selectively connect the airflow paths of the two ducts 530 together. The connecting duct 532 may fluidly couple the two ducts 530 by selectively opening covers 536A and 534A. The respective covers may move to opened positions 536B and 534B. In this manner, airflow from one of the propulsion units 120 may feed air into two ducts, for example if one of the propulsion units 120 fails. This is merely one example. In some embodiments, the plurality of ducts may be created in a larger channel (e.g., walled structure) 144 with collapsible sides. Therefore, if one of the propulsion units 120 mounted at the inlet 132 of the ducts 130 fails (e.g., stops spinning), the sides of the ducts 130 configured for the failed propulsion unit 120 may be collapsed and permit airflow to be delivered to another region of the wing 102 (causing one propulsion unit to feed two ducts). Advantageously, this may assist in flight and landing in emergency situations (e.g. failure of a propulsion unit) so that the aircraft 100 may remain capable of flight. Stated another way, in some embodiments the aircraft may be configured to dynamically (e.g., during flight) "merge" multiple ducts. As an example, if a propulsion unit fails during flight, then as a safety mechanism, the aircraft may be configured to merge the duct being fed by the failed propulsion unit with another one (fed by an active propulsion unit).

Example Landing Gear

Figure 6A:
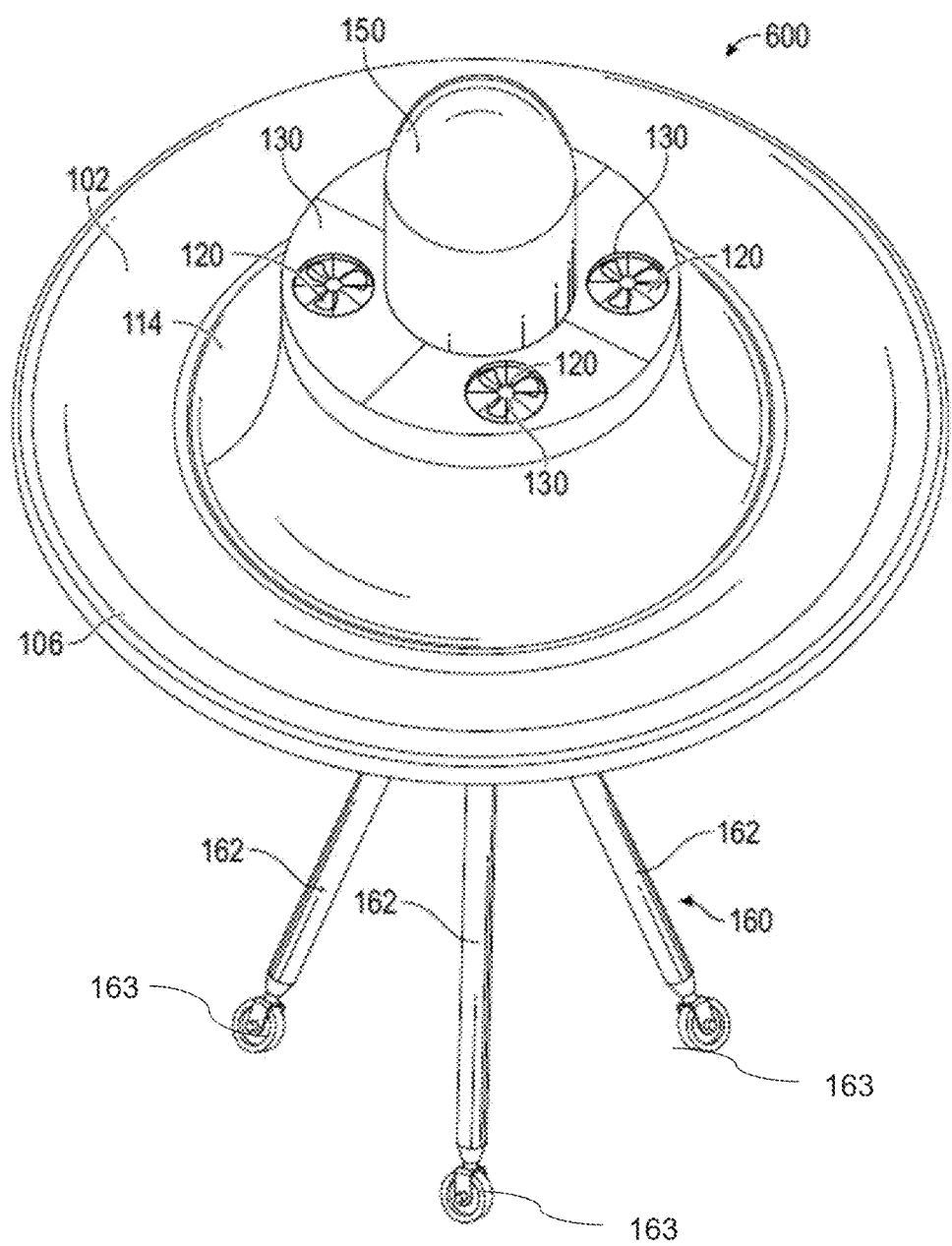
FIG. 6A illustrates a perspective view of another embodiment of an aircraft having a lifting body shown as an annular wing with a plurality of propulsion units and airflow ducts and deployed landing gear.
Figure 6B:
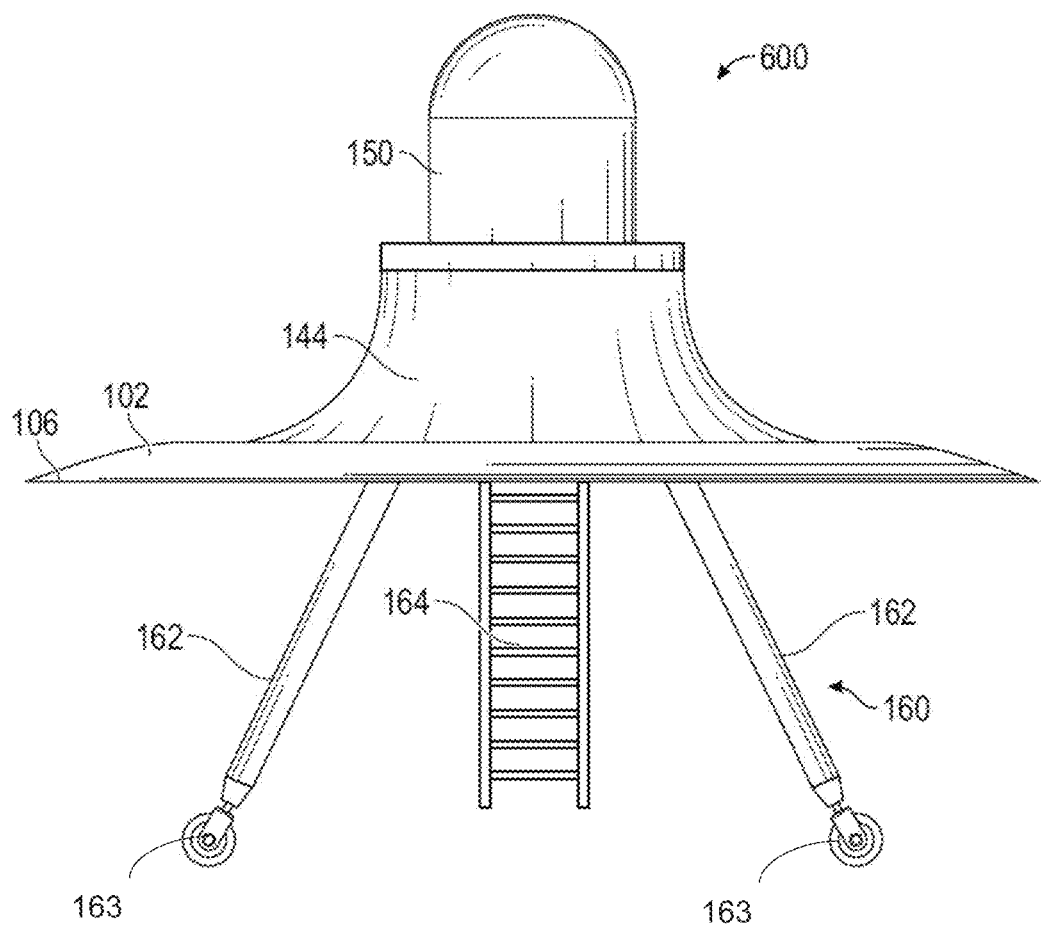
FIG. 6B illustrates a side view of the aircraft of FIG. 6A with deployed loading ladder.

FIGS. 6A-6B illustrate another embodiment of an aircraft 600. The aircraft 600 may have many or all of the same or similar features as aircraft 100, and the same reference numbers are used to refer to the same features. The aircraft 600 includes landing gears and landing features 160. The landing features 160 may comprise a plurality of legs 162 (e.g., tripod) which may extend from a retracted position on the underside of the aircraft 600 or bottom portion 119 of the aircraft 600. The plurality of legs 162 may be configured to support the aircraft 600 upon landing. The plurality of legs 162 may also, in some embodiments, collapse, telescope, and/or pivot. Additionally, in some embodiments, a ladder 164 may extend from the main portion 150 of the aircraft 600 to reach a ground surface. This may be advantageous in embodiments where there is a passenger compartment and passengers need to enter and exit the aircraft 600. The landing features 160 and/or ladder 164 may be retractable such as, for example, by being telescopically and/or rotatably coupled to the body of the aircraft 600. The landing gears or landing features 160 may comprise tires or wheels 163. The tires or wheels 163 may be located at the bottom of the plurality of legs 162.

Signal Receiving, Processing, And Executing

FIG. 7 illustrates an embodiment of a block diagram 200 for an aircraft as disclosed herein, including, for example, the aircraft 100, which may be used with the techniques disclosed herein. The aircraft 100 may have sensors 202, a receiver 210, a controller 212 or processor, a data storage module 213, a transmitter 218, a power source 223, motor driver(s) 222, and motors(s) 230. The sensors 202 in the aircraft 100 may include at least one of a gyroscope 204, accelerometer 206, magnetometer 208, GPS 209, and/or other sensors 202(e.g., an optical sensor, thermometer, barometer, altimeter, camera, etc.).

The system may also allow for user input(s) 211 to control various aspects of the system. For example, in the main portion 150 of the aircraft 100 there may be one or more buttons or control panels which may be operated to fly the aircraft 100.

The controller 212 may also be used to perform certain functions while the device is flying. In some embodiments, the data storage module 213 may have programming instructions which may be used to dictate flight operations under certain conditions. For example, there may be programmed instructions to indicate to a user that the power source is low on energy and the aircraft 100 needs to land in a short amount of time.

The data storage module 213 may store information and data. The data storage module 213 may have read-only memory for the process to execute programmed functions. The data storage module 213 may also have writeable memory to store various programmed features. The data storage module 213 does not need to have both read-only memory and writeable memory.

The transmitter 218 may be used to receive data from the controller 212 or processor to send the signal to another location (e.g., computer, remote server for storage and/or analysis). For example, the transmitter 218 may be used to send data to an air traffic control center or to a central hub to review/analyze flight patterns and flight characteristics.

The motor driver 222 may be configured to receive instructions from the controller or processor 212 which may be used to adjust the speed or blade pitch or rotor axis of the various motors 230 coupled to the various propulsion units 120 of the aircraft 100. There may be more than one motor driver 222 controlling the motors 230 to assist in the independent operation of each of the propulsion units 120. The motors 230 are connected to the motor driver 222 and receive instructions from the controller 212 or processor to operate at various speeds to lift and fly the aircraft 100. Although not shown, a motor driver 222 may be connected to the supports 148 to move the supports 148 to different positions to adjust the mount angle of the wing 102.

The power source may also be included in the aircraft 100 to power each of the components and features of the aircraft 100. Although no line is drawn from the power source to each component, each component is either directly or indirectly coupled to the power source. The power source 223 may be based on fossil fuel or electric battery which may be recharged or live power. Solar energy may be used. Additionally, there may be alternative power sources 223 (e.g., solar) which may be used to power the aircraft 100.

Methods of Aircraft Operation

Figure 8:
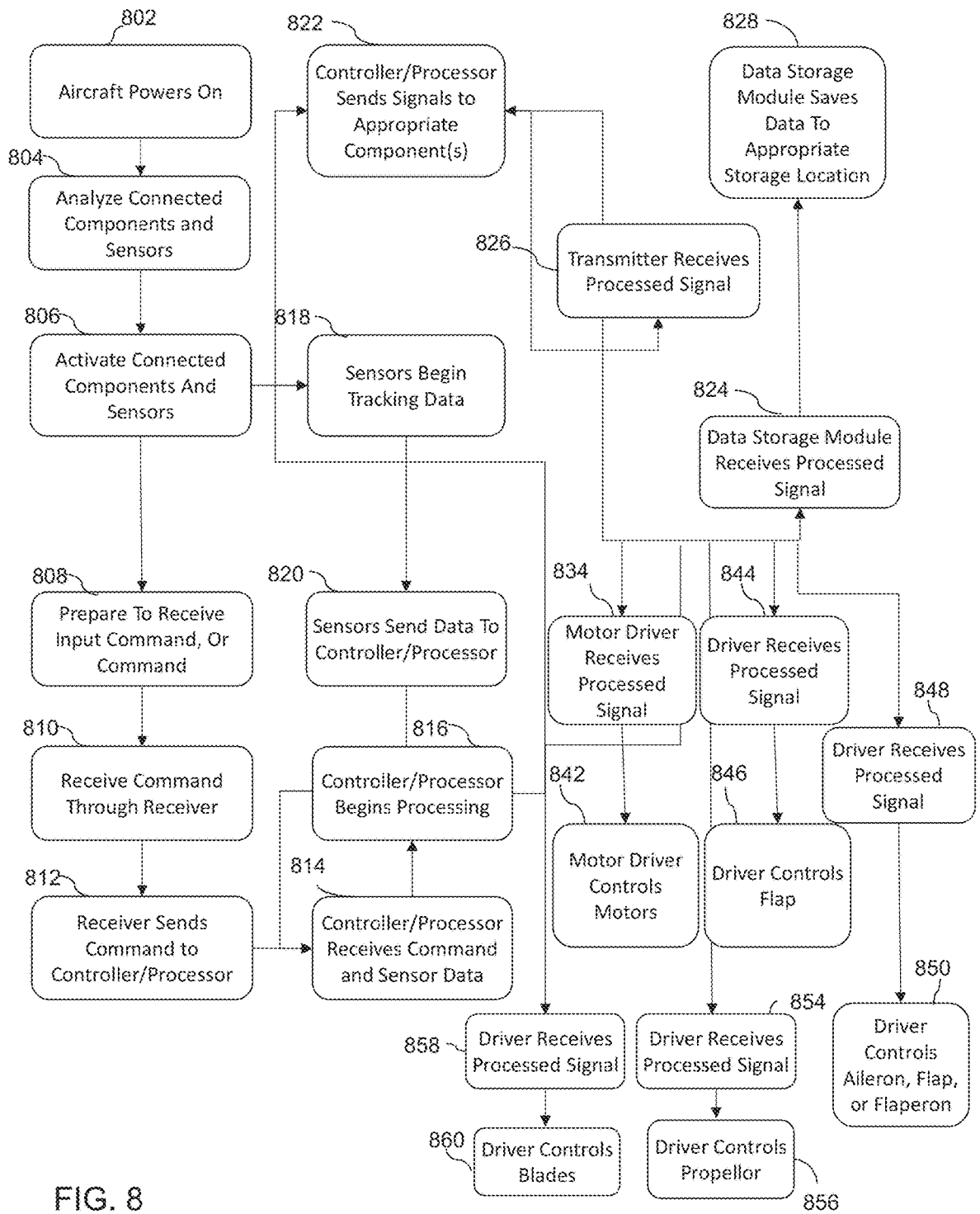
FIG. 8 illustrates a flow chart diagram of an embodiment of a process for operating an aircraft having an annular wing with a plurality of propulsion units and airflow ducts.

In some embodiments described herein a method for flying an aircraft 100 is disclosed herein. FIG. 8 illustrates a flow chart diagram for one embodiment of a process for the aircraft 100 disclosed herein. Blocks 802 through 808, and 818 and 820 relate to a general start up procedure of the aircraft. To start-up the aircraft 100 at block 802, the aircraft 100 may be powered on, either by a key control, button control, switch, or any other similar feature. After starting the aircraft 100, at block 804, the controller 212 or processor may determine whether there is sufficient power to fly the aircraft 100, if the sensors 202 are all connected, and if the motor driver(s) 222 and motors 230 are operational. At block 806, the aircraft may activate the components and sensors 202.

At block 818, the aircraft 100 may then determine the requirements for flying based on readings from the sensors 202 (e.g., weather, windspeed, aircraft 100 weight). At block 820, after determining what is necessary for flying based on the sensors 202, data may be sent to the controller 212 or processor. Additionally, the aircraft 100 may receive input data from a user to determine a flight path or flight instructions. Furthermore, at block 808, the user inputs 211 may include selecting (e.g., commanding) an autonomous flight path to fly the aircraft 100. Additionally, the controller may be connected to an autonomous control box 214 which may control (e.g., command) various aspects of the system-based readings from the sensors 202. For example, a user may select a flight destination to send to the controller 212 and the autonomous controls 214 may provide inputs on speed and flight controls and operations of the propellors to optimize the flight experience, which may be based on weather and traffic. Additionally, at block 810, the aircraft 100 may also determine next steps based on inputs (e.g., commands) to a receiver 210.

At blocks 812 and 814, the commands received by the controller 212 may be converted into a signal to operate the aircraft 100 or perform a flight sequence. In some embodiments, the flying device may convert the commands into an appropriate signal (e.g., electrical signal). At block 816, the controller 212 may process the commands and sensor data to send signals to the various components of the aircraft 100 (e.g., motors) to manipulate the components. After processing is complete, at block 822, the signals may be sent to the components to operate them. Additionally, not all of the components are necessarily driven at the same time. For example, operating the controller 212 may include directing a determined amount of power or energy based on the signals to one or more of the propulsion units 120 to direct a flow of air through the ducts 130 to lift the aircraft 100.

At block 824, the data storage module 213 may also receive a processed signal from the controller 212. Additionally, at block 826, the transmitter 218 may receive a signal from the controller 212. At block 828, the data storage module 213 may store information and signals to be later used during flight. For example, the flap 140 may be opened if the forward speed of the aircraft 100 is not met by a certain time threshold. The transmitter 218 may send the processed signal to another source (e.g., computer) for further analysis.

At block, 834, the motor 230 or motor driver 222 may receive a signal from the controller 212 to adjust the speed and/or power delivered to the propulsion unit 120. At block 842, the motor driver 222 may activate to signal to a specific motor 230 of a propulsion unit 120 for operational controls. For example, by adjusting the speed of a motor driver 222 based on the input signal, the speed of the flow of air from the propulsion unit 120 may tilt the aircraft 100 thrust the aircraft 100 forward. Additionally, by adjusting the speed of at least one of the motor drivers 222, the aircraft 100 may be configured to vertically takeoff or land safely (e.g., without excessive turbulence).

Additionally, the controller 212, although not shown, may be coupled to a driver which may adjust the orientation of the wing 102 (e.g., change the mounting angle). Therefore, based on the desired speed of the aircraft 100 the controller may deliver a signal to the cable driver which may extend or retract the supports 148 which may adjust the mount angle. For example, when the aircraft 100 is not moving at a desired speed by a predetermined period of time, the controller may send a signal to the cable driver to adjust the mount angle of the wing 102 to increase the speed of the aircraft 100 (e.g., from 5 MPH to 10 MPH).

At block 844, the controller 212 may be coupled to a driver. At block 846, the driver can operate to the flap 140 to open or close the flap 140 a desired amount. For example, when the aircraft 100 needs to increase its speed, the controller 212 may send a signal to the driver to open the flap 140 a desired amount to direct a flow of air from the ducts 130 to increase the speed of the aircraft 100.

At block 848, the controller 212 may be coupled to a driver. At block 850 the driver can operate an aileron, flap, or flaperon located at the trailing edge 106 of the wing 102, which can pivot, extend or retract the aileron. For example, when the additional lift is needed to operate the aircraft 100 the controller 212 may send a signal to the driver to extend a flap to increase the camber of the wing 102.

At block 854, the controller 212 may be coupled to a driver. At block 856, the driver may control one or more propellers or other types of propulsion units and/or thrusters located below the wing 102. The propellers may receive a signal from the controller 212 to adjust the speed and/or power delivered to the propellers. For example, adjusting the speed of the propellor based on the input signal from the controller 212 to the driver can thrust the aircraft 100 in a desired direction (e.g., forward).

At block 858, the controller 212 may be coupled to a driver. At block 860 the driver may be connected to a swivel connected to the plurality of blades 122. Therefore, the driver may adjust the angle of the plurality of blades when the driver receives a signal from the controller 212. The controller 212 may also be coupled to drivers connected to each of the individual wing sections (e.g., 102A, 102B, 102C, 102D). After receiving a signal from the controller 212, the driver may adjust the angle of the individual wing sections (e.g., 102A, 102B, 102C, 102D) to achieve desired operational characteristics (e.g., lift, tilt, thrust, etc.).

Figure 9:
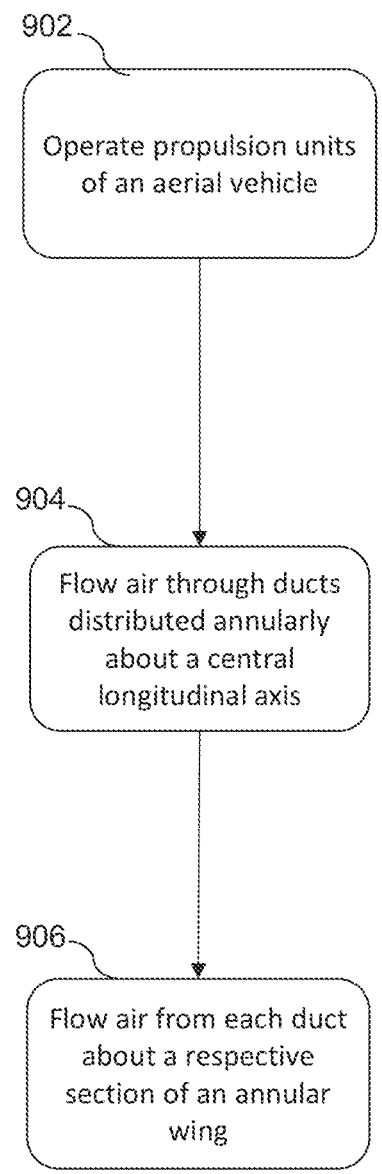
FIG. 9 illustrates a flow chart diagram of an embodiment of a process for operating a lifting system or an aircraft having an annular wing with one or more propulsion units and airflow ducts.

FIG. 9 illustrates a flow chart diagram for one embodiment of a process for the aircraft 100 disclosed herein. Blocks 902-906 generally relate to operating propulsion units of the aircraft 100. At block 902, the propulsion units 120 may be powered on so that they may generate a flow of air for vertical takeoff of short takeoff. At block 904, the flow of air generated from the propulsion units 120 may flow through the ducts 130. The ducts 130 may be distributed annularly about a central longitudinal axis of the aircraft 100. At block 906, the flow of air from each duct 130 may flow to the leading edge 104 of a respective region (e.g., section) of the wing 102 (e.g., sections 105A, 105B, 105C, 105C).

Additional Aircraft Examples

Figure 10:
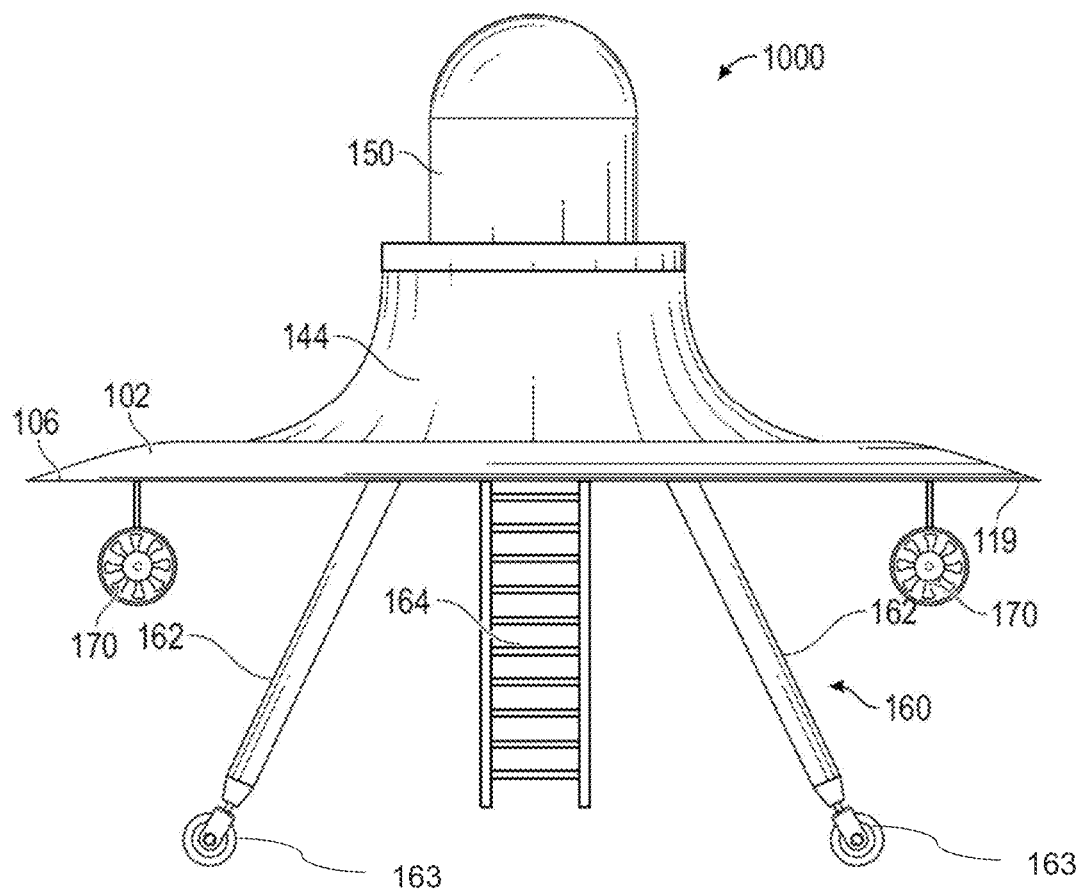
FIG. 10 illustrates a side view of another embodiment of an aircraft having a lifting body embodied as a wing with a plurality of propellers and a deployed landing gear with lateral-thrusting propulsion units.

FIG. 10 illustrates another embodiment of an aircraft 1000. The aircraft 1000 may have many or all of the same or similar features as aircraft 100, and the same reference numbers are used to refer to the same features. The aircraft 1000 includes one or more propellors 170 (and/or propulsion units, thrusters, and/or the like) positioned on a bottom portion 119 of the aircraft 1000. The propellors 170 may be operated to thrust the aircraft 1000 in a desired direction. For example, when the aircraft 1000 is traveling, additional thrust may be desired to increase the airspeed of the aircraft. Therefore, the plurality of propellors 170 may be capable of delivering additional thrust for forward motion. Additionally, the one or more propellors 170 may be retractable to the bottom portion 119 of the aircraft 1000. When not in use, the propellers 170 may retract from an extended, operational position to a retracted position.

Figure 11A:
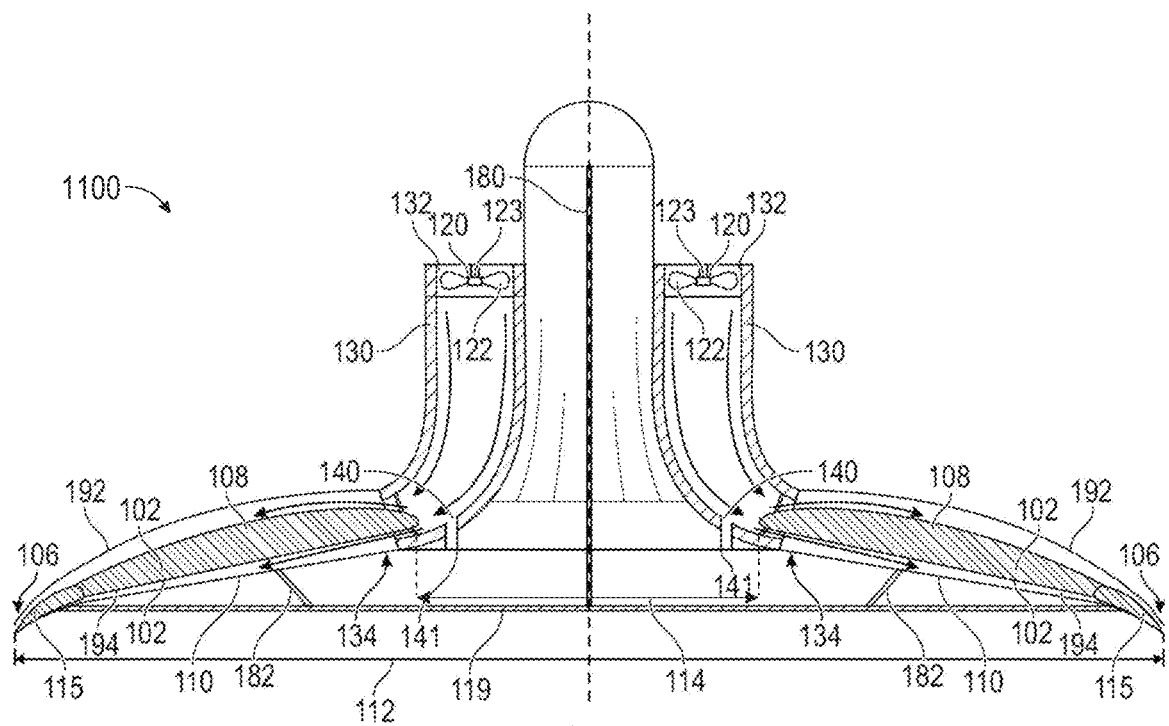
FIG. 11A illustrates a cross-sectional view of another embodiment of an aircraft having a lifting body embodied as a wing with ailerons and with a plurality of propulsion units and airflow ducts and connecting structure.
Figure 11B:
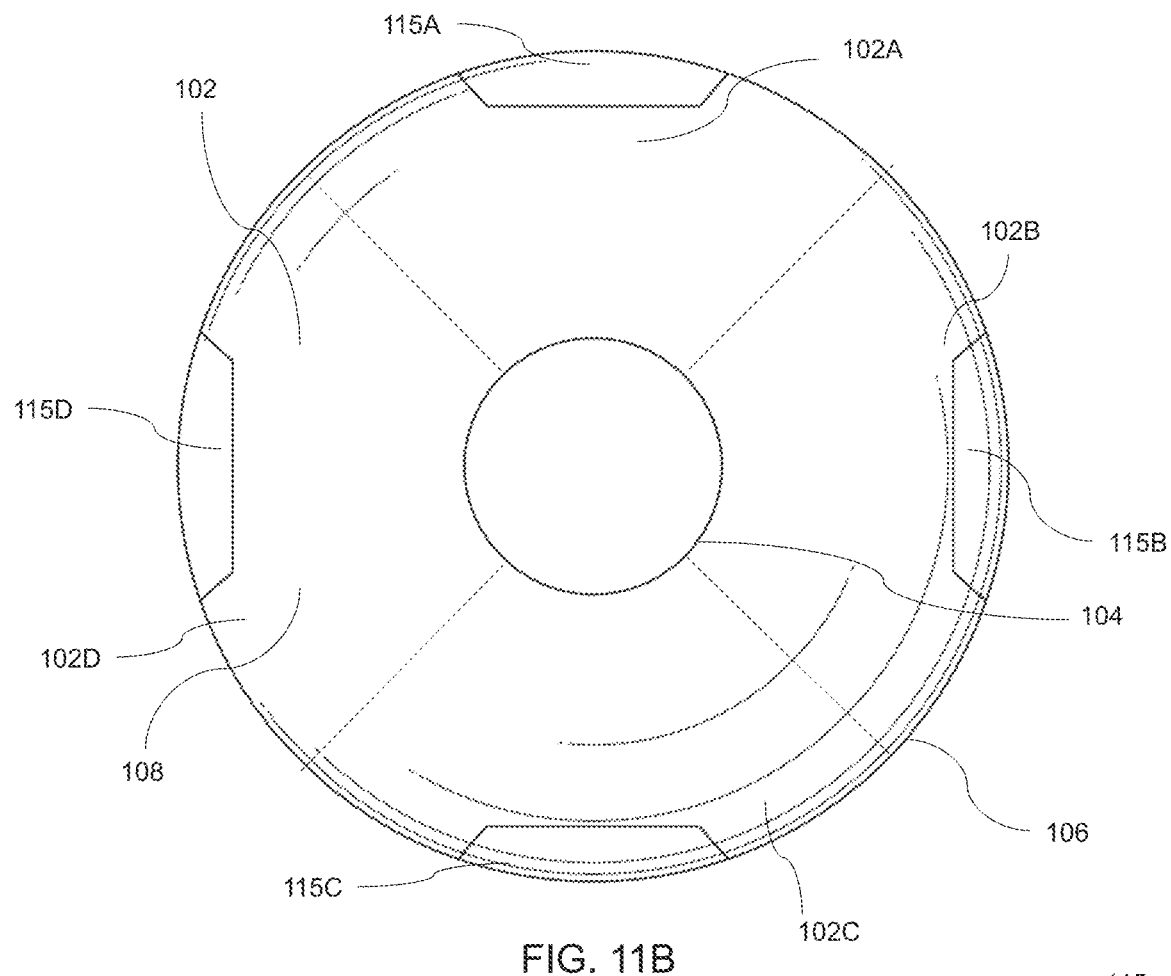
FIG. 11B illustrates a top view of the wing shown in isolation from the aircraft of FIG. 11A.
Figure 11C:
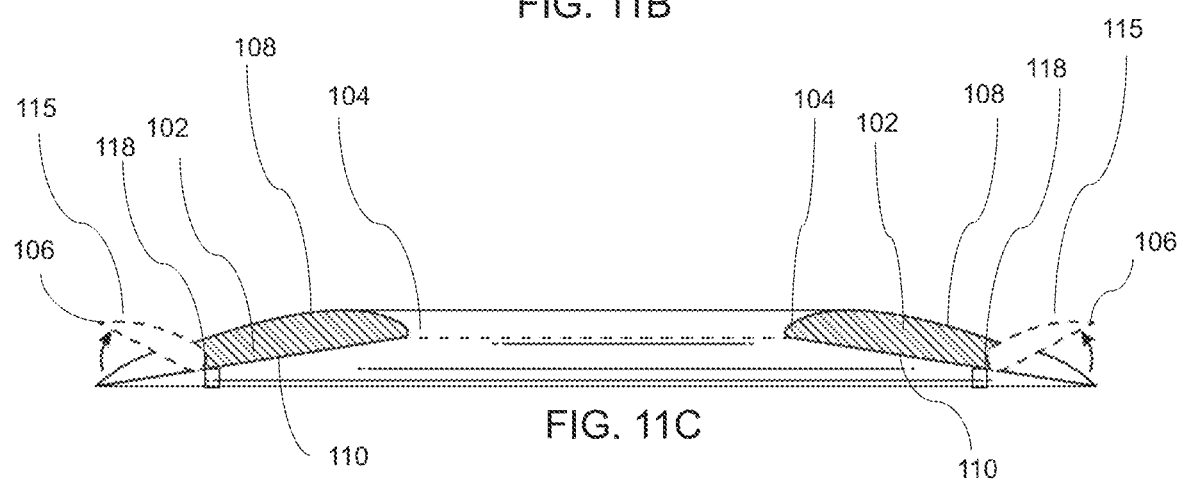
FIG. 11C illustrates a cross-sectional view of the wing of FIG. 11B.
Figure 11D:
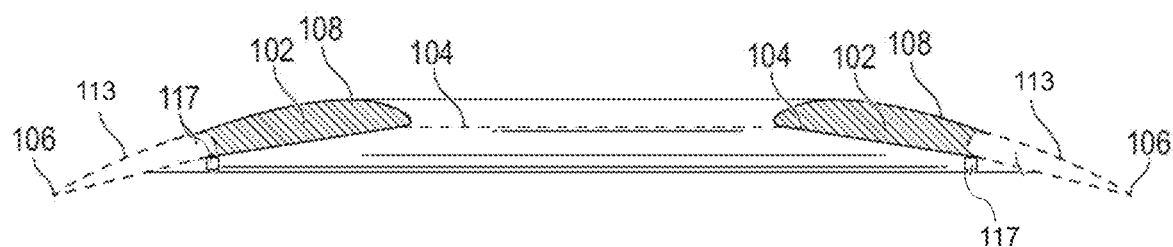
FIG. 11D illustrates a cross-sectional view of another embodiment of a wing that could be used with the aircraft of FIG. 11A.
Figure 11E:
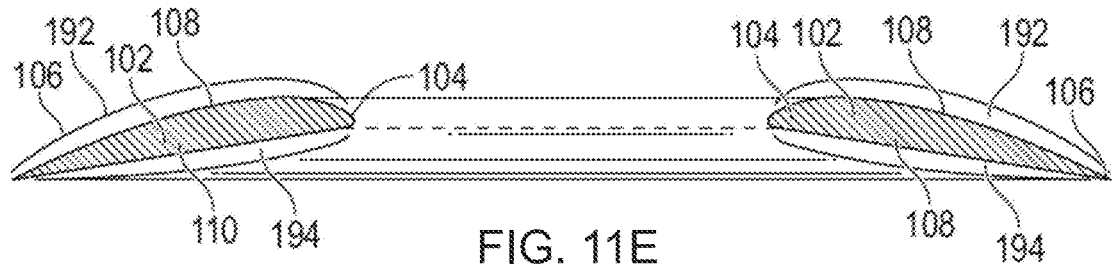
FIG. 11E illustrates a cross-sectional view of the wing of the aircraft of FIG. 11A, with sleeves above and below the wing.
Figure 11F:
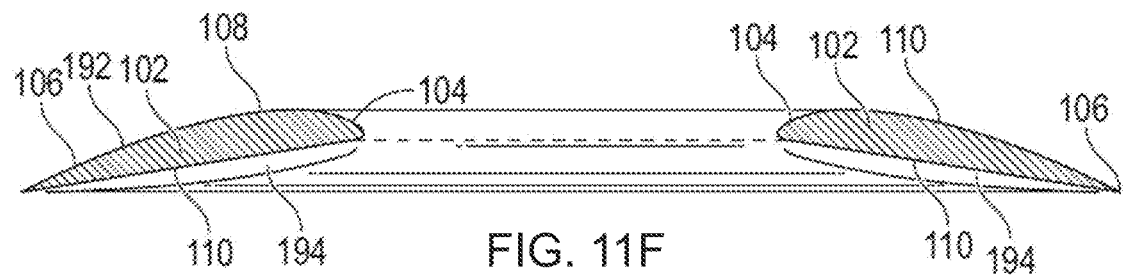
FIG. 11F illustrates a cross-sectional view of an alternative embodiment of the wing of the aircraft of FIG. 11A, with a sleeve only below the wing.
Figure 11G:
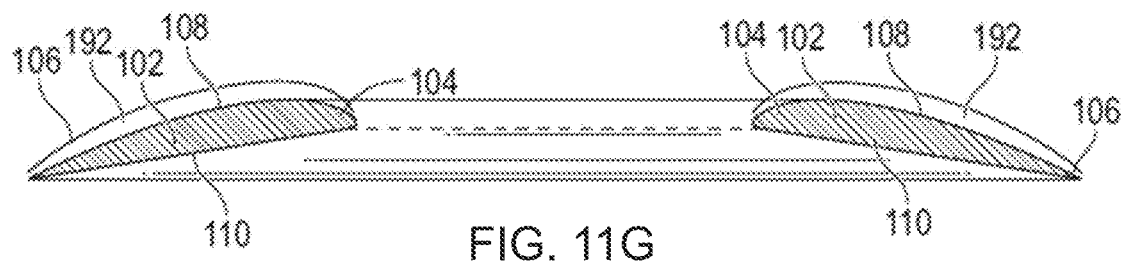
FIG. 11G illustrates a cross-sectional view of an alternative embodiment of the wing of the aircraft of FIG. 11A, with a sleeve only above the wing.

FIGS. 11A-11G show an additional embodiment of an aircraft 1100. The aircraft 1100 may have many or all of the same or similar features as aircraft 100, and the same reference numbers are used to refer to the same features. The wing 102 may be covered with one or more sleeves or thin sheets which may be one or more top sleeves 192 and/or one or more bottom sleeves 194 (see, for example, FIGS. 11A, 11E-11G). The wing 102 may have both one or more top sleeves 192 and one or more bottom sleeves 194 (see FIG. 11E). The wing 102 may solely have one or more bottom sleeves 194 (see FIG. 11F). The wing 102 may solely have one or more top sleeves 192 (see. FIG. 11G). The one or more sleeves (e.g., top sleeves 192 and bottom sleeves 194) may extend radially, either partially or entirely, over the top surface 108 and/or the bottom surface 110 of the wing 102. Advantageously, the flow of air traveling from the outlet end 134 of the ducts 130 will travel between a space between the one or more top sleeves 192 and/or the one or more bottom sleeves 194 from the leading edge 104 to the trailing edge 106.

The top sleeves 192 and the bottom sleeves 194 may enhance the ground effect (e.g., the positive influence of lift that occurs on an aircraft wing when it is close to the ground due to a reduction in the aerodynamic drag). The top sleeves 192 and the bottom sleeve 194 may be configured to further reduce the speed of air at the bottom surface 110 of the wing 102 to improve the lift characteristics by increasing the amount of pressure exerted on the bottom surface 110. In some embodiments, the wing fabric may be a cloth-like fabric. Advantageously, the top sleeves 192 and bottom sleeves 194 on the wing 102 may assist in reducing weather related turbulence by streamlining airflow on the top surface 108 and/or bottom surface 110 (e.g. by isolating external unstable atmosphere).

The plurality of blades 122 may be coupled to the hub and to the motor 230, which may be configured to rotate or change the angle of the plurality of blades 122 due to a swivel 123. The plurality of blades 122 may have a fixed span (e.g., length). In some cases, the plurality of blades 122 may have a length and/or blade pitch that varies to deliver an optimized flow of air to the ducts 130. In some embodiments, the swivel 123 may vary the blade pitch.

With reference to FIG. 11A, the main portion 150 may have one or more structural support members 180, such as a structural beam or beams or a structural framework, which may be used to support and couple the wing 102 to the aircraft 1100. The one or more structural support members 180 may be static or dynamic. The structural support members 180 may be deployable from a stowed configuration where the aerolift systems attached thereto are located closer to the main portion 150, to a deployed configuration where the aerolift systems are located radially farther away from the main portion 150, as described in further detail herein, for example with respect to FIGS. 52A-52D. The structural support members 180 may extend though the vertical centerline or true centerline or center point of the aircraft 100 (e.g., the centerline of the wing 102 or the main portion 150). Additionally, the aircraft 1100 may include additional structural support members 180 and/or a bottom portion 119 which may extend from one edge of the wing 102 on the bottom surface 110 to an opposite edge of the wing 102 on the bottom surface 110. Additionally, the structural support members 180 may have supporting members 182 which can extend to a middle area of the bottom surface 110 of the wing 102. Advantageously, the structural support members 180 can act as a foundation for the bottom surface 110 which may help to transfer lift force generated at the wing 102 to the aircraft 1100. An additional advantage of the bottom portion 119 may be that the bottom portion 119 makes the profile of the aircraft 1100 more aerodynamic during flight (e.g., forward motion). In some embodiments, the structural beams can be hydraulic. An advantage of hydraulic structural beams may be that the wing 102 can flex or move a desired amount due to the changing angle of attack at the leading edge and to effectively transfer lift force to the aircraft 100. Additionally, although not shown, the sleeves 192 and 194 may be made of or covered with fixed or retractable solar panels. One advantage of having solar panel on the one or more top sleeves 192 and/or the one or more bottom sleeves 194 may be their ability to generate power during storage or in flight. The solar panels may be used to recharge the aircraft (e.g., motor, components, batteries, etc.).

In some embodiments, the wing 102 may have a variable span (e.g., variable outer diameter). Depending on the conditions or desired operational characteristics, the wing 102 may expand in diameter or retract in diameter. Advantageously, this may help deliver a desired amount of lift, stability, or maneuverability to the aircraft 1100. In some embodiments, the wing 102 may include moveable (e.g., extendable or retractable) flaps 113 on the trailing edge that can increase or decrease the span (see FIG. 11D). The flaps 113 may also rotate from side to side (e.g., from a left position to a right position). The flaps 113 may deflect downward a desired amount (e.g., fifteen degrees) which may improve lift. The flaps 113 may also be coupled to an actuator 117 which controls the movement of the flaps. The flaps 113 may also deflect downwards to increase drag. For example, when the aircraft 1100 may be traveling at a high rate of speed, the flaps 113 may deflect downwards to increase drag to rapidly reduce the speed of the aircraft. Additionally, the changing profile of the flaps 113 can help produce more lift at takeoff and can allow for improved maneuverability during landing. The flaps 113 can be any type of flap (e.g., plain flap, split flap, slotted flap, etc.) that may provide stability and help to maneuver the aircraft 1100 to optimize the wing profile.

In some embodiments, the wing 102 may have ailerons 115 mounted on the top surface 108 near the trailing edge 106 (see FIG. 11C). The ailerons 115 may deflect upwards or downwards to change the shape, profile, or camber of the wing 102. The ailerons 115 may also be coupled to an actuator 118 which controls the deflection of the ailerons 115. Advantageously, by changing the profile of the section of the wing 102 (e.g., increasing the wing area, increasing the camber or curvature of the wing 102) by actuating the ailerons 115 in an upward direction, the aircraft 1100 may receive more sectional lift at desired speeds, which may assist in turning or specific directional movements. In some embodiments, the ailerons 115 may be differential ailerons (e.g., one aileron 115 goes up more than another aileron goes down 115). For example, when the aircraft 1100 makes a left roll, the leftmost ailerons 115 may deflect upwards, and the rightmost ailerons 115 may deflect downwards more than the leftmost aileron 115. For a right roll, the rightmost ailerons 115 may deflect upwards and the leftmost ailerons 115 may deflect downwards more than the rightmost aileron 115. In some embodiments, the ailerons 115 are connected to a controller 212 which can send a signal to the ailerons 115 to adjust their orientation. The ailerons 115 can be coupled (e.g., hinge) to the outermost edge of the wing 102 and can form the original shape of the airfoil profile when not actuated. The ailerons 115 can be located on each of the individual wing sections (e.g., 102A, 102B, 102C, 102D) and can be multiple ailerons (e.g., aileron 115A, aileron 115B, aileron 115C, aileron 115D).

Alternative Wing Shapes

Figure 12A:
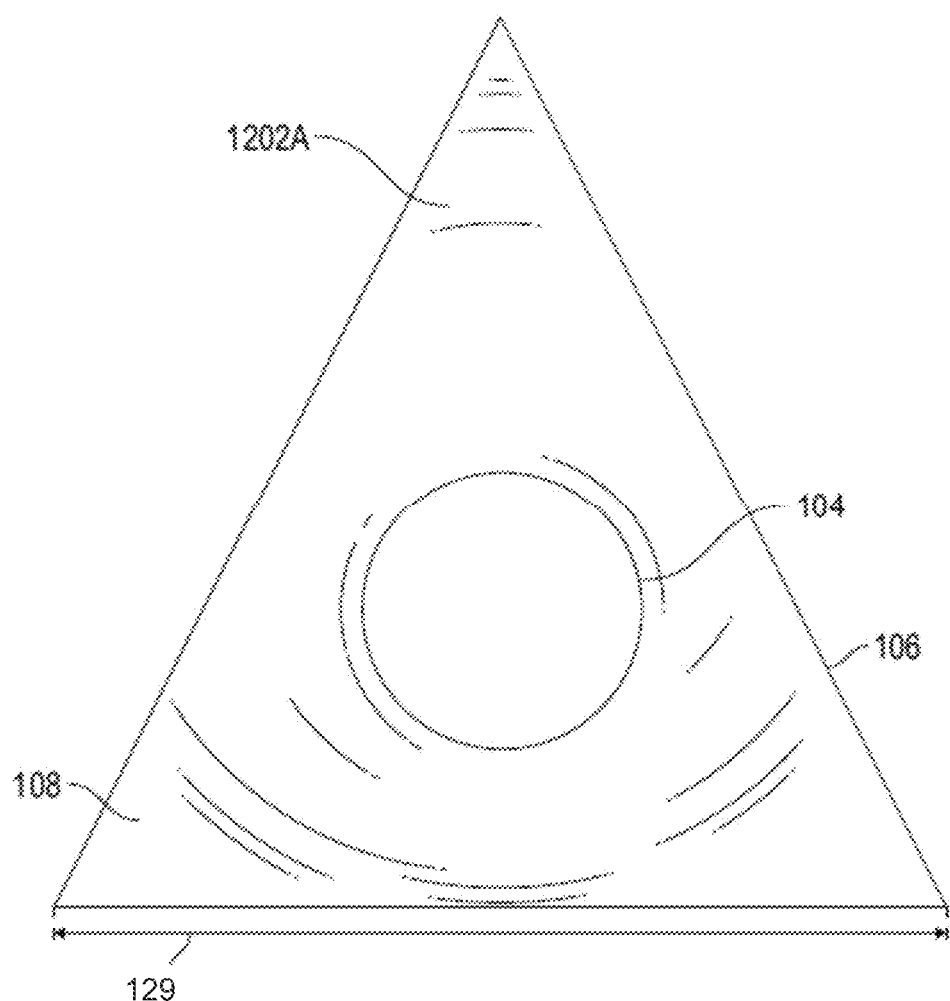
FIG. 12A illustrates another embodiment of a lifting body embodied as an annular wing shown as a triangular-shaped wing, in isolation.
Figure 12B:
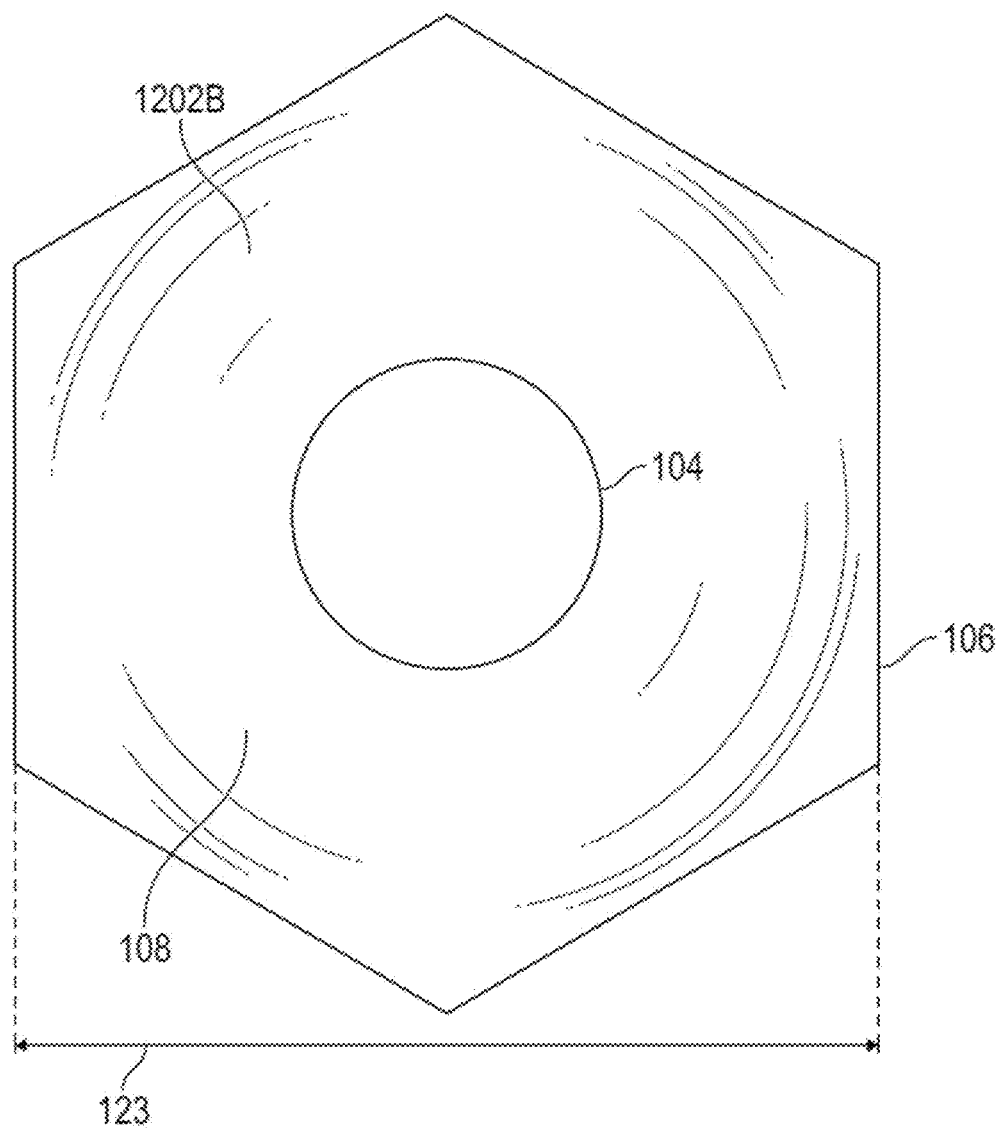
FIG. 12B illustrates another embodiment of a lifting body embodied as an annular wing shown as a polygonal-shaped wing, in isolation.
Figure 13A:
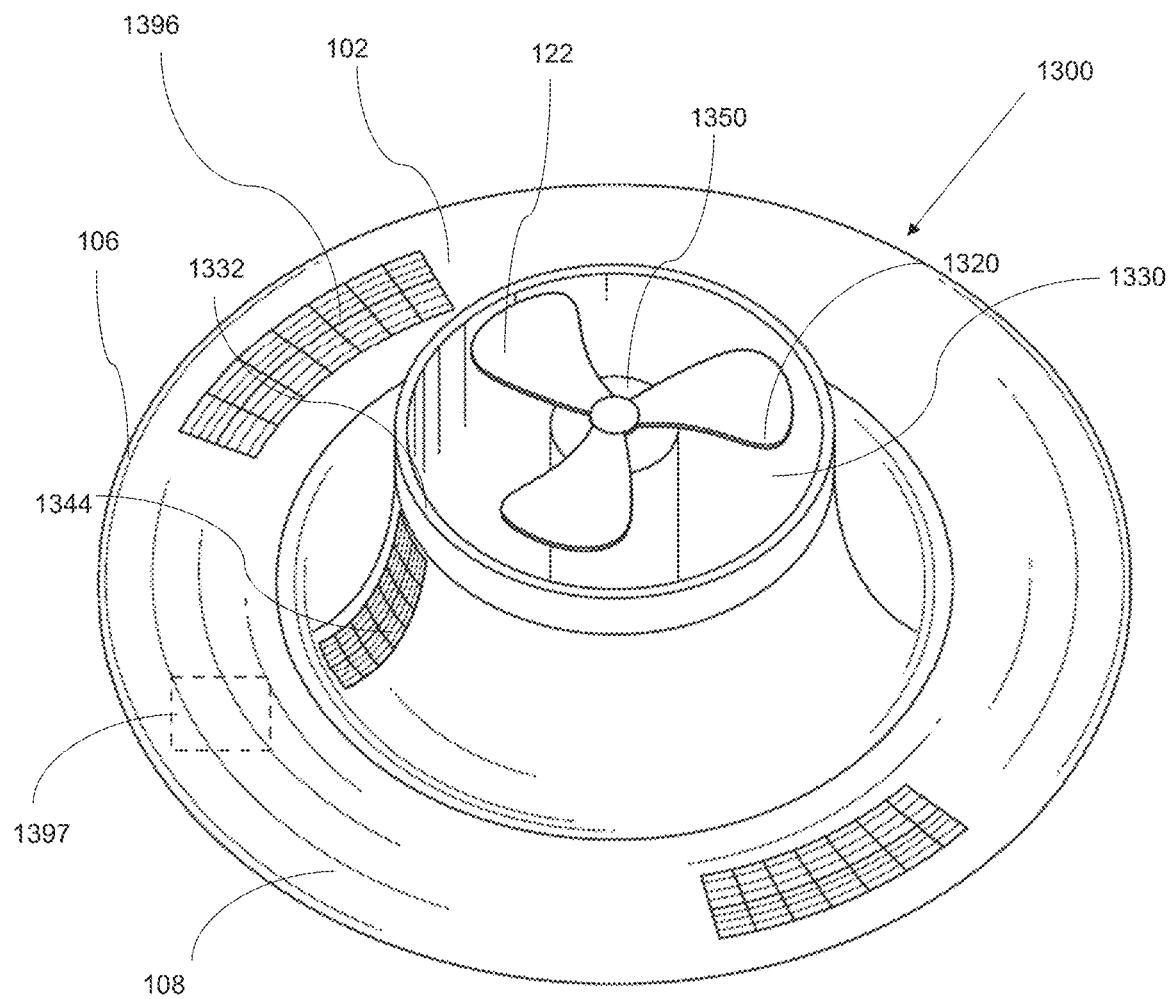
FIG. 13A illustrates a perspective view of another embodiment of an aircraft having a lifting body embodied as an annular wing with a central propulsion unit and an annular airflow duct.
Figure 13B:
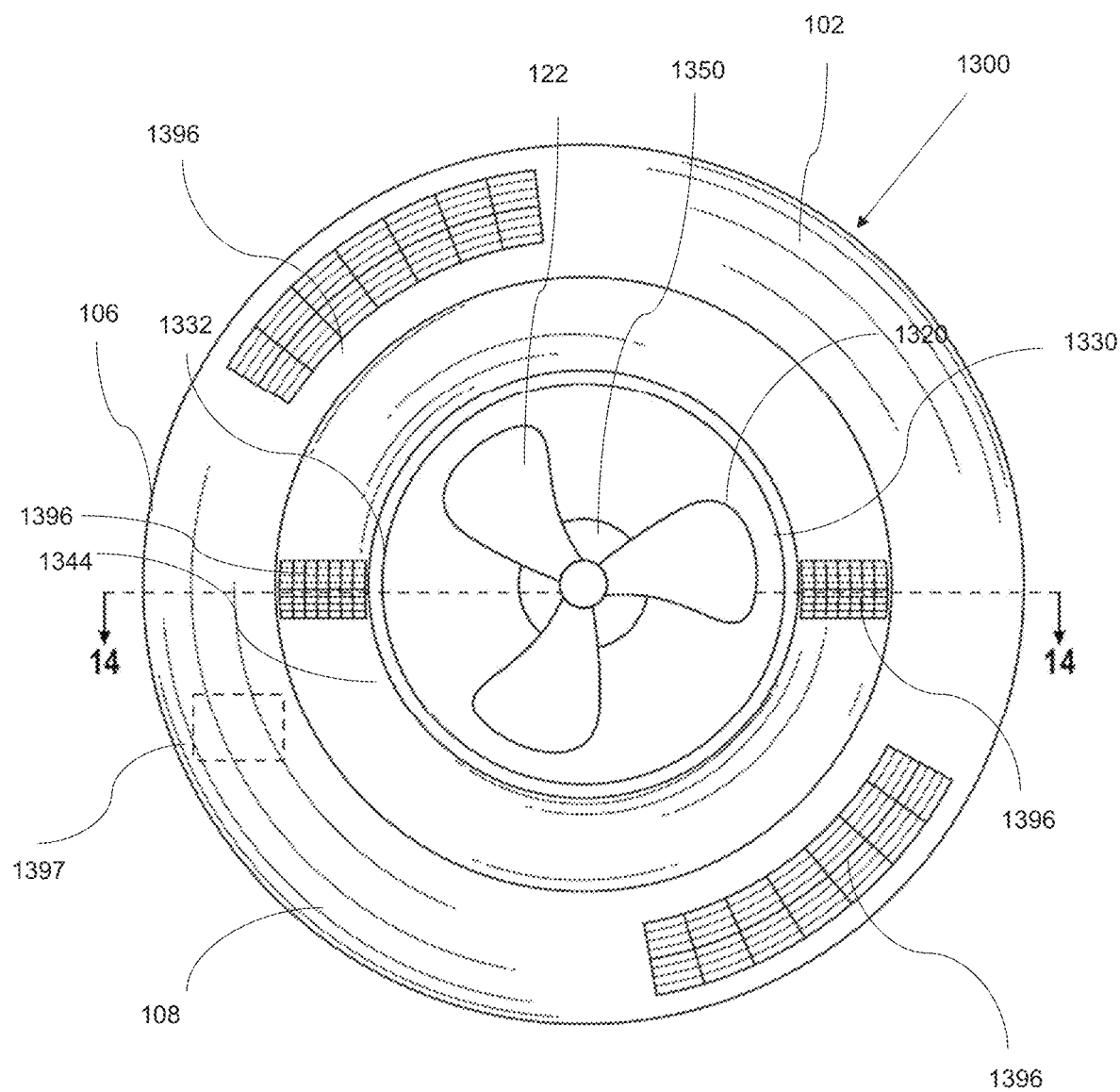
FIG. 13B illustrates a top view of the aircraft shown in FIG. 13A.
Figure 13C:
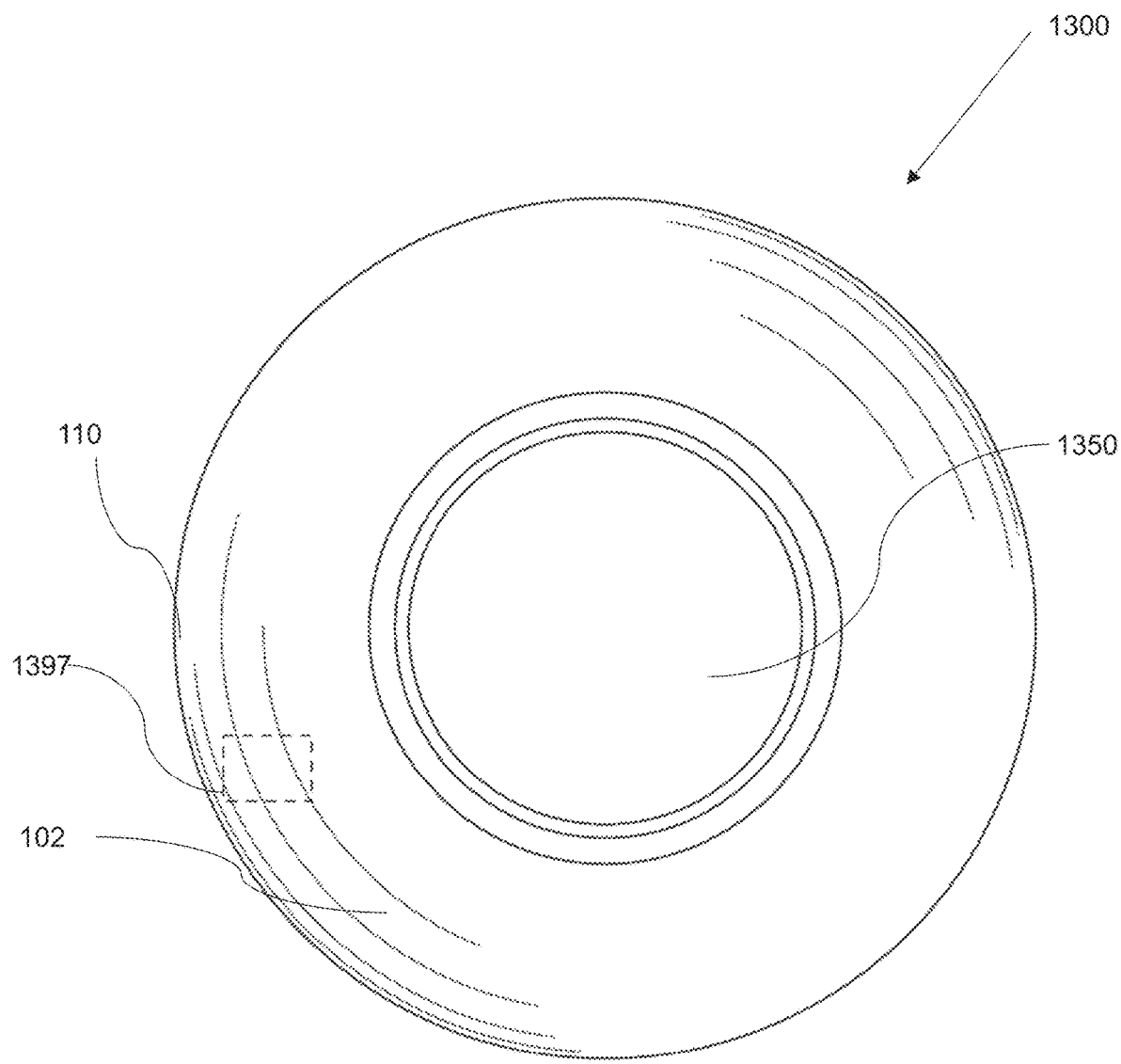
FIG. 13C illustrates a bottom view of the aircraft shown in FIG. 13A.
Figure 14:
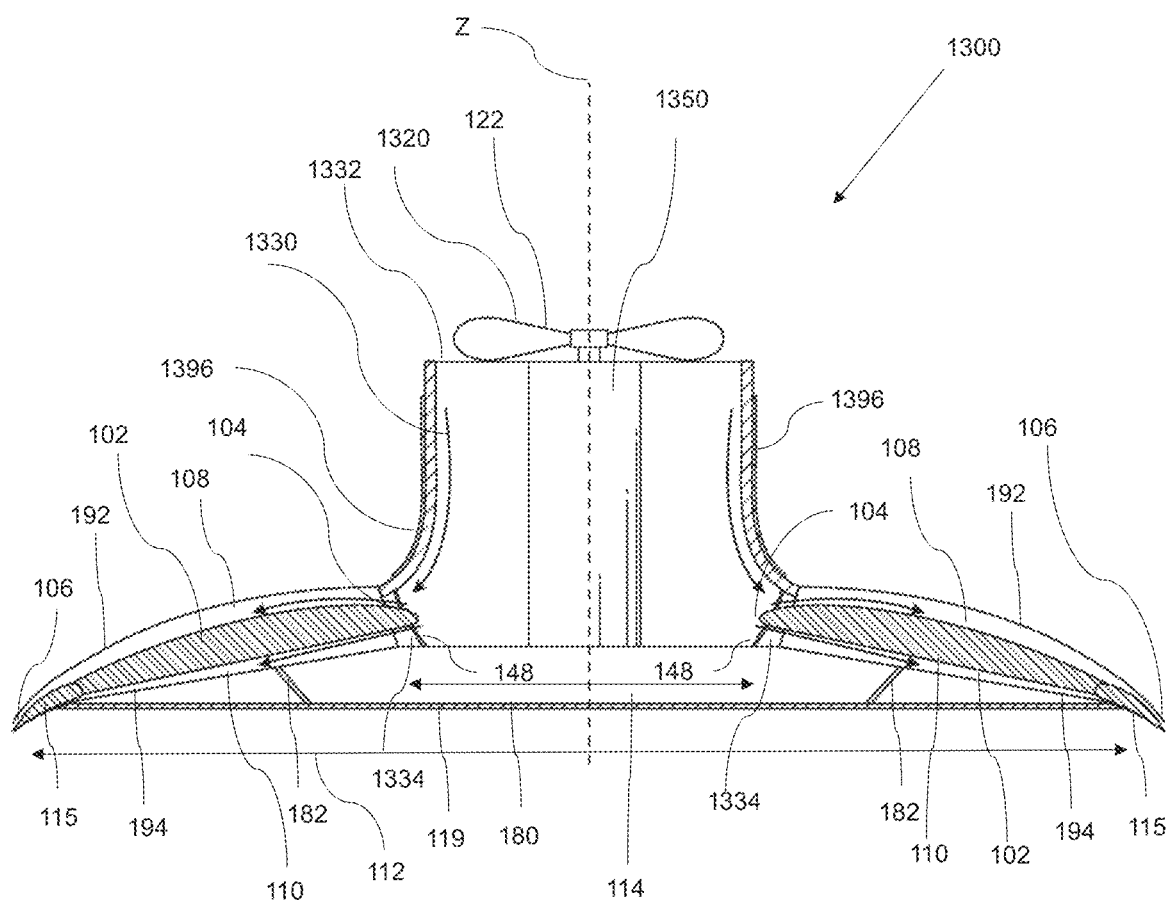
FIG. 14 illustrates a cross-sectional view of the aircraft shown in FIG. 13A.
Figure 15A:
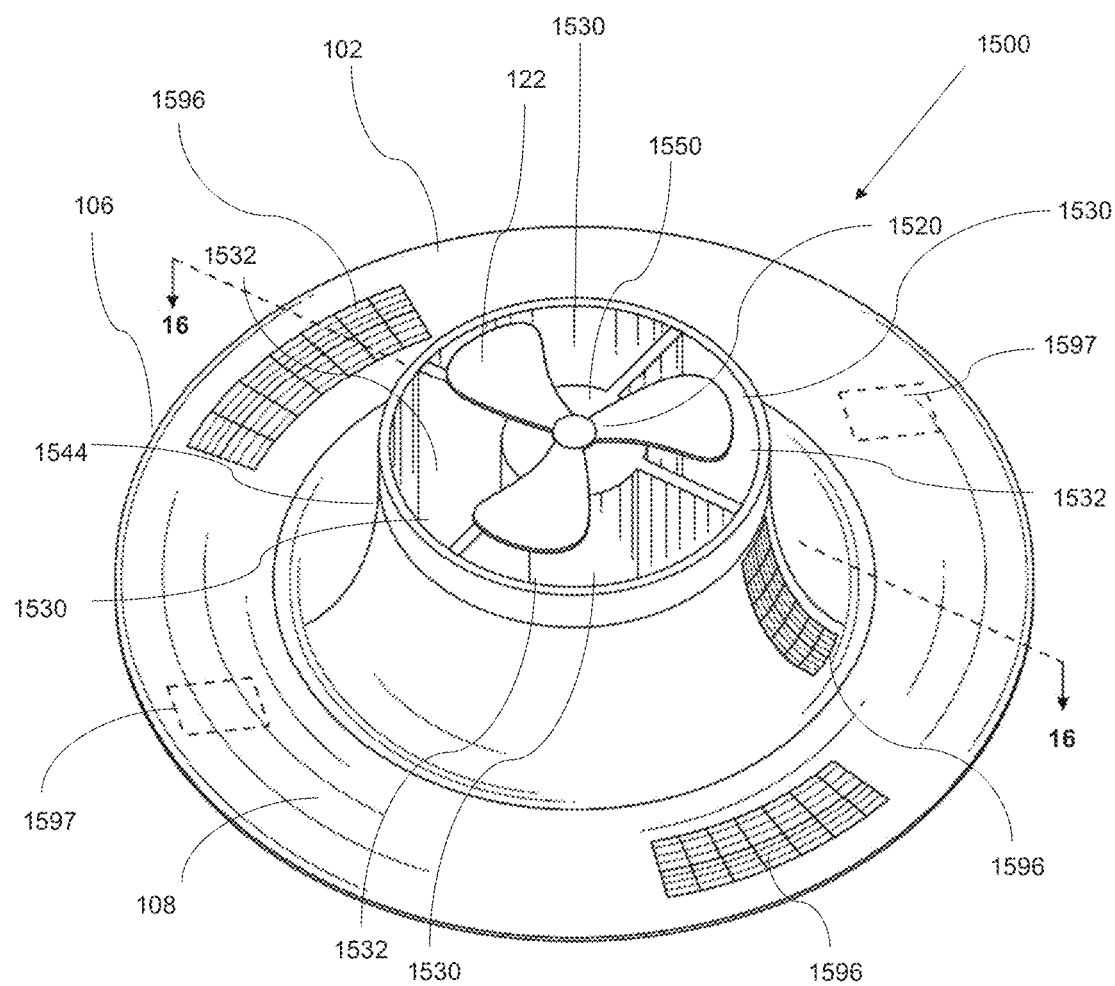
FIG. 15A illustrates a perspective view of another embodiment of an aircraft having a lifting body embodied an annular wing with a propulsion unit and a plurality of airflow ducts.
Figure 15B:
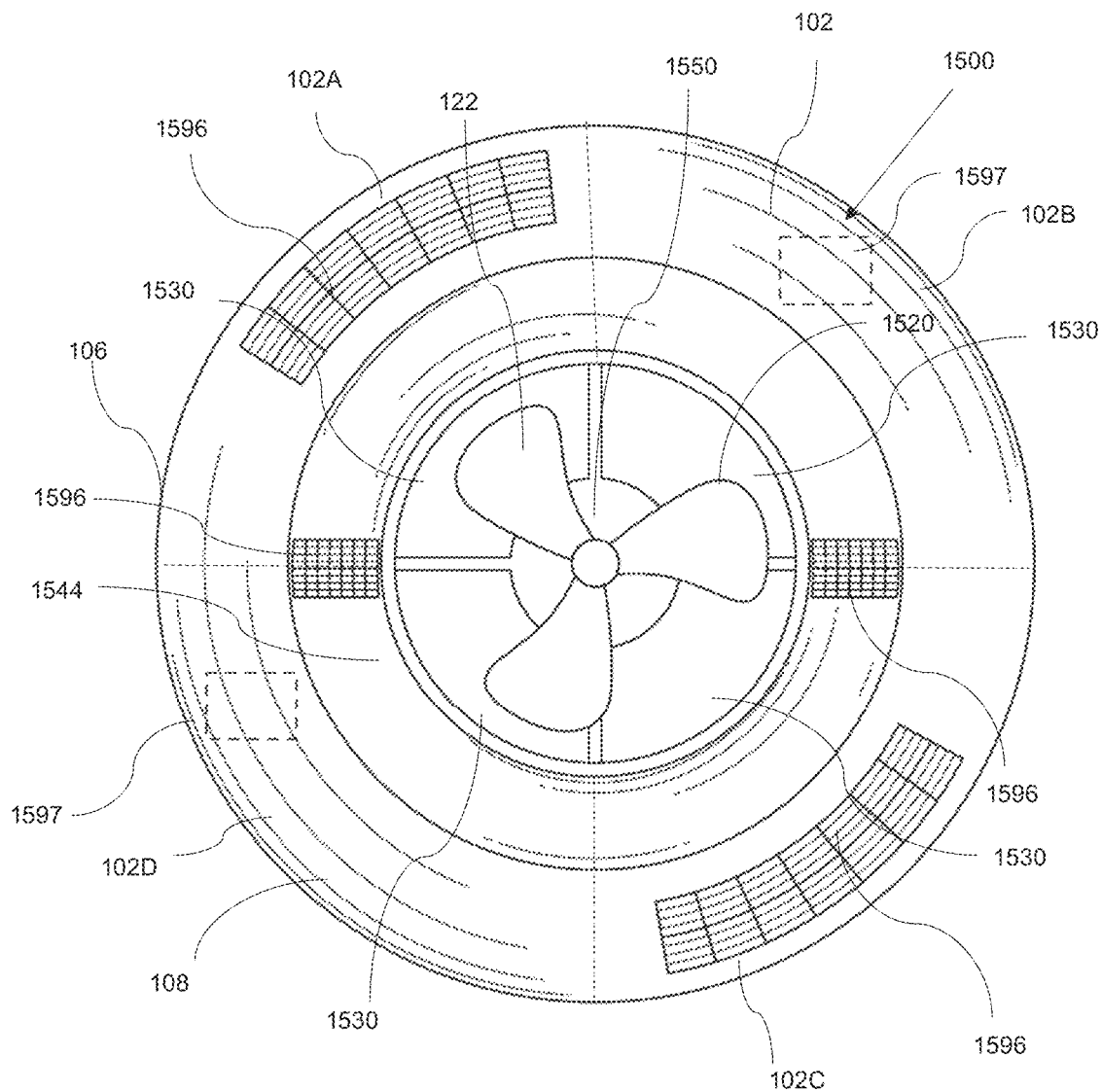
FIG. 15B illustrates a top view of the aircraft shown in FIG. 15A.
Figure 15C:
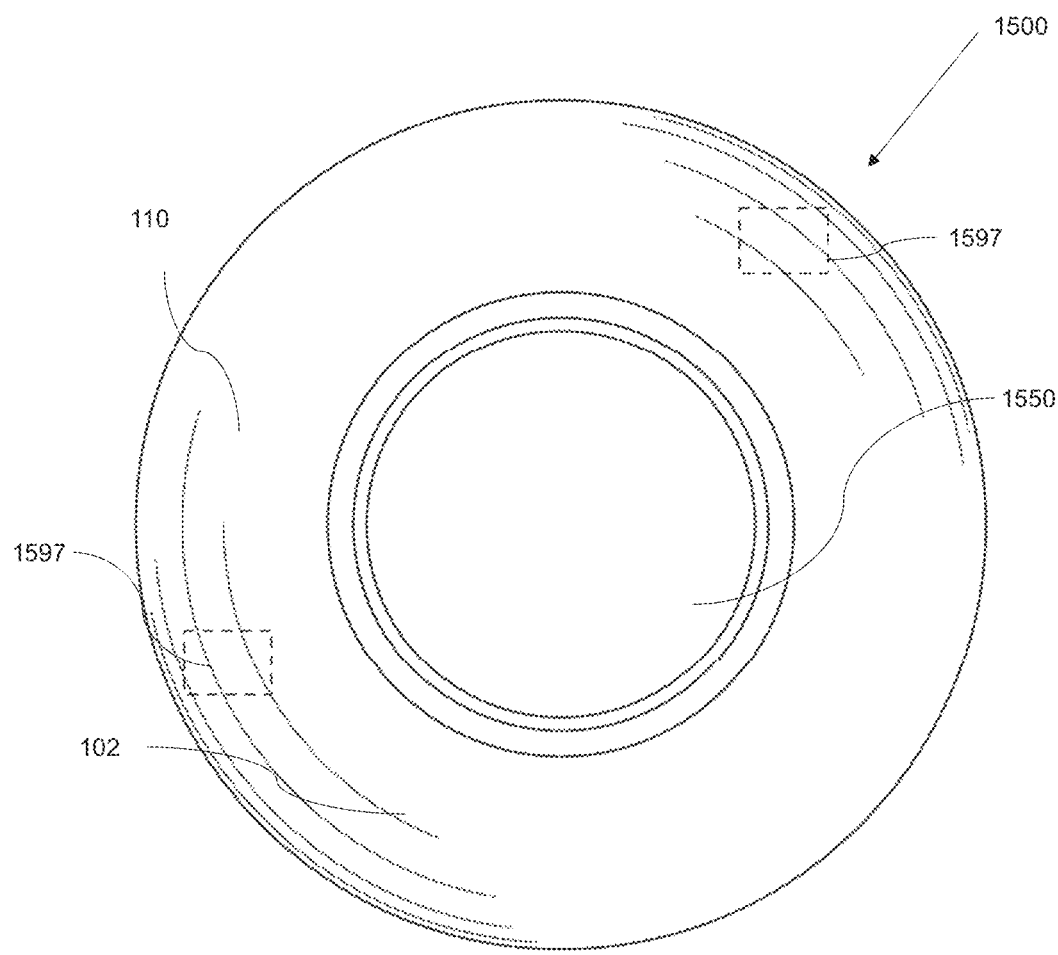
FIG. 15C illustrates a bottom view of the aircraft shown in FIG. 15A.
Figure 16:
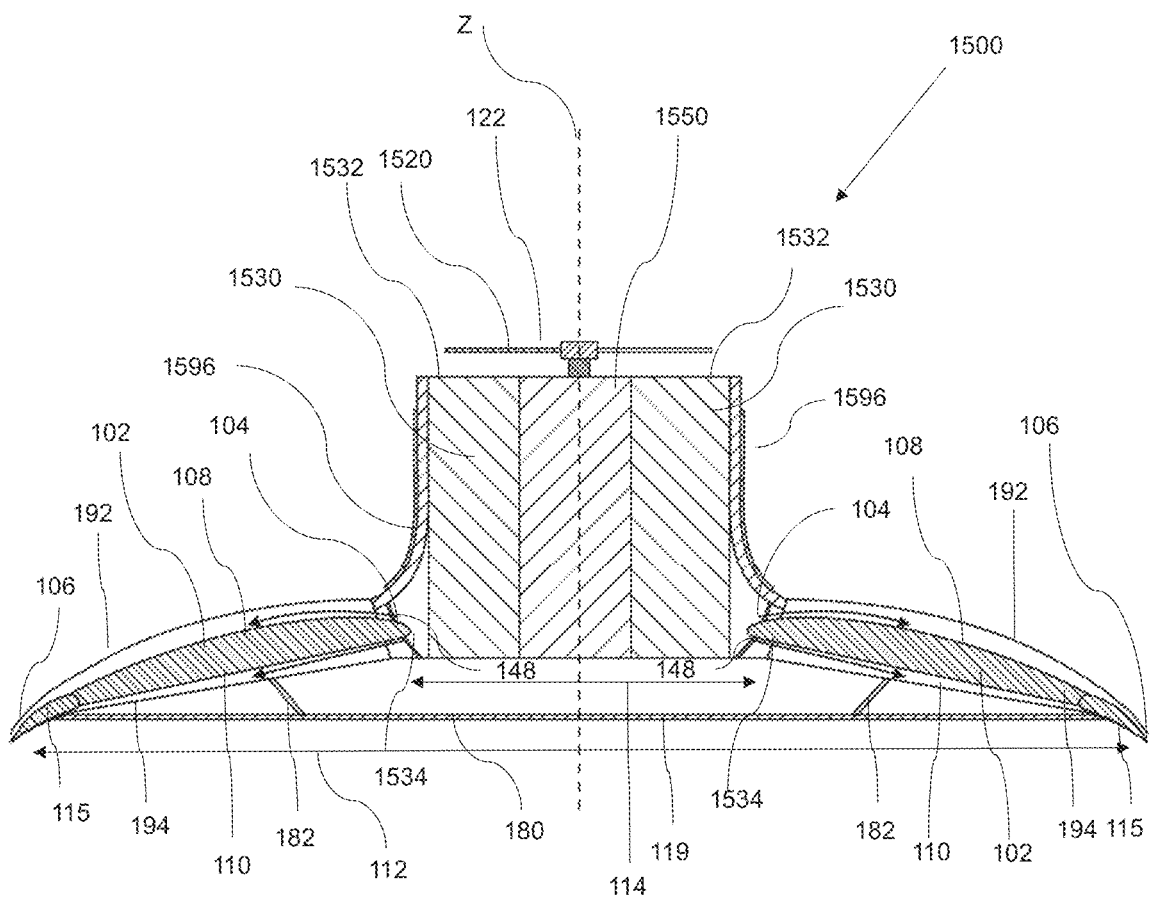
FIG. 16 illustrates a cross-sectional view of the aircraft shown in FIG. 15A.

Various embodiments of aircraft disclosed herein may position one or more wings or wing segments about or around a central compartment in configurations that generally form an annular shape, a doughnut shape, a toroid shape, a triangular shape, a square shape, a rectangular shape, a hexagonal shape, a polygonal shape, a round shape, and/or the like. FIGS. 12A and 12B illustrate two specific example embodiments of such wings. Specifically, FIGS. 12A and 12B are top views of wings 1202a and 1202b, respectively. Wings 1202a and 1202b may be similar to the wing 102 described above, and the same reference numbers are used to refer to the same components. In some embodiments, as shown in FIG. 12A, the wing 1202a may be triangularly shaped. In some embodiments, as shown in FIG. 12B, the wing 1202b can comprise a polygonal or hexagonal shape. An advantage of multiple different wing shapes may allow the aircraft 1100 to achieve desired flight characteristics. The wing 102 can have a span 129 that extends along the trailing edge 106 or outer edge of the wing 102.

Figure 22A:
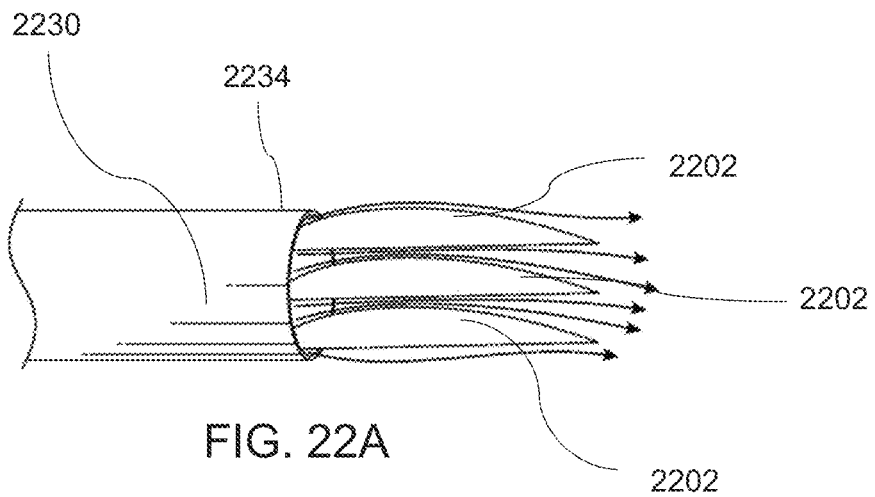
FIG. 22A is a partial perspective view of an embodiment of an airflow duct feeding air to multiple stacked wings of an aircraft.
Figure 22B:
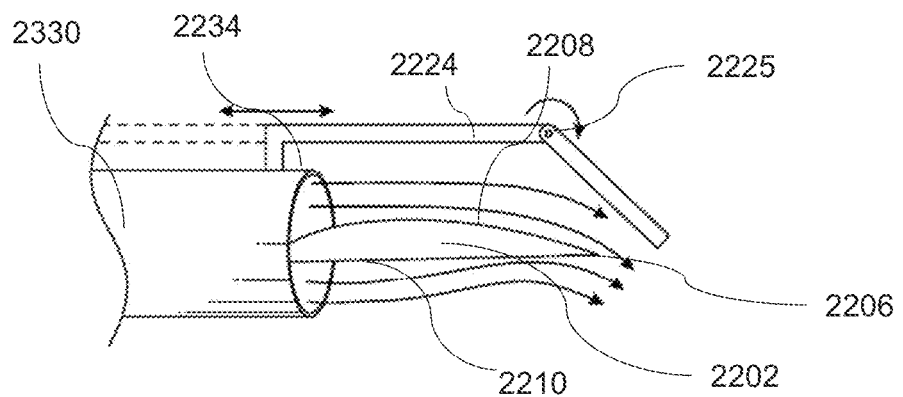
FIG. 22B is a partial perspective view of an embodiment of an airflow duct and a lifting body embodied as a flow diverter mounted to a top portion of the airflow duct to deflect air downward.

The wing 102 may be a plurality of wings 102 stacked on top of each other (see, for example, FIG. 22A). Therefore, the plurality of wings 102 may be mounted to the ducts 130 and may receive a flow of air at the leading edge 104. The plurality of wings 102 may each have a different span (outer diameter) to improve the lift and maneuverability characteristics of the aircraft 1100.

Additionally, although not shown, the wing 102 may have one or more solar panels attached (e.g., fixed) to a portion (e.g., top surface 108 and/or bottom surface 110) of the wing 102 for solar energy generation. In some embodiments, the wing 102 may be made of one or more solar panels. The solar panels may be retractable (e.g., return into a space within the wing 102) when not required for energy generation. One advantage of the one or more solar panels is that they may store and generate energy during flight and/or when in storage. The energy from the one or more solar panels can be used to power the aircraft components, motor, and/or controls.

Example Aircraft with Central Rotor and Non-Distributed Airflow Duct

FIGS. 13A-13C and 14 illustrate another embodiment of an aircraft 1300. The aircraft 1300 may have many or all of the same or similar features as aircraft 100, or any other aircraft disclosed herein, and the same reference numbers are used to refer to the same features. The aircraft 1300 includes one propulsion unit 1320 mounted along the longitudinal centerline Z of the aircraft 1300 and one duct 1330 configured to receive air from the one propulsion unit 1320. Additionally, the one propulsion unit 1320 may be located central to and/or above the main portion 1350. The one propulsion unit 1320 may be configured to draw a flow of air (such as from above the aircraft) and deliver the flow of air to the inlet end 1332 of the one duct 1330. Additionally, the one propulsion unit 1320 may be mounted in a vertical and/or downward facing direction to deliver the flow of air to the one duct 1330. The flow of air (e.g., flow of environmental air) may be delivered to the leading edge 104 of the wing 102 from the outlet end 1334 of the duct 1330. The flow of air may first be delivered to the leading edge of 104 of the wing 102 and travel over the top surface 108 and the bottom surface bottom surface 110, in order to generate lift, similar to as described in more detail above with reference to aircraft 100. In this embodiment, the outlet end 1334 of the duct 1330 may be generally annularly shaped, in order to provide a flow of air to the generally annularly shaped leading edge 104 of wing 102. Other embodiments may shape the duct outlet and/or wing differently.

With continued reference to FIGS. 13A-13C and 14, in some embodiments, one or more solar panels 1396 may be placed on the wing 102. The one or more solar panels 1396 may be placed along the top surface 108 of the wing 102 and spaced circumferentially along the wing 102. The one or more solar panels 1396 may also or alternatively be placed along the outside of the duct 1330 or along the outside of the larger channel (e.g., walled structure) 1344, or may be placed anywhere else on the aircraft that may be exposed to sunlight. In some embodiments, the solar panels may be fixed, and in some embodiments, the solar panels may be retractable. Further, some embodiments may include deployable solar panels, which can be stored when not needed, and can be deployed when needed (such as, for example, by deploying in a fashion that wraps the solar panels around a portion of the aircraft, and/or by deploying in a fashion that pops open an array of solar panels that are supported away from the main body of the aircraft). An advantage of one or more solar panels 1396 may be that it provides additional power to a battery. Additionally, the one or more solar panels 1396 may be an additional power source 223 to power the aircraft 1300. Another advantage of including one or more solar panels is that the aircraft may be able to reach more remote areas (such as for search and rescue or air ambulance missions) where there is no power source and not get stuck. As an example, the aircraft could be flown into the middle of the Arizona desert, be left in the sun for a few hours or days, and then fly back to a nearby power source. The addition of solar panels is not limited to the embodiment of FIGS. 13A-13C and 14, and solar panels may also be included with any other aircraft embodiments disclosed herein.

The aircraft 1300 may also have one or more proximity sensors 1397 positioned on the top surface 108, and/or the bottom surface 110 of the aircraft 1300, and/or elsewhere. The proximity sensor 1397 may be configured to determine the location of the aircraft 1300 in space and/or the proximity of the aircraft 1300 to an obstacle. For example, the proximity sensor 1397 may be configured to determine the distance the proximity sensor 1397 is located from a ground surface. Furthermore, the proximity sensor 1397 may be configured to determine the distance the aircraft 1300 is from other objects (e.g., objects, other aircrafts, buildings, etc.). The proximity sensor(s) may utilize any suitable technology, such as radar, ultrasonic, infrared, machine vision, laser, and/or the like. The addition of proximity sensors is not limited to the embodiment of FIGS. 13A-13C and 14, and proximity sensors may also be included with any other aircraft embodiments disclosed herein.

Example Aircraft with Central Rotor and Distributed Airflow Ducts

FIGS. 15A-15C and 16 illustrate another embodiment of an aircraft 1500. The aircraft 1500 may have many or all of the same or similar features as aircraft 1300, or any other aircraft disclosed herein, and the same reference numbers are used to refer to the same features. The aircraft 1500 includes a single propulsion unit 1520 that feeds airflow to a plurality of ducts 1530, instead of a single propulsion unit that feeds airflow to a single duct. The single propulsion unit 1520 may be positioned centrally on the aircraft 1500. Additionally, the one propulsion unit 1520 may be positioned central to and/or above the main portion 1550. The single propulsion unit 1520 may be configured to draw a flow of air and deliver said flow of air to the inlet ends 1532 of the plurality of ducts 1530. Additionally, the single propulsion unit 1520 may be mounted in a vertical and/or downward facing direction to deliver the flow of air to the plurality of ducts 1530. The flow of air (e.g., flow of environmental air) may delivered to the leading edge 104 of the wing 102 from the outlet end 1534 of the plurality of duct 1530. The flow of air may first be delivered to the leading edge of 104 and travel over the top surface 108 and the bottom surface bottom surface 110.

In some embodiments, the plurality of ducts 1530 may be configured to deliver a flow of air to a particular region of the wing 102. For example, when the single propulsion unit 1520 delivers the flow of air to the plurality of ducts 1530 (e.g., four ducts in this embodiment, but could be a different number in other embodiments) the flow of air can reach a particular section (e.g., one or more of sections 102A, 102B, 102C, 102D) of the wing 102. Additionally, the wing 102 may have ailerons 115 mounted on the top surface 108 near the trailing edge 106. The ailerons 115 may deflect upwards or downwards to change the shape, profile, or camber of the wing 102. The ailerons 115 may also be coupled to an actuator 118 which controls the deflection of the ailerons 115. By changing the profile of the section of the wing 102 (e.g., increasing the wing area, increasing the camber or curvature of the wing 102) by actuating the ailerons 115 in an upward direction, the aircraft 1500 may receive more sectional lift at desired speeds, which may assist in turning or specific directional movements. Advantageously, this may allow for increased control and maneuverability of the aircraft 1500 when it has a single propulsion unit 1520.

Similar to as discussed above with reference to aircraft 1300, in some embodiments, one or more solar panels 1596 may be placed on the wing 102. The one or more solar panels 1596 may be placed along the top surface 108 of the wing 102 and spaced circumferentially along the wing 102. The one or more solar panels 1596 may also be placed along the outside of the duct 1530 or along the outside of the larger channel (e.g., walled structure) 144. An advantage of the one or more solar panels 1596 may be that the one or more solar panels 1596 provide additional power to a battery. Additionally, the one or more solar panels 1596 may be an additional power source 223 to power the aircraft 1500.

Similar to above, with reference to aircraft 1300, the aircraft 1500 may also have one or more proximity sensors 1597 positioned on the top surface 108 and the bottom surface 110 of the aircraft 1500. The one or more proximity sensors 1597 may be configured to determine the location of the aircraft 1500 in space. For example, the one or more proximity sensors 1597 may be configured to determine the distance the proximity sensor 1597 is located from a ground surface. Furthermore, the one or more proximity sensors 1597 may be configured to determine the distance the aircraft 1300 is from other objects (e.g., objects, other aircrafts, buildings, etc.).

Example Aircraft with Parachute

Figure 17:
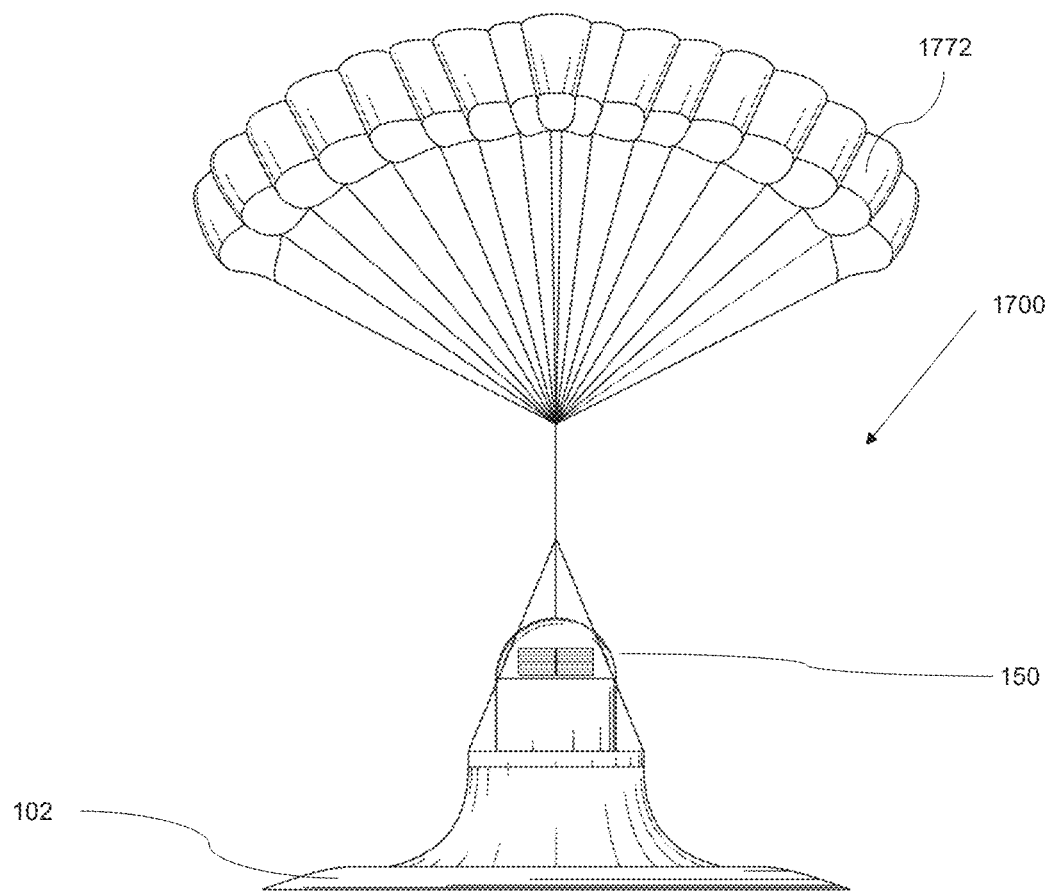
FIG. 17 illustrates a side view of another embodiment of an aircraft having a lifting body embodied as an annular wing and airflow ducts with a deployed parachute.

FIG. 17 illustrates another embodiment of an aircraft 1700. The aircraft 1700 may have many or all of the same or similar features as aircraft 100, or any other aircraft disclosed herein, and the same reference numbers are used to refer to the same features. A parachute may be released from aircraft 1700 to assist with landing (and/or to enable a safe landing in an emergency, such as when power is lost). In some cases, the parachute 1772 may be positioned on or within the main portion 150 before being deployed. When deployed, the parachute 1772 may release and expand from the top of the main portion 150. Advantageously, the parachute 1772 may release when the aircraft 1700 is making a rapid decent or when one or more of the propulsion units 120 fail and the aircraft rapidly loses elevation. Some embodiments may include a plurality of parachutes instead of a single parachute. In some embodiments, the parachute 1772 may be attached to another portion of the aircraft using one or more tethers, cables, ropes, and/or the like.

Example Aircraft with Inflatable Landing Gear

Figure 18:
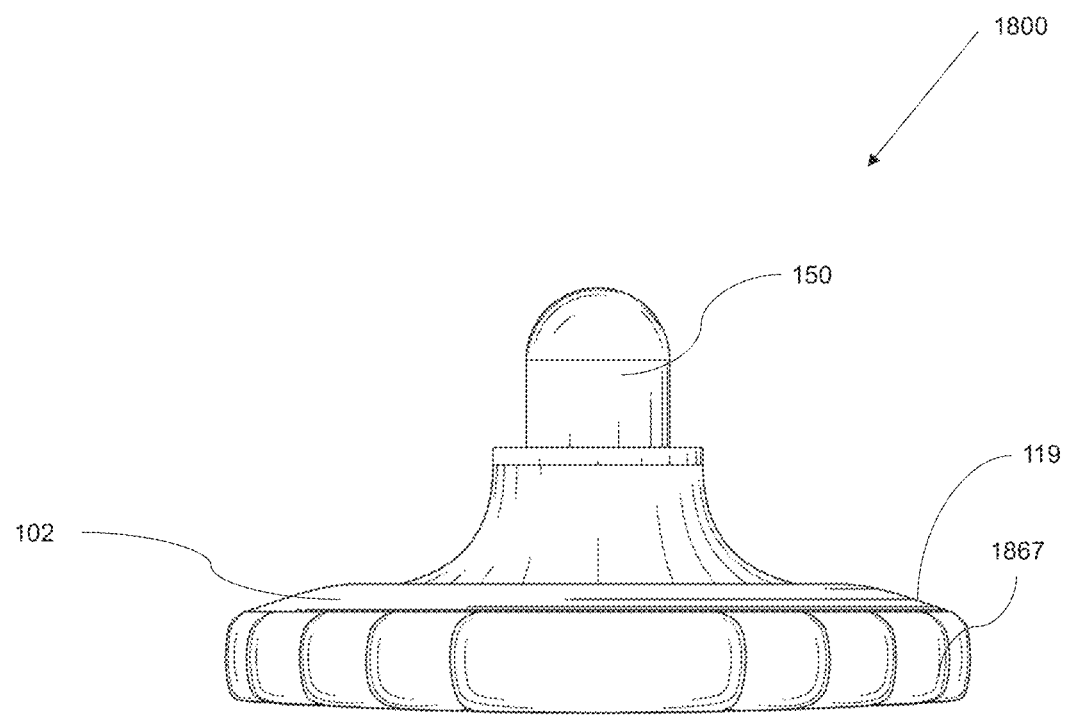
FIG. 18 illustrates a side view of another embodiment of an aircraft having a lifting body embodied as an annular wing and airflow ducts with deployed inflatable landing gear.

FIG. 18 illustrates another embodiment of an aircraft 1800. The aircraft 1800 may have many or all of the same or similar features as aircraft 100, or any other aircraft disclosed herein, and the same reference numbers are used to refer to the same features. An inflatable landing gear 1867 may be located at or near a bottom surface of the aircraft 1800. The inflatable landing gear 1867 may expand and inflate from within a bottom area of the aircraft 1800. Additionally, the inflatable landing gear 1867 may be coupled to a pump or another inflation device which may provide a flow of air required to fill the inflatable landing gear 1867. Advantageously, by placing the inflatable landing gear 1867 on the bottom portion bottom portion 119 of the aircraft 1800, the aircraft 1800 may be able to safely land in water when the inflatable landing gear 1867 deploys.

Example Aircraft with Elongated Body and Longitudinal Wings

Figure 19:
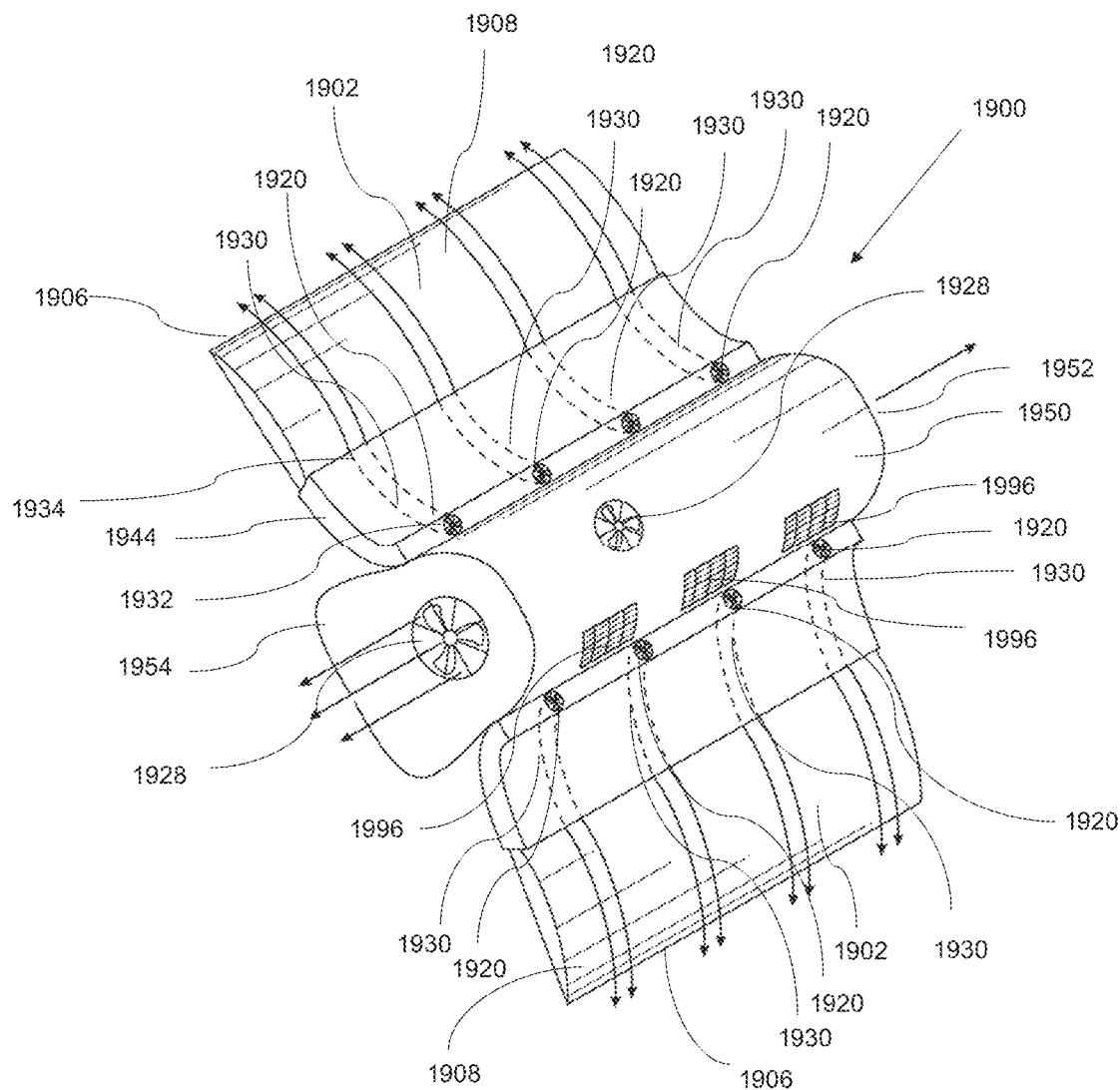
FIG. 19 illustrates a perspective view of another embodiment of an aircraft having an elongated main body and two lifting bodies embodied as wings extending longitudinally along the elongated main body with longitudinally distributed airflow ducts.
Figure 20A:
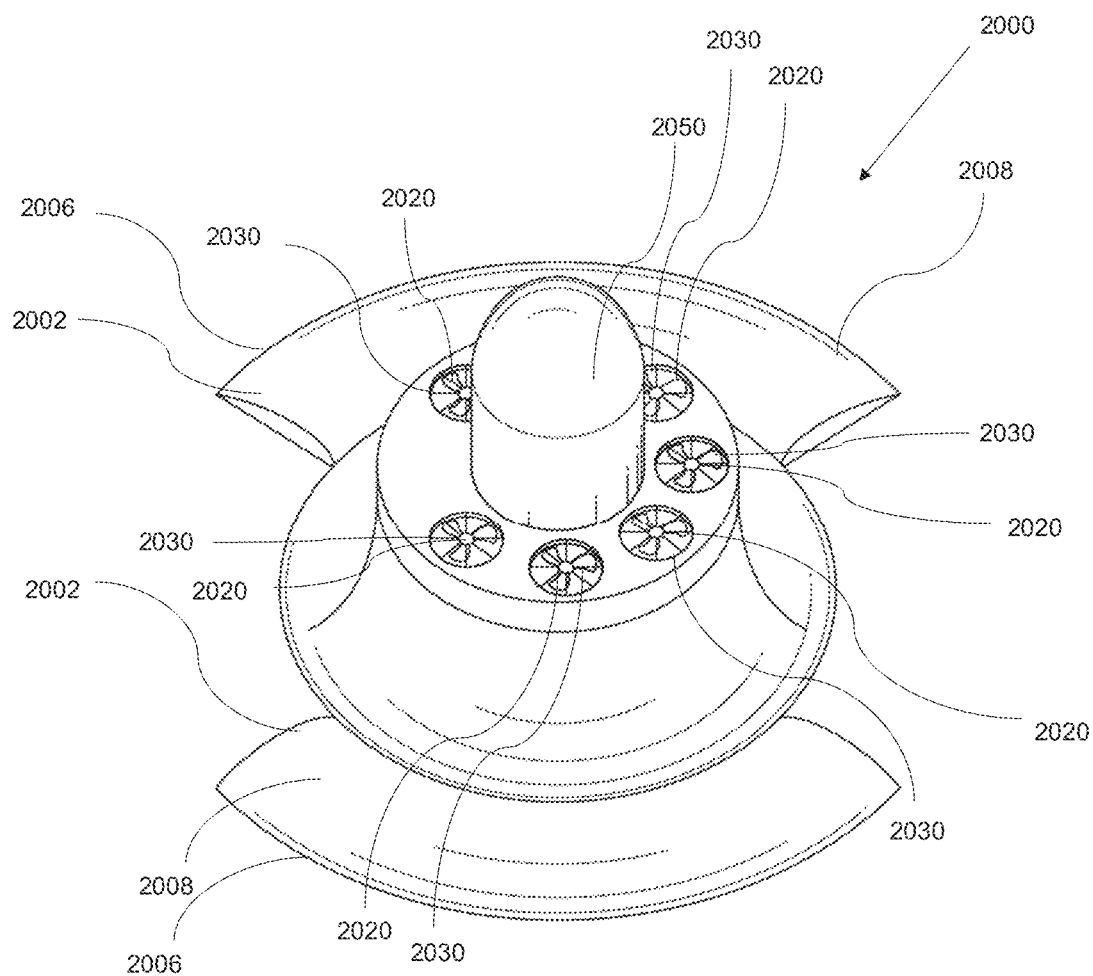
FIG. 20A illustrates a perspective view of another embodiment of an aircraft having two lifting bodies embodied as partial annular wings shown as crescent wings with a plurality of propulsion units and a plurality of airflow ducts.
Figure 20B:
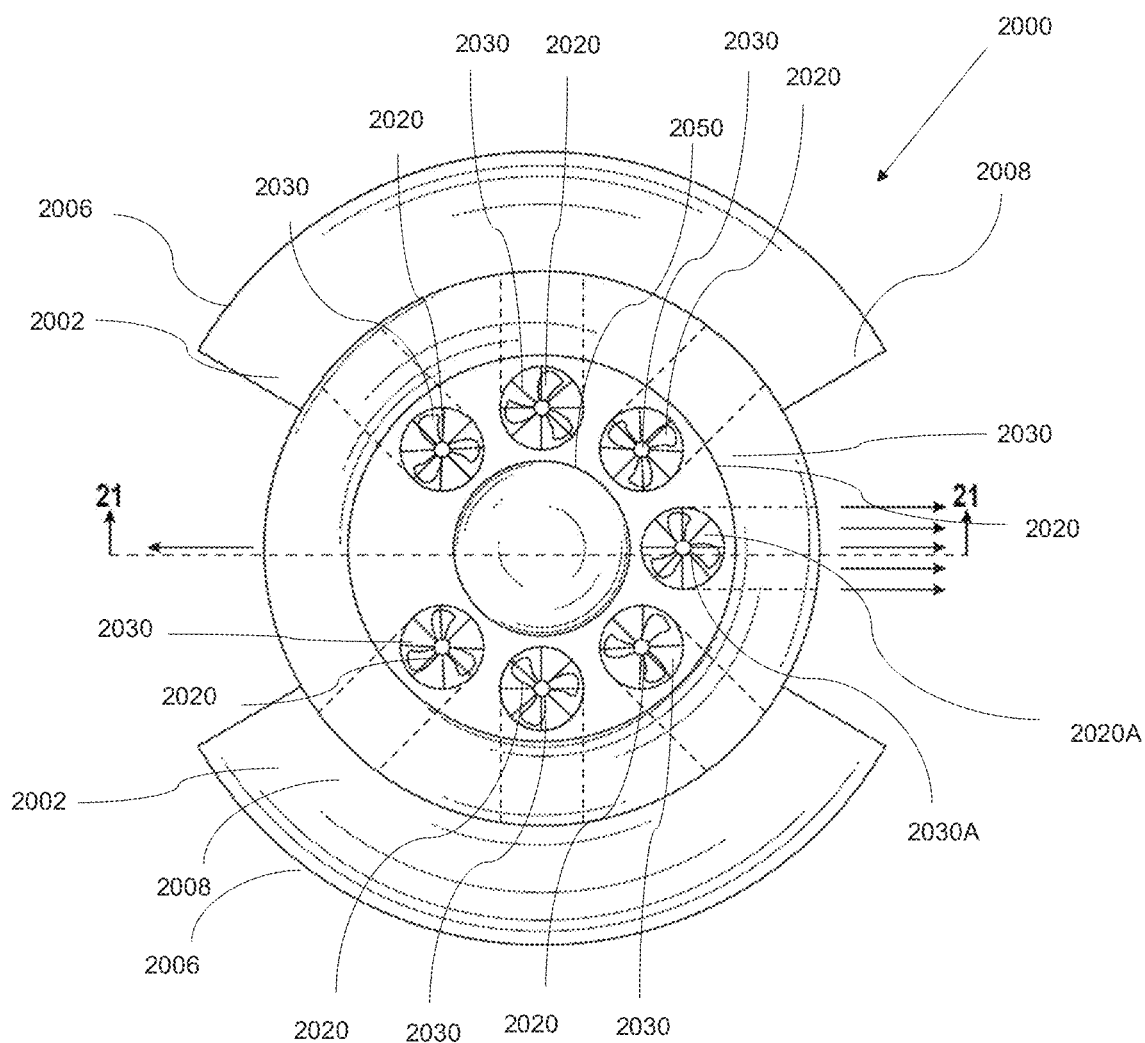
FIG. 20B illustrates a top view of the aircraft shown in FIG. 20A.
Figure 20C:
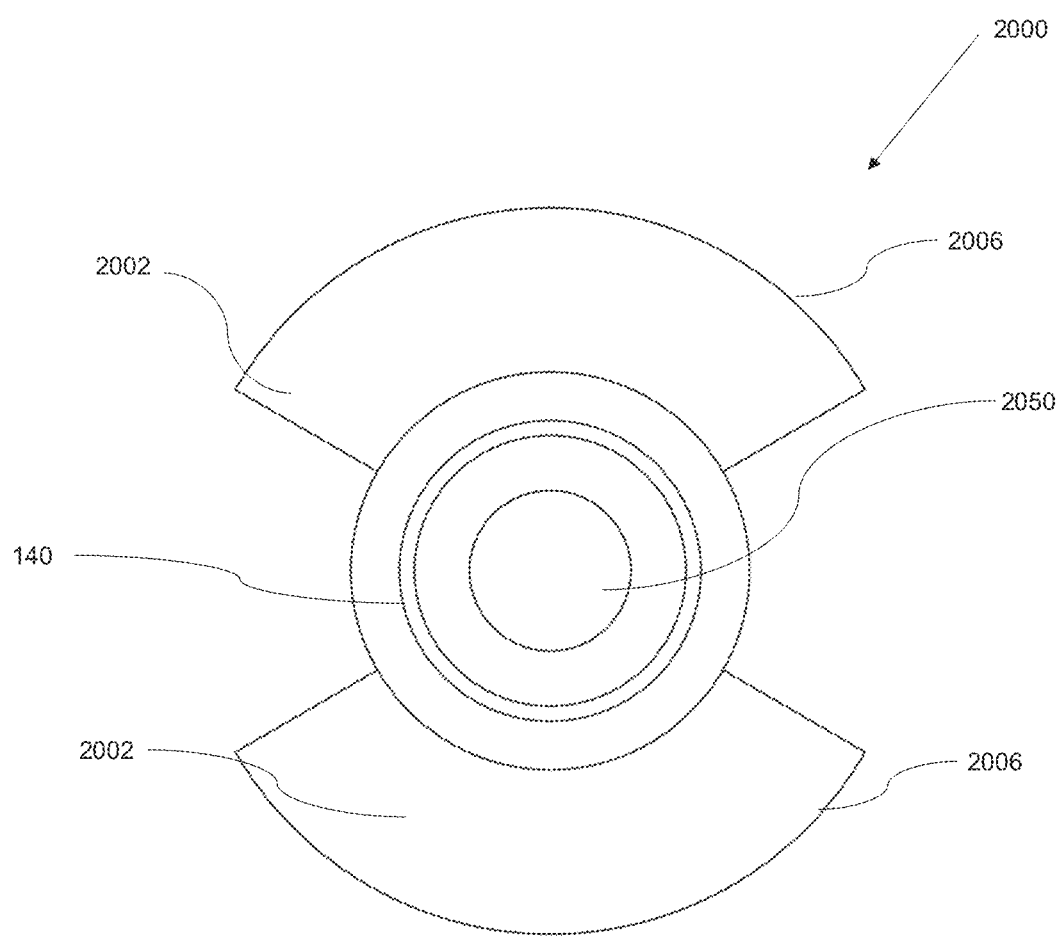
FIG. 20C illustrates a bottom view of the aircraft shown in FIG. 20A.
Figure 21:
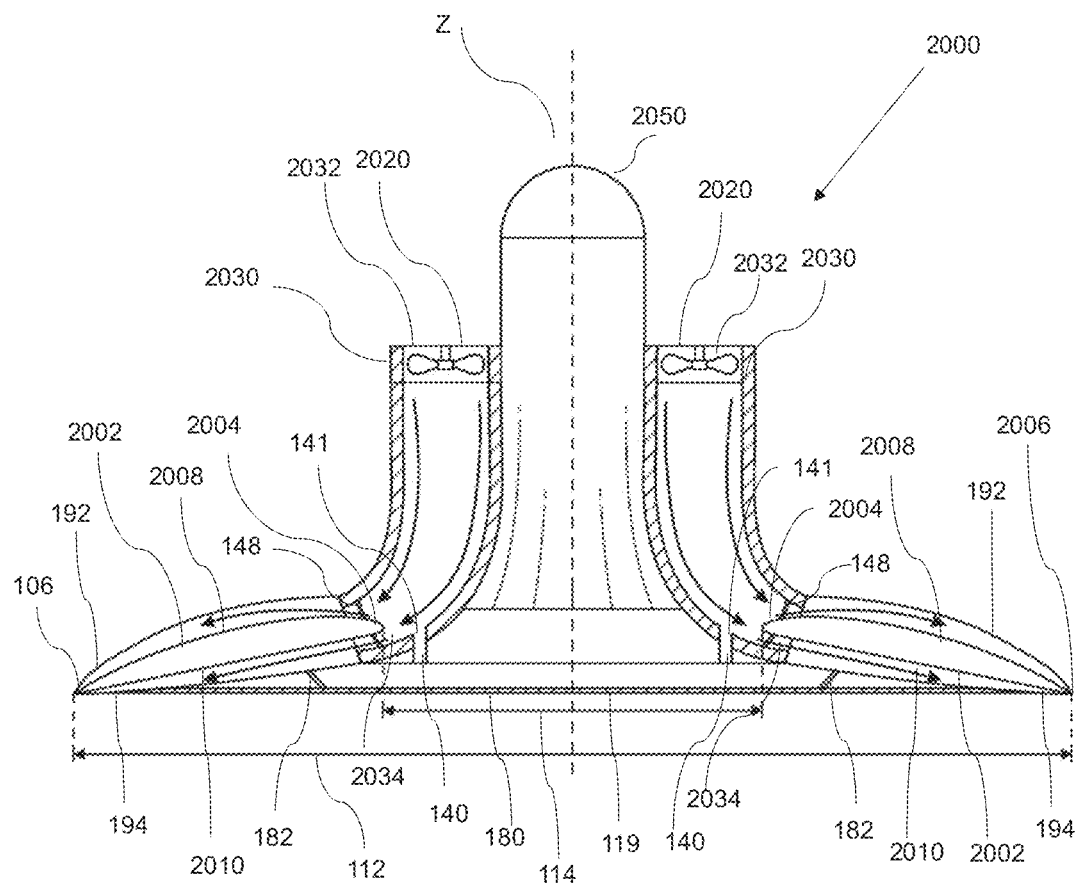
FIG. 21 illustrates a cross-sectional view of the aircraft shown in FIG. 20A.

FIG. 19 illustrates another embodiment of an aircraft 1900. The aircraft 1900 may have many or all of the same or similar features as aircraft 100, or any other aircraft disclosed herein, and the same reference numbers are used to refer to the same features. The aircraft 1900 comprises two lifting bodies depicted as wings 1902 extending longitudinally along the sides of the aircraft 1900, instead of a wing extending circumferentially around the aircraft. The aircraft 1900 may have a plurality of propulsion units 1920, a plurality of ducts 1930, and a main portion 1950 which may be empty, or which may contain a payload compartment, passenger area, cockpit, and/or the like.

In some embodiments, the main portion 1950 may be tubular or cylindrical or shaped otherwise, and may extend along the longitudinal axis of the aircraft 1900. The main portion 1950 may have a front portion 1952 and rear portion. The front portion 1952 and the rear portion 1954 and/or a top portion of the aircraft may have one or more rotors 1928 (and/or one or more inlets or outlets of ducts coupled to a rotor). The one or more rotors 1928 may deliver a flow of air from the front portion 1952 to the rear portion 1954, such as through a duct that passes therebetween, to move the aircraft 1900 in a forward direction. Alternatively, the one or more rotors 1928 may deliver a flow of air from a top portion of the aircraft to the rear portion 1954, such as through a duct that passes therebetween, to move the aircraft 1900 in a forward direction. Additionally, the main portion 1950 may contain a passenger portion therein. The aircraft 1900 may also have one or more solar panels 1996 positioned on the main portion 1950 or elsewhere.

In some embodiments, the ducts 1930 are coupled to the main portion 1950. The ducts 1930 extend from a sidewall of the main portion 1950. The plurality of ducts 1930 may extend from an inlet end 1932 to an outlet end 1934. Additionally, in some embodiments, the length or shape of the plurality of ducts 1930 can be configured to provide a desired flow of air to the wings 1902 coupled to the outlet end 1934. The plurality of ducts 1930 can have a propulsion unit 1920 coupled to the inlet end 1932 of the plurality of ducts 1930. The propulsion units 1920 may deliver a flow of air through the plurality of ducts 1930 and to the leading edge of the wings 1902. The flow of air may travel over a top portion 1908 of the wings 1902 and to a trailing edge 1906. The plurality of ducts 1930 may be contained within one or more walled channels 1944. The walled channels 1944 may be positioned along the sidewalls of the main portion 1950. The one or more walled channels 1944 may be L-shaped or J-shaped, or shaped otherwise, and may extend the entire length of the tubular main body 1950, or may not extend the entire length.

In some embodiments, one or more solar panels 1996 may be placed on the body 1950. An advantage of one or more solar panels 1996 may be that it provides additional power to a battery. Additionally, the one or more solar panels 1996 may be an additional power source 223 to power the aircraft 1900.

Example Aircraft with Crescent Wings

FIGS. 20A-20C and 21 illustrate another embodiment of an aircraft 2000. The aircraft 2000 may have many or all of the same or similar features as aircraft 100, or any other aircraft disclosed herein, and the same reference numbers are used to refer to the same features. The aircraft 2000 has two crescent shaped lifting bodies depicted as wings 2002. In other words, the aircraft 2000 may include some portions of the wing 102 of aircraft 100, with some portions of the wing 102 of aircraft 100 removed. The two crescent shaped wings 2002 can be positioned on opposite sides of the aircraft 2000. In this embodiment, each of the wings 2002 may span approximately 90 degrees of the circular outer profile of the aircraft 2000. In other embodiments, each of the one or more wings 2002 may span between 45 to 150 degrees of the circular outer profile of the aircraft 2000. The two crescent shaped wings 2002 may have a trailing edge 2006, a top portion 2008, and a bottom portion 2010. The two crescent shaped wings 2002 may also have a main portion 2050.

The aircraft 2000 may also have one or more ducts 2030 (e.g., four, five, six, seven, etc.). One of the propulsion units 2020 (e.g., 2020A) and ducts 2030 (e.g., 2030A) may be placed on a rear portion of the aircraft 2000 (and/or be configured such that airflow is directed rearward). The duct 2030A at the rear portion of the aircraft 2000 may be coupled to a propulsion unit 2020A which may deliver a flow of air through the duct 2030 from the inlet end 2032 to the outlet end 2034. The flow of air that exits the outlet end 2034 at the rear portion of the aircraft 2000 may thrust the aircraft 2000 forward. Advantageously, the other one or more ducts 2030 may receive a flow of air from other propulsion units 2020. The other propulsion units 2020 can deliver the flow of air from the inlet end 2032 to the outlet end 2034 and to the leading edge 2004 of the one or more wings 2002. The other propulsion units 2020 and other one or more ducts 2030 may be configured to change altitude, pitch, roll, and yaw to maneuver the aircraft 2000 in a desired direction, similarly as described above with reference to other embodiments. Additionally, each of the propulsion units 2020 may also be operated independently. By operating the rear propulsion unit 2020A independently, the aircraft 2000 can thrust forward while the other propulsion units 2020 may be used to stabilize flight to account for turbulence, wind, movement of payloads and/or passengers, and/or the like.

Example Wing Configurations and Flow Diverters

FIGS. 22A-22D illustrate examples of different configurations of lifting bodies depicted as wings 2202 and ducts 2230. The wings 2202 and ducts 2230 may operate similar to the wings 102 and ducts 130 of aircraft 100, discussed above, and may be used with any aircraft described herein, including aircraft 100. In some embodiments, the ducts 2230 may be coupled to one or more wings 2202 (see FIG. 22A). The wings 2202 may be spaced apart vertically or stacked within or next to the duct 2230. Therefore, each of the stacked wings 2202 may receive a flow of air from the outlet end 2234 of the ducts 2230 at the leading edge 2204 of the wings 2202. Such a stacked configuration may, for example, increase the efficiency of the aircraft.

Figure 22C:
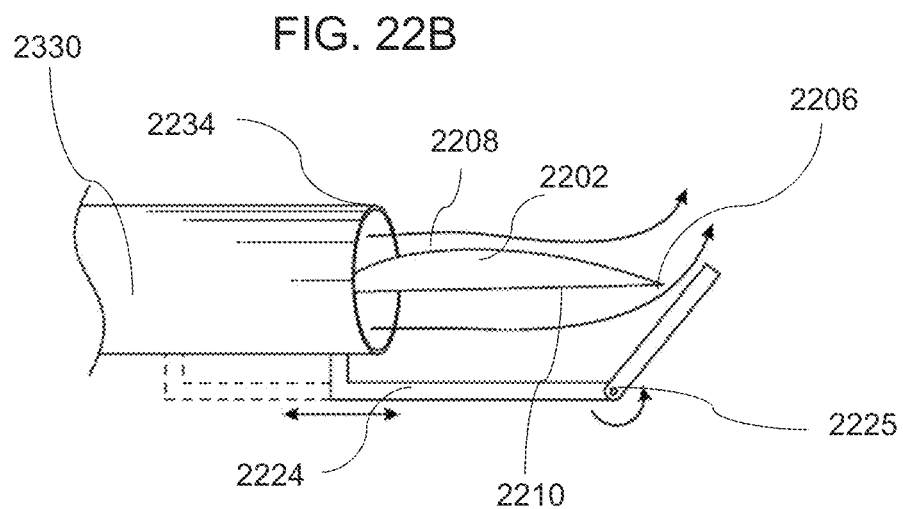
FIG. 22C is a partial perspective view of an embodiment of an airflow duct and a lifting body embodied as a flow diverter mounted to a bottom portion of the airflow duct to deflect air upward.

The wings 2202 may be coupled to (or be positioned next to) a flow diverter 2224 near a top portion 2208 of the wing 2202 (see FIG. 22B) and/or near a bottom portion 2210 of the wing (see FIG. 22C). The flow diverter 2224 may be configured to divert a flow of air at the trailing edge 2206 upwards or downwards. Advantageously, the flow diverter 2224 may be configured to prevent air from being directed radially outwards when landing, such as to prevent blowing the flow of air onto objects around the aircraft when landing. For example, when the flow diverter 2224 is positioned above the top portion 2208 of the wings 2202, the flow diverter 2224 may rotate downwards to direct a flow of air in a downward direction at the trailing edge 2206. In embodiments where the flow diverter 2224 is located at a bottom portion 2210 of the wings 2202, the flow diverter 2224 can rotate upwards to direct a flow of air in an upwards direction at the trailing edge 2206. Additionally, the flow diverter 2224 may be connected to a pivot actuator 2225 which may control the flow diverter 2224 and rotate a segment of the flow diverter 2224 upwards or downwards.

The flow diverter 2224 may be designed to prevent the flow of air delivered to the trailing edge 2206 along the top portion 2208 and/or bottom portion 2210 from being obstructed. For example, when the aircraft (e.g., aircraft 100) is traveling in a forward direction, the flow diverter 2224 can block an incoming flow of environmental air at the trailing edge 2206 of the wings 2202. Advantageously, having the flow diverter 2224 block an incoming flow of air at the trailing edge 2206 may improve maneuverability and stability when the aircraft (e.g., aircraft 100) is moving in a desired direction (e.g., forward direction).

The flow diverter 2224 may also translate in a forward and backward (or outward and inward) direction along the ducts 2230. The flow diverter 2224 may be coupled to an exterior portion of the ducts 2230 near the outlet end 2234. Advantageously, the flow diverter 2224 may translate forward and backwards to divert the flow of air closer or further from the trailing edge 2206 of wings 2202. In some embodiments, the flow diverter 2224 may translate along the ducts 2230 along a track coupled to the ducts 2230.

Figure 22D:
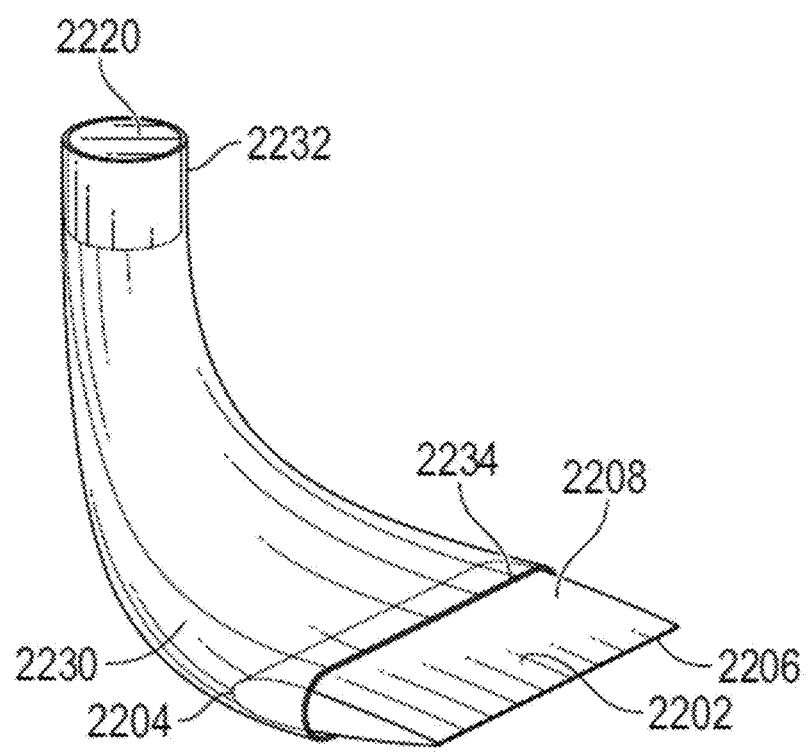
FIG. 22D is a partial perspective view of another embodiment of a rotor and airflow duct, the airflow duct having an outlet with a different shape and/or cross-sectional area than the inlet, and the outlet conforming to the shape of a lifting body embodied as a wing at the outlet.

With reference to FIG. 22D, in some embodiments, the ducts 2230 may have a larger (e.g., wider) outlet end 2234 than inlet end 2232. Additionally, the wings 2202 may be completely contained or mounted within the outlet end 2234 (or a leading edge of the wing maybe be completely contained or mounted within the outlet end 2234). The propulsion unit 2220 can direct a flow of air from the inlet end 2232 to the outlet end 2234 through the widening profile (e.g., tapering profiled) of the ducts 2230 to allow the flow of air to reach the leading edge 2204 of the wing 2202. The cross-sectional area of the outlet end 2234 may be greater than the cross-sectional area of the inlet end 2232. The cross-sectional area of the inner channel defined by the duct 2230 may increase, along at least a section of the duct 2230 or along the entire length of the duct 2230, in the direction from the inlet end 2232 to the outlet end 2234 along the inner channel. The ducts 2230 can be J-shaped, C-shaped, L-shaped, or any other orientation which may effectively deliver a flow of air to the wing 2202 for optimal angle of attack to cause optimal lift while optimizing energy usage. In some embodiments, the opening area of the outlet end 2234 may be at least twice as large as the opening area of the inlet end 2232. Alternatively, the outlet end 2234 may be at least one and a half times as large as the inlet end 2232. The outlet end 2234 may be between one and a quarter times and three times as large as the inlet end 2232. Therefore, the ducts 2230 can deliver a flow of air over wings with larger surface areas. The wing 2202 may be located partially outside the outlet end 2234. In some embodiments, the wing 2202 may be located entirely outside the outlet end 2234.

Example Aircraft with Stacked Wings

Figure 23A:
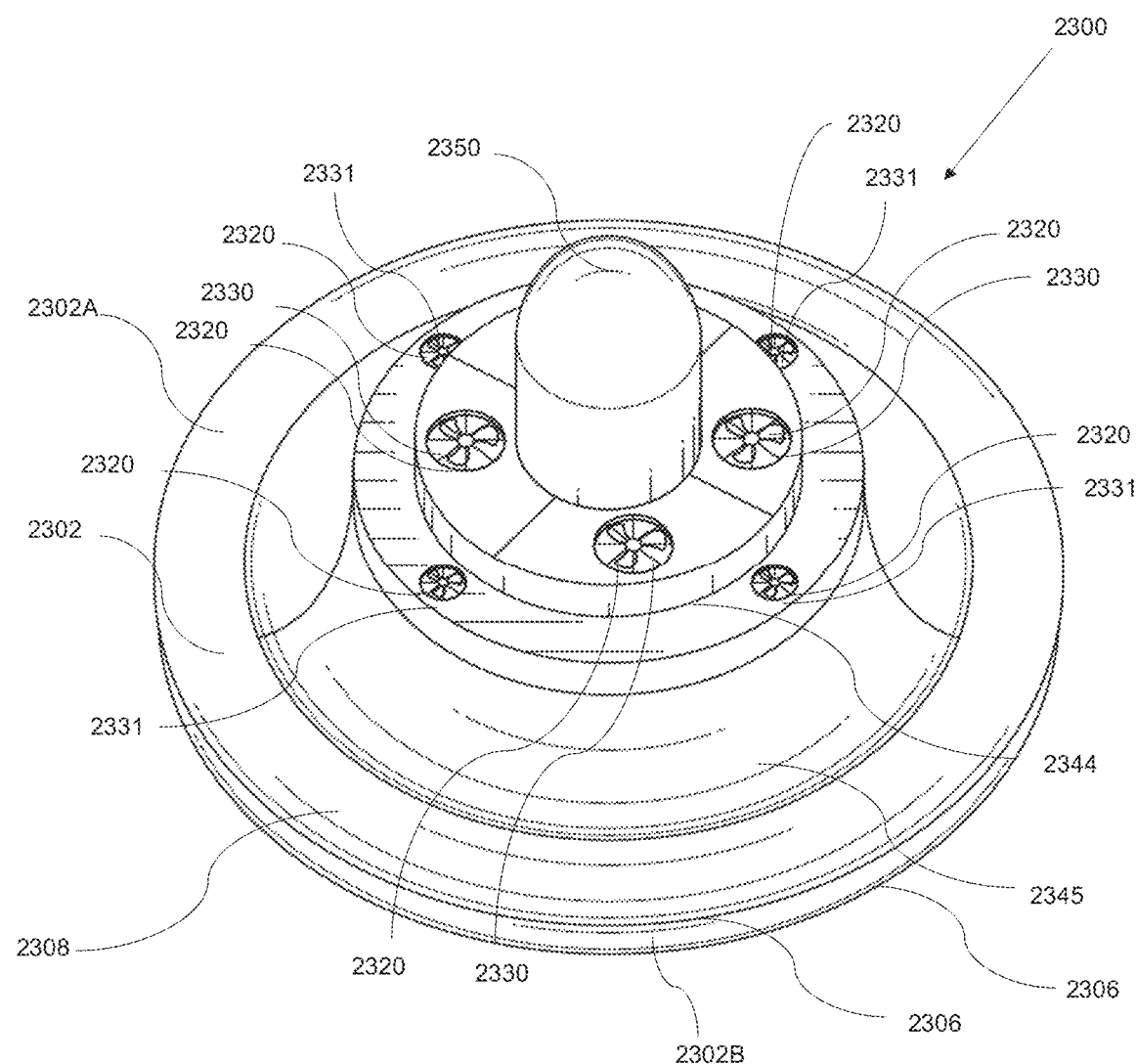
FIG. 23A illustrates a perspective view of another embodiment of an aircraft having a first section of ducts and a second section of ducts with inlets spaced radially outward from and lower than inlets of the first set of ducts, along with a plurality of propulsion units.
Figure 23B:
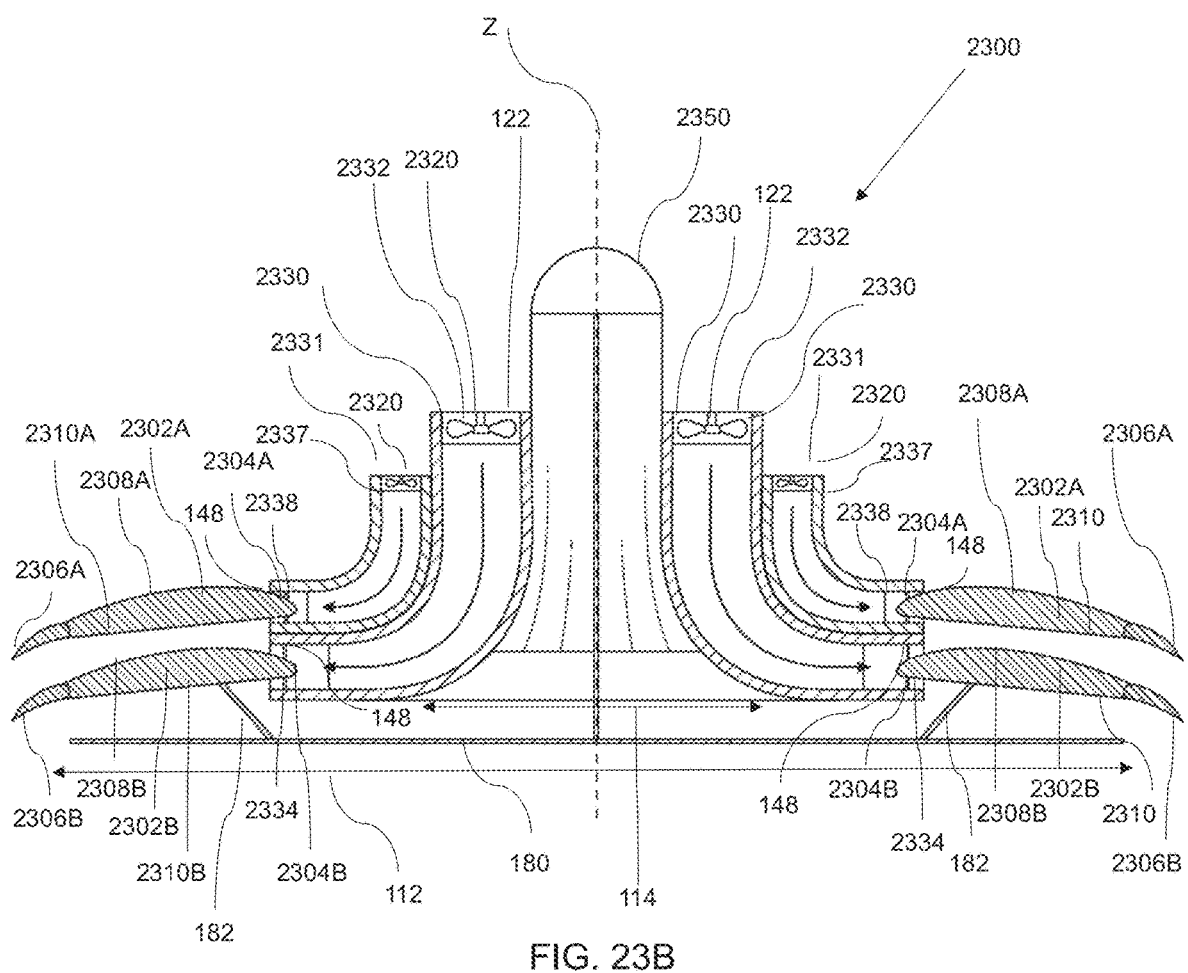
FIG. 23B illustrates a cross-sectional view of the aircraft shown in FIG. 23A.

FIGS. 23A-23B illustrate another embodiment of an aircraft 2300. The aircraft 2300 may have many or all of the same or similar features as aircraft 100, or any other aircraft disclosed herein, and the same reference numbers are used to refer to the same features. The aircraft 2300 has multiple distinct annular arrangements of ducts 2330, 2331 and propulsion units 2320. In other words, the aircraft 2300 may have a first section of ducts 2330 and propulsion units 2320 which may provide a flow of air to a first lifting body depicted a first wing 2302B (e.g., bottom wing) and a second section of ducts 2331 and propulsion units 2320 which may provide a flow of air to a second lifting body depicted as a second wing 2302A (e.g., top wing). The wings 2302A and the wings 2302B may have a leading edge 2304A, 2304B and a trailing edge 2306A, 2306B. The first section of ducts 2330 may be positioned radially outward of the main body 2350 along a first annular path. The second section of ducts 2331 may be positioned radially outward of the first section of ducts 2330 along a second annular path. In this embodiment, there are two wings 2302A, 2302B which may be positioned in a stacked orientation where 2302A is positioned above 2302B. Other embodiments may utilize other arrangements of ducts intended to feed different wings (including, but not limited to, arrangements that position ducts intended to feed different wings within the same general annular space, instead of positioning one set of ducts radially outside of another set of ducts). For example, there may be one, two, three, four, five, six, seven, eight, nine, ten, eleven, twelve, or more of each of the ducts 2330 and the ducts 2331. There may be two, three, four, five, or more of the sections of ducts. As further example, there may be one, two, three, four, five, six, seven, eight, nine, ten, or more of the wings 2302. The ducts 2330 in the first section may be angularly offset about a central longitudinal axis from the ducts 2331 of the second section, as shown. In some embodiments, the ducts 2330 may be angularly aligned with some or all of the ducts 2331.

The first section of ducts 2330 may have a longer duct length than the second section of ducts 2331. Therefore, in some embodiments, the first section of ducts 2330 may have an inlet end 2332 positioned higher than an inlet end 2337 of the second section of ducts 2331. Additionally, the first section of ducts 2330 may have an outlet end 2334 positioned below outlet end 2338 of the second section of ducts 2331. The shorter length of the second section of ducts 2330 may increase the flow rate of air that exits the outlet end 2338 since there may be less friction and turbulence experienced by the air in the ducts 2331. Additionally, by positioning the inlet end 2337 of the second section of ducts 2331 below the inlet end 2332 of first section of ducts 2330, the air intake at the inlet end 2337 may increase (e.g., as compared to an orientation where the inlet end 2332 of the ducts 2330 and the inlet end 2337 of the ducts 2331 are level). In some embodiments, the inlet ends 2332 may be positioned above or at the same height as the inlet ends 2337. In some embodiments, the outlet ends 2334 may be positioned above or at the same height as the outlet ends 2338. The inlet end 2337 and outlet end 2338 of the second section of ducts 2331 may have a smaller diameter than the diameter inlet end 2332 and outlet end 2334 of the first section of ducts 2330. The first section of ducts 2330 may be created in a larger channel (e.g., walled structure) 2344. In some embodiments, the second section of ducts 2331 may be created in a second larger channel (e.g., second walled structure) 2345.

The plurality of propulsion units 2320 are configured to deliver a flow of air from the inlet end 2332 of the ducts 2330 and the inlet end 2337 of the ducts 2331 to deliver a flow of air to the leading edge 2304A, 2304B of the wings 2302A, 2302B. The flow of air generated by the propulsion units 2320 to travel through the first section of ducts 2330 and the second section of ducts 2331 may be delivered to the leading edges 2304A, 2304B and travel over the top surfaces 2308A, 2308B and the bottom surfaces 2310A, 2310B. The flow of air traveling from the leading edges 2304A, 2304B to the trailing edges 2306A, 2306B along the top surfaces 2308A, 2308B may flow at a relatively greater speed, compared to air flowing along the bottom surfaces 2308A, 2308B, due to the curved profile of the top surface 2308, resulting in a relatively lower air pressure exerted on the upper portion of the wing as compared to the pressure on the bottom surface 2310. Furthermore, the flow of air traveling over the leading edge 2304A and top surface 2308A of wing 2302A may be greater than the flow of air traveling over the leading edge 2304B and top surface of 2308B of wing 2302B. Advantageously, by having a stacked wing orientation (e.g., 2302A above 2302B), the total lift capability of aircraft 2300 may increase and may permit the aircraft 2300 to lift heavier payloads without increasing the span of the wings 2302A, 2302B.

Figure 24A:
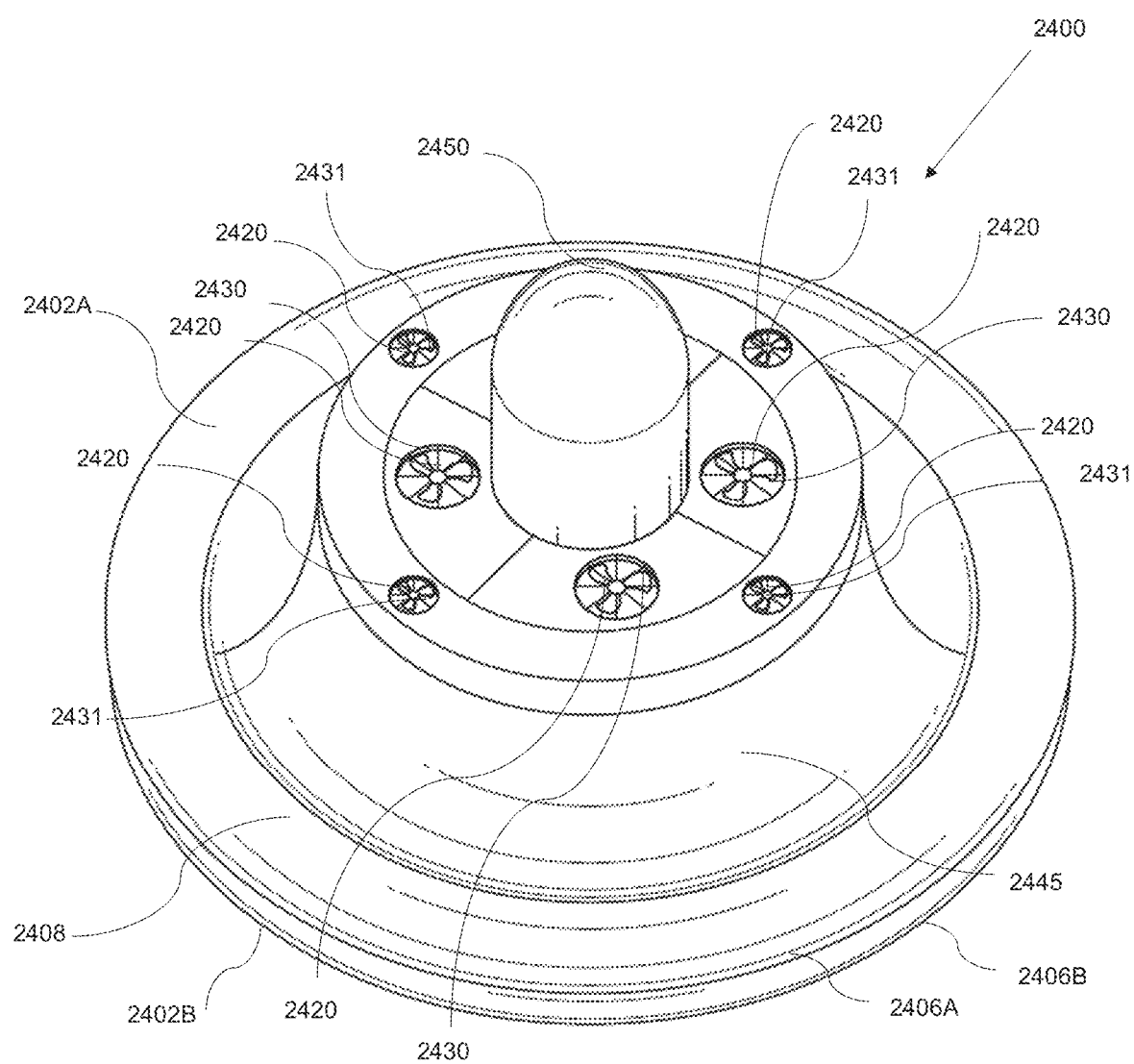
FIG. 24A illustrates a perspective view of another embodiment of an aircraft having a first section of ducts and a second section of ducts with inlets spaced radially outward from and vertically even with inlets of the first set of ducts, along with a plurality of propulsion units.
Figure 24B:
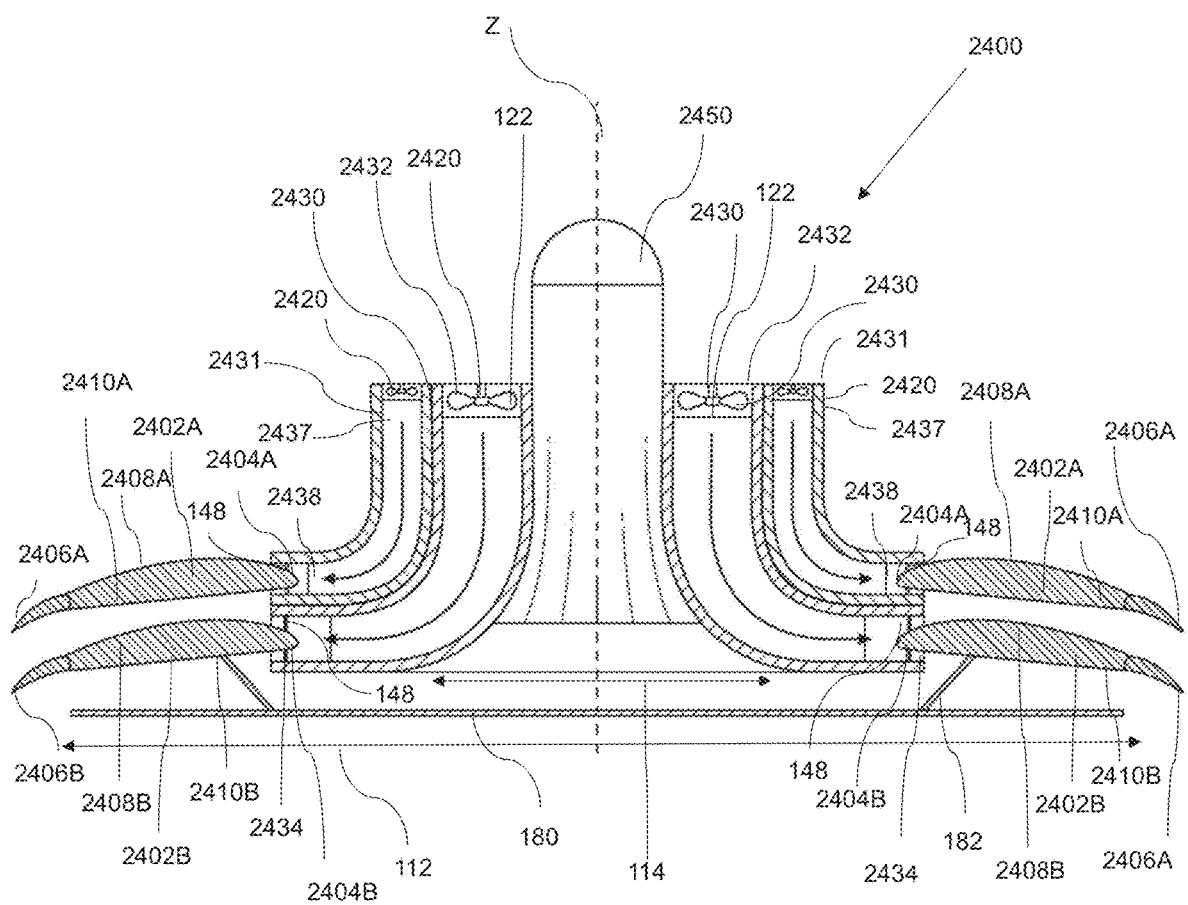
FIG. 24B illustrates a cross-sectional view of the aircraft shown in FIG. 24A.

FIGS. 24A-24B illustrate another embodiment of an aircraft 2400. The aircraft 2400 may have many or all of the same or similar features as aircraft 100, 2300, or any other aircraft disclosed herein, and the same reference numbers are used to refer to the same features. The aircraft 2400 has multiple distinct annular arrangements of ducts 2430, 2431 and propulsion units 2420 (similar in concept the arrangements of ducts of aircraft 2300 discussed above). In other words, the aircraft 2400 may have a first section of ducts 2430 and propulsion units 2420 which may provide a flow of air to a first lifting body depicted as a first wing 2402B (e.g., bottom wing) and a second section of ducts 2431 and propulsion units 2420 which may provide a flow of air to a second lifting body depicted as a second wing 2402A (e.g., top wing). The first section of ducts 2430 may be positioned radially outward of the main body 2450. The second section of ducts 2431 may be positioned radially outward of the first section of ducts 2430. In this embodiment, there are two wings 2402A, 2402B which may be positioned in a stacked orientation where 2402A is positioned above 2402B. As with aircraft 2300 discussed above, other embodiments may utilize other arrangements of ducts intended to feed different wings (including, but not limited to, arrangements that position ducts intended to feed different wings within the same general annular space, instead of positioning one set of ducts radially outside of another set of ducts).

In the aircraft 2400, the first section of ducts 2430 may be level (e.g., positioned at a same height in the Z-direction) as the second section of ducts 2431. The first section of ducts 2430 may have a longer length than the second section of ducts 2431. Therefore, the first section of ducts 2430 may have an outlet end 2434 positioned below outlet end 2438 of the second section of ducts 2431. The shorter length of the second section of ducts 2430 may increase the flow rate of air that exits the outlet end 2438 since there may be less friction and turbulence experienced by the air in the ducts 2431. The inlet end 2437 and outlet end 2438 of second section of ducts 2431 may have a smaller diameter than the diameter of the inlet end 2432 and outlet end 2434 of the first section of ducts 2430. The first section of ducts 2430 may be created in a larger channel (e.g., walled structure) 2444. In some embodiments, the second section of ducts 2431 may be created in a second larger channel (e.g., second walled structure) 2445.

The plurality of propulsion units 2420 are designed to deliver a flow of air from an inlet end 2432 of the ducts 2430. The inlet end 2437 of the ducts 2431 are designed to deliver a flow of air to the leading edge 2404A, 2404B of the wings 2402A, 2402B. The flow of air generated by the propulsion units 2420 to travel through the first section of ducts 2430 and the second section of ducts 2431 may be delivered to the leading edges 2404A, 2404B and travel over the top surfaces 2408A, 2408B and the bottom surfaces 2410A, 2410B. The flow of air traveling from the leading edges 2404A, 2404B to the trailing edges 2406A, 2406B along the top surfaces 2408A, 2408B may flow at a relatively greater speed, compared to air flowing along the bottom surfaces 2408A, 2408B, due to the curved profile of the top surface 2408A, 2408B, resulting in a relatively lower air pressure exerted on the upper portion of the wing as compared to the pressure on the bottom surface 2410A, 2410B. Furthermore, the flow of air traveling over the leading edge 2404A and top surface 2408A of wing 2402A may be greater than the flow of air traveling over the leading edge 2404B and top surface of 2408B of wing 2402B. Advantageously, by having a stacked wing orientation (e.g., 2402A above 2402B), the total lift capability of aircraft 2300 may increase and may permit the aircraft 2300 to lift heavier payloads without increasing the span of the wings 2302A, 2302B.

Example Aircraft with Alternative Wing Tip Shape and Flow Diverters

Figure 25A:
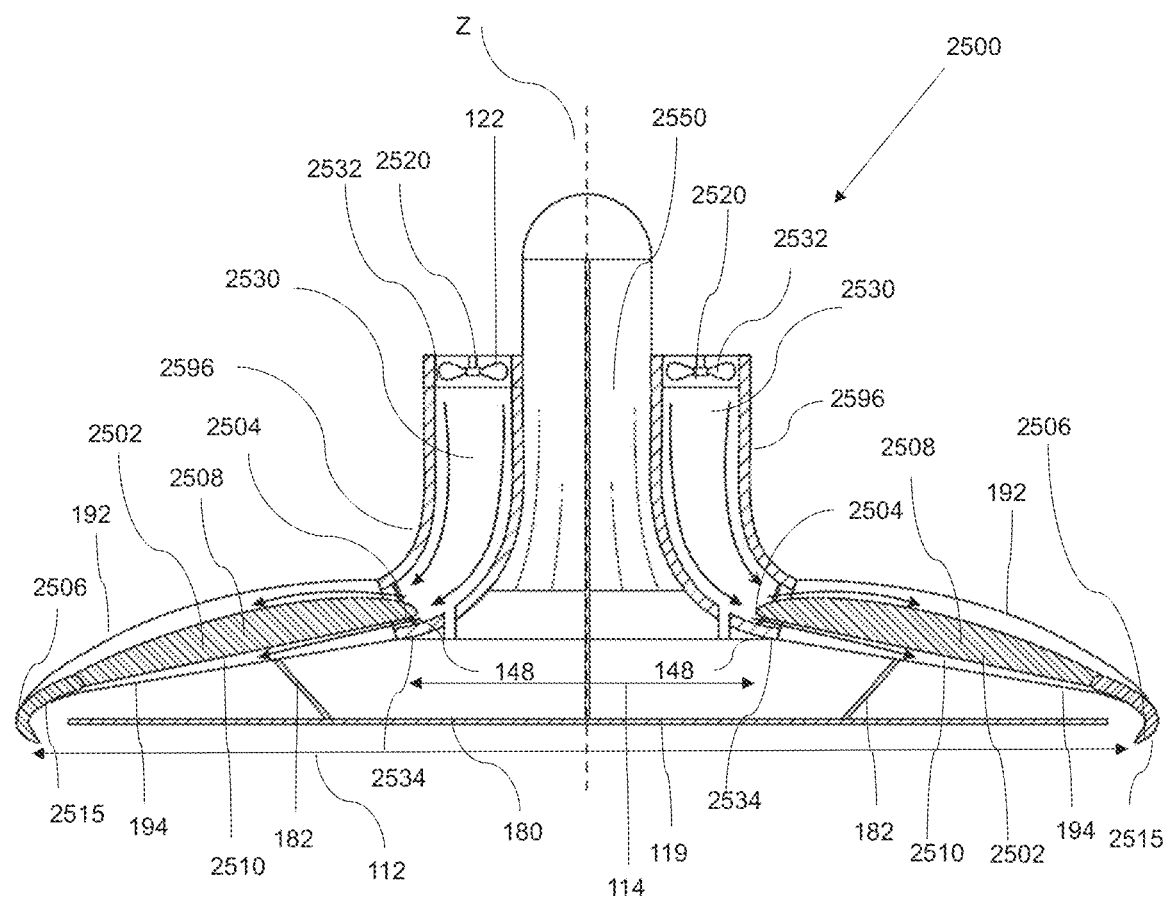
FIG. 25A illustrates a cross-sectional view of another embodiment of an aircraft having a curved tip at the trailing edge of the lifting body embodied as a wing.
Figure 25B:
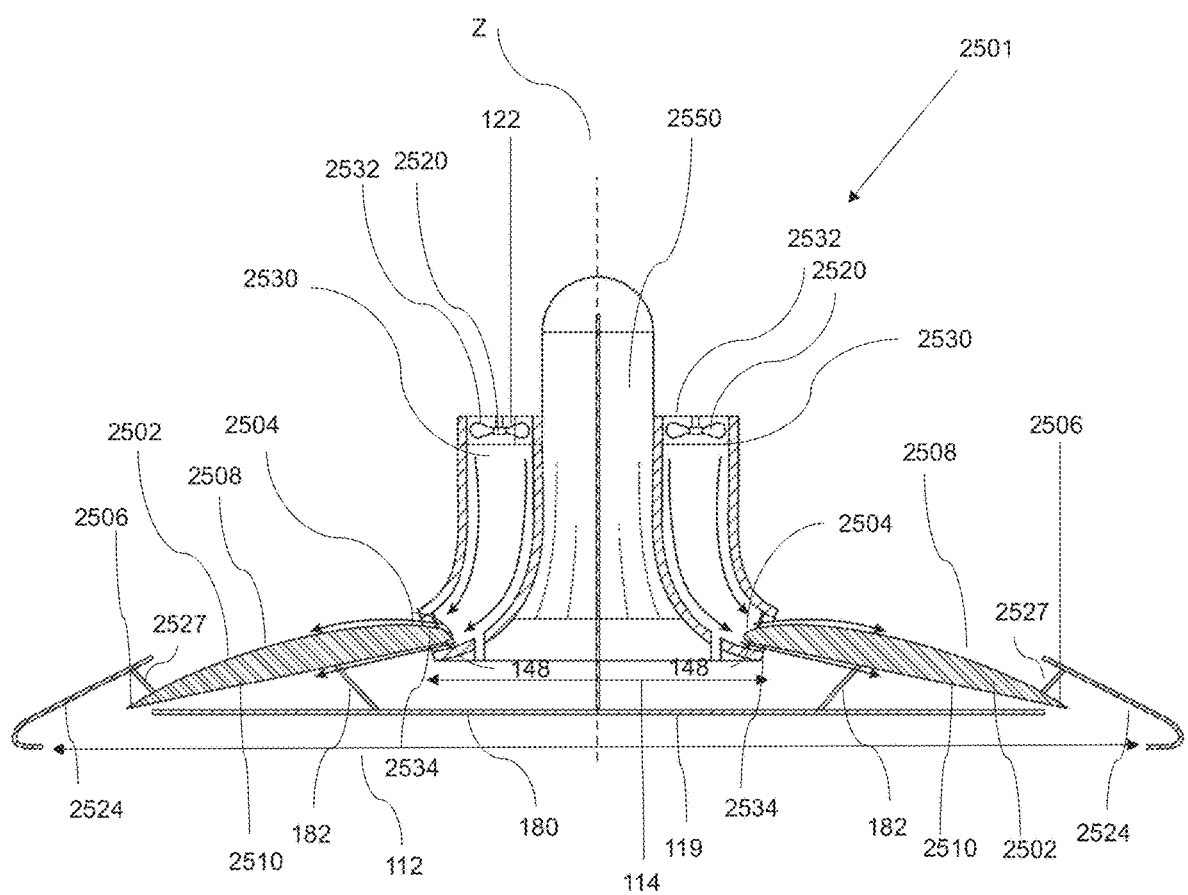
FIG. 25B illustrates a cross-sectional view of another embodiment of an aircraft having a lifting body embodied as a flow diverter positioned near the trailing edge of the wing.

FIGS. 25A-25B illustrate additional embodiments of aircraft 2500 and 2501, respectively. The aircraft 2500, 2501 may have many or all of the same or similar features as aircraft 100, or any other aircraft disclosed herein, and the same reference numbers are used to refer to the same features. For example, one or more solar panels 2596 may be placed along the outside of the duct 2530 or along the outside of the larger channel. Additionally, the aircraft 2500 may have a main body 2550. In the aircraft 2500, 2501, the flow of air at the trailing edge 2506 of the lifting body depicted as wing 2502 is configured to flow and/or be diverted inwardly towards the longitudinal centerline Z of the aircraft 2500, 2501.

The plurality of propulsion units 2520 are configured to deliver a flow of air from the inlet end 2532 to the outlet end 2534 and to a leading edge 2504 of the wing 2502. The flow of air may travel along the top surface 2508 and the bottom surface 2510 of the wing 2502. The ailerons 2515 (see FIG. 25A) may have a curved shape (e.g., C-shape) and may be configured to allow a flow of air to flow over the top surface 2508 of the wing and may direct a flow of air at the bottom surface 2510 downward and towards the longitudinal centerline of the aircraft 2500. The tip of the ailerons 2515 (or trailing edge 2506) may be curved towards the centerline of the aircraft 2500.

The wings 2502 may be coupled to (or be positioned next to) a flow diverter 2524 near a top surface 2508 of the wing 2502 (see FIG. 25B). The flow diverter 2524 may be coupled to the wings 2502 via a coupling member 2527. The flow diverter 2524 may be configured to divert a flow of air at the trailing edge 2506 downwards. Advantageously, the flow diverter 2524 may be configured to prevent air from being directed radially outwards when landing, such as to prevent blowing the flow of air onto objects around the aircraft when landing. For example, when the flow diverter 2524 is positioned above the top surface 2508 of the wings 2502, the flow diverter 2524 may rotate downwards to direct a flow of air in a downward direction at the trailing edge 2506.

The flow diverter 2524 may be configured to prevent the flow of air delivered to the trailing edge 2506 along the top surface 2508 and the bottom surface 2510 from being obstructed. For example, when the flow diverter 2524 is traveling in a forward direction, the flow diverter flow diverter 2524 may block an incoming flow of environmental air at the trailing edge 2506 of the wing 2502. Advantageously, having the flow diverter 2524 block an incoming flow of air at the trailing edge 2506 may improve maneuverability and stability when the aircraft 2500 is moving in a desired direction (e.g., forward direction).

Example Aircraft with Multi-Component Wing

Figure 26:
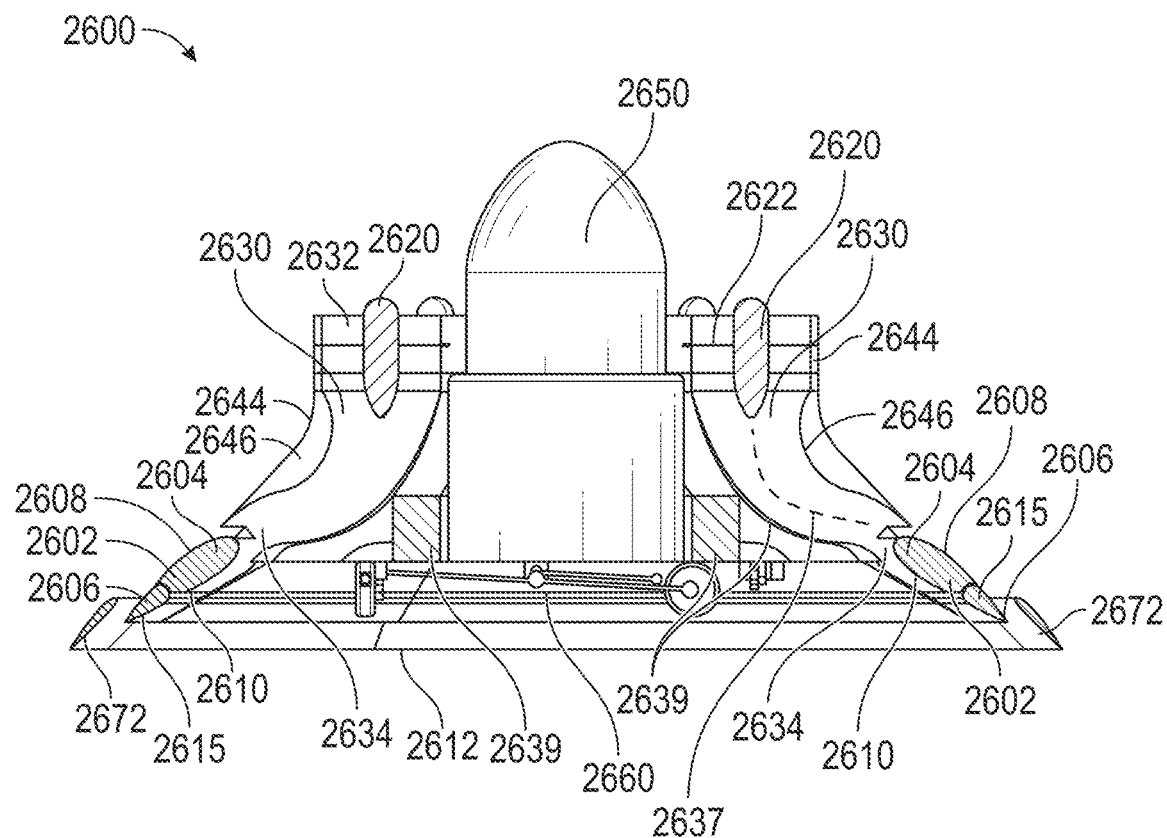
FIG. 26 illustrates a cross-sectional view of another embodiment of an aircraft having a lifting body embodied as a wing and one or more additional wings spaced away from the wing.
Figure 27A:
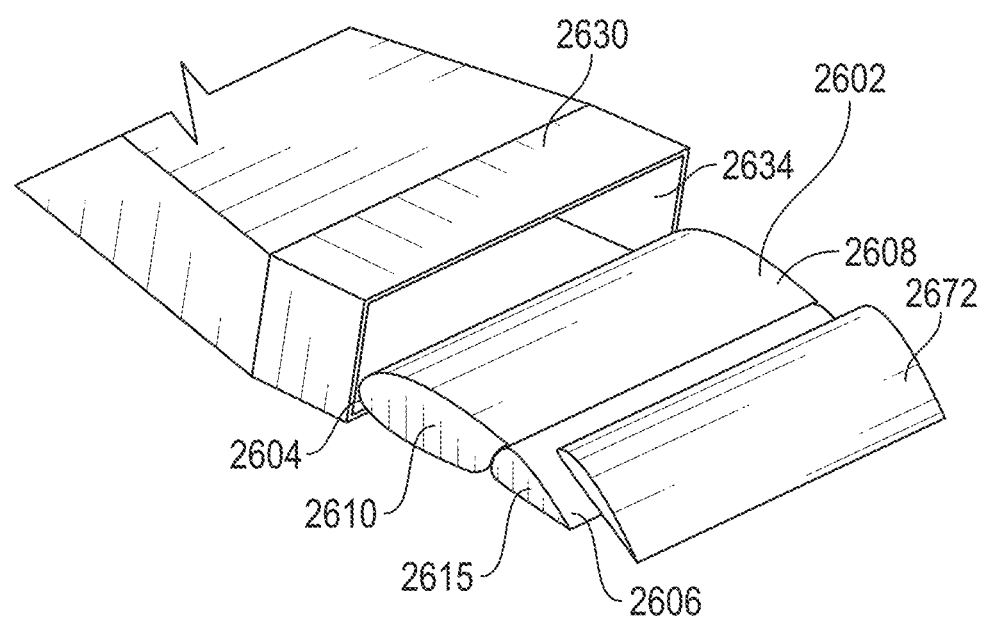
FIG. 27A illustrates a perspective detail view of the outlet end of the airflow duct of FIG. 26 having the wing and the additional wing spaced away from the wing.
Figure 27B:
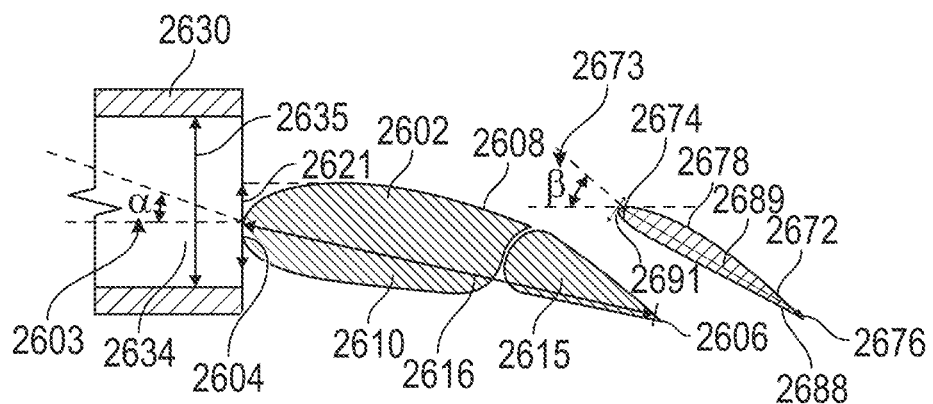
FIG. 27B illustrates a cross-sectional view of an additional embodiment of the outlet end of the airflow duct of FIG. 26 having the wing and the additional wing spaced away from the wing and the duct.
Figure 27C:
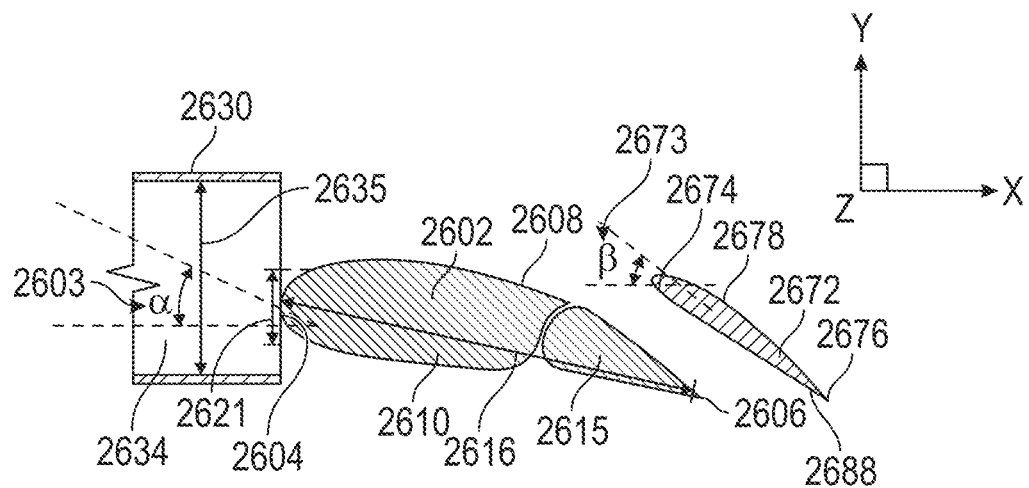
FIG. 27C illustrates a cross-sectional view of an additional embodiment of the outlet end of the airflow duct of FIG. 26 having a relatively larger outlet opening.
Figure 27D:
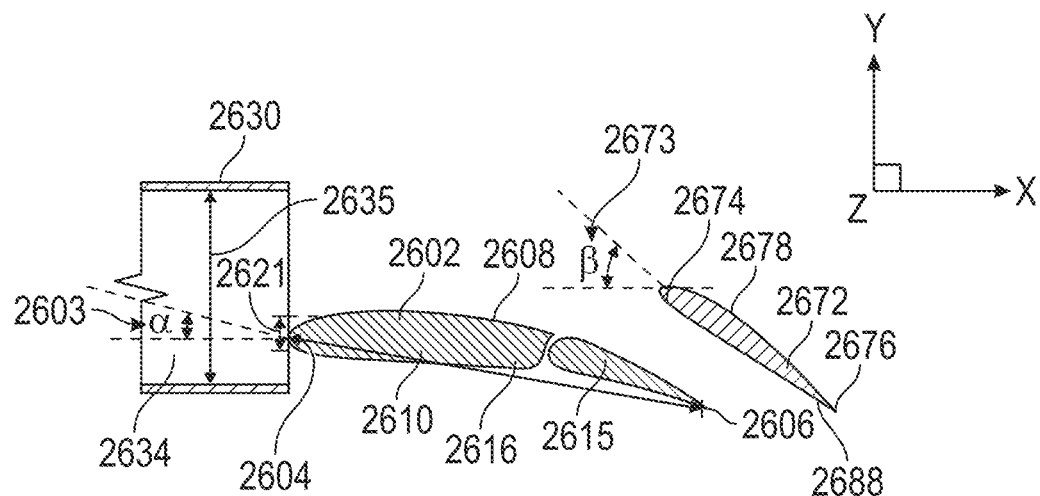
FIG. 27D illustrates a cross-sectional view of an additional embodiment of the outlet end of the airflow duct of FIG. 26 having a relatively thinner wing.
Figure 27E:
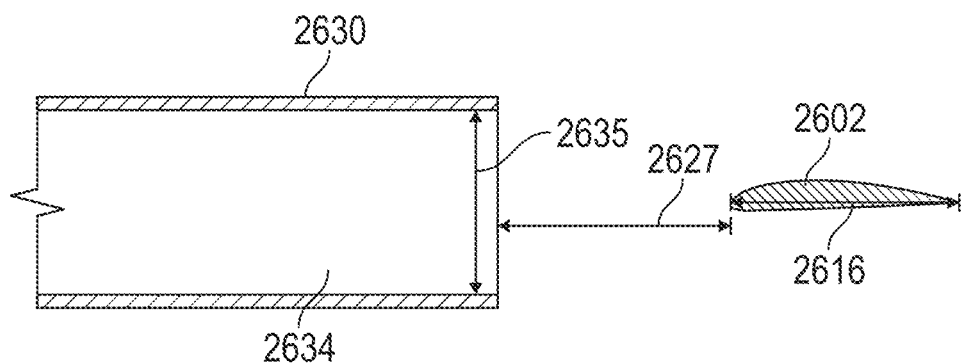
FIG. 27E illustrates a cross-sectional view of an additional embodiment of the outlet end of the airflow duct of FIG. 26 having a wing with a leading edge spaced relatively farther from the outlet end of the duct.

FIGS. 26-27E illustrate additional embodiments of an aircraft 2600 and components thereof. The aircraft 2600 may have many or all of the same or similar features as aircraft 100, or any other aircraft disclosed herein, or vice versa, and the same reference numbers are used to refer to the same features. In the aircraft 2600, a multi-component lifting body (e.g. airfoil or wing, etc.) is utilized, where an additional lifting body depicted as an additional wing 2672 is spaced away from the main or first wing 2602. Further, the wings may be angled more toward a vertical orientation, as further described. The wing 2602 or the additional wing 2672 may have an annular shape having an overall outer diameter 2612 from five to 25 feet, from 10 to 20 feet, from 10 to 15 feet, about 13.5 feet, or 13.5 feet.

The plurality of propulsion units 2620 are configured to deliver a flow of air from the inlet end 2632 to the outlet end 2634 of the plurality of ducts 2630 and to a leading edge 2604 of the wing 2602. The plurality of propulsion units 2620 may, for example, be from ten inches to thirty inches or from fifteen inches to twenty five inches or a twenty inch diameter, ducted fan (although any other suitable propulsion unit sizes may also be used for a given application). The plurality of propulsion units 2620 may be designed to generate thrust at the inlet end 2632 of the plurality of ducts 2630 to deliver a flow of air to the wing 2602. The plurality of ducts 2630 may be placed within a larger channel 2644. The plurality of propulsion units 2620 may be canted (e.g., have tilt at the outside edge of the plurality of propulsion units 2620), which may improve the flow of air delivered to the plurality of ducts 2630.

The plurality of ducts 2630 may also have an outer wall 2646. The outer wall 2646 may define an outer boundary for the flow of air through the duct 2630. The outer wall 2646 may be located inwardly of a wall of the larger channel 2644. The outer wall 2646 may define a profile. The profile may be configured to maintain or optimize the airflow velocity at the outlet end 2634 (e.g., reduce the amount of airflow, thrust, and/or power lost due to the plurality of ducts 2630 turning between the inlet end 2632 and the outlet end 2634). For example, the outer wall 2646 may have a curved profile which may be designed to reduce frictional forces exerted on the flow of air (e.g., which may reduce the airflow velocity at the outlet end 2634 and which may deliver a slower flow of air to the wing 2602). The outer wall 2646 may cause a middle area of the plurality of ducts 2630 to have a smaller width or area than the inlet end 2632 and/or the outlet end 2634.

The flow of air may travel along the top portion 2608 and the bottom surface 2610 of the wing 2602. The ailerons 2615 may be configured to allow a flow of air to flow over the top portion 2608 of the wing and may direct a flow of air at the bottom surface 2610 downward and relatively more inwardly, e.g. more towards the longitudinal centerline of the aircraft 2600. The ailerons 2615 may deflect (for example, rotate and/or translate) upwards and/or downwards to change the shape, profile, or camber of the wing 2602. The ailerons 2615 may have any of the same or similar features or functions as those described with respect to other ailerons herein, such as the ailerons 115, and vice versa.

The additional wing 2672 may be coupled to or positioned adjacent to a top portion 2608 of the wing 2602. The additional wing 2672 may be spaced upwards and laterally away (e.g., radially outward) from the wing 2602 (e.g., upwards and away from the top portion 2608). A portion of the additional wing 2672 may be positioned above the ailerons 2615 of wing 2602. As seen in FIG. 27B, the leading edge 2674 may be radially inward of the trailing edge 2606. Alternatively, the entire additional wing 2672 may be positioned upwards and away (e.g., farther away along the longitudinal axis) from the aircraft 2600 such that the leading edge 2674 of the additional wing 2672 is located radially outward of the trailing edge 2606.

The additional wing 2672 may have a top surface 2678, where the top surface 2678 may have a curved profile. The additional wing 2672 may have a bottom surface 2688, where the bottom surface 2688 may have a flatter surface relative to the top surface 2678. Therefore, when viewing the cross-sectional profile of the additional wing 2672, the additional wing 2672 may have the profile of an airfoil. The additional wing 2672 may be configured to generate additional lift from the flow of air at the trailing edge 2606. For example, when the flow of air exits the outlet end 2634 and flows over the top portion 2608 the flow of air can travel to the additional wing 2672. In some embodiments, it may be advantageous to have a thicker wing 2602, where the wing 2602 may have a thickness to chord ratio (e.g., t/c ratio) of approximately 0.24, of approximately 0.12, or from 0.1 to 0.25 or from 0.15 to 0.3, or from 0.2 to 0.28. The wing 2602 may have a thickness to chord ratio of approximately 0.20 or less (e.g., 0.19, 0.18, 0.17, 0.16, 0.15, 0.14, 0.13), or 0.10 or less (e.g., 0.09, 0.08, 0.07, 0.06).

In some embodiments, the flow of air traveling over the top portion 2608 of the wing 2602 can be delivered to a leading edge 2674 of the additional wing 2672. The flow of air may first be delivered to the leading edge 2674 and may travel over the top surface 2678 and the bottom surface 2688. The leading edge 2674 may be located above approximately 10% to 50% of the top portion 2608 of the wing 2602 (e.g., 10% to 50% of a distance measured from a middle point of the top portion 2608 to the trailing edge 2606 of the wing 2602). Therefore, air can flow from the top portion 2608 to the leading edge 2674 of the additional wing 2672.

The additional wing 2672 may have a trailing edge 2676 positioned on the same horizontal axis as the trailing edge 2606. The trailing edge 2676 may be positioned radially outward of the trailing edge 2606.

The leading edge 2674 of the additional wing 2672 may be radially outward of the leading edge 2604 of the wing 2602. In at least some embodiments, the leading edge 2674 of the additional wing 2672 is radially inward of the trailing edge 2606 of the wing 2602. The additional wing 2672 may be thinner than the wing 2602, where the additional wing 2672 is 20%-70% thinner than the wing 2602 (e.g., relative to thickness 2621). "Thinner" as used here may refer to a relation between the maximum thicknesses of the two wings.

The flow of air traveling from the leading edge 2674 to the trailing edge 2676 along the top surface 2678 may flow at a relatively greater speed than that of the air flowing along the bottom surface 2688. The flow of air from the leading edge 2674 to the trailing edge 2676 along the bottom surface 2688 may flow at a relatively lower speed due to the flatter profile (e.g., compared to the top surface 2678) of the bottom surface 2688. The pressure differential between the bottom surface 2688 and the top surface 2678 causes an additional lifting force which may be transferred to the aircraft 2600. Advantageously, positioning the additional wing 2672 above and away from the wing 2602 can improve the amount of lift generated (e.g., a 12%, or 10% or greater, or 8% or greater, improvement) over an embodiment of the aircraft 2600 without the additional wing 2672. In some embodiments, positioning the additional wing 2672 above and away from the wing 2602 may improve the performance of the aircraft 2600 by 5%-7% relative to aircrafts without the additional wing 2672. Therefore, the performance of the wing 2602 may be improved by adding the additional wing 2672, which may in turn increase the amount of lift generated by the aircraft 2600. In some embodiments, the positioning of the additional wing 2672 above and away from the wing 2602 may improve the amount of lift generated by 5%-20% when compared to an embodiment of the aircraft 2600 without the additional wing 2672.

In some embodiments, by placing the additional wing 2672 above and away from the wing 2602, the thickness of the wing 2602 may be reduced. For example, adding the additional wing 2672 can allow the wing 2602 to be relatively thin, where the wing 2602 can have a thickness to chord ratio (e.g., t/c ratio) of 0.12 or less (e.g., 0.10, 0.09, 0.08, 0.07, 0.06, 0.05, etc.) and produce enough force to lift the aircraft 2600 upwards. Furthermore, by reducing the thickness to chord ratio of the wing 2602, the wing 2602 can occupy less space at the opening of the duct (e.g., the thickness of the wing 2602 is much smaller). Reducing the thickness to chord ratio may thus reduce the amount of back pressure generated at the outlet end 2634 of the plurality of ducts 2630 due to the thinner wing 2602. In some embodiments, by reducing the thickness to chord ratio, the amount of thrust generated per propulsion unit 2620 can be increased by approximately 12%, or 10% or more, or 8% or more, when compared to aircraft embodiments with larger thickness to chord ratios (e.g., 0.24) and without an additional wing 2672.

The additional wing 2672 may have any of the same or similar features or functions as those described with respect to other additional wings or flow surfaces as described herein, such as the wings 2202 (e.g., see FIG. 22A) or the flow diverter 2224 (e.g., see FIG. 22B), and vice versa.

In some embodiments, the outer wall 2646 geometry or configuration may improve the amount of lift generated by the wing 2602. The plurality of ducts 2630 can each have a turn angle 2637, also called a bend angle or duct angle. The turn angle 2637 may improve the maximum amount of lift which can be generated by the plurality of propulsion units 2620 (e.g., the turn angle 2637 can optimize the delivery of airflow to the wing 2602 in order to generate lift). The turn angle 2637 can refer to the angular difference between the direction in which a propulsion unit directs thrust into the inlet end 2632 of the plurality of ducts 2630 (e.g., line 2937A in FIG. 29B) and the direction in which the outlet end 2634 of the plurality of ducts 2630 directs the flow of air (e.g., line 2937B in FIG. 29B). The turn angle 2637 may therefore be indicative of the angle through which a flow of air from the plurality of propulsion units 2620 is bent (e.g., turned) while traveling through the ducts 2630 from the inlet end 2632 to the outlet end 2634. For example, if the plurality of propulsion units 2620 directs a flow of air vertically downward (e.g., parallel to a longitudinal axis of the aircraft 2600), and the plurality of ducts 2630 expels the flow of air vertically downward (e.g., at the outlet end 2634) then the turn angle 2637 would be zero degrees. In another example, if the plurality of ducts 2630 directs a flow of air vertically downward through the inlet end 2632 and the plurality of ducts 2630 expels the flow of air horizontally at the outlet end 2634, then the turn angle 2637 would be ninety degrees.

In some embodiments, the turn angle 2637 can range from 32 degrees to 45 degrees. Additionally, the turn angle can be zero degrees, five degrees or more, ten degrees or more, 15 degrees or more, 20 degrees or more, 25 degrees or more, 30 degrees or more, 35 degrees or more, fifty degrees or less, fifty five degrees or less, sixty degrees or less, sixty five degrees or less, seventy degrees or less, seventy five degrees or less, eighty degrees or less, eighty five degrees or less, or ninety degrees or less. The turn angle 2637 can correspond to improvements in the amount of lifting force generated by the plurality of propulsion units 2620 by 50-60%.

In general, testing of the concepts disclosed herein has shown that, when considering turn angles (which may alternatively be referred to as "duct angles") between 0 degrees and 90 degrees, there can be a range of angles within which the total vertical lift generated by the combination of the thrust from the propulsion unit(s) and the lift created by the airfoil(s) is greater than the lift that would be generated by the propulsion units alone. An example of this effect can be seen in the graph of FIG. 29E. This graph shows that, as the turn angle increases from 0, there may be a slight loss of efficiency; but then as the turn angle increases further, the total lift increases over the lift of the propulsion units alone (i.e. over the lift at angle 0). Once the turn angle is increased further, however, the efficiency begins dropping, eventually resulting in a total lift that is less than the lift would be with the propulsion units alone (i.e. the lift at angle 0). Testing has found that the area within which the total lift is greater than the lift would be with the propulsion units alone can be around approximately 32 degrees to 45 degrees. This is not always the case, however, and variations in designs and configurations may cause the upper and lower bounds of that range to be different depending on the application.

As further shown in FIG. 26, the aircraft 2600 may also have a landing gear assembly 2660. The landing gear assembly 2660 may have a plurality of legs which extend downwards and which may allow the aircraft to roll or rest on ground surface. The landing assembly gear assembly 2660 may also include one or more wheels which may allow the aircraft 2600 to travel along the ground. The aircraft 2600 may also include one or more battery packs 2639. The one or more battery packs 2639 may be capable of delivering power to the operations systems of the aircraft 2600 and to the plurality of propulsion units 2620. The battery pack(s) 2639 may extend annularly about a central portion 2650 of the aircraft 2600.

FIGS. 27A-27E show different configurations of wings 2602 coupled to or placed adjacent to one of the plurality of ducts 2630 at the outlet end 2634. The outlet end 2634 may have a diameter or opening or height 2635 which may assist in providing a desired amount of airflow to the leading edge 2604. The wing 2602 may have a variety of parameters which factor into the lift characteristics of the aircraft 2600. For example, the wing 2602 may have a chord 2616 or chord length which represents the distance from the leading edge 2604 to the trailing edge 2606. In some embodiments, the chord 2616 is angled no more than 45 degrees relative to a reference axis of the system, such as a vertical axis or an axis aligned with a gravity vector. The reference axis may be the central axis Z of the vehicle or system (for example, see FIG. 2). In some embodiments, the chord 2616 may be angled no more than 40 degrees, no more than 35 degrees, no more than 30 degrees, no more than 25 degrees, no more than 20 degrees, no more than 15 degrees, no more than 10 degrees, or no more than 5 degrees, relative to the reference axis. Additionally, the wing 2602 may have a maximum thickness 2621 as shown.

The wing 2602 may have an angle of attack 2603 which corresponds to the angle between the chord 2616 and the direction of flow of air exiting the outlet end 2634. The additional wing 2672 may also have a thickness (e.g., thickness 2691), chord (e.g., chord 2689), and angle of attack (e.g., angle of attack 2673), as discussed further below.

In some embodiments, the thickness 2621 of the wing 2602 relative to its chord 2616 (e.g., length) may have a ratio from 0.08 to 0.16, from 0.09 to 0.15, from 0.10 to 0.14, from 0.11 to 0.13, or 0.12 (e.g., a t/c ratio of 0.12). The distance the wing 2602 is spaced from the outlet end 2634 can also vary (e.g., see FIG. 27E and associated description). Additionally, the sizing of the wing 2602 can be determined based on a variety of non-dimensional parameters, which can include, for example, the ratio between height 2635 of plurality of ducts 2630 at the outlet end 2634 to the chord 2616 (e.g., H/c), and/or the ratio between the distance 2627 (See FIG. 27E) the airfoil (e.g., wing 2602) is offset from the outlet end 2634 to the chord 2616 (e.g., D/c). The ratio between i) the distance the additional wing 2672 is positioned from the wing 2602 and ii) the chord 2689 of the additional wing 2672 may be approximately 2:1, 3:2, 1:1, 2:3, 1:2, 2:5, 1:4, or 1:5.

The horizontal distance between the additional wing 2672 and the wing 2602 may be measured from the leading edge 2604 or the trailing edge 2606 to the leading edge 2674 or trailing edge 2676, respectively. This horizontal distance may be at least 50%, at least 60%, at least 70%, at least 80%, or at least 90% of the length of the chord 2616 of the radially inward wing 2602 that is closer to the duct outlet.

In some embodiments, the propulsion units 2620 may be electric propulsion units capable of delivering at least six-hundred N of thrust, or up to six-hundred and sixty N of thrust, and/or at least thirty kW of power or at thirty-six kW of power. In some embodiments, the propulsion units 2620 may have a casing with a radius of ten inches. The casing may, in some embodiments, have a radius between eight inches to twenty inches. The plurality of blades 2622 of the propulsion units 2620 may have a rotational speed range or RPM (revolutions per minute) range between four thousand five hundred to six thousand five hundred RPM (e.g., the plurality of blades 2622 spin at four thousand five hundred to six thousand five hundred RPM). The plurality of blades 2622 may include eleven blades having a 0.25" radius center body. The blade chord of the plurality of blades 2622 is approximately two inches. Additionally, the blade chord of the plurality of blades 2622 may be between one inch and five inches. The plurality of blades 2622 may also have a linear twist at the end or root. The plurality of blades 2622 may have a linear twist extending along the chord of the plurality of blades 2622. Additionally, the plurality of blades 2622 may have a linear twist at the tip of the plurality of blades 2622. For example, the plurality of blades 2622 may have a twist of seventy-five degrees at the root (e.g. base of the plurality of blades 2622). The plurality of blades 2622 may have a twist of thirty-five degrees at the tip. Additionally, the plurality of propulsion units 2620 when rotating at approximately five thousand five hundred RPM may generate at 12.5 kg/s mass flux, a vertical force of approximately six-hundred sixty N, and a power of approximately thirty-six KW.

In FIGS. 27A-27C, the thickness 2621 to chord 2616 ratio (e.g., t/c) of the wing 2602 may be such that the height or thickness of the wing 2602 may occupy approximately half of the opening height 2635 at the duct outlet end 2634. Alternatively, the thickness to chord ratio of the wing 2602 may be smaller than that of FIGS. 27A-27C (see, for example, FIG. 27D). The wing 2602 may only have a height or thickness that occupies approximately one quarter of the opening or height 2635 of the outlet end 2634. The wing 2602 may only have a height or thickness that occupies approximately one fifth of the opening or height 2635 of outlet end 2634. The wing 2602 may be positioned at a lower end of the outlet end 2634. The leading edge 2604 may be located a particular distance from the bottom of the duct exit, such as five percent or less, ten percent or less, fifteen percent or less, twenty percent or less, twenty five percent or less, thirty percent or less, thirty five percent or less, forty percent or less, or fifty percent or less, of the height of the opening 2635 as measured from the bottom of duct exit. The relatively lower positioning of the wing may allow for a majority (e.g., eighty percent or more, ninety percent or more, or ninety five percent or more) of the flow of air exiting the outlet end 2634 to flow over the top portion 2608 of the wing.

In some embodiments, the wing 2602 may be placed near or at the vertical middle of the outlet end 2634 which can allow for more uniform distribution (e.g., relative to when the wing 2602 is placed at a lower portion of the outlet end 2634) of air flowing from the outlet end 2634 to flow over both the top portion 2608 and bottom surface 2610 of the wing 2602. Additionally, the thickness to chord ratios (e.g., t/c) for the additional wing 2672 may be similar (e.g., 0.12, 0.06, etc.) to those for the wing 2602 (e.g., thickness 2691 to chord 2689). The thickness to chord ratios (e.g., t/c) for the additional wing 2672 may be smaller than those for the wing 2602.

In some embodiments, the additional wing 2672 may have a smaller height or thickness 2691 than the wing 2602. The ratio between the thickness 2691 of the additional wing 2672 and the thickness 2621 of wing 2602 can be approximately 2:3 or less, 1:2 or less, 2:5 or less, 1:3 or less, 2:7 or less, or 1:4 or less. The additional wing 2672 may have a smaller height or thickness 2691 than wing 2602. The additional wing 2672 may have a smaller chord 2689 than the chord 2616 of wing 2602. The ratio between the chord 2689 of the additional wing 2672 and the chord 2616 of wing 2602 can be approximately 2:3 or less, 1:2 or less, 2:5 or less, 1:3 or less, 2:7 or less, or 1:4 or less. Alternatively, the additional wing 2672 can have the same chord 2689 as the chord 2616 of wing 2602.

The chord 2689 of the additional wing 2672 may be angled relative to the chord 2616 of the wing 2602, where the relative angle between the two chords (i.e., chord 2689 and chord 2616) is approximately ten degrees. In some embodiments, the relative angle between the two chords may be 5 degrees or less, fifteen degrees or less, twenty degrees or less, twenty five degrees or less, thirty degrees or less, or forty degrees or less. The relative angle between the two chords may be between 5 degrees and fifty degrees.

The additional wing 2672 may have an angle of attack (β) 2673 which differs from the angle of attack (α) 2603 of the wing 2602. For example, the angle of attack 2603 of the wing 2602 may be smaller than the angle of attack 2673 of the additional wing 2672. In some embodiments, the angle of attack 2603 may be equal to the angle of attack 2673. The angle of attack 2673 of the additional wing 2672 may be optimized to generate a desired amount of lift from the flow of air travelling the top portion 2608 of the wing 2602. In some embodiments, the difference between the angle of attack 2673 of the additional wing 2672 and the angle of attack 2603 of the wing 2602 may be approximately 1 degree or less, 5 degrees or less, fifteen degrees or less, twenty degrees or less, twenty five degrees or less, thirty degrees or less, or forty degrees or less. In some embodiments, one or both of the angles of attack (e.g., angle of attack 2673 and angle of attack 2603) may be adjustable. One or both of wing 2602 and additional wing 2672 may rotate to adjust the angle of attack (e.g., angle of attack 2603 and angle of attack 2673), for example via actuation of an actuator.

As shown in FIG. 27E, the leading edge 2604 of the wing 2602 may be spaced or offset horizontally from the outlet end 2634 a distance 2627. The distance 2627 may be determined to reduce back pressure at the outlet end 2634, which may improve lift characteristics. The distance 2627 may be optimized given other parameters of the system to improve lift characteristics. For example, the ratio of i) the D=distance 2627 between the leading edge 2604 and the outlet end 2634 relative to ii) the chord 2616 (e.g., "D/c ratio") may be at least 1, or at least 1.5. In some embodiments, the D/c ratio may be from 0 to 1, less than 0.5, less than 0.75, less than 1, or less than 2. The particular D/c ratio may depend on the size and scale of the application of the aerolift system.

The positioning of the wing 2602 may be optimized with a desired D/c ratio (e.g., distance 2627 over chord 2616) and "H/c" ratio (e.g., H=height 2635 over the c=chord 2616). As the H/c ratio is reduced, the amount of lift for the aircraft 2600 may be reduced. In some cases, reducing the H/c ratio from 0.8 to 0.4 or 0.25 will reduce the amount of lift generated by the aircraft 2600. In some embodiments, adjusting D/c ratio (e.g., increasing/decreasing) may not significantly affect the amount of lift generated by the aircraft 2600. The amount of drag generated by the wing 2602 may be affected by the D/c ratio. In some examples, a lower H/c ratio (e.g., 0.2) can increase the amount of drag experienced by the aircraft 2600.

In some embodiments, the combined considerations of the wing 2602 profile (e.g., chord, airfoil profile, turn angle, distance, etc.), the outer wall 2646 of the plurality of ducts 2630 profile, and the pressure generated at the leading edge 2604 are responsible for determining the optimal characteristics of the aircraft 2600.

Figure 28A:
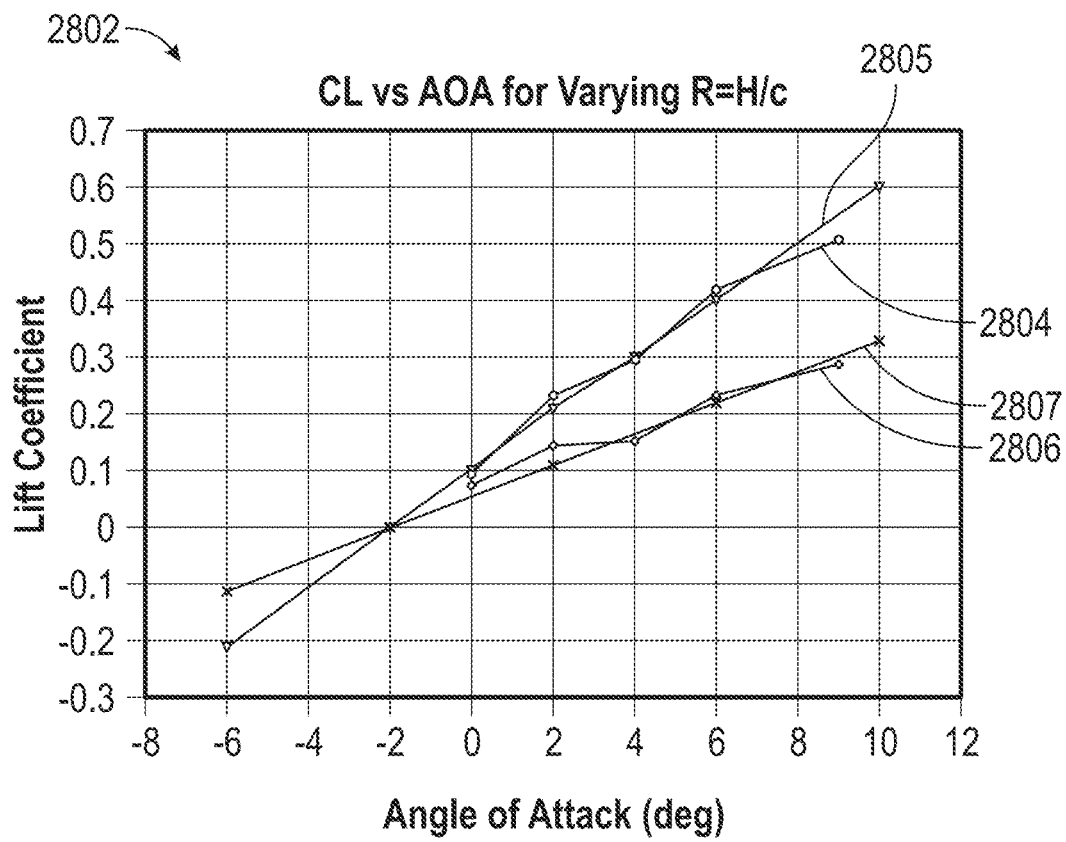
FIG. 28A is a graphical representation of data for the predicted lift coefficient versus the angle of attack of the wing of FIG. 26 for various geometries of the wing.
Figure 28B:
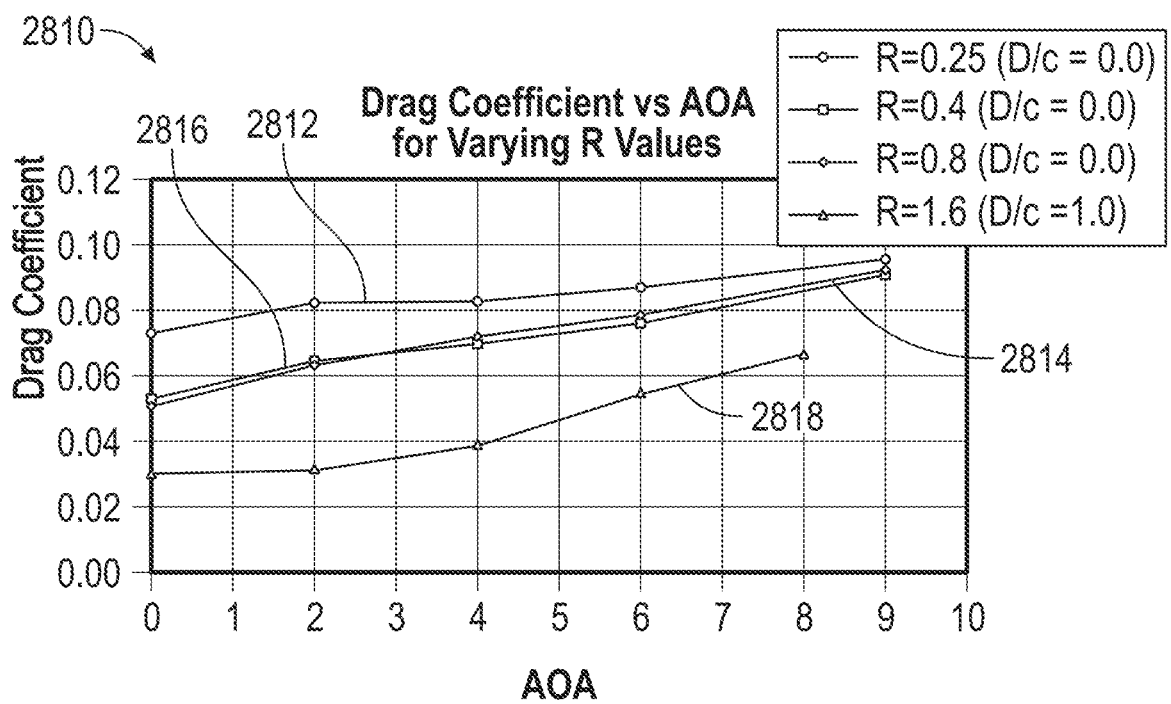
FIG. 28B is a graphical representation of data for the predicted drag versus the angle of attack of the wing of FIG. 26 for various geometries of the wing.
Figure 28C:
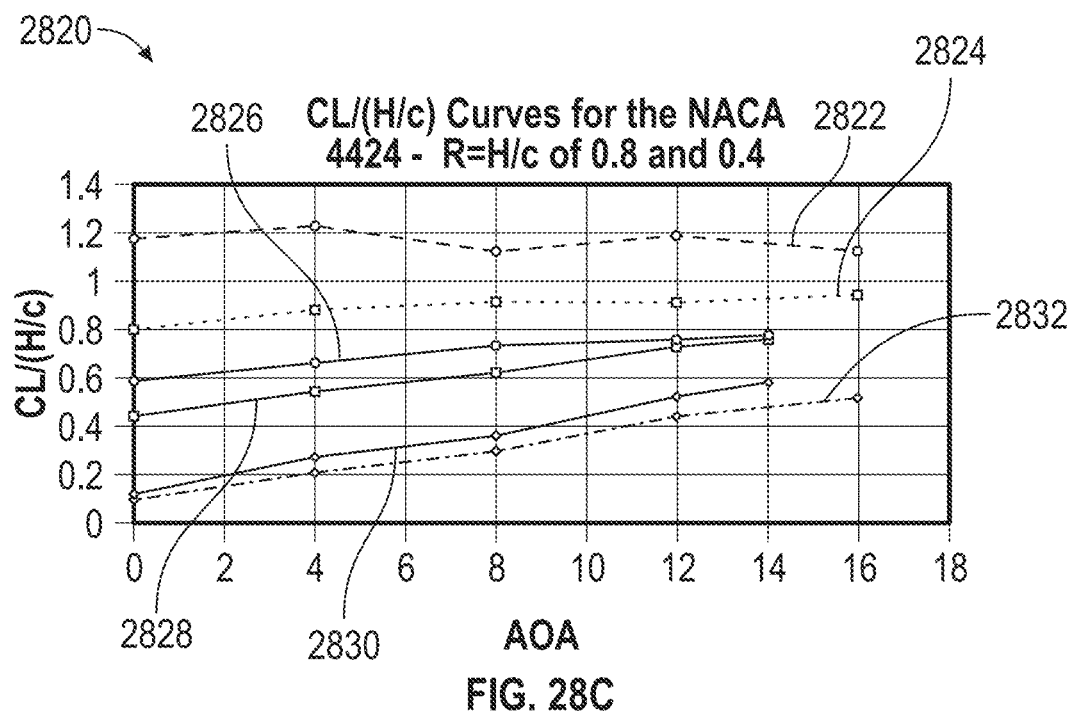
FIG. 28C is a graphical representation of analytical data for the lift coefficient relative to the height/chord ratio of the wing versus the angle of attack of the wing of FIG. 26.

FIGS. 28A-28C are graphical representations of theoretical and model-based data based on selected parameters (e.g., t/c ratio, H/c ratio, D/c ratio) of the aircraft 2600. FIG. 28A shows a data plot 2802 with a comparison of the predicted lift coefficient (CL) versus the angle of attack (AOA) of the wing 2602 for varying H/c ratios as produced by analysis using the relevant equations and as produced by a computer model using computational fluid dynamics (CFD). Lines 2804 and 2805 show the data for an H/c ratio of 1.6 for the model-based data and the theoretical data, respectively. Lines 2806 and 2807 are for an H/c ratio of 0.8 for the model-based data and the theoretical data, respectively. As shown, the theoretical and model-based data tightly correspond to each other. For example, for an H/c ratio of 1.6, the line 2805 and the line 2804 correspond to one another (e.g., follow a similar trend/slope). Additionally, for an H/C ratio of 0.8, the line 2807 and the line 2806 correspond to one another.

FIG. 28B shows trends 2810 for the predicted drag coefficient for the wing 2602 versus angle of attack (AOA) based on different combinations of H/c and D/c ratios. For example, line 2812 shows the expected drag based on the angle of attack of the wing 2602 when the H/c ratio is 0.25 and the D/c ratio is 0. Line 2814 shows the expected drag based on the angle of attack of the wing 2602 when the H/c ratio is 0.4 and the D/c ratio is 0. Line 2816 shows the expected drag based on the angle of attack of the wing 2602 when the H/c ratio is 0.8 and the D/c ratio is 0. Line 2818 shows the expected drag based on the angle of attack of the wing 2602 when the H/c ratio is 0.1.6 and the D/c ratio is 1.

FIG. 28C shows a graphical representation 2820 of the lift coefficient to H/c ratio versus angle of attack of the wing and for varying combinations of H/c. As shown in FIG. 28C, the maximum value of the lift coefficient relative to H/c ratio is relatively insensitive (e.g., does not change) with respect to the angle of attack of the wing 2602. Therefore, it may be advantageous to maintain a lower angle of attack for the wing 2602 to have a high lift to drag ratio. For example, line 2822 shows lift coefficient relative to H/c ratio when the H/c ratio is 0.8 and the D/c ratio is 0. Line 2824 shows lift coefficient relative to H/c ratio when the H/c ratio is 0.8 and the D/c ratio is 0.2. Line 2826 shows lift coefficient relative to H/c ratio when the H/c ratio is 0.8 and the D/c ratio is 0.3. Line 2828 shows lift coefficient relative to H/c ratio when the H/c ratio is 0.4 and the D/c ratio is 0. Line 2830 shows lift coefficient relative to H/c ratio when the H/c ratio is 0.8 and the D/c ratio is 0.1. Line 2832 shows lift coefficient relative to H/c ratio when the H/c ratio is 0.4 and the D/c ratio is 0.15.

Additional Duct Examples

Figure 29A:
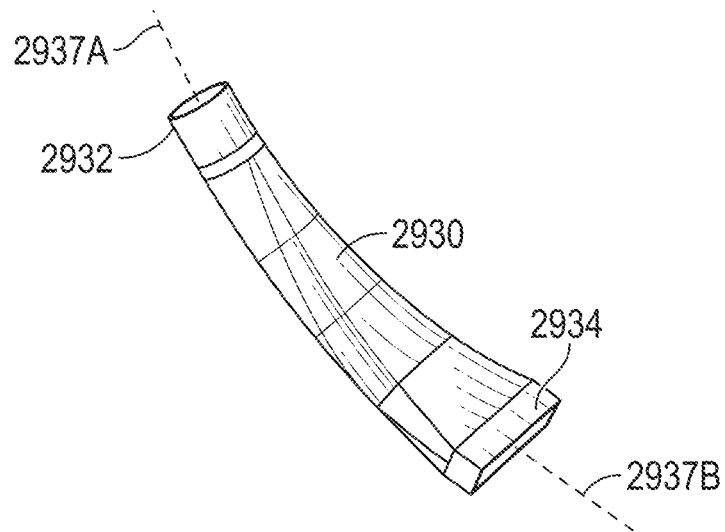
FIG. 29A illustrates a perspective view of another embodiment of an airflow duct for use in an aircraft with axes indicating a turn angle of the duct.
Figure 29B:
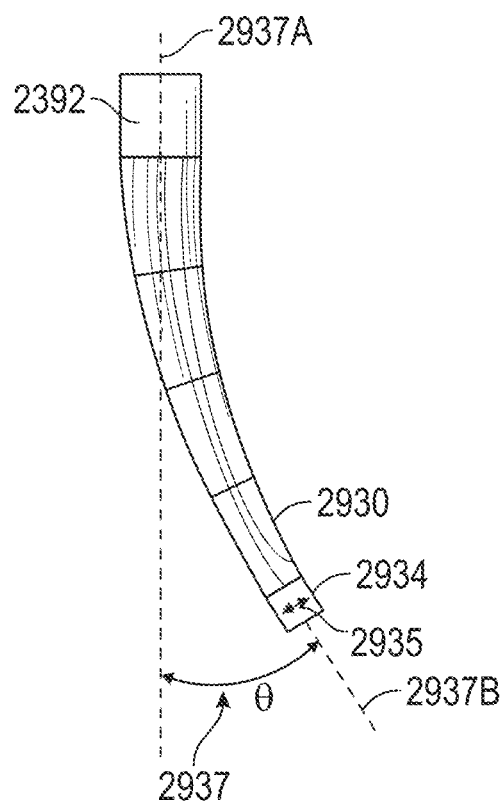
FIG. 29B illustrates a side view of the airflow duct of FIG. 29A.
Figure 29C:
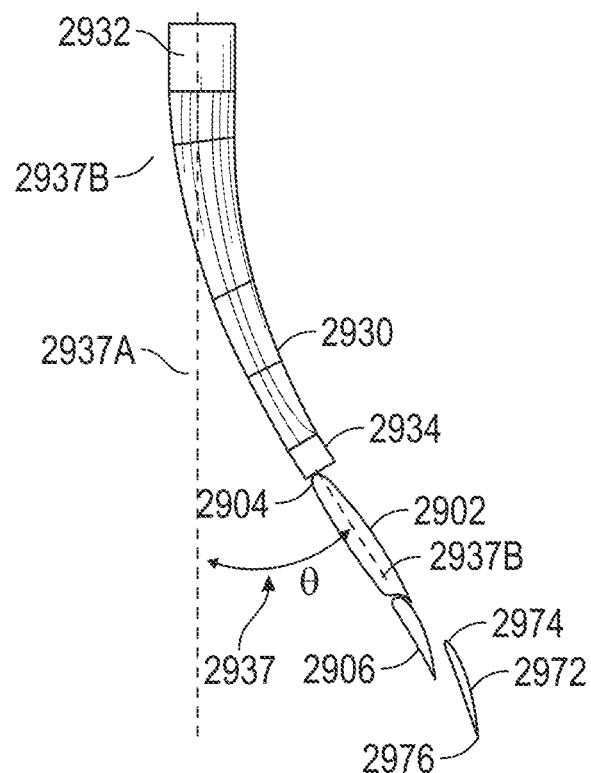
FIG. 29C illustrates a side view of the airflow duct of FIG. 29A having a wing extending from the outlet end of the airflow duct.
Figure 29D:
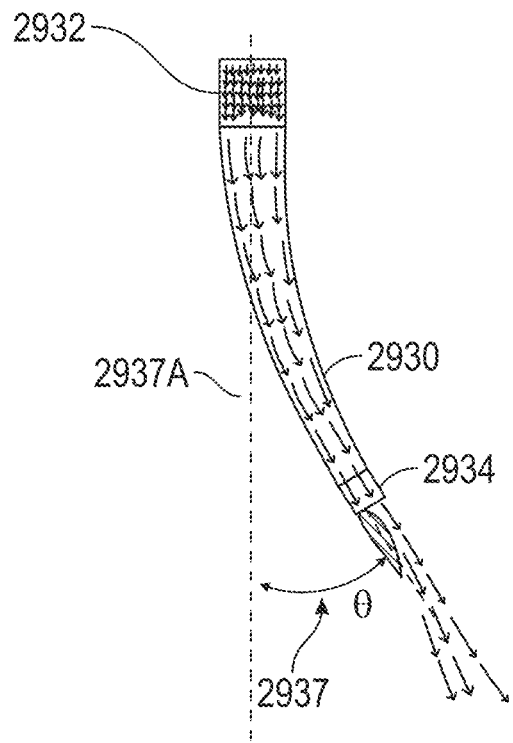
FIG. 29D illustrates a cross-sectional view of the airflow duct of FIG. 29A delivering a flow of air to the wing.
Figure 29E:
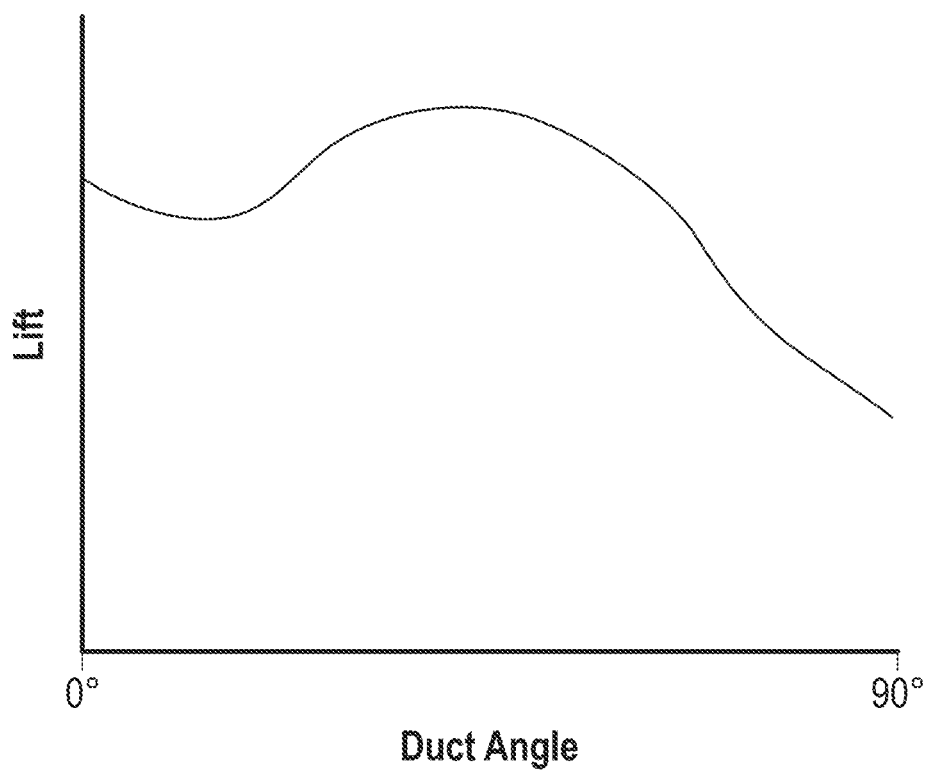
FIG. 29E is a graphical representation showing a qualitative relationship expected between the amount of lift generated versus the duct turn angle for an aircraft or lifting system.

FIGS. 29A-29D illustrate additional embodiments of one or more ducts 2930, and FIG. 29E illustrates a graph showing how lift can be influenced by a turn angle of the duct (also called a turn angle or duct angle). The ducts 2930 may have many or all of the same or similar features as ducts 130, or any other ducts disclosed herein, and vice versa, and the same reference numbers are used to refer to the same features. The ducts 2930 may have a different shape or profile (e.g., turn angle) to deliver an optimal amount of airflow to an airfoil (e.g., airfoil 2902), and/or to optimize the amount of lift generated.

FIGS. 29A-29D show one or more ducts 2930 having a turn angle 2937. In some embodiments, the ducts 2930 may have various turn angles 2937. The turn angle 2937 is an angle between line 2937A and line 2937B. The line 2937A represents a direction parallel with and defined by the channel of the duct at the inlet end 2932, which may be approximately the same as the direction of the flow of air into the inlet end 2932 delivered by the propulsion units, e.g., propulsion units 2620. The line 2937B represents a direction parallel with and defined by the channel of the duct at the outlet end 2934, which may be approximately the same as the direction of the flow of air out of the outlet end 2934. The turn angle 2937 is measured as viewed from a side view of the duct, as shown in FIG. 29B. FIGS. 29C and 29D also show the lines 2937A and 2937B but offset from the duct channel for clarity. In some embodiments, the turn angle 2937 may be from twenty-five to forty degrees, from twenty eight to thirty eight degrees, from thirty to thirty five degrees, thirty two degrees, or about thirty two degrees. In other embodiments, the turn angle 2937 may be ninety degrees or less. Additionally, the turn angle 2937 may be between thirty-two degrees and ninety degrees. For example, the turn angle can be forty-five degrees or less, fifty degrees or less, fifty-five degrees or less, sixty degrees or less, or sixty five degrees or less. One advantage of optimizing the turn angle 2937 is to improve the resultant vertical force that may be obtained for the aircraft system (e.g., aircraft 2600) and to reduce turbulent airflow (e.g., deliver laminar airflow at the outlet end 2934).

The inlet end 2932 of the ducts 2930 can have an opening or diameter which can correspond to the diameter of the fan or propulsion unit (e.g., propulsion units 2620). For example, the inlet end 2932 may be sized and shaped to contain propulsion units (e.g., propulsion units 2620) having a twenty inch diameter. The outlet end 2934 of the ducts 2930 may have a vertical (relative to the orientation of the opening) height 2935 from six to twenty two inches, from eight to twelve inches from nine to eleven inches, of ten inches, 10.5 inches, or approximately 10.5 inches. The height 2935 is the vertical distance of the opening at the outlet end 2934 measured vertically and perpendicularly to the line 2937B at the cross-sectional opening of the outlet end 2934. Furthermore, the height 2935 of the outlet end 2934 may be designed or optimized for a particular airfoil 2902 design. For example, the airfoil 2902 may have a chord of approximately two feet. The leading edge 2904 may be positioned at or adjacent to the outlet end 2934.

The additional wing 2972 may be coupled to or positioned adjacent to the airfoil 2902. The additional wing 2972 may be spaced upwards and laterally away (e.g., radially outward) from the airfoil 2902 (e.g., upwards and away from the airfoil 2902). The leading edge 2974 may be radially inward of the trailing edge 2906. Alternatively, the entire additional wing 2972 (e.g., the leading edge 2974 and the trailing edge 2976) may be positioned upwards and away (e.g., farther away along the longitudinal axis) from an aircraft such that the leading edge 2974 of the additional wing 2972 is located radially outward of the trailing edge 2906.

As described above, FIG. 29E shows a graph of the amount of combined lift generated by the propulsion unit and the airfoil based on the duct's turn angle 2937. For example, as the turn angle 2937 changes from 0 to 90 degrees, the amount of combined lift generated can vary. In some embodiments, a turn angle 2937 around or near 32 to 45 degrees may generate the greatest amount of combined lift. Additionally, a turn angle 2937 of zero degrees may generate a large amount of lift relative to other turn angles 2937 close to zero. As the turn angle 2937 increases beyond zero degrees, the contribution to the lift from the airfoil causes the combined lift to be greater than other possible with only a propulsion unit. As the turn angle 2937 increases beyond 32 or 45 degrees, or beyond some amount therebetween, the amount of combined lift generated by the airfoil 2902 and propulsion unit may then decrease.

FIGS. 30A-30F illustrate additional embodiments of one or more ducts 3030. The ducts 3030 may have many or all of the same or similar features as ducts 130, or any other ducts disclosed herein, and vice versa, and the same reference numbers are used to refer to the same features. The ducts 3030 may have a different shape or profile (e.g., turn angle 3037) to deliver an optimal amount of airflow to an airfoil (e.g., airfoil 3002). The turn angle 3037 is an angle between line 3037A (which represents the direction of the flow of air into the inlet end 3032) and line 3037B (which represents the direction of the flow of air out of the outlet end 3034).

Figure 30A:
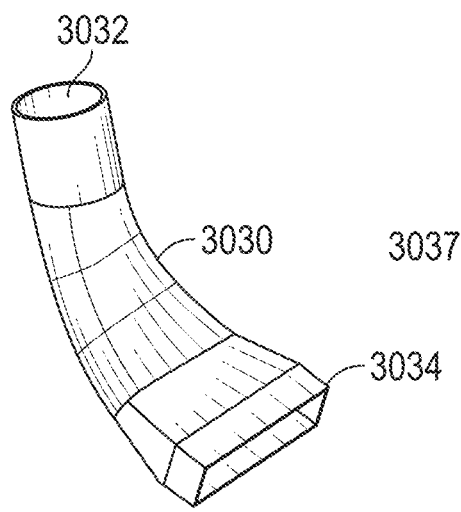
FIG. 30A illustrates a perspective view of another embodiment of an airflow duct having a moderate turn angle for use in an aircraft.
Figure 30B:
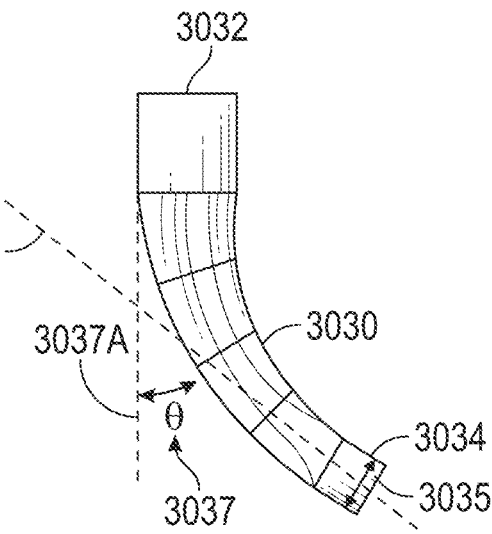
FIG. 30B illustrates a side view of the airflow duct of FIG. 30A.

FIGS. 30A-30B show a duct 3030 with a turn angle 3037. The duct 3030 may have the same or similar features as the duct 2930 and vice versa, except as otherwise described. FIG. 30E shows a cross-sectional view of the ducts 3030 with a turn angle of approximately 45 degrees. The outlet end 3034 may have a height 3035 of approximately 10.5 inches. In some embodiments, the outlet end 3034 may have a height 3035 between 6 inches to 22 inches. Furthermore, the height 3035 of the outlet end 3034 may be designed or optimized for a particular airfoil 3002 design. For example, the airfoil 3002 may have a chord of approximately two feet. The airfoil 3002 may have an outer diameter (e.g., the diameter measured from trailing edge 3006 of the airfoil 3002 that passes through a center point or axial centerline of the airfoil 3002) of 13.5 feet.

Figure 30C:
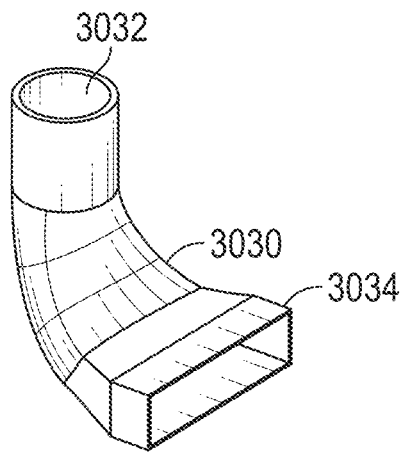
FIG. 30C illustrates a perspective view of another embodiment of an airflow duct having a sharper turn angle for use in an aircraft.
Figure 30D:
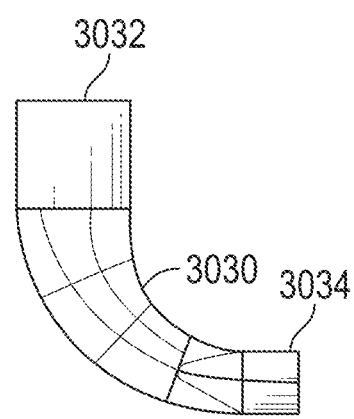
FIG. 30D illustrates a side view of the airflow duct of FIG. 30C.
Figure 30E:
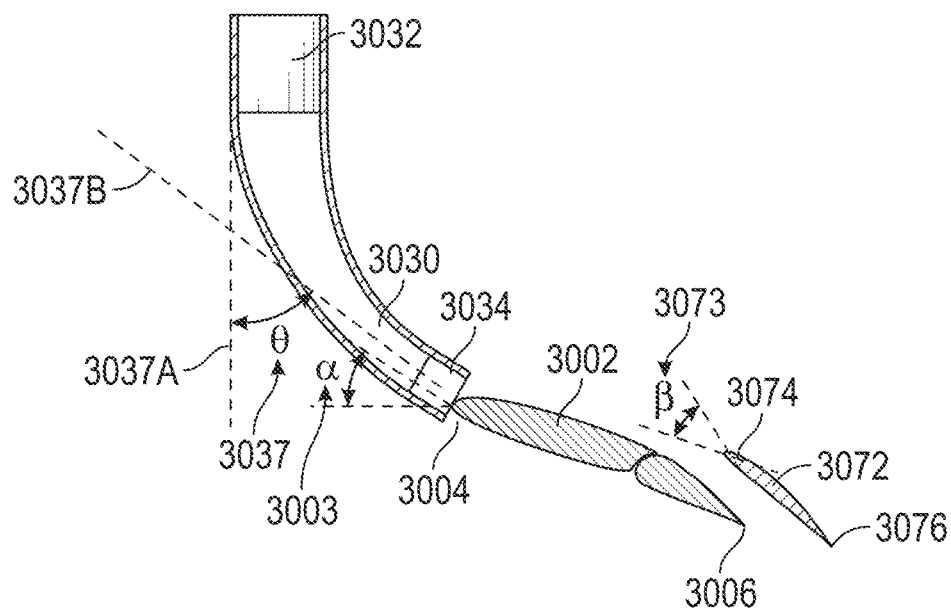
FIG. 30E illustrates a cross-sectional view of the airflow duct of FIG. 30A.
Figure 30F:
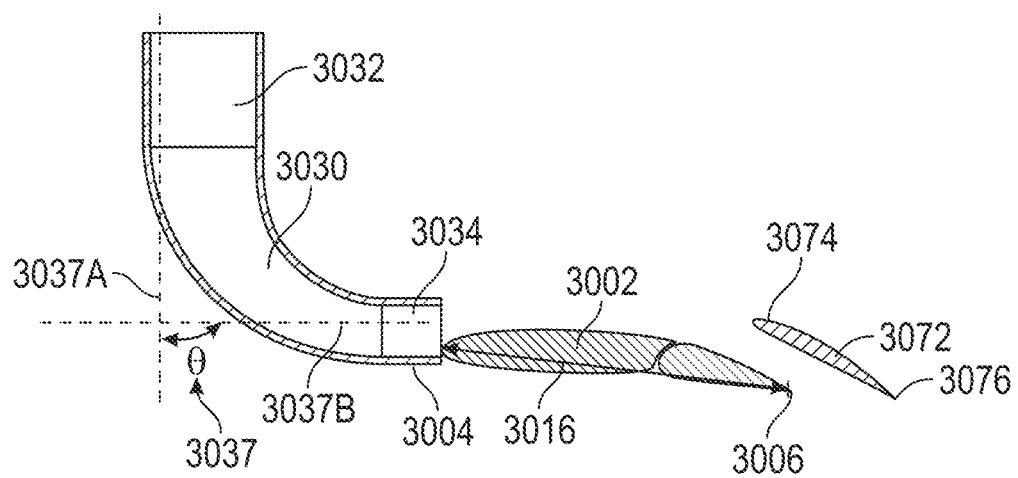
FIG. 30F illustrates a cross-sectional view of the airflow duct of FIG. 30C.

FIGS. 30C and 30D show the duct 3030 with a turn angle 3037 of approximately 90 degrees. FIG. 30F shows a cross-sectional view of the ducts 3030 with a turn angle 3037 of approximately 45 degrees. The outlet end 3034 may have a height 3035 of approximately 10.5 inches. In some embodiments, the outlet end 3034 may have a height 3035 between 6 inches to 22 inches. Furthermore, the height 3035 of the outlet end 3034 may be designed or optimized for a particular airfoil 3002 design. For example, the airfoil 3002 may have a chord 3016 of approximately two feet. The airfoil 3002 may have an outer diameter (e.g., the diameter measured from trailing edge 3006 of the airfoil 3002 that passes through a center point or axial centerline of the airfoil 3002) of 13.5 feet.

The duct 3030 may further have an outlet end 3034 with a cross-sectional area that is larger than that of the inlet end 3032. The ratio of an area of the outlet end 3034 to an area of the inlet end 3032 may be 1.25:1 or less, 1.5:1 or less, 1.75:1 or less, 2:1 or less, 2.25:1 or less, 2.5:1 or less, 3:1 or less, 5:1 or less. The inlet end 3032 may be circular or other rounded shapes. The outlet end 3034 may be rectangular, square, or other segmented shapes. The outlet end 3034 may have a shape corresponding to that of the airfoil 3002.

FIG. 30E shows the additional wing 3072 which may be coupled to or positioned adjacent to the airfoil 3002. The additional wing 3072 may be spaced upwards and laterally away (e.g., radially outward) from the airfoil 3002 (e.g., upwards and away from the airfoil 3002 and away from the leading edge 3004). The leading edge 3074 may be radially inward of the trailing edge 3006. Alternatively, the entire additional wing 3072 (e.g., the leading edge 3074 and the trailing edge 3076) may be positioned upwards and away (e.g., farther away along the longitudinal axis) from an aircraft such that the leading edge 3074 of the additional wing 3072 is located radially outward of the trailing edge 3006.

The additional wing 3072 may have a curved profile. The additional wing 3072 may be configured to generate additional lift from the flow of air at or adjacent to the trailing edge 3006. The additional wing 3072 may be configured to generate additional lift from the flow of air at or adjacent to a middle portion of the airfoil 3002. For example, when the flow of air exits the outlet end 2634 and flows over the airfoil 3002 the flow of air can travel to the additional wing 3072. The airfoil 3002 may have an angle of attack 3003 which corresponds to the angle between the chord 3016 and the direction of flow of air exiting the outlet end 3034. The angle of attack may be positive. The angle of attack may be from zero to 75 degrees, from zero to 50 degrees, from zero to 30 degrees, from 10 to 75 degrees, from 10 to 50 degrees, from ten to 30 degrees, or from ten to 20 degrees. The angle of attack may be adjustable during flight as the lifting body rotates (or parts thereof, such as flaps etc.) relative to the "freestream" direction of air exiting the duct outlet. Further, the chord 3016 may be angled with respect to a reference axis of the system or vehicle, for example as described with respect to the chord 2616 and FIGS. 27A-27E. Likewise, this angle between the chord 3016 and the reference axis may change as the lifting body rotates, etc.

Figure 31A:
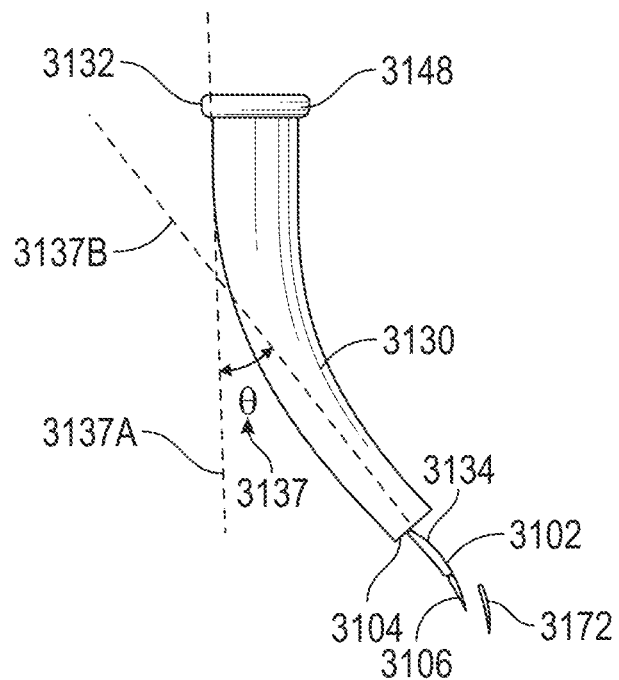
FIG. 31A illustrates a side view of another embodiment of an airflow duct having an inlet lip.
Figure 31B:
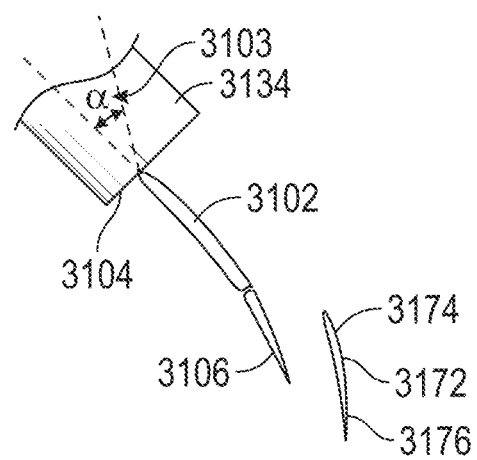
FIG. 31B illustrates a side view of the outlet end of the airflow duct of FIG. 31A.

FIGS. 31A-31D show one or more ducts 3130 with an inlet lip 3148. FIG. 31A shows a side view of the one or more ducts 3130 with an inlet lip 3148. FIG. 31B shows a detailed view of the outlet end 3134 of the one or more ducts 3130. The airfoil 3102 may have a leading edge 3104 and a trailing edge 3106. The airfoil 3102 may have an angle of attack 3103 which corresponds to the angle between the chord and the direction of flow of air exiting the outlet end 3134. The inlet lip 3148 may provide a smooth transition surface for air to flow into the inlet end 3132. The inlet lip 3148 may be an elliptic lip, which may provide for improved airflow from the inlet end 3132 to the outlet end 3134. The horizontal width of the inlet lip 3148 may be greater than the vertical height of the lip. Furthermore, the inlet lip 3148 may be designed to provide for a better conditioned or more laminar flow of air into the one or more propulsion units. A flow of air from the inlet lip 3148 through the inlet end 3132, the one or more ducts 3130, and the outlet end 3134 can have improved lift characteristics relative to ducts 3130 without an inlet lip 3148. For example, the inlet lip 3148 can provide increased performance of a propulsion unit (e.g., propulsion units 120) compared to one or more ducts 3130 without an inlet lip 3148. In some embodiments, the performance of a propulsion unit coupled to one or more ducts 3130 with an inlet lip 3148 can be approximately 20%-40% greater than those without an inlet lip 3148. In some embodiments, the inlet lip 3148 may be canted, which may improve airflow from the inlet end 3132 to the outlet end 3134 (e.g., less turbulent airflow). An additional wing 3172 having a leading edge 3174 and a trailing edge 3176 may also be positioned radially outward of the airfoil 3102.

Figure 31C:
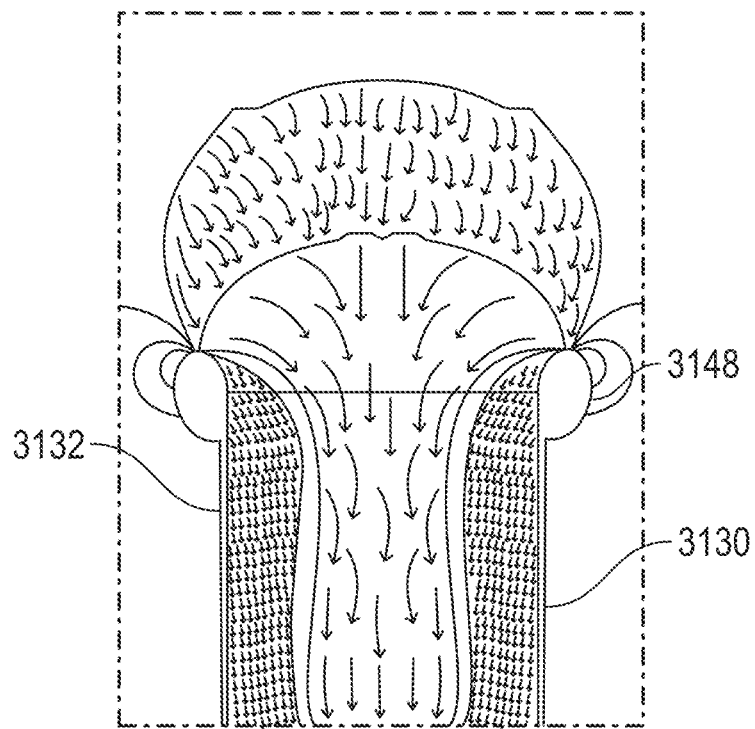
FIG. 31C illustrates a flow of air entering the inlet end of the airflow duct of FIG. 31A.
Figure 31D:
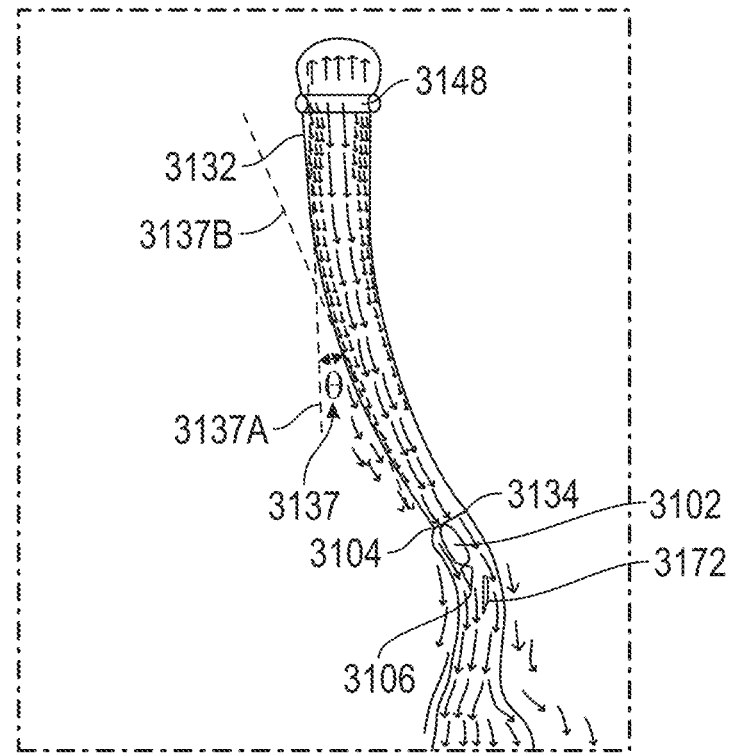
FIG. 31D illustrates a flow of air traveling through the airflow duct of FIG. 31A from the inlet end to the outlet end and around the wing.

FIGS. 31C-31D depict improved airflow characteristics of the one or more ducts 3130. The one or more ducts 3130 may have a smoother airflow velocity field at the inlet end 3132 due to the inlet lip 3148. Additionally, such airflow traveling through the one or more ducts 3130 may result in a greater induced lift due to the inlet lip 3148. The flow of air from the inlet end 3132 may be more laminar (e.g., smoother) and faster at positions nearer the centerline of the one or more ducts 3130, as opposed to the boundary or outer inside diameter of the one or more ducts 3130 (e.g., the flow of air may be slower at the outer inside diameter of the one or more ducts 3130). Incorporating the inlet lip 3148 with the turn angle 3137 can further improve the amount of lift that can be generated by reducing the risk of turbulent or separated flow inside the duct. For example, having one or more ducts 3130 with a turn angle 3137 of approximately 32 degrees and an inlet lip 3148 may result in an approximately 8.5% improvement in vertical thrust to power ratio. Additionally, including a turn angle 3137 of approximately 32 degrees may provide about a 12% improvement over the baseline fan in vertical thrust to power ratio when the airfoil 3102 is poisoned adjacent to (e.g., approximately 0 inches away from) the outlet end 3134. The turn angle 3137 is an angle between line 3137A (which represents the direction of the flow of air into the inlet end 3132) and line 3137B (which represents the direction of the flow of air out of the outlet end 3134).

FIGS. 32A-32D illustrate additional embodiments of one or more ducts 3230. The ducts 3230 may have many or all of the same or similar features as ducts 130, or any other ducts disclosed herein, and vice versa, and the same reference numbers are used to refer to the same features. The ducts 3230 may have one or more vanes which may improve airflow at the inlet end 3232 or outlet end 3234 of the one or more ducts 3230.

Figure 32A:
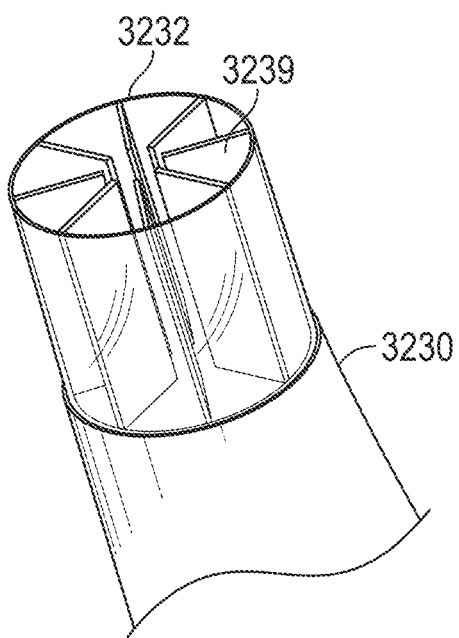
FIG. 32A illustrates an additional embodiment of an inlet end of an airflow duct having one or more vanes.

FIGS. 32A-32D show one or more ducts 3230 which designed to generate more uniform airflow at the inlet end 3232 and the outlet end 3234. Portions of the ducts 3230 are shown transparently in order to more clearly see structures therein. FIG. 32A shows the one or more ducts 3230 may include one or more vanes 3239 (e.g., steering vanes 3239) positioned within and at the inlet end 3232. The one or more vanes 3239 may be capable of removing air swirl entering the duct 3230. The one or more vanes 3239 may be positioned adjacent to the inlet end 3232. The one or more vanes 3239 may include eight vanes extending radially and angularly spaced within the inlet end 3232. The one or more vanes 3239 may be positioned underneath (e.g., below) one or more of the plurality of propulsion units in order to create a smooth transition of air (e.g., laminar air flow) from the inlet end 3232 to the outlet end 3234. The one or more vanes 3239 may also be rectangularly shaped and extend from an outside wall of the one or more ducts 3230 towards an axial centerline of the one or more ducts 3230.

Figure 32B:
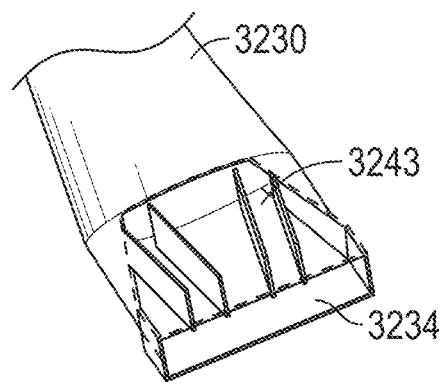
FIG. 32B illustrates an additional embodiment of the exit end of an airflow duct having one or more deswirling vanes.
Figure 32C:
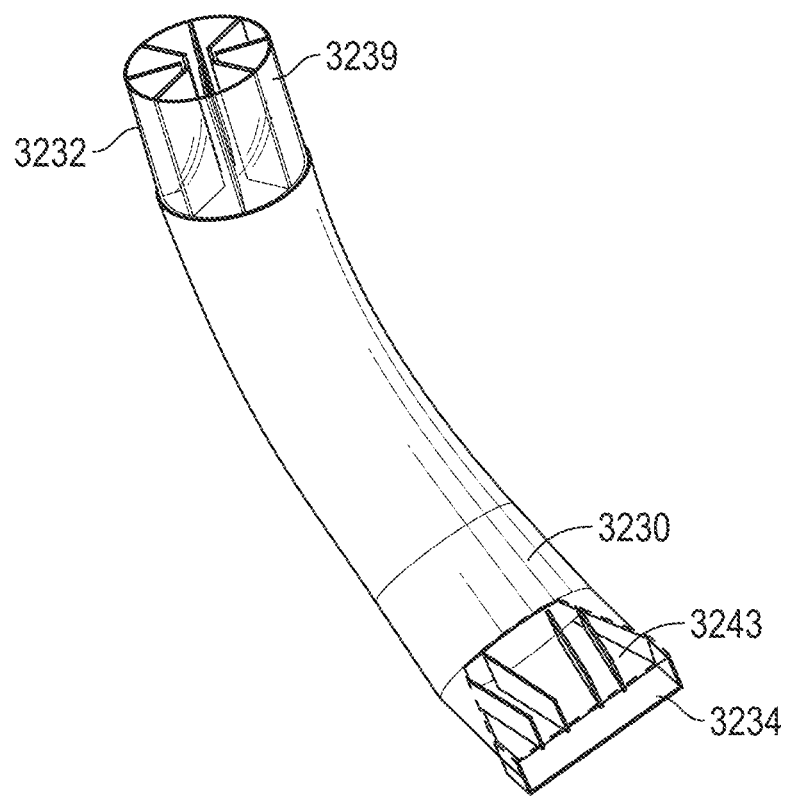
FIG. 32C illustrates a perspective view of an additional embodiment of an airflow duct having one or more vanes at an inlet end and one or more deswirling vanes at an exit end of the airflow duct.
Figure 32D:
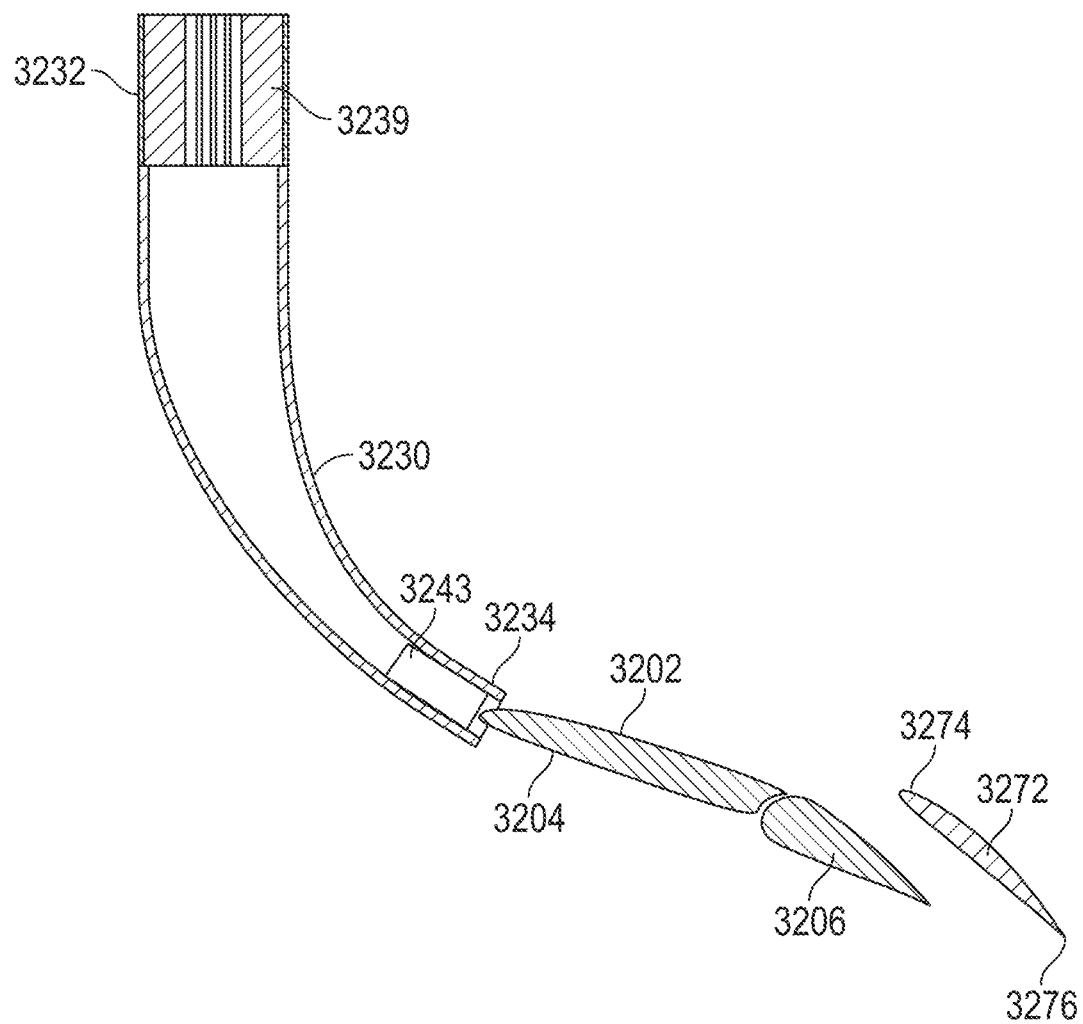
FIG. 32D illustrates a cross-sectional view of the airflow duct of FIG. 32C.

FIG. 32B shows the outlet end 3234 of the duct 3230 having one or more additional vanes or deswirling vanes 3243 positioned therein. FIGS. 32C and 32D show the duct 3230 which may include both deswirling vanes 3243 at the outlet end 2334 and vanes 3239 at the inlet end 3232. An additional wing 3272 having a leading edge 3274 and a trailing edge 3276 may also be positioned radially outward of the airfoil 3202 (e.g., the leading edge 3204 and/or the trailing edge 3206). The deswirling vanes 3243 may extend from a position within the one or more ducts 3230 and towards (e.g., adjacent to the) the outermost edge or opening of the outlet end 3234. The deswirling vanes 3243 may be angled relative to walls of the one or more ducts 3230 such that the flow of air generated by the plurality of propulsion units and flowing through the one or more ducts 3230 is more laminar and has a more uniform velocity at the outlet end 3234. The deswirling vanes 3243 positioned at the outlet end 3234 may include a plurality of deswirling vanes 3243 (e.g., 2, 3, 4, 6, 8, 10, etc.) designed to deliver a more uniform flow to the airfoil 3202. The deswirling vanes 3243 may be one or more rectangular plates which may extend from a bottom-most portion of the outlet end 3234 of the one or more ducts 3230. Additionally, the deswirling vanes 3243 may be positioned around (e.g., radially around) the outlet end 3234 in order to deliver a more uniform airflow to an airfoil 3202. In some embodiments, by including deswirling vanes 3243, the pressure buildup that may occur at the outlet end 3234 due to the positioning of the airfoil 3202 near or adjacent to the outlet end 3234 may be reduced, which can improve the lift of an aircraft.

Figure 33A:
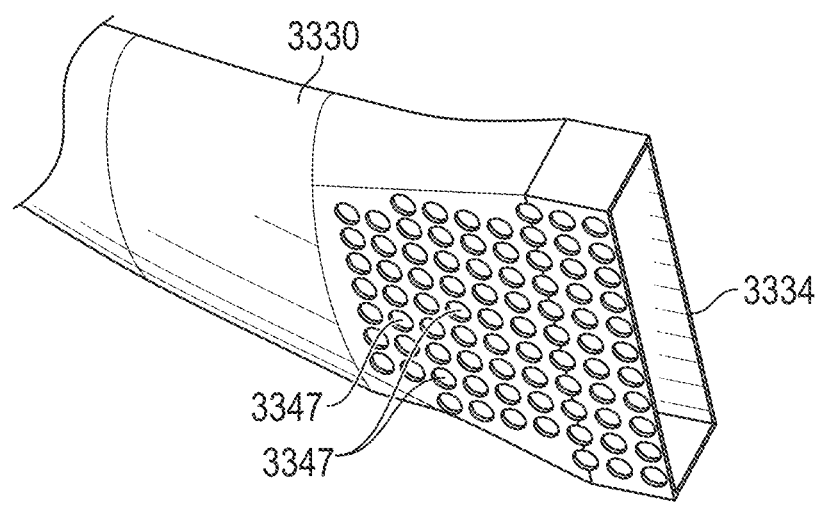
FIG. 33A illustrates an additional embodiment of the exit end of an airflow duct having one or more holes for diverting flow.
Figure 33B:
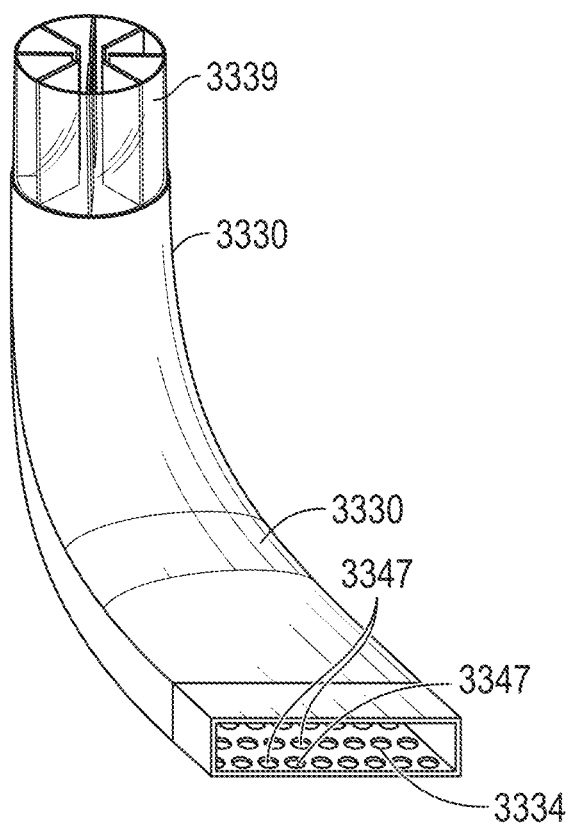
FIG. 33B illustrates a perspective view of an additional embodiment of an airflow duct having one or more vanes at an inlet end and one or more sidewall openings at an exit end of the airflow duct.
Figure 33C:
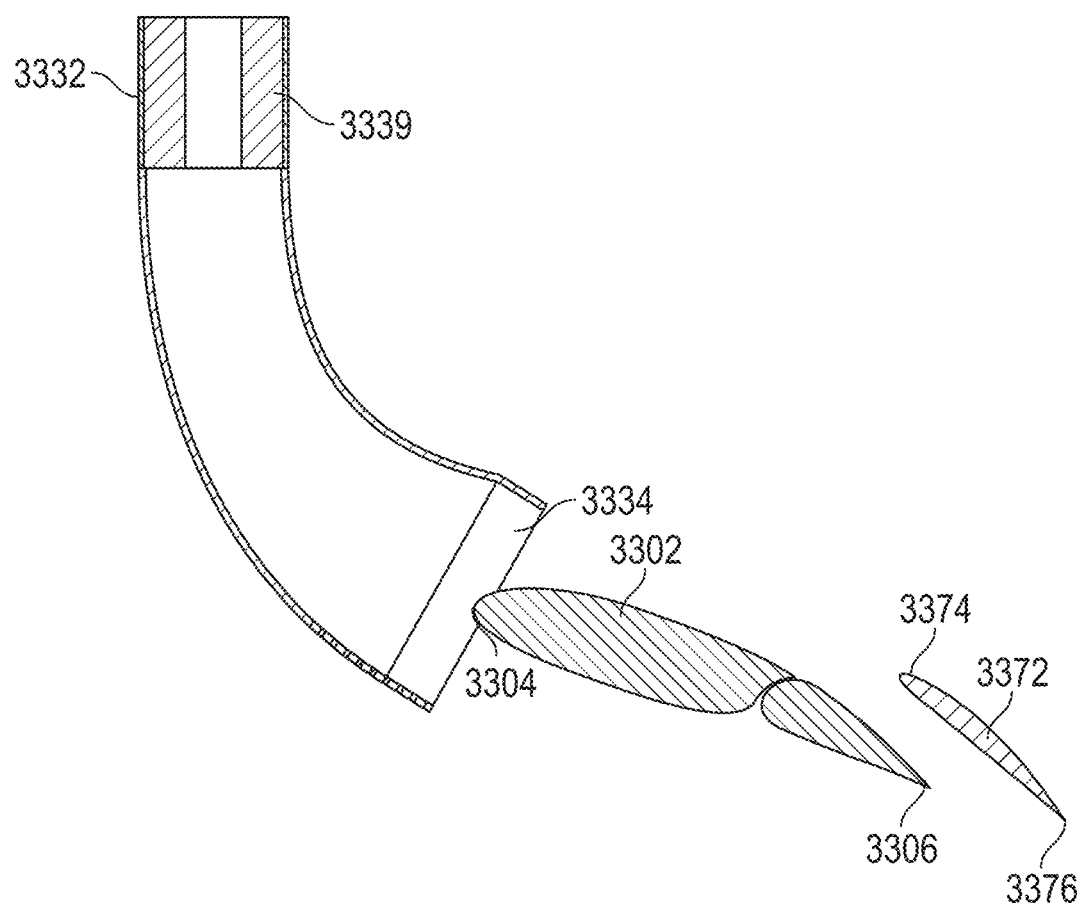
FIG. 33C illustrates a cross-sectional view of the airflow duct of FIG. 32B having a wing extending from the exit end.

FIGS. 33A-33C illustrate additional embodiments of the one or more ducts 3330 with openings 3347. The ducts 3330 may have many or all of the same or similar features as ducts 130, or any other ducts disclosed herein, and vice versa, and the same reference numbers are used to refer to the same features. The ducts 3330 may have one or more openings 3347 at the outlet end 3334 which may improve airflow to the airfoil 3302.

FIGS. 33A-33C show the outlet end 3334 of the one or more ducts 3330 which can include the one or more openings 3347, shown as a plurality of holes (for clarity only some of the openings 3347 are labelled in FIGS. 33A and 33B). FIG. 33A shows the outlet end 3334 with the one or more openings 3347. FIG. 33B shows a perspective view of the one or more ducts 3330. FIG. 33C shows a cross-sectional view of one or more ducts 3330. The one or more ducts 3330 may include one or more vanes 3339 (e.g., steering vanes 3339) positioned within and at the inlet end 3332. An additional wing 3372 having a leading edge 3374 and a trailing edge 3376 may also be positioned radially outward of the airfoil 3302 (e.g., at the leading edge 3304 or trailing edge 3306). The one or more openings 3347 may be positioned along a bottom-most portion or lower portion of the outlet end 3234, such as a lower sidewall. The one or more openings 3347 may be arranged evenly in a grid like pattern at the outlet end 3334. Additionally, the one or more openings 3347 may be arranged in rows starting from the outermost edge of the outlet end 3334 to a medial or middle area of the outlet end 3334, where the density of openings 3347 in each row may decrease farther away from the outermost edge of the outlet end 3334. In some embodiments, the one or more openings 3347 may reduce the amount of backpressure generated by the airfoil 3302 on the duct exit and can increase the amount of lift that may be generated. The openings 3347 may be circular as shown or other shapes, such as elongated, etc.

Figure 34:
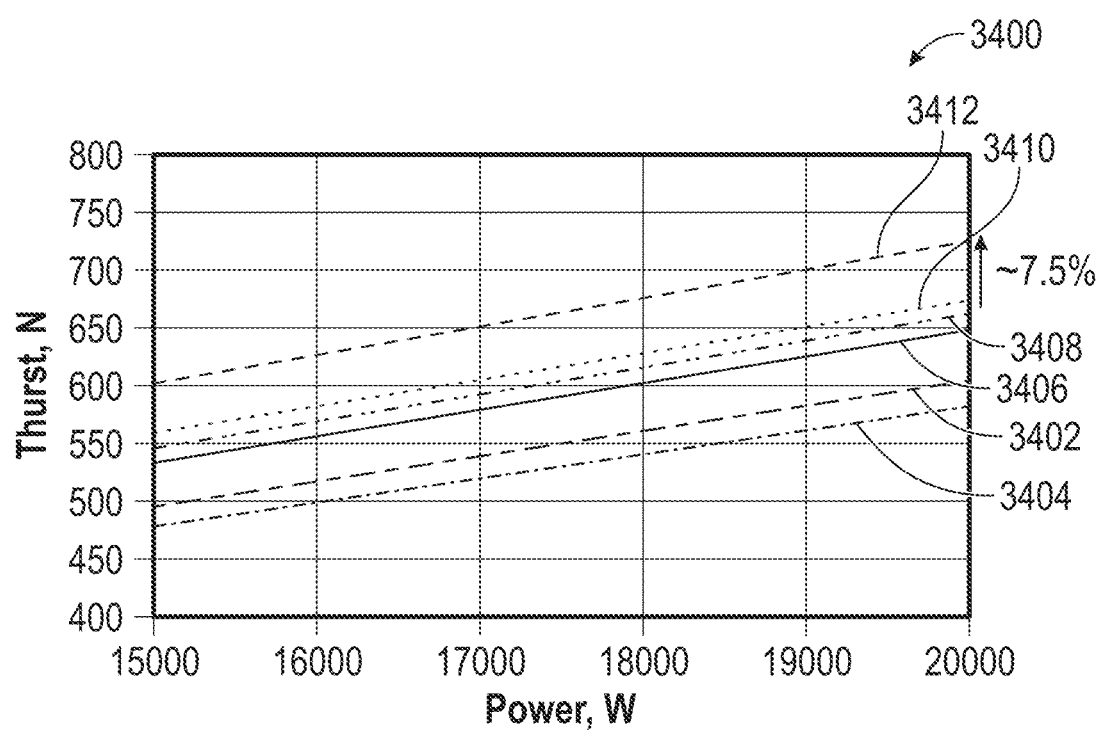
FIG. 34 is a graphical representation of analytical data for an amount of thrust generated versus an amount of power delivered by a propulsion unit, for various airflow ducts and wing configurations.

FIG. 34 is a graphical representation 3400 of the amount of thrust (N, newtons) generated versus fan power (W, watts) for varying duct turn angles. A baseline representation 3402 of the one or more ducts (e.g., duct 2930) is included where the duct does not have a turn angle (e.g., turn angle of zero) and is therefore a straight pipe). Line 3404 shows the amount thrust versus power generated when the duct has a turn angle of 32 degrees without an airfoil. Line 3406 shows the thrust versus power generated when the duct has a turn angle of 32 degrees and the airfoil has a t/c ratio of 0.12. Line 3408 shows the thrust versus power generated when the duct has a turn angle of forty five degrees and the airfoil has a t/c ratio of 0.06. Line 3410 shows the thrust versus power generated when the duct has a turn angle of thirty two degrees and the airfoil has a t/c ratio of 0.06. Line 3412 shows the thrust versus power generated when the duct is using an alternative fan, where the alternative fan is expected to provide improved thrust of approximately 7.5% compared to line 3410.

Example Aircraft with Substantially Vertically-Oriented Airfoils

Figure 35A:
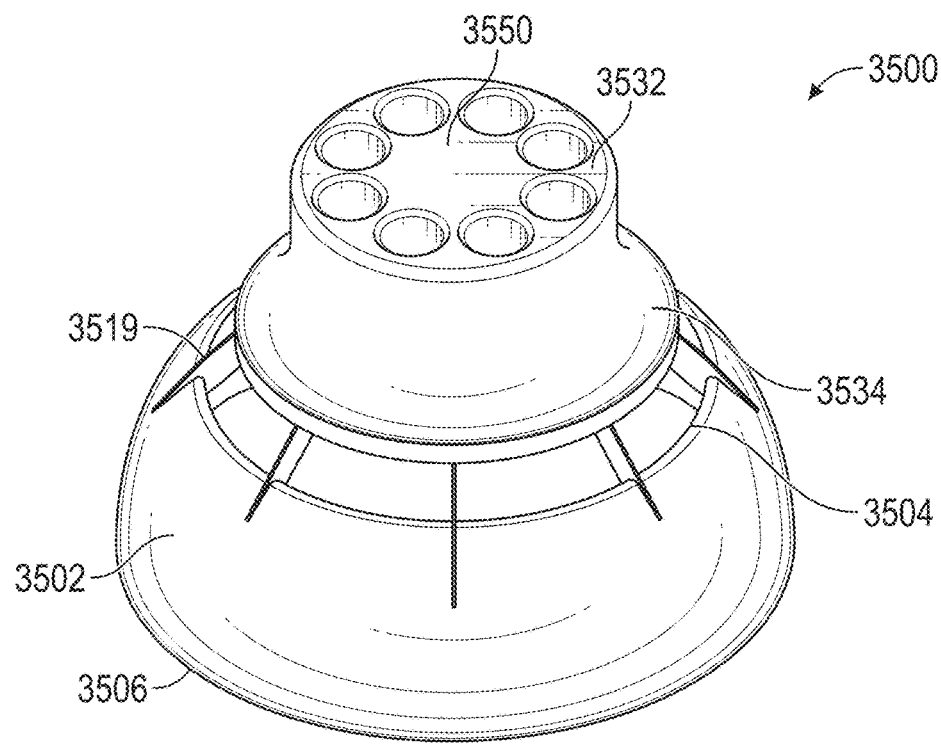
FIG. 35A illustrates a perspective view of an additional embodiment of an aircraft having a wing positioned in a substantially vertical orientation.
Figure 35B:
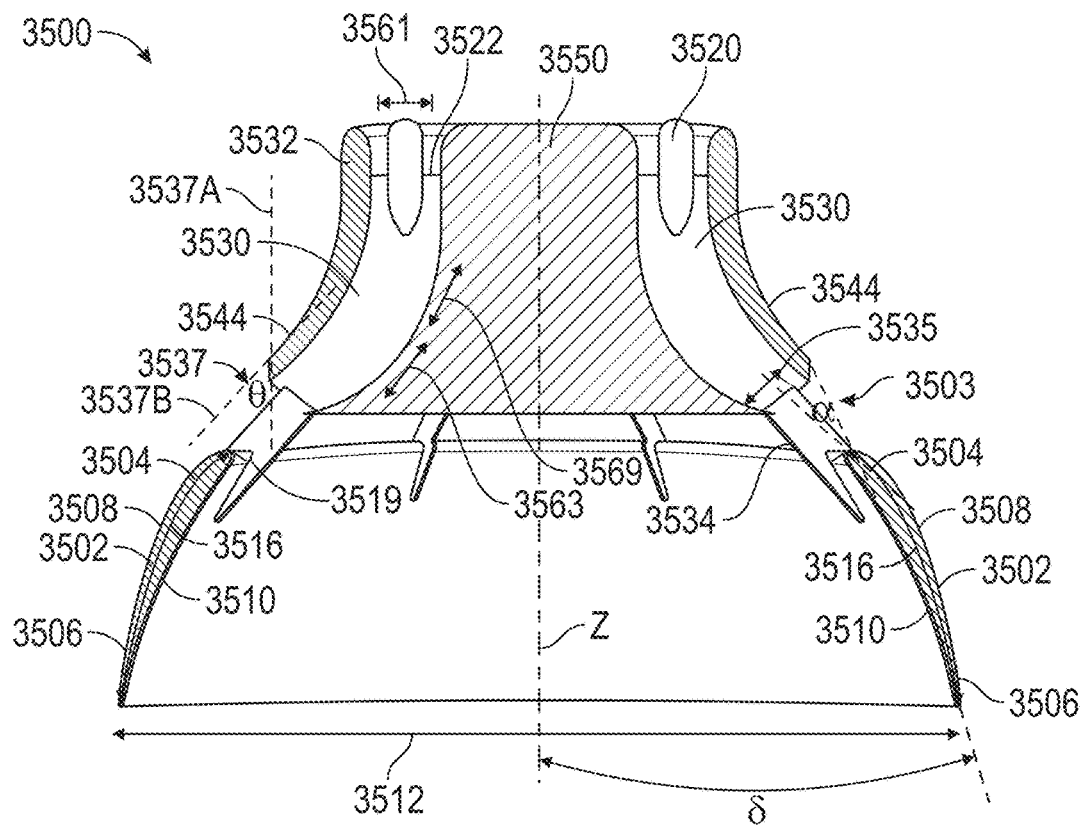
FIG. 35B illustrates a cross-sectional view of the aircraft of FIG. 35A.

FIGS. 35A-35B illustrate additional embodiments of an aircraft 3500. The aircraft 3500 may have many or all of the same or similar features as aircraft 100, or any other aircraft disclosed herein, and vice versa, and the same reference numbers are used to refer to the same features. In the aircraft 3500, the wing (e.g., airfoil) 3502 is oriented close to vertically, as further described.

The plurality of ducts 3530 may receive a flow of air delivered by a plurality of propulsion units 3520. The plurality of propulsion units 3520 may have a plurality of blades 3522. The flow of air may travel from the inlet end 3532 to the outlet end 3534 of the plurality of ducts 3530 and to a leading edge 3504 of the wing 3502. The flow of air may be delivered by a propulsion unit 3520 which may be a 20" diameter ducted fan. Thrust may be generated at the inlet end 3532 of the plurality of ducts 3530 to deliver a flow of air to the wing 3502. The plurality of ducts 3530 may be placed within a larger channel 3544. The plurality of ducts 3530 may also be shaped to optimize the airflow velocity at the outlet end 3534 (e.g., reduce the amount of airflow lost due to the plurality of ducts 3530 turning between the inlet end 3532 and the outlet end 3534). The flow of air may travel along the top surface 3508 and the bottom surface 3510 of the wing 3502. The wing 3502 may be couped to the outlet end 3534 with one or more coupling units 3519. The one or more coupling units 3519 may extend radially around the aircraft 3500 and be positioned adjacent to the outlet end 3534.

In some embodiments, the wing 3502 may be oriented substantially vertical or at small angles with respect to a reference axis such as the longitudinal axis Z of the aircraft 3500. The reference axis may be a vertical axis, or an axis aligned with the gravity vector. An angle δ may be defined between the chord 3516 of the wing 3502 and the longitudinal axis Z of the aircraft 3500. The angle δ may be no more than 45 degrees, no more than 40 degrees, no more than 35 degrees, no more than 30 degrees, no more than 25 degrees, or no more than 20 degrees. In some embodiments, the angle δ may be from 25 to 35 degrees, or approximately 30 degrees. The angle δ may change as the wing rotates (or rotates portions thereof, such as flaps, etc.) and changes its angle of attack (α). The angle δ may have any of the values, and the chord and reference axis may have any of the features, described herein with respect to the angle between a reference axis and the chord 2616 (see FIGS. 27A-27E) or the chord 3016 (see FIGS. 30A-30F), and vice versa.

As shown, the duct 3530 may have a turn angle 3537. The turn angle 3537 is the angle between axis 3537A, which is parallel with the direction of the inlet end 3532 of the duct 3530 (the axis 3537A is shown offset from the inlet end 3532 so that the angle is clear), and axis 3537B, which is parallel with the direction of the outlet end 3534 of the duct 3530. The turn angle 3537 may be any of the amounts as described herein, such as from 32 to 45 degrees, etc. The turn angle 3537 may be the acute angle as measured between the axis 3537B and a portion of the axis 3537A that extends below the vehicle.

The aircraft 3500 may include eight or more propulsion units 3520 (e.g., fans) which may generate approximately 1,200 pounds of thrust. The amount of thrust generated by the plurality of propulsion units 3520 can range between 1,000 pounds and 1,400 pounds when eight propulsion units 3520 are incorporated. Additionally, the aircraft 3500 can include more than eight propulsion units 3520 (e.g., ten fans, twelve fans, fourteen fans, sixteen fans). The plurality of ducts 3530 can have an expansion ratio from the inlet end 3532 to the outlet end 3534. The expansion ratio from the inlet to the outlet may be approximately 1:1 (e.g., where the width 3561 or area at the inlet end 3532 is equal to the height 3535 or area at the at the outlet end 3534). Additionally. The expansion ratio may be between 0.5 (e.g., the width 3561 or area at the inlet end 3532 is half as large as the height 3535 or area at the outlet end 3534) and three (e.g., the width 3561 or area at the inlet end 3532 is three times smaller than the height 3535 or area at the outlet end 3534). Other ratios as described herein may be incorporated. In some embodiments, the height 3535 at the outlet end 3534 can be approximately eleven inches. Additionally, the height 3535 at the outlet end 3534 can be between 9 inches and fifteen inches.

The aircraft 3500 may have an outer radius 3512 of about 6.6 ft. The aircraft 3500 may also have an outer radius 3512 between four feet and ten feet. The aircraft 3500 may have a duct turn length 3569 which is the length along a curved centerline of the duct 3530, e.g. as measured from where the duct 3530 begins to bend to where the duct 3530 stops bending (see FIG. 35B). The aircraft 3500 may have a duct turn length 3569 of ten inches. In some embodiments, the duct turn length 3569 may be between 6 inches and fifteen inches. The aircraft 3500 may have a duct length after the turn 3563 of about 4.9 feet. The aircraft 3500 may also have a duct length after the turn 3563 between three feet and six feet. The total duct length may be 2095 mm. Additionally, the total duct length may be between 1400 mm and 3000 mm. The total duct length may be 1499 mm, 1629 mm, 1842 mm, 2018 mm, 2019 mm, 2219 mm, 2301 mm, 2600 mm.

The aircraft 3500 may be capable of holding a passenger and cargo, where the passenger and cargo may weigh approximately 250 lbs. The aircraft 3500 may also weigh approximately 1,000 lbs. In some embodiments, the aircraft 3500 may be capable of carrying a passenger and cargo weighing up to or approximately 1,000 lbs. The aircraft 3500 may weigh approximately 1,800 lbs. The passenger and cargo may be stored in the main portion 3550.

The aircraft 3500 with combined propulsion unit and wing may be able to generate a greater amount of thrust ("T") than the thrust ("T*") of a system having only a propulsion unit operating with the same amount of power (i.e. the "thrust ratio" of T/T* as shown in the equations of FIG. 35C). The aircraft 3500 may have a thrust ratio which is dependent on the expansion ratio (i.e., A3/A2) from the inlet end 3532 (e.g., inlet end area A2) to the outlet end 3534 (i.e., outlet end area A3) and the duct deflection angle 3537. For example, see the equations in FIG. 35C. The angle φ represents an angle between a horizontal line (e.g., perpendicular to the longitudinal axis Z) and the direction of the flow of air out of the outlet end 3534. The drag coefficient is represented by $C_d$. The average pressure loss coefficient is represented by $\xi$. Additionally, the expansion ratio (A3/A2) may be represented by $A_w$. The aircraft 3500 may be capable of generating a thrust ratio between 1.1 and 1.2. Additionally, based on the selected parameters, the thrust ratio may be approximately 1.169, 1.17, 1.185, or 1.173. A list of tables (e.g., Tables 1-3) are reproduced for reference which disclose the thrust ratio based on selected parameters previously disclosed.

TABLE 1

| Parameter | Value |
| --- | --- |
| Max Thrust Ratio | 1.185 |
| Fan Number | 8 |
| Outer Radius | 6.6 |
| Length of Turn | 12 |
| Length After Turn | 4.5 |
| Duct Deflection Angle | 15 deg (from vertical) |

TABLE 1-continued

| Parameter | Value |
| --- | --- |
| Expansion Ratio | 2.5 |
| Exit Thickness | 11 |

TABLE 2

| Parameter | Value |
| --- | --- |
| Max Thrust Ratio | 1.173 |
| Fan Number | 14 |
| Outer Radius | 9.93 ft |
| Length of Turn | 11.5 in |
| Length After Turn | 5 ft |
| Duct Deflection Angle | 15 deg (from Vertical) |
| Expansion Ratio | 2.74 |
| Exit Thickness | 13.1 in |

TABLE 3

| Parameter | Value |
| --- | --- |
| Max Thrust Ratio | 1.169 |
| Fan Number | 8 |
| Outer Radius | 6.6 ft |
| Length of Turn | 10 in |
| Length After Turn | 4.9 ft |
| Duct Deflection Angle | 15 deg (from Vertical) |
| Expansion Ratio | 2.34 |
| Exit Thickness | 11.2 |

Example Aerolift System

Figure 36A:
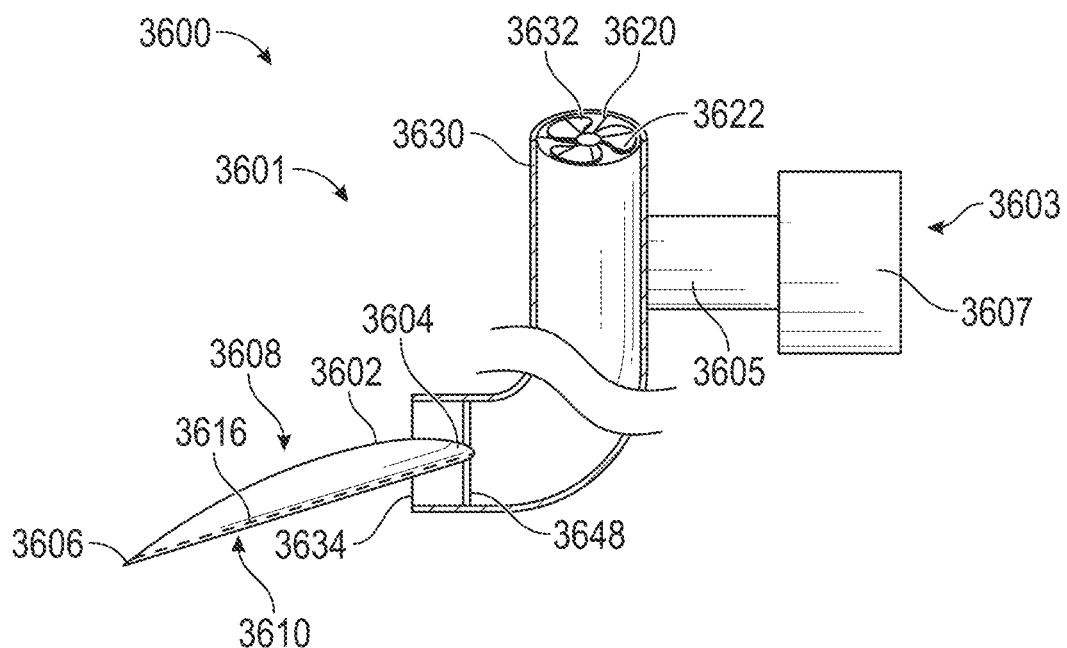
FIGS. 36A and 36B are cross-sectional views of an example system for generating movement using aerodynamic lifting forces, having a supporting structure shown schematically attached with an example aerolift system having a propulsion unit, duct, and a lifting body.
Figure 36B:
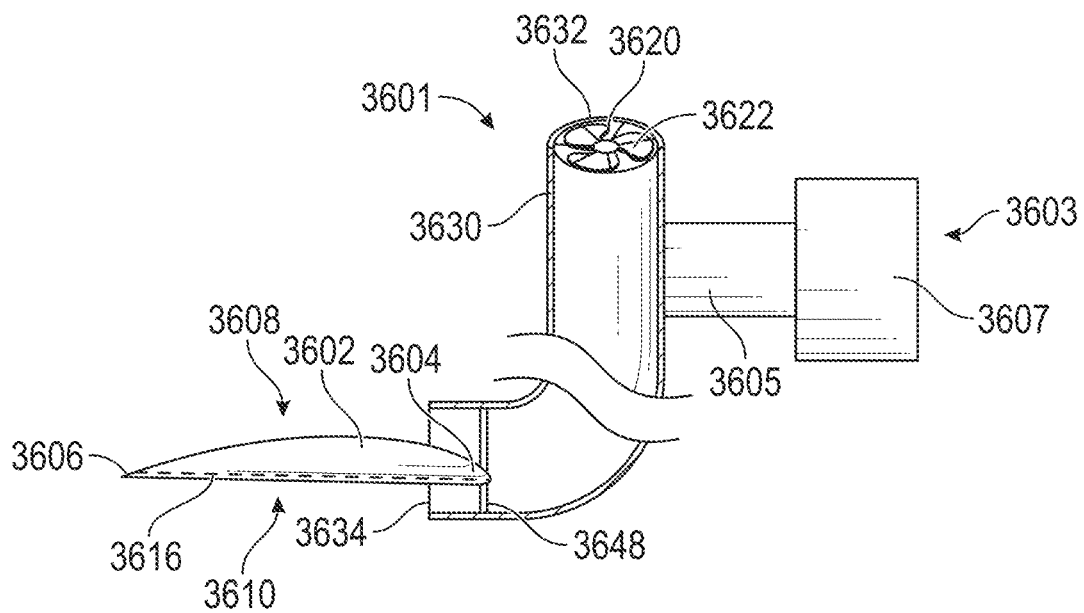

FIGS. 36A and 36B are cross section views illustrating an example of a system 3600 for generating movement via aerodynamic lifting forces. The system 3600 may have many or all of the same or similar features as aircraft 100, or any other aircrafts or systems disclosed herein, and vice versa, and the same reference numbers are used to refer to the same features. Thus the aerolift system may incorporate any or all of the vertically-oriented wings, the multi-component wings such as a wing with one or more additional wings, and the duct with a particular turn angle, as described above with respect to the particular embodiment of an aircraft. Other applications may use the same basic propulsive design. Various such "aerolift" systems are described herein with respect to FIGS. 36A-45.

As shown in FIGS. 36A and 36B, the system 3600 includes a machine structure 3603 having a supporting structure 3607 and moveable component 3605, each shown schematically. Attached to the moveable component 3605 is an aerolift system 3601. The aerolift system 3601 includes a propulsion unit 3620, a duct 3630, and a lifting body 3602. The propulsion unit 3620 moves air through the duct 3630 and over the lifting body 3602. In this way, the aerolift system 3601 produces movement via aerodynamic lifting forces to cause the moveable component 3605 to move relative to the supporting structure 3607.

The system 3600 may be an elevator, construction vehicle, skycrane, electric vertical take-off and landing (eVTOL) vehicle, helicopter, hovercraft, lift (e.g., ski-lift, utility lift, electric ladder), drill, hover drone, other flying vehicle, weather drone, or other system. The system 3600 may be used with, or include any features shown in, the aircrafts and related systems shown in the Appendix filed herewith. The machine structure 3603 may include a moveable elevator passenger or cargo compartment as the moveable component 3605 and the supporting structure 3607 as a supporting shaft. The machine structure 3603 may include a lifting arm as the moveable component 3605 and the supporting structure 3607 as a construction vehicle body. The machine structure 3603 may also include a helicopter body, a drone body, a satellite body, a weather drone body. Additionally, the supporting structure may also include an external wall, a pole, a ground surface, a ledge, a crane, a bridge, etc. The moveable component may also include containment area, cargo, a rigid pole, a coupling member, a drone body, a grabbing mechanism, etc.

The aerolift system 3601 includes the duct 3630 coupled to the lifting body 3602. FIG. 36A is a cross-sectional view of the system 3600 with the lifting body 3602 at a first orientation (e.g., 30-degree orientation) with one duct 3630 shown. In some embodiments, there can be multiple ducts 3630 positioned on or within the aerolift system 3601. FIG. 36B is a cross-sectional view of the system 3600 with the lifting body 3602 at a second orientation (e.g., 0-degree orientation). The lifting body 3602 may have a leading edge 3604 and a trailing edge 3606. The leading edge 3604 may be located near or within the lower or outlet end 3634 of the ducts 3630. The ducts 3630 may be coupled to one or more propulsion units 3620. The lifting body 3602 may have a top surface 3608, where the top surface 3608 may have a curved profile. The lifting body 3602 may have a bottom surface 3610, where the bottom surface 3610 has a flatter surface relative to the top surface 3608. Therefore, when viewing a cross-sectional profile of the lifting body 3602, the lifting body 3602 may have the profile of an airfoil. Furthermore, the lifting body 3602 may be symmetrical about a longitudinal axis.

In some embodiments, the lifting body 3602 may be generally symmetrical about a longitudinal axis. Additionally, the lifting body 3602 may be shapes that are generally circumferential including but not limited to circular, elliptical, triangular, square, rectangular, pentagonal, hexagonal, heptagonal, octagonal, other polygonal or segmented shapes, or combinations thereof. The lifting body 3602 may have a cross-sectional shape of an airfoil. The cross-sectional profile of the airfoil may be configured so that the top (e.g., upper) side of the airfoil is more curved than a bottom (e.g., lower) side of the airfoil. The airfoil configuration may be useful since it may be capable of generating lift in the system 3600 to move the moveable component 3605. Advantageously, by having an airfoil profile, a flow of air may increase speed upon reaching a leading edge 3604 of the lifting body 3602 and travel over the top, curved portion of the lifting body 3602. The upper curved shape creates a lower pressure zone relative to the high-pressure zone created by slower moving air flowing around the flat contour of the bottom surface 3610 of the lifting body 3602. In some embodiments, having a singular, annular lifting body 3602 may further increase the amount of pressure underneath the lifting body and may improve the lift/drag coefficient to lift the moveable component 3605 more efficiently.

The lifting body 3602 may be mounted at the outlet end 3634 at a variable angle of attack (e.g., 0 degrees, 5 degrees) which may be used, for example, to assist in vertical lift of the aerolift system 3601 to move the moveable component 3605. The angle of attack may be based on the angle which air exiting the duct 3630 meets the leading edge 3604 of the lifting body 3602. The angle may be formed between the chord 3616 of the airfoil and the direction of the relative air flow from the outlet end 3634. The first mounting angle as shown in FIG. 36A may provide a first angle of attack that provides the desired amount of lift and allows a plurality of propulsion units 3620 to operate at an optimal speed to provide vertical lift. The lifting body 3602 may then rotate to a second mounting angle as shown in FIG. 36B to provide a second angle of attack which may provide a relatively smaller lifting force as compared to the first angle of attack.

In some embodiments, a flow of air (e.g., flow of environmental air) is delivered to the leading edge 3604 of the lifting body 3602 from the outlet end 3634 of each of the ducts 3630. The flow of air may first be delivered to the leading edge 3604 and travel over the top surface 3608 and the bottom surface 3610. The flow of air traveling from the leading edge 3604 to the trailing edge 3606 along the top surface 3608 may flow at a relatively greater speed, compared to air flowing along the bottom surface 3610, due to the curved profile of the top surface 3608, resulting in a relatively lower air pressure exerted on the upper portion of the lifting body 3602 as compared to the pressure on the bottom surface 3610. The flow of air from the leading edge 3604 to the trailing edge 3606 along the bottom surface 3610 may flow at a relatively lower speed, compared to air flowing along the top surface 3608, due to the flatter profile (e.g., compared to the top surface 3608) of the bottom surface 3610, resulting in a relatively greater air pressure exerted on the bottom surface 3610 of the lifting body 3602 as compared to the pressure on the top surface 3608. The pressure differential between the bottom surface 3610 and the top surface 3608 causes a lifting force applied upward to the lifting body 3602, which may be transferred to the aerolift system 3601 and/or the machine structure 3603 (e.g., the moveable component 3605 and supporting structure 3607).

The plurality of ducts 3630 may be coupled to the lifting body 3602. Additionally, or alternatively, the system may be coupled to a compartment 3760, such as a passenger or other compartment (see, for example, FIG. 37). The plurality of ducts 3630 may extend from an inlet end 3632 to an outlet end 3634. In some examples, the length or shape of the ducts 3630 may be configured to provide a desired speed and direction of airflow to provide streamlined airflow and a desired amount of lift necessary for the operational requirements of the aerolift system 3601 to move the moveable component 3605. The length of the ducts 3630 may determine how long of a path the flow of air has to travel from the inlet end 3632 to the outlet end 3634. The longer the length of the ducts 3630, the lower the flow rate of the air is at the outlet end 3634 due to friction and turbulence experienced by the air in the ducts 3630. Therefore, in some embodiments, the length of the ducts 3630 may be configured to be as short as possible to increase the flow rate of air at the outlet end 3634. In some embodiments, the extended length of the ducts 3630 may be two feet. Additionally, the extended length of the ducts 3630 may be ten feet. In some embodiments, the extended length of the ducts 3630 may be between one foot and twelve feet. Furthermore, the ratio of length of the ducts 3630 to a diameter of a blade 3622 may be 2:1 (e.g., length of the ducts is two times longer than the diameter of the blades 3622 of the propulsion units 3620). Additionally, in some embodiments, the ratio between the length of the ducts 3630 and the diameter of a blade 3622 may be between 1:1 to 4:1. The duct 3630 can define a channel that "turns" from the inlet to the outlet. There may be various turn angles. The duct 3630 may have an inlet oriented vertically or generally vertically. A longitudinal axis of the inlet may be parallel with a vertical longitudinal axis of the system. The axis of the inlet may be within two, five, ten, twenty or thirty degrees of a vertical axis. The outlet of the duct 3630 may be angled with respect to the inlet. A longitudinal axis of the outlet may be at an angle from ten to sixty degrees, from twenty to fifty degrees, or from thirty to forty degrees, relative to a longitudinal axis of the inlet. The axes may be at other relative angles, such as about ninety degrees as shown in the figures. Further, the lifting body 3602 may be outside or inside or partially inside the duct 3630. The lifting body 3602 may be positioned a distance away from the exit of the duct 3630. The lifting body 3602 may be positioned vertically relative to the outlet opening of the duct 3630. A chord line of the lifting body 3602 may be positioned aligned with, or unaligned with (located vertically upward or downward relative to), a central longitudinal axis of the outlet of the duct 3630 exit.

The inlet end 3632 and the outlet end 3634 may be circular or generally circular (e.g., ovular). The inlet end 3632 and outlet end 3634 may be shaped to permit a desired flow of air to enter the propulsion units 3620. The inlet end 3632 and outlet end 3634 of the ducts 3630 may have a diameter configured to provide a desired amount of airflow to the leading edge 3604 of the lifting body 3602. In some examples, the diameter of inlet end 3632 may be approximately two feet. Additionally, in some examples, the diameter of the inlet end 3632 may range from eight inches to sixteen inches, from sixteen inches to thirty-two inches, or from thirty-two inches to seventy-two inches. In some embodiments, the diameter of the inlet end 3632 of the ducts 3630 corresponds to the diameter of the propulsion units 3620. In some examples, the diameter of the outlet end 3634 may be approximately two feet. Additionally, in some examples, the diameter of the outlet end 3634 may range from eight inches to sixteen inches, from sixteen inches to thirty-two inches, or from thirty-two inches to seventy-two inches. The ratio of diameter between the inlet end 3632 and the outlet end 3634 may be between 1:1 to 4:1. Therefore, the ducts 3630 may taper from the inlet end 3632 to the outlet end 3634.

In some embodiments, the plurality of ducts 3630 may be grooved or include a plurality of grooves (e.g., vanes) on an inner wall of the ducts 3630. The grooves may extend from the inlet end 3632 to the outlet end 3634 of the ducts 3630 and may reduce turbulent flow of air. Grooves may allow for streamlining airflow (e.g., laminar flow) and better control the airflow velocity as it reaches the leading edge 3604 of the device. For each embodiment the wall thickness of the ducts 3630 is sufficient to maintain shape under nominal and operational environmental stresses from pressure and temperature changes. In some embodiments, the plurality of ducts 3630 may taper, (e.g., decrease in cross-sectional area, from the inlet end 3632 to the outlet end 3634), which may increase the air pressure from the inlet end 3632 to the outlet end 3634 and increase the speed of the air at the leading edge 3604. Tapering the duct 3630 may allow the propulsion unit 3620 to operate at increased or slower speeds, depending on geometry, to deliver a desired amount of air to the leading edge 3604.

Figure 37:
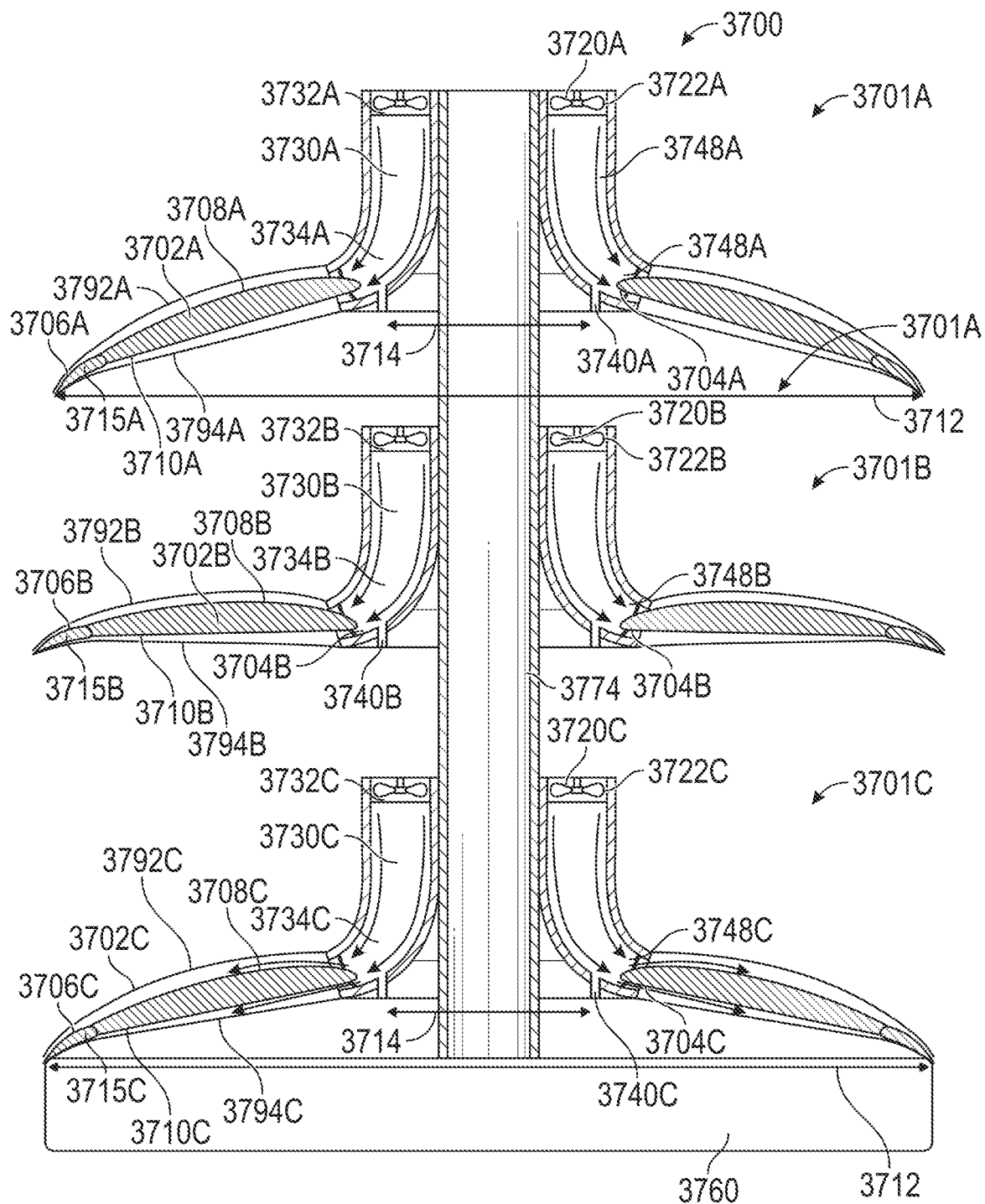
FIG. 37 illustrates a cross-sectional view of an example embodiment of a system for generating movement via aerodynamic lifting forces shown as an elevator lift system including the airflow ducts and the lifting body of FIG. 36A, including three vertically stacked aerolift systems.

In some embodiments, the plurality of ducts 3630 may also have a flap or bypass valve 3740 positioned along a bottom edge of the ducts 3630 (shown, at least, in FIG. 37). The bypass valve 3740 may be a hinged member, rudder, etc., that is moveable to reveal a slot or other opening in the duct 3630. The bypass valve 3740 may allow a flow of air to exit the ducts 3630 through an opening 3741 before reaching the leading edge 3604 of the lifting body. Therefore, the bypass valve 3740 may be designed to create additional vertical lift when the flow of air exiting the ducts through opening 3741 is directed downwards. For example, directing a desired flow of air downward from the bypass valve 3740 can directly generate lift which can supplement the lift generated by directing a flow of air across the lifting body 3602, which may increase the net vertical lifting force during the rising phase of the elevator system. The bypass valve 3740 may be on a vertical portion of the duct 3630, on a horizontal portion of the duct 3630, or as shown on an angled or curved portion of the duct 3630.

In some embodiments, a set of propulsion units 3620 (e.g., rotors, propellers, ducted fans, turbofans, and/or the like) may be mounted at the inlet end 3632 of the ducts 3630. The propulsion units 3620 may comprise a plurality of blades 3622 extending from a central hub. In some embodiments, the blades in the propulsion units 3620 may have a variable blade pitch to optimize energy consumption during flight. A motor within each propulsion unit may rotate the blades 3622 via the hub. In some embodiments, each of the propulsion units 3620 may be independently controlled (e.g., different pitch, spin/rotate to generate a flow of air independently of each other, such that each propulsion unit 3620 may generate a different flow level than the others). Independently controlling the propulsion units 3620 may allow each propulsion unit 3620 to rotate at a particular speed or deliver a different amount of air to a section of the leading edge of the lifting body 3602. By configuring the plurality of propulsion units 3620 to rotate the blades 3622 at various, independently controlled speeds, the aerolift system 3601 may, adequately lift and lower the machine structure 3603 and/or moveable component 3605 based on the operating conditions experienced by the aerolift system 3601. Operating the different propulsion units 3620 independently may also be used to stabilize flight, even in a stationary hover, such as to account for turbulence, wind, movement of payloads and/or passengers, and/or the like.

In some embodiments, the one or more propulsion units 3620 may be oriented in a vertical and/or downward facing direction to provide lift to the aerolift system 3601. Other embodiments may orient the propulsion units 3620 angled, vertical, or other orientations. It should be noted that, although various embodiments described herein depict the propulsion units 3620 at the inlet end 3632 of the ducts 3630, other embodiments may position the propulsion units 3620 differently. For example, the propulsion units 3620 may be positioned within the ducts 3630, such as at an intermediate point between the inlet end 3632 and outlet end 3634. The propulsion units 3620 may be equidistantly distributed along a circular path around a central portion and/or lifting body 3602 or may be spaced differently. The series of ducts 3630 may be coupled to each of the propulsion units 3620 and equidistantly spaced or spaced differently. The propulsion units 3620 may be configured, such that a flow of air being drawn into the channels reaches a particular area (e.g., segment) of the lifting body 3602. Therefore, the system 3600 may have the optimal amount of airflow drawn to the entire lifting body (and/or to a substantial portion of the lifting body 3602) to lift/lower the moveable component 3605.

The plurality of propulsion units 3620 may be operated by a controller 212, such as one or more processors, based on user inputs 211 and/or autonomous controller 214 and/or sensors 202 (see, for example, FIG. 10). The plurality of propulsion units 3620 may be coupled to independently controlled motors 230 that are operated to lift the system 3600 upwards or lower the system 3600 downwards (e.g., on or within a building). The motors 230 may operate to spin the plurality of blades 3622 to deliver air to the ducts 3630. The plurality of blades 3622 may be coupled to the hub and to the motor 230, which may be configured to rotate or swivel the hub and the plurality of blades 3622. The plurality of blades 3622 may have a fixed span (e.g., length). In some cases, the plurality of blades 3622 may have a length and/or blade pitch that varies to deliver an optimized flow of air to the ducts 3630. In some embodiments, rotating or swiveling the propulsion units 3620 and therefore the plurality of blades 3622, may vary the blade pitch. Additionally, in some embodiments, the blade pitch may be varied by oil pressure or centrifugal weights which may be attached directly to the plurality of blades 3622. The plurality of blades 3622 may be shrouded in a case which houses the motor 230, blades 3622, and hub. Additionally, the plurality of propulsion units 3620 may each deliver approximately fifty to two-hundred and fifty N of thrust (e.g., spin the blades 3622 at a fast enough speed to generate the desired force). The plurality of propulsion units 3620 may have a diameter of about 12 inches. However, in some cases the diameter of the propulsion units 3620 (e.g., the diameter of the case or shroud) may range from six inches to sixteen inches, from sixteen inches to thirty-two inches, or from thirty-two inches to seventy-two inches.

The plurality of propulsion units 3620 may be coupled to an electric motor (e.g., motors 230) or a piston engine (e.g., powered by fossil fuel). In some embodiments, the propulsion units 3620 may be electric propulsion units capable of delivering up to two-hundred and fifty newtons of thrust at fifteen kW of power. In some embodiments, the propulsion units 3620 may have a casing with an inside diameter of one hundred and ninety-five mm. The casing may, in some embodiments, have an inside diameter between one hundred mm and 300 mm. The total area of the rotating plurality of blades 3622 may be approximately two hundred and fifteen $cm^2$ (e.g., thirty-three $in^2$). The amount of input power may range between four kW and twenty-five kW. Additionally, the static thrust range may be between fifty and three hundred and fifty N. The RPM range of the propulsion units 3620 may be 10,000-18,000 RPM (e.g., the plurality of blades 3622 spin at 10,000-18,000 RPM). The total weight of each propulsion unit 3620 may be between 36000 g to 3400 g (e.g., about 7.5 lbs.).

The lifting body 3602 may be mounted to the outlet 3634 of the ducts 3630 via a series of supports 3648 (e.g., high strength tie rods, axles, cables, and the like). The supports 3648 may also connect to an area adjacent to the leading edge 3604 of the lifting body 3602. By using the supports 3648, the angle of the lifting body 3602 relative to the direction of incoming air from the duct 3630 may be varied. The supports 3648 may be configured to adjust the angle (e.g., angle of attack) of the lifting body 3602 to achieve an amount of lifting force. The supports 3648 may also extend or retract the lifting body 3602 further into or outside of duct 3630. Advantageously, using supports 3648 to couple the lifting body 3602 to the plurality of ducts 3630 may lead to significant weight reduction in the aerolift system 3601. Additionally, in some embodiments, the supports 3648 may further connect the lifting body 3602 to other portions of the aerolift system 3601.

Various embodiments disclosed herein may be configured for a system 3600 which may have a cargo area or moveable component 3605 disposed beneath or within the aerolift system 3601 (see, for example, FIG. 37). However, the disclosures herein may be used for a system 3600 which may be designed to lift persons, items, packages, other payloads, and/or the like within the cargo area (which may also be referred to as a payload compartment, passenger compartment, and the like) at the machine structure 3603. In some embodiments, the system 3600 may be designed to lift 50 lbs., to transport packages from one floor of a building to another floor (e.g., higher or lower floor). Furthermore, the aerolift system 3601 may be designed and sized to hold 2500 lbs. at the machine structure 3603 (e.g., moveable component 3605), which may include a number of individuals and their personal items. In some embodiments, the aerolift system 3601 may be designed lift 25 lbs., 3600 lbs., 500 lbs., 36000 lbs., 2000 lbs., 3000 lbs., 4000 lbs. 5000 lbs. and/or 6000 lbs. located at the moveable component 3605 and/or at the machine structure 3603. Additionally, in some embodiments, the machine structure 3603 can be a freight elevator and can be designed to hold 40,000 lbs. In some embodiments, the freight elevator may be designed to hold 10,000, lbs., 20,000 lbs., 30,000 lbs., 40,000 lbs., 50,0000 lbs., and/or 60,000 lbs.

The system 3600 can be operated according to block diagram 200 (see, FIG. 7). The system 3600 may be used in or with the various other systems described herein, such as aircraft 100, and used with the techniques disclosed herein. The system 3600 may have sensors 202, a receiver 210, the controller 212, a data storage module 213, a transmitter 218, a power source 223, motor driver(s) 222, and motors(s) 230. The sensors 202 in the system 3600 may include at least one of a gyroscope 204, accelerometer 206, magnetometer 208, and/or other sensors 202 (e.g., an optical sensor, thermometer, barometer, altimeter, camera, etc.).

The system may also allow for user input(s) 211 to control various aspect of the system. For example, in the passenger compartment 3660 there may be one or more buttons or control panels which may be operated to lift and/or lower the system 3600.

The controller 212 may also be used to perform certain functions while the device operational. In some embodiments, the data storage module 213 may have programming instructions which may be used to the amount of lift generated by the one or more propulsion units 3620. For example, there may be programmed instructions to indicate to a user that the power source is low on energy and the system 400 need to be shut down for a period of time.

The data storage module 213 may store information and data. The data storage module 213 may have read-only memory for the process to execute programmed functions. The data storage module 213 may also have writeable memory to store various programmed features. The data storage module 213 does not need to have both read-only memory or writeable memory.

The transmitter 218 may be used to receive data from the controller 212 to send the signal to another location (e.g., computer, remote server for storage and/or analysis). For example, the transmitter 218 may be used to send data to a or to a central hub to review/analyze maintenance conditions.

The motor driver 222 may be configured to receive instructions from the controller 212 which may be used to adjust the speed or blade pitch or rotor axis of the various motors 230 coupled to the various propulsion units 3620 of the system 3600. There may be more than one motor driver 222 controlling the motors 230 to assist in the independent operation of each of the propulsion units 3620. The motors 230 are connected to the motor driver 222 and receive instructions from the controller 212 to operate at various speeds to lift the system 3600. Although not shown, a motor driver 222 may be connected to the supports 3648 to move the supports 3648 to different positions to adjust the mount angle of the lifting body 3602.

The power source may also be included in the system 3600 to power each of the components and features of the system 3700. Although no line is drawn from the power source to each component, each component is either directly or indirectly coupled to the power source. The power source 223 may be a direct power connector (e.g. plug with chord) or based on fossil fuel, or electric battery which may be recharged, or live power such as based on solar energy. Additionally, there may be alternative power sources 223 (e.g., solar) which may be used to power the system 3600.

Example Machine System—Elevator

FIG. 37 illustrates an embodiment of a system 3700 for generating movement via aerodynamic lifting forces shown as an elevator system. The system 3700 may cause a passenger compartment 3760 or cab to travel upwards and/or downwards along a central spine 3774. The system 3700 includes components from many of the systems disclosed herein to permit the aerolift system to travel up a central spine 3774. The system 3700 may include one or more aerolift systems 3701A, 3701B, 3701C, such as three as shown, or one, two, four, five, six, seven, eight, nine, ten, or more, and which may include or incorporate many or all of all of the features described in system 200 and aerolift system 3601, or any other system disclosed herein.

The supporting structure is shown as a supporting spine 3774, such as an elevator shaft. The aerolift systems 3701A, 3701B, 3701C are coupled to the central spine 3774. The central spine 3774 may be located inward of the plurality of ducts 3730 and is parallel to a longitudinal centerline of the aerolift systems 3701A, 3701B, 3701C. The aerolift systems 3701A, 3701B, and 3701C may all be coupled to each other and may be configured to travel vertically or translate along the central spine 3774. The bottom system (e.g., aerolift system 3701C) may be directly connected to an elevator cab or payload area or passenger compartment 3760. The passenger compartment 3760 may be capable of containing persons, cargo, and/or other materials. Advantageously, having the multiple aerolift systems 3701A, 3701B, 3701C connected may increase the amount of lift generated and can allow for the system 3700 to operate in smaller spaces. For example, in buildings with smaller elevator shafts, the aerolift systems 3701A, 3701B, 3701C can have a smaller diameter (e.g., outer diameter 3712) and still generate enough lift to travel between floors of a building.

The aerolift systems 3701A, 3701B, 3701C may have a plurality of ducts 3730 (ducts 3730A, ducts 3730B, ducts 3730C). The plurality of ducts 3730 may be spaced annularly around the central spine 3774. An inner wall of the plurality of ducts 3730 may be attached to an outer surface of the central spine 3774. The inner wall of the plurality of ducts 3730 may be slidably or otherwise coupled to reduce the amount of friction between the central spine 3774 and the plurality of ducts 3730 (e.g., pulley, trolley, slide, gears, groove, etc.) The plurality of propulsion units 3720 (e.g., 3720A, 3720B, 3720C) may be positioned near the inlet end 3732 (e.g., 3732A, 3732B, 3732C) of the plurality of ducts 3730. The plurality of propulsion units 3720 may be designed to provide a flow of air which can be used to create a vertical force (e.g., parallel to the longitudinal axis) to lift all of the coupled aerolift systems 3701A, 3701B, 3701C.

The flow of air generated by the plurality of propulsion units 3720 can be delivered to the leading edge (e.g., leading edge 3704A, 3704B, 3704C) of the lifting bodies (e.g., lifting bodies 3702A, 3702B, 3702C) at the exit end (e.g., exit end 3734A, 3734B, 3734C) of the plurality of ducts 3730. The flow of air can travel along the top surface (e.g., top surface 3708A, 3708B, 3708C) and the bottom surface (e.g., bottom surface 3710A, 3710B, 3710C) of the lifting bodies 3702A, 3702B, 3702C. The flow of air traveling along the top surface 3708 from the leading edge 3704A, 3704B, 3704C to the trailing edge 3706A, 3706B, 3706C may flow at a relatively greater speed compared to the air flowing along the bottom surface 3710A, 3710B, 3710C, due to the curved profile of the top surface 3708A, 3708B, 3708C. By having air flowing at a faster speed over the top surface 3708A, 3708B, 3708C relative to the bottom surface 3710A, 3710B, 3710C, the lifting body 3702A, 3702B, 3702C may have lower pressure over the top surface 3708A, 3708B, 3708C relative to the bottom surface 3710A, 3710B, 3710C. Therefore, a pressure differential (e.g., the lower pressure on the top surface 3708A, 3708B, 3708C relative to the higher pressure on the bottom surface 3710A, 3710B, 3710C) may cause a lifting or vertical force to be applied to the lifting body 3702A, 3702B, 3702C to allow the aerolift systems 3701A, 3701B, 3701C to travel upwards along the central spine 3774.

The plurality of propulsion units 3720 may also be configured to stop running or operate at a speed which allows the aerolift systems 3701A, 3701B, 3701C to drop or descend. The plurality of propulsion units 3720 may be configured to create a vertical force which does not exceed the gravitational force of the aerolift systems 3701A, 3701B, 3701C and the aerodynamic forces exerted on the system. The plurality of propulsion units 3720 may have plurality of blades 3722A, 3722B, 3722C which rotate slower when the aerolift systems 3701A, 3701B, 3701C are descending than when the aerolift systems 3701A, 3701B, 3701C are traveling upwards (e.g., rising, lifting).

In some embodiments, the system 3700 may include three aerolift systems each coupled together (e.g., aerolift system 3701A, aerolift system 3701B, aerolift system 3701C). However, in some embodiments, the system 3700 may contain anywhere from one to six aerolift systems (or more in some embodiments). The lifting body 3702 (e.g., 3702A, 3702B, 3702C) may have an outer diameter 3712 and an inner diameter 3712. The ratio of the outer diameter 112 to the inner diameter 3714 may be 2:1 or greater, 3:1 or greater, 4:1 or greater, about 3:1, or about 4:1. The outer diameter 3712 of the lifting body 3702 may be approximately thirty feet and the inner diameter may be about ten feet. Additionally, in some embodiments, the outer diameter 3712 of the lifting body 3702 may be between twenty feet to sixty feet. In smaller versions of the system 3700, the inner diameter 3714 may be from one to ten inches, and the outer diameter 112 may be from three to fifty inches. Additionally, each of aerolift systems 3701A, 3701B, 3701C may be sized differently (e.g., have different lifting body diameters). Advantageously, by having a variety of lifting body diameters (e.g., outer diameter 3712) the amount of energy required to operate the system 3700 may be reduced.

The lifting bodies (e.g., lifting body 3702A) may be independently rotatable or actuatable. The angle of each lifting body (e.g., lifting body 3702A) in the system 3700 may be able to change independently of another lifting body (e.g., lifting body 3702B) to achieve a desired lifting or vertical force to move the systems up the central spine 3774. In some embodiments, the systems 3701A, 3701B, and 3701C may be coupled to a set of rollers positioned on an outside surface of the central spine 3774 which may allow the aerolift systems 3701A, 3701B, 3701C to freely slide along the central spine 3774.

Advantageously, the aerolift systems 3701A, 3701B, 3701C may not require a machine room to travel up and down a building (when compared to current cable or hydraulic based elevator systems). Since the plurality of propulsion units 3720 are positioned within the aerolift systems 3701A, 3701B, 3701C and may be configured to lift and lower the system 3700, a machine room may be unnecessary. Additionally, by using the aerolift systems 3701A, 3701B, 3701C, no oils and/or pistons may be necessary to lift and lower the aerolift systems 3701A, 3701B, 3701C and or passenger compartment 3760 up the central spine 3774. Advantageously, this can reduce maintenance costs due to replacement parts, routine upkeep, or staffing. Additionally, the aerolift systems 3701A, 3701B, 3701C can be attached externally to buildings (see, for example, FIG. 40A). Having aerolift systems 3701A, 3701B, 3701C positioned externally may allow for the floorplan of a building to include more offices, apartments, rooms, etc. Additionally, for other external structures, like construction sites, system 3700 can be attached to the side of beams to translate the passenger compartment 3760 (e.g., or other item, device, car, construction item, etc.) up and down the beams. In some embodiments, the wing 102 may have ailerons 115 mounted on the top surface 108 near the trailing edge 106

Figure 38:
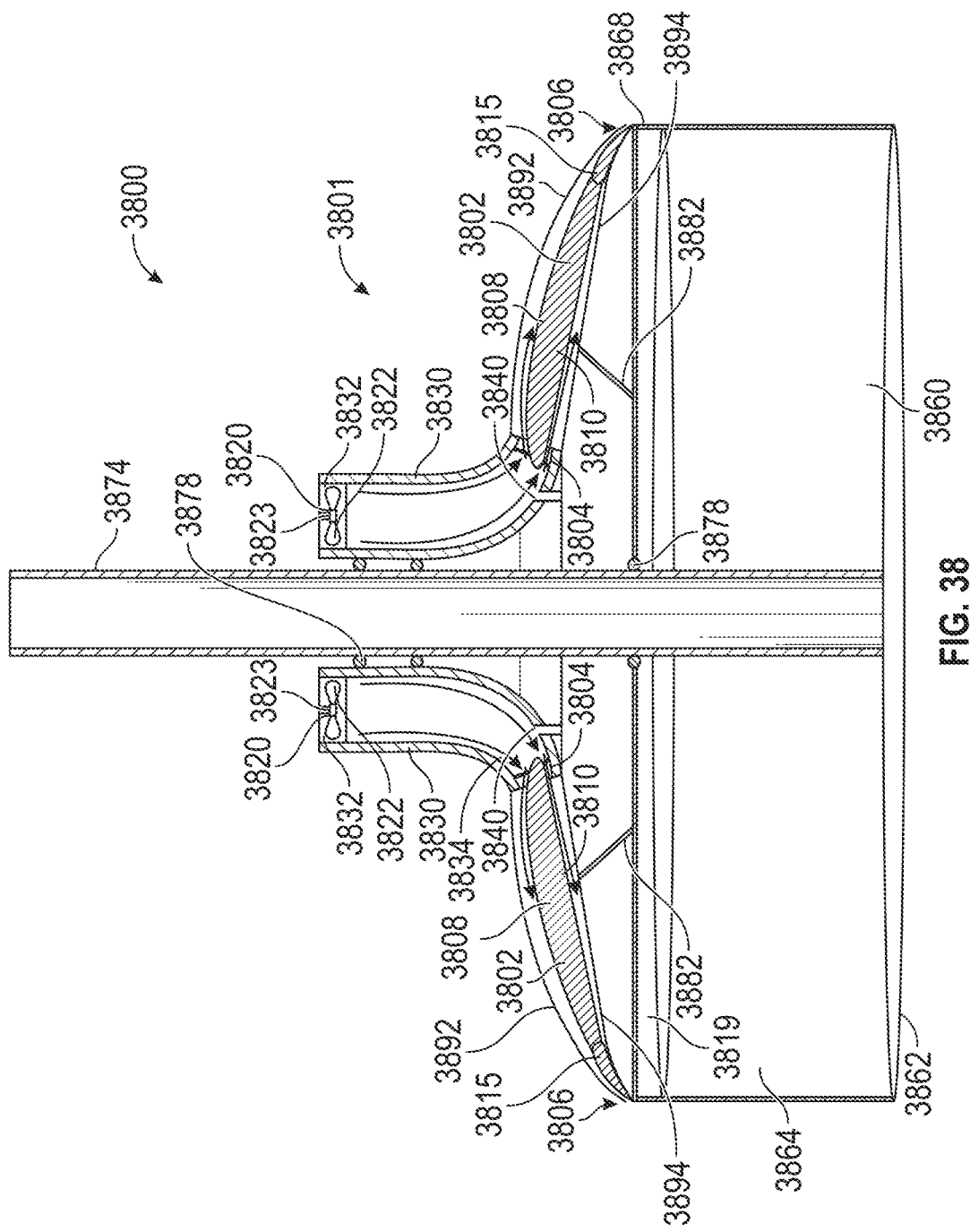
FIG. 38 illustrates a cross-sectional view of an embodiment of a system for generating movement via aerodynamic lifting forces shown as an elevator lift system.

FIG. 38 illustrates an additional embodiment of a system 3800 for generating movement via aerodynamic lifting forces shown as an elevator system. The system 3800 may have many or all of the same or similar features as system 3700, or any other system disclosed herein, and the same reference numbers are used to refer to the same features. The system 3800 may include a plurality of gears 3878 configured to lift and lower the passenger compartment 3860 along the central spine 3874. The plurality of gears 3878 may be coupled to an internal portion of the aerolift system 3801 and may be positioned internally to the ducts 3830. Advantageously, having the plurality of gears 3878 coupled to the system 3800 can efficiently lift and lower the system along the central spine 3874.

The aerolift system 3801 may have a plurality of ducts 3830. The plurality of ducts 3830 may be spaced annularly around the central spine 3874. An inner wall of the plurality of ducts 3830 may be attached to an outer surface of the central spine 3874. The plurality of propulsion units 3820 may be positioned near the inlet end 3832 of the plurality of ducts 3830. The plurality of propulsion units 3820 may be designed to provide a flow of air which can be used to create a vertical force (e.g., parallel to the longitudinal axis) to lift the aerolift system 3801.

The flow of air generated by the plurality of propulsion units 3820 can be delivered to the leading edge 3804 of the lifting bodies 3802 at the exit end 3834 of the plurality of ducts 3830. The flow of air can travel along the top surface 3808 and the bottom surface 3710 of the lifting bodies 3802. The flow of air traveling along the top surface 3808 from the leading edge 3804 to the trailing edge 3806 may flow at a relatively greater speed compared to the air flowing along the bottom surface 3810, due to the curved profile of the top surface 3808. By having air flowing at a faster speed over the top surface 3808 relative to the bottom surface 3810, the lifting body 3802 may have lower pressure over the top surface 3808 relative to the bottom surface 3810. Therefore, a pressure differential (e.g., the lower pressure on the top surface 3808 relative to the higher pressure on the bottom surface 3810) may cause a lifting or vertical force to be applied to the lifting body 3802 to allow the aerolift system 3801 and passenger compartment 3860 to travel upwards along the central spine 3874.

The plurality of propulsion units 3820 may also be configured to stop running or operate at a speed which allows the aerolift system 3801 to drop or descend. The plurality of propulsion units 3820 may be configured to create a vertical force which does not exceed the gravitational force of the aerolift system 3801 and the aerodynamic forces exerted on the system. The plurality of propulsion units 3820 may have plurality of blades 3822 which rotate slower when the aerolift system 3801 is traveling upwards (e.g., rising, lifting).

The plurality of gears 3878 may be configured to guide the system 3800 along the central spine 3874. For example, the plurality of gears 3878 may allow the system 3800 to travel upwards when a flow of air is delivered to the aerolift system 3801 by the plurality of propulsion units 3820. When a lifting force is applied to the lifting body 3802 via the plurality of propulsion units 3820, the plurality of gears 3878 can engage the central spine 3874 to translate the aerolift system 3801 upwards. In some embodiments, the plurality of gears 3878 can engage the central spine 3874 to prevent the aerolift system 3801 from traveling upwards or downwards when a desired height and or floor of a building is reached. The plurality of gears 3878 may allow the aerolift system 3801 to travel downwards when a flow of air is not delivered to or reduced to the plurality of ducts 3830.

In some embodiments, the aerolift system 3801 may contain anywhere from one lifting body and duct system to six lifting bodies and duct systems (or more in some embodiments). The lifting body 3802 may have an outer diameter 3812 and an inner diameter 3812. The ratio of the outer diameter 3812 to the inner diameter 3814 may be 2:1 or greater, 3:1 or greater, 4:1 or greater, about 3:1, or about 4:1. The outer diameter 3812 of the lifting body 3802 may be approximately thirty feet and the inner diameter may be about ten feet. Additionally, in some embodiments, the outer diameter 3812 of the lifting body 3802 may be between twenty feet to sixty feet. In smaller versions of the aerolift system 3801, the inner diameter 3814 may be from one to ten inches, and the outer diameter 3812 may be from three to fifty inches.

FIG. 39 illustrates an additional embodiment of a system 3900 for generating movement via aerodynamic lifting forces shown as an elevator system. The lift system 3900 may have many or all of the same or similar features as system 3700 or 3800, or any other system disclosed herein, and the same reference numbers are used to refer to the same features. The system 3900 may include a passenger compartment 660 detached from the system 3900. In some embodiments, the aerolift system 3601 can be configured to translate the passenger compartment 3960 along a belt 3974 coupled to a plurality of gears 3978. The belt 3974 can be attached to a top portion 3964 of the passenger compartment 3960.

The aerolift system 3901 may have a plurality of ducts 3930. The plurality of ducts 3930 may be spaced annularly around the belt 3974 and plurality of gears 3978. The plurality of propulsion units 3920 may be designed to provide a flow of air which can be used to create a vertical force (e.g., parallel to the longitudinal axis) to lift the aerolift system 3901. When the aerolift system 3901 begins to lift, the plurality of gears 3978 attached to the aerolift system 3901 may drive the belt 3974 upwards and correspondingly lift the passenger compartment 3960. When the aerolift system 3901 begins to descend, the plurality of gears 3978 attached to system 3900 may drive the belt 3974 downwards and lower the passenger compartment.

Figure 40A:
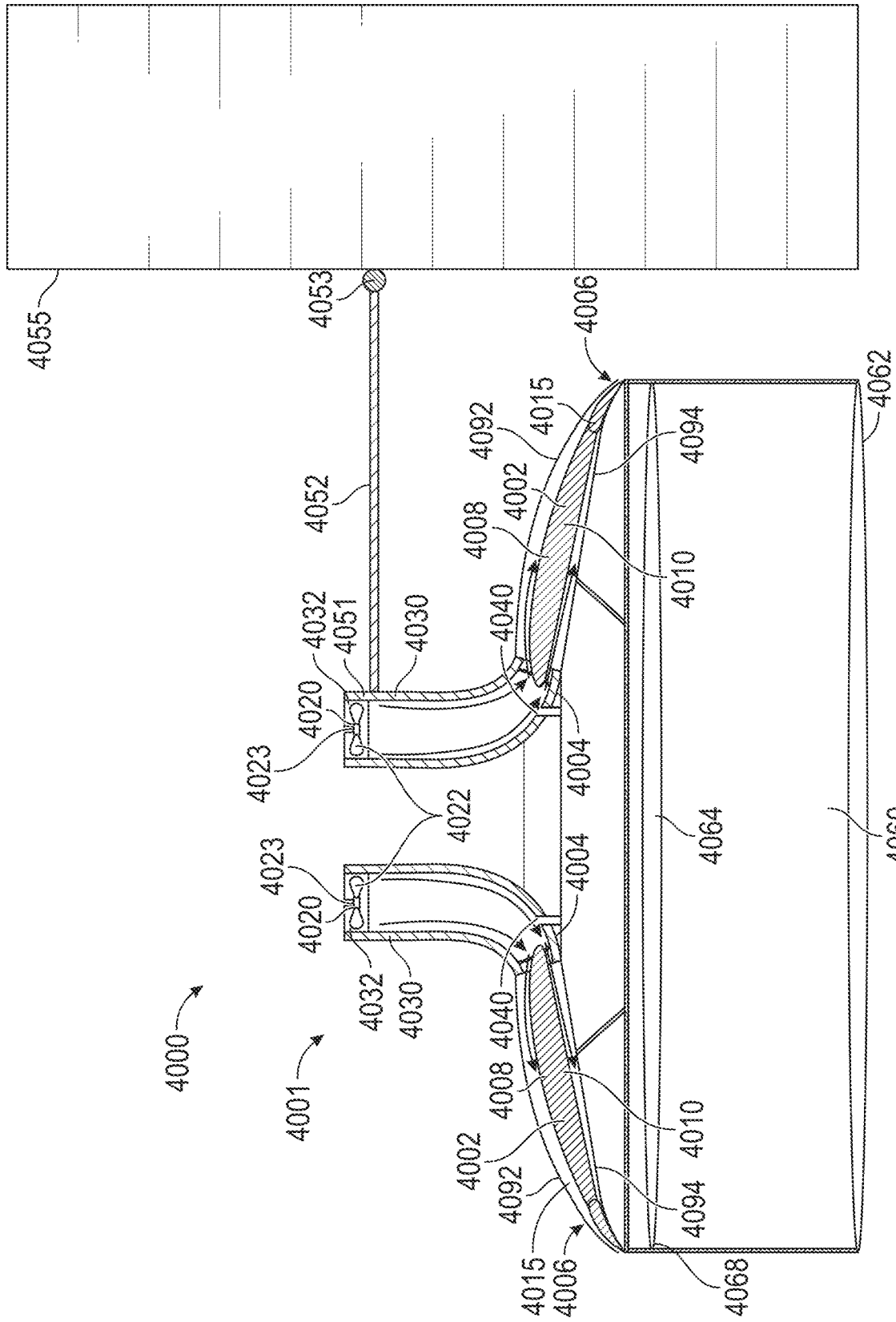
FIG. 40A illustrates a cross-sectional view of an alternative embodiment of the aerolift system including the airflow ducts and the lifting body of FIG. 36A, coupled to a building.
Figure 40B:
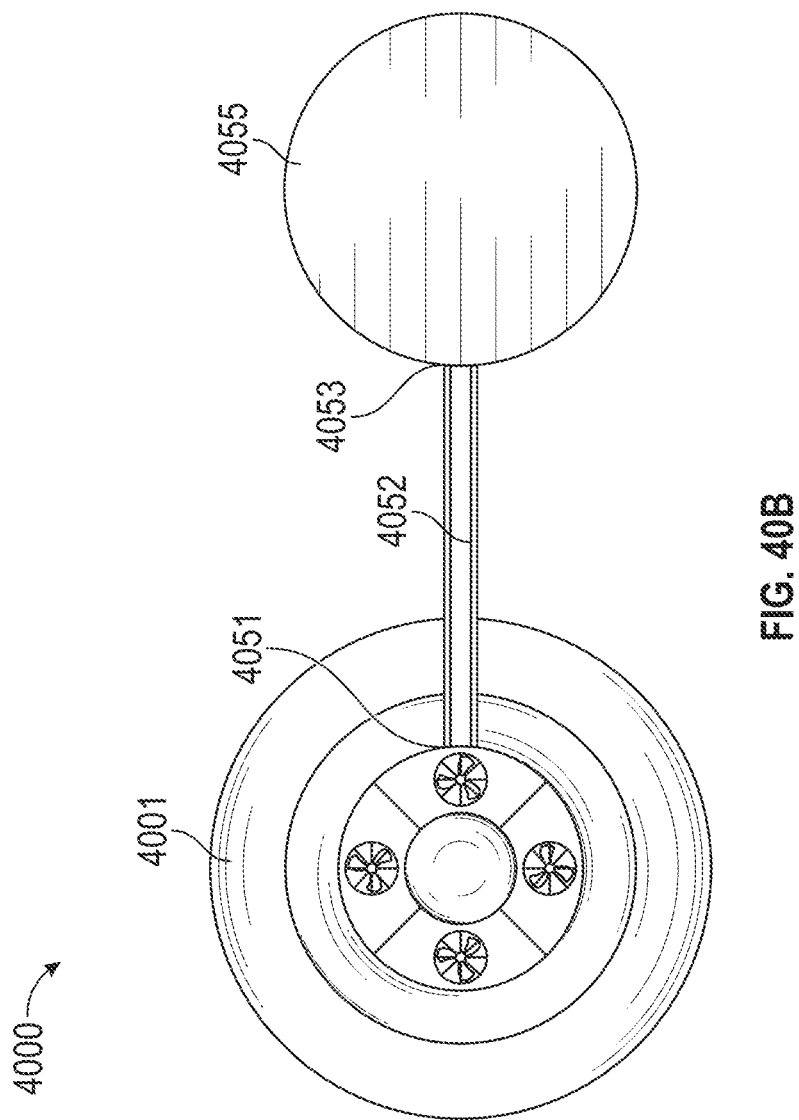
FIG. 40B illustrates a top view of an alternative embodiment of the aerolift system including the airflow ducts and the lifting body of FIG. 36A, coupled to a building.

FIGS. 40A-40B illustrate an additional embodiment of a system 4000 for generating movement via aerodynamic lifting forces shown as an elevator system. The lift system 4000 may have many or all of the same or similar features as system 3700, or any other system disclosed herein, and the same reference numbers are used to refer to the same features. The aerolift system 4001 may be externally coupled to a building. Additionally, the passenger compartment 4060 may be directly coupled to the system 4000.

The aerolift system 4001 may have a plurality of ducts 4030 and a plurality of propulsion units 4020. The plurality of propulsion units 4020 may be positioned near the inlet end 4032 of the plurality of ducts 4030. The plurality of propulsion units 4020 may be designed to provide a flow of air which can be used to create a vertical force (e.g., parallel to the longitudinal axis) to lift the aerolift system 4001 and passenger compartment 4060. An outer wall of the plurality of ducts 4030 may be attached (e.g., fixed) at a first position 4051 to a connector 4052 which can couple the aerolift system 4001 to the building 4055. The connector 4052 may couple to the wall or building 4055 via a trolley 4053 or other suitable method (e.g., railing, slot, etc.) for translating the aerolift system 4001 and passenger compartment 4060 upwards and downwards. Advantageously, this can allow the aerolift system 4001 to easily connect to already built structures to permit vertical lift. Additionally, the building 4055 can be any suitable structure which requires a vertical lifting system (e.g., building, beam structure, skyscraper, etc.).

FIG. 41 illustrates an additional embodiment of a system 4100 for generating movement via aerodynamic lifting forces shown as an elevator system. The lift system 4100 may have many or all of the same or similar features as system 3700, or any other system disclosed herein, and the same reference numbers are used to refer to the same features. The aerolift system 4101 may be internally coupled to a leftmost side or a rightmost side of a building 4155. Advantageously, positioning the aerolift system 4101 at a side of the building 4155 may allow the building 4155 to have more available space in a middle or medial area.

Figure 42:
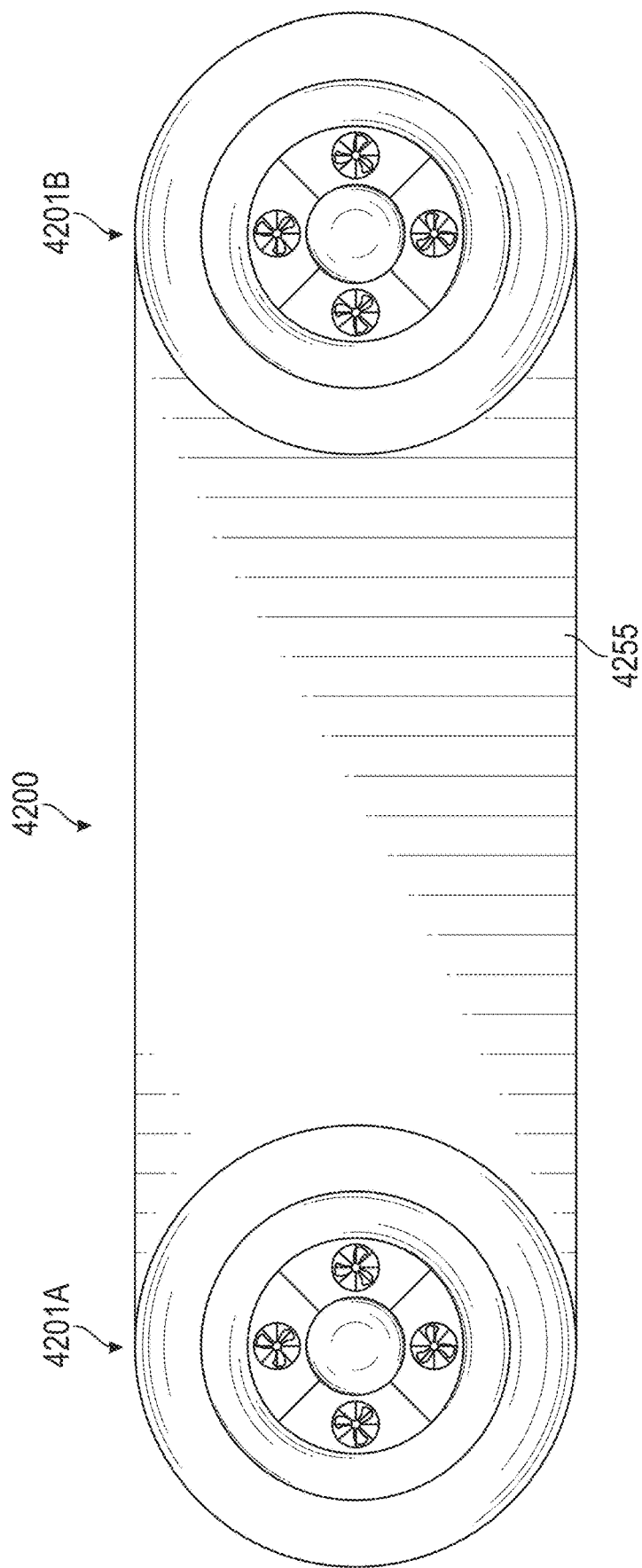
FIG. 42 illustrates a top view of an alternative embodiment of two of the aerolift systems, including the airflow ducts and the lifting body of FIG. 36A, integrated at two ends of a building.

FIG. 42 illustrates an additional embodiment of a system 4200 for generating movement via aerodynamic lifting forces shown as an elevator system. The system 4200 may have many or all of the same or similar features as system 3700, or any other system disclosed herein, and the same reference numbers are used to refer to the same features. Multiple aerolift systems (e.g., 4201A and 4201B) may be internally coupled to a building 4255. The aerolift systems 4201A and 4201B may be coupled at the leftmost and rightmost portions of the building 4255. Advantageously, positioning aerolift systems 4201A and 4201B and the leftmost and rightmost portions can allow the building 4255 to have more available space in a middle or medial area.

Methods of Operation

Figure 43:
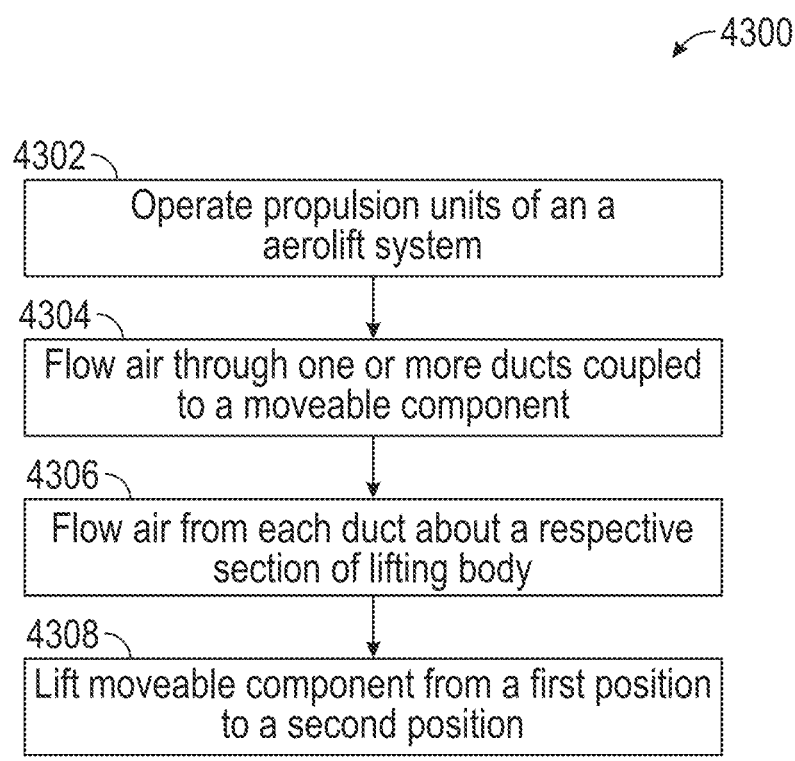
FIG. 43 illustrates a flow chart diagram of an embodiment of a process for operating the lift system with a plurality of propulsion units and airflow ducts.

FIG. 43 illustrates a flow chart diagram 4300 for one embodiment of a process for the system 3600 disclosed herein. The lift system 3600 may have many or all of the same or similar features as any other system disclosed herein, and the same reference numbers are used to refer to the same features. Blocks 4302-4306 generally relate to operating propulsion units 3620 of the system 3600. At block 4302, the propulsion units 3620 may be powered on so that they may generate a flow of air for vertical lift or for vertical descent. At block 4304, the flow of air generated from the propulsion units 3620 may flow through the ducts 3630. The ducts 3630 may be distributed annularly about a central longitudinal axis of the system 3700. At block 4306, the flow of air from each duct 3630 may flow to the leading edge 3604 of a respective region (e.g., section) of the lifting body. At block 4308, the system 3600 may move from a first position to a second position. The first position may be higher than the second position. Alternatively, the first position may be lower than the second position.

Additional Lifting Body Examples

Figure 44:
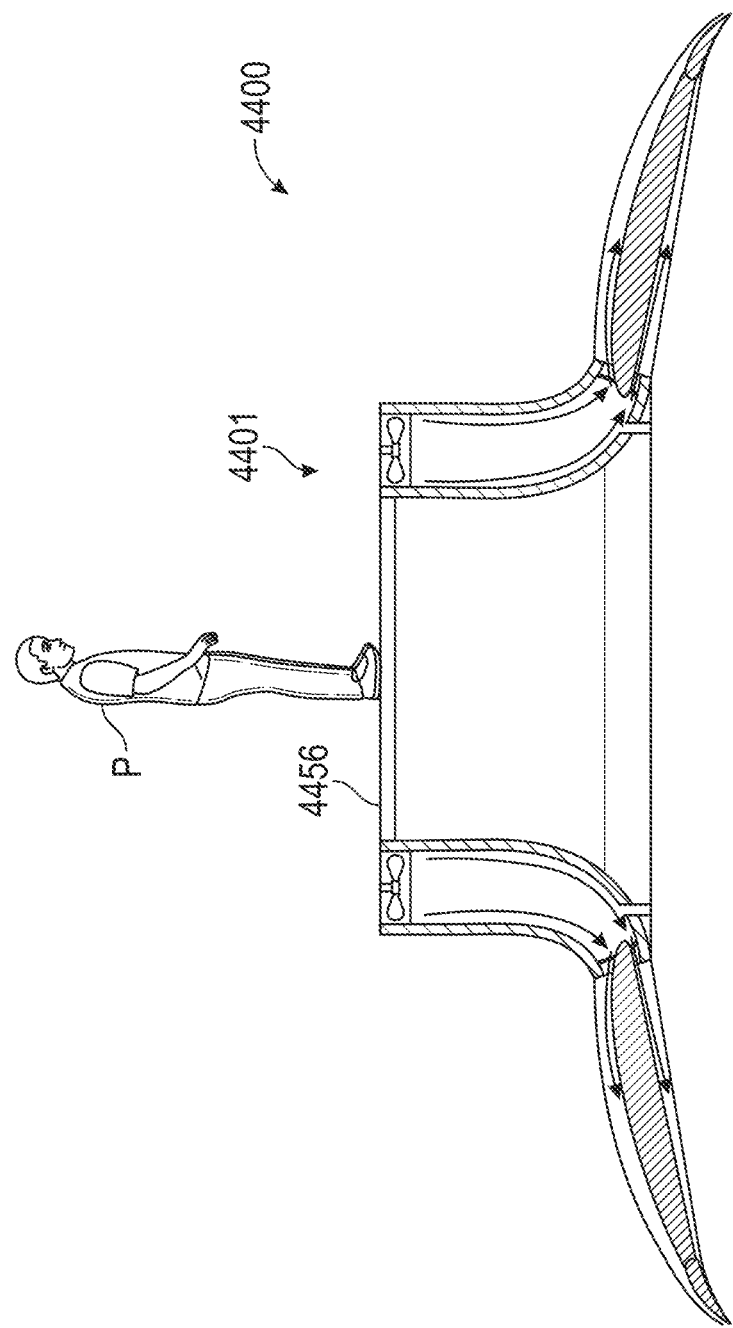
FIG. 44 illustrates a cross-sectional view of an alternative embodiment of the aerolift system including the airflow ducts and the lifting body of FIG. 36A, with a lift platform for supporting a payload thereon, such as a human.

FIG. 44 illustrates an additional embodiment of a system 4400 for generating movement via aerodynamic lifting forces shown as an elevator system. The lift system 4400 may have many or all of the same or similar features as system 3700, or any other system disclosed herein, and the same reference numbers are used to refer to the same features. The aerolift system 4401 may be coupled to a lift platform 4456. Advantageously, coupling the aerolift system 4401 to a lift platform 4456 may allow a user or person P to travel vertically without a supporting structure. For example, a user may stand on the lift platform 4456 and be transferred from a first location to a second location, where the second location can be a higher location than the first location. Additionally, the system 4400 may be capable of transferring a user from the second, higher location to a lower location while the user is on the lift platform 4456.

Figure 45:
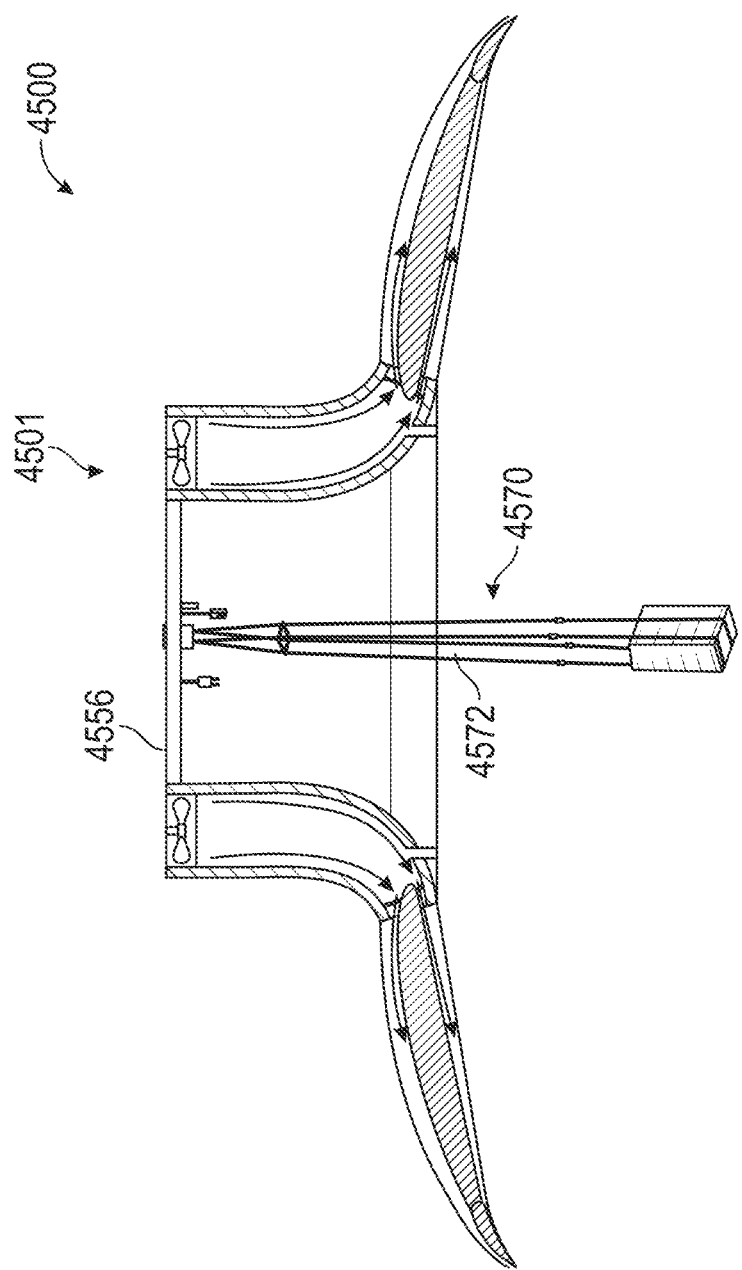
FIG. 45 illustrates a cross-sectional view of an alternative embodiment of the aerolift system including the airflow ducts and the lifting body of FIG. 36A, with a system for lifting and carrying a payload such as objects or packages.

FIG. 45 illustrates an additional embodiment of a system 4500 for generating movement via aerodynamic lifting forces shown as an elevator system. The system 4500 may have many or all of the same or similar features as system 3700, or any other system disclosed herein, and the same reference numbers are used to refer to the same features. The system 4500 is coupled to a lift and carry system 4570. The lift and carry system 4570 may include one or more cables 4572 which are coupled to a platform 4556 of the lift and carry system 4570. Advantageously, the lift and carry system 4570 may support a package (e.g., cargo, payload, materials, etc.) to transfer the package to a desired location. For example, the system 4500 may be capable of delivering a package to a higher floor of a building or structure. Additionally, the lift and carry system 4570 may be capable of holding packages weighing 50 lbs. The lift and carry system 4570 may also be designed to lift 25 lbs., 100 lbs., 500 lbs., 1000 lbs., 2000 lbs., 3000 lbs., 4000 lbs., 5000 lbs., 6000 lbs. or more.

Additional Example Aerolift Features and Aircraft Embodiments

Figure 46A:
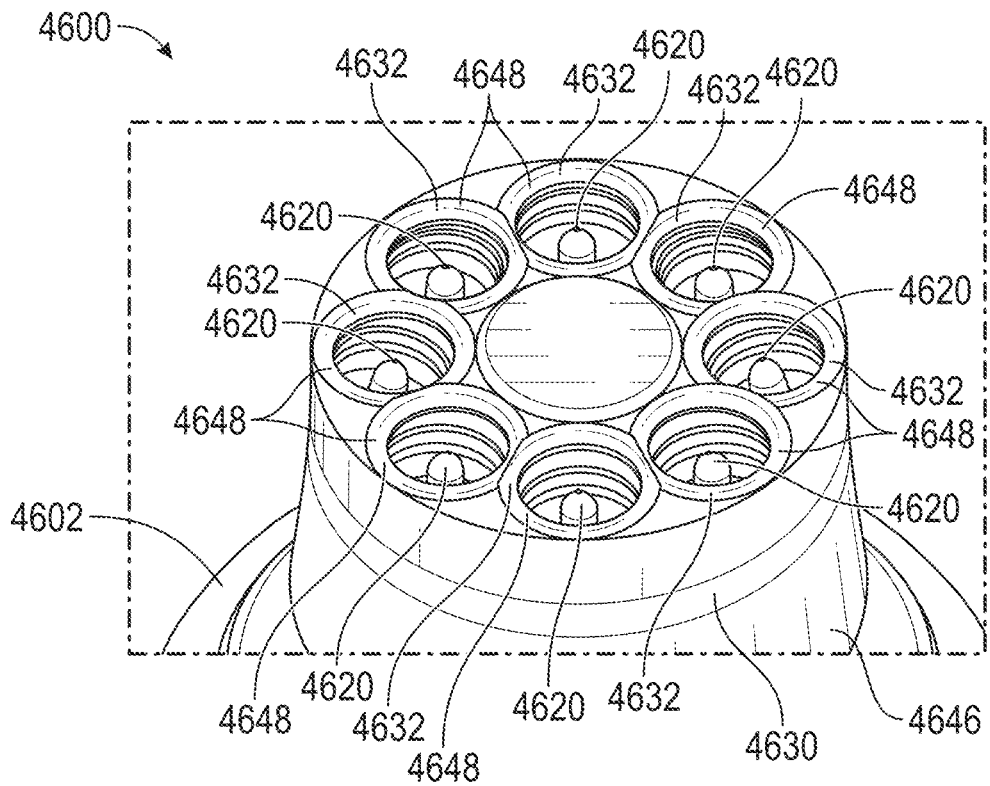
FIG. 46A illustrates a perspective detail view of another embodiment of an aircraft having one or more wings, one or more ducts, and one or more propulsion units spaced about the aircraft.
Figure 46B:
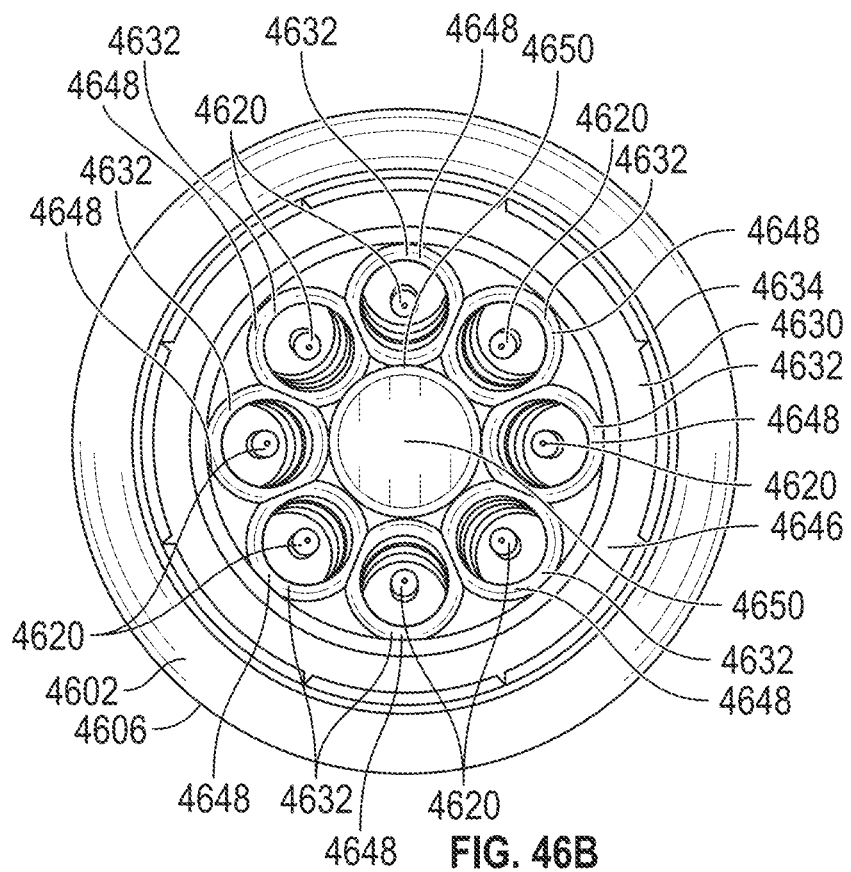
FIG. 46B illustrates a top view of the aircraft of FIG. 46A.

FIGS. 46A-46B illustrate perspective and top views respectively of additional embodiments of an aircraft 4600 and components thereof that includes the aerolift system. The aircraft 4600 may have many or all of the same or similar features as aircraft 100, or any other aircraft disclosed herein, or vice versa, and the same reference numbers are used to refer to the same features. The aircraft 4600 may utilize entry lips 4648 which may provide a smooth transition surface for air to flow into the inlet end 4632 of the ducts 4630, among other features as described herein.

The plurality of propulsion units 4620 are configured to deliver a flow of air from the inlet end 4632 to the outlet end 4634 of the plurality of ducts 4630 and to a lifting body shown as an airfoil 4602. The plurality of propulsion units 4620 may, for example, be from ten inches to 30 inches or from 15 inches to 25 inches or a 20 inch (in) diameter, ducted fan (although any other suitable propulsion unit sizes may also be used for a given application). The plurality of propulsion units 4620 may be designed to generate thrust at the inlet end 4632 of the plurality of ducts 4630 to deliver a flow of air to the airfoil 4602 and to the trailing edge 4606. The propulsion units 4620 may be aligned with the opening or axis of the inlet end. In some embodiments, the propulsion unit 4620 may be angled or canted with respect to the opening or axis of the inlet end, as described in further detail herein, for example with respect to FIGS. 51A and 51B.

The plurality of ducts 4630 may also have an outer wall 4646. The outer wall 4646 may define an outer boundary for the flow of air through the duct 4630. The outer wall 4646 may define a profile. The profile may be configured to maintain or optimize the airflow velocity at the outlet end 4634 (e.g., reduce the amount of airflow, thrust, and/or power lost due to the plurality of ducts 4630 turning between the inlet end 4632 and the outlet end 4634). For example, the outer wall 4646 may have a curved profile which may be designed to reduce frictional forces exerted on the flow of air (e.g., which may reduce the airflow velocity at the outlet end 4634 and which may deliver a slower flow of air to the airfoil 4602). The outer wall 4646 may be contoured so that a middle area of the plurality of ducts 4630 have a larger cross-sectional area than the inlet end 4632 and a smaller cross-sectional area than the outlet end 4634.

The aircraft 4600 may be capable of holding a passenger and/or cargo, where the passenger and cargo may weigh approximately 250 lbs total. The aircraft 4600 may also weigh approximately 1,000 lbs. The aircraft 4600 may weigh between 850 lbs. and 1500 lbs. In some embodiments, the aircraft 4600 may be capable of carrying a passenger and cargo weighing up to or approximately 1,000 lbs total. The passenger and cargo may be stored in the central body 4650.

Figure 46C:
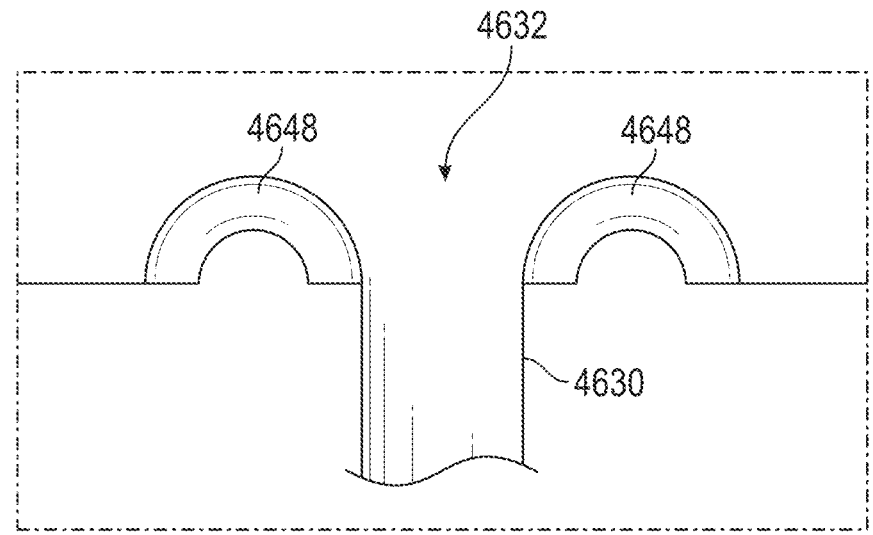
FIGS. 46C and 46D show close up partial views of embodiments of the inlet ends having inlet lips that protrude and inlet lips that are flush with the inlet end, respectively.
Figure 46D:
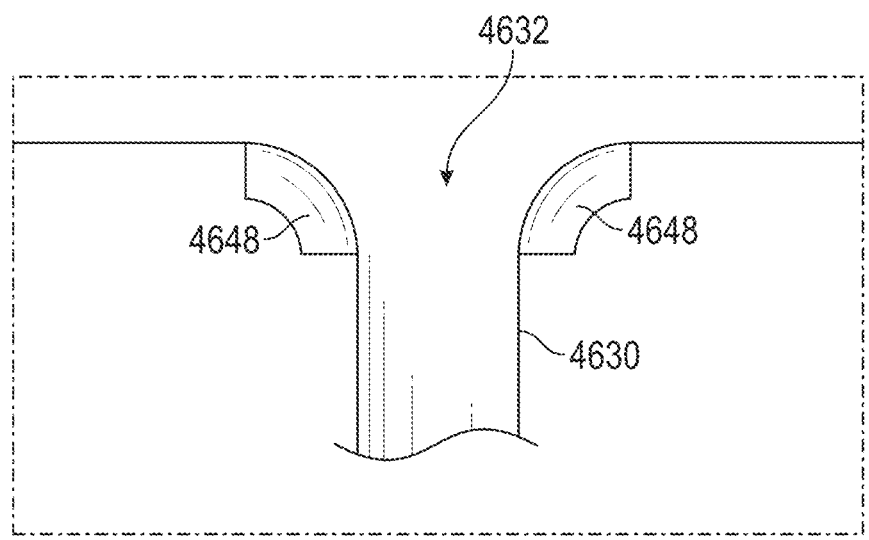

FIGS. 46C and 46D show close up partial views of embodiments of the inlet end 4632 of the duct 4630 having inlet lips 4648. The inlet lip 4648 in FIG. 46C protrudes above the inlet end 4632, while the inlet lip 4648 of FIG. 46D is even with the inlet end 4632. The inlet lips 4648 may provide a smooth transition surface for air to flow into the inlet ends 4632. The inlet lip 4648 may be an inwardly curving lip, which may provide for improved airflow from the inlet end 4632 to the middle area of the duct and to the outlet end 4634. The inlet lip 4648 can be curved inwardly (e.g., curved in the direction of the flow of air into the duct 4630) to simplify manufacturing of the duct 4630. As shown in FIG. 46D, the topmost portion of the inlet lip 4648 may be level (e.g., an equivalent vertical height) with the topmost portion of inlet end 4632 of the plurality of ducts 4630 before curving into the inlet end 4632. As shown in FIG. 46C, in some embodiments, the inlet lip 4648 may protrude upwardly above the inlet end 4632 to create a "bump" at the inlet. In either case, the inlet lip 4648 may be designed to provide for a better conditioned or more laminar flow of air into the duct 4630. A flow of air from the inlet lip 4648 through the inlet end 4632, through the one or more ducts 4630, and through the outlet end 4634 can have improved lift characteristics relative to ducts 4630 without an inlet lip 4648. For example, the inlet lip 4648 can provide increased performance of a propulsion unit (e.g., propulsion units 4620) compared to one or more ducts 4630 without an inlet lip 4648. In some embodiments, the performance of a propulsion unit coupled to one or more ducts 4630 with an inlet lip 4648 can be approximately 20%-40% greater than those without an inlet lip 4648. The inlet lip 4648 may have an elliptical cross-section extruded about the opening of the inlet end. In some embodiments, the inlet lip 4648 may be circular, rounded, airfoil-shaped, other smooth rounded shapes or contours, or combinations thereof. In some embodiments, the inlet lip 4648 may be on a canted inlet end of the duct, or the inlet lip 4648 may be horizontal but with a canted propulsion unit therein, as further described herein for example with respect to FIG. 51A, which may improve airflow from the inlet end 4632 to the outlet end 4634 (e.g., less turbulent airflow).

Figure 47A:
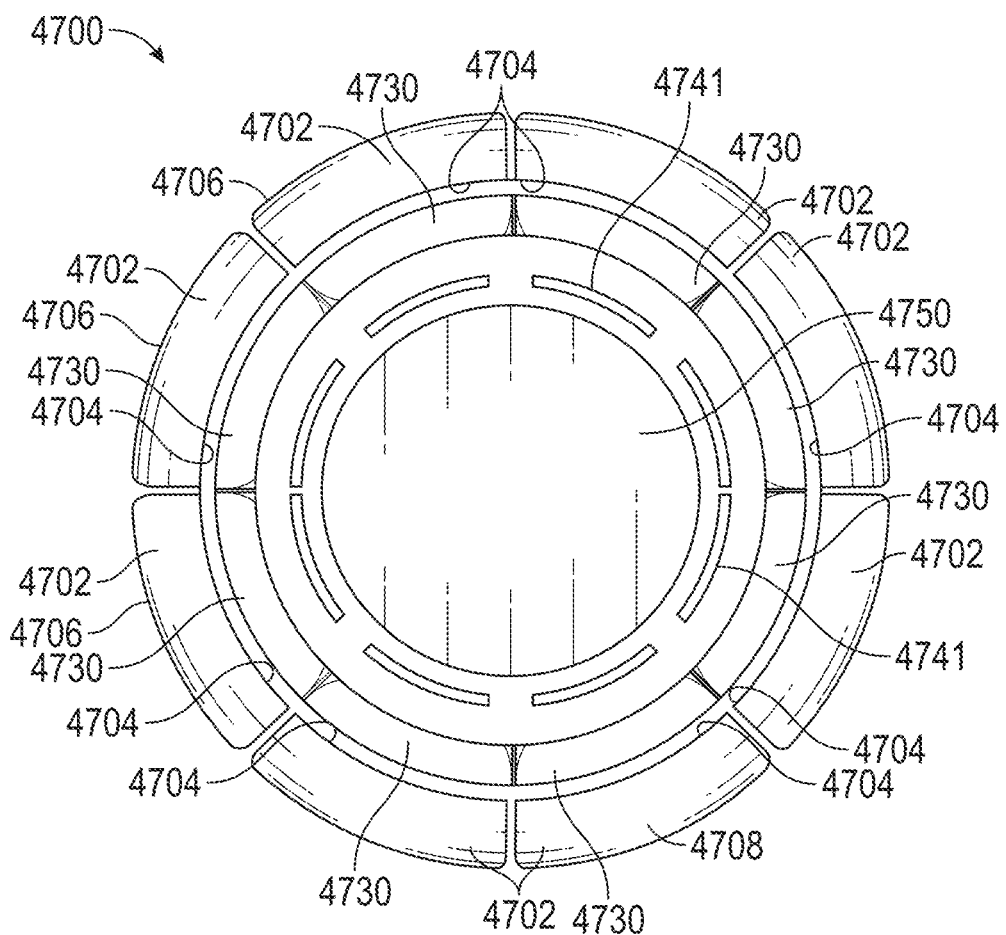
FIG. 47A illustrates a top view of another embodiment of an aircraft having one or more ducts and one or more bypass vents to direct a flow of air outside of the of the one or more ducts before reaching an outlet end of the one or more ducts.
Figure 47B:
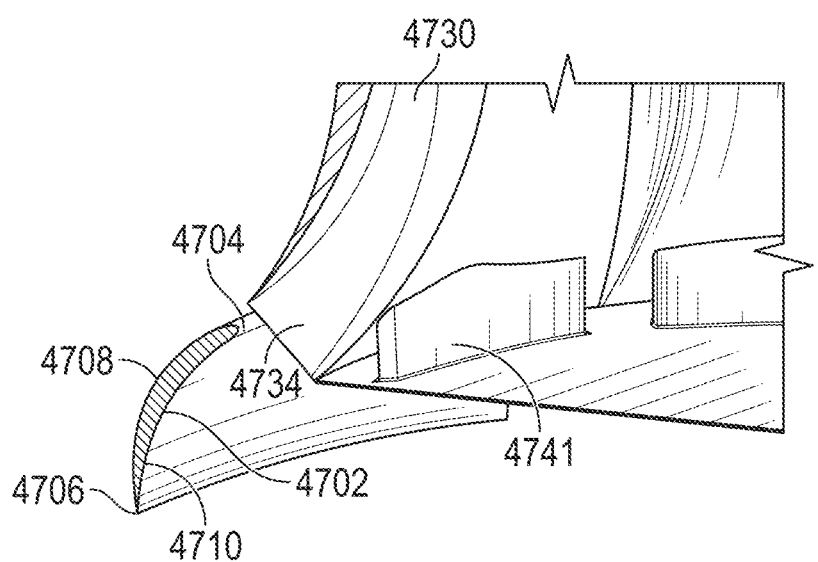
FIG. 47B illustrates a perspective detail view of the outlet end of one of the ducts of FIG. 47A.

FIGS. 47A-47B illustrate bottom and partial cross-sectional view respectively of an additional embodiment of an aircraft 4700 and components thereof having the aerolift system. The aircraft 4700 may have many or all of the same or similar features as aircraft 100, or any other aircraft disclosed herein, and the same or similar reference numbers are used refer to the same or similar features. The aircraft 4700 may have a plurality of ducts 4730 and a central body such as a payload 4750 as shown, which may contain a payload compartment, passenger area, cockpit, and/or the like. In the aircraft 4700 one or more openings or bypass vents 4741 may be able to direct a flow of air, which entered the ducts 4730 through the inlet end 4732, to an area outside of the ducts 4730 before the flow of air would have reached the outlet end 4734 of the ducts 4730. There may be eight vents 4741 as shown (for clarity, only one of the vents 4741 is labelled). The vents 4741 may be rounded, elongated slits in the bottom or radially inward surfaces of one or more of the ducts 4730. In some embodiments, the vents 4741 may be in the top or radially outward surfaces of the one or more ducts 4730. The vents 4741 may be in lateral portions of the duct located in between radially inward and outward surfaces. The vents 4741 may be within one, some or all of these locations.

A flow of air (e.g., flow of environmental air) may be delivered to the leading edge 4704 of the wing 4702 from the outlet end 4734 of each of the ducts 4730. The flow of air may first be delivered to the leading edge 4704 and travel over the top surface 4708 and the bottom surface 4710. The flow of air traveling from the leading edge 4704 to the trailing edge 4706 along the top surface 4708 may flow at a relatively greater speed, compared to air flowing along the bottom surface 4710. The flow of air from the leading edge 4704 to the trailing edge 4706 along the bottom surface 4710 may flow at a relatively lower speed, compared to air flowing along the top surface 4708. The pressure differential between the bottom surface 4710 and the top surface 4708 may cause a lifting force to be applied upward to the wing 4702, which is transferred to the aircraft 4700.

The opening or bypass vent 4741 may provide a flow channel from an interior of the duct to an external region of the ducts 4730. The ducts 4730 may have a bypass vent 4741 which may extend from a lower portion of the ducts 4730 (e.g., adjacent to the outlet end 4734). The bypass vents 4741 may be positioned on the ducts 4730 in order to direct a flow of air downward and outside of the ducts 4730 before reaching the outlet end 4734 and the leading edge 4704 of the wing 4702. The bypass vents 4741 may prevent pressure buildup which may occur at the outlet end 4734. Additionally, the bypass vents 4741 may prevent the flow of air leaving the outlet end 4734 from circling around (e.g., recirculation) at the outlet end 4734 which may also lead to increased pressure at the outlet end 4734. Advantageously, positioning bypass vents 4741 along the ducts 4730 can improve the lift characteristics of the aircraft 4700. The downward flow of air through the vents 4741 may provide additional lift to the system.

Figure 48A:
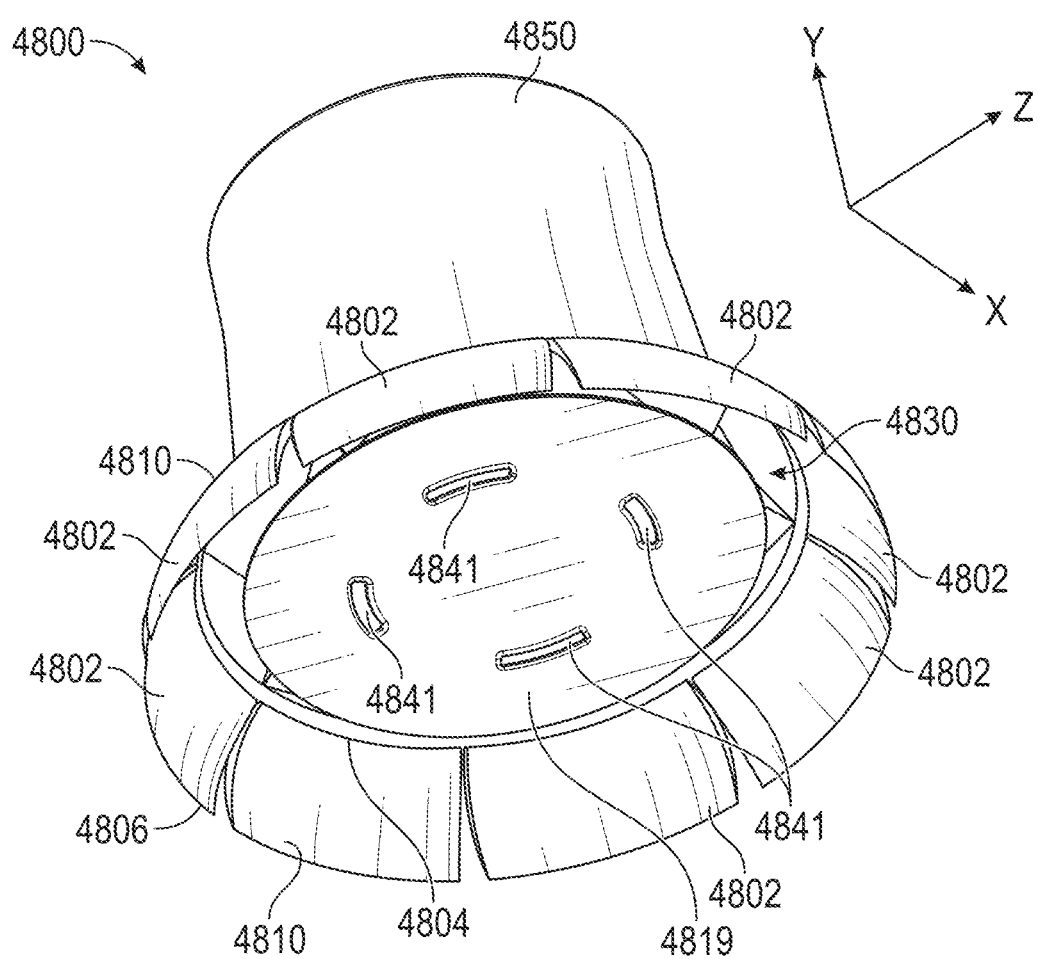
FIG. 48A illustrates a bottom perspective view of another embodiment of an aircraft having one or more ducts and one or more bypass vents to direct a flow of air outside of the of the one or more ducts before reaching an outlet end of the one or more ducts.
Figure 48B:
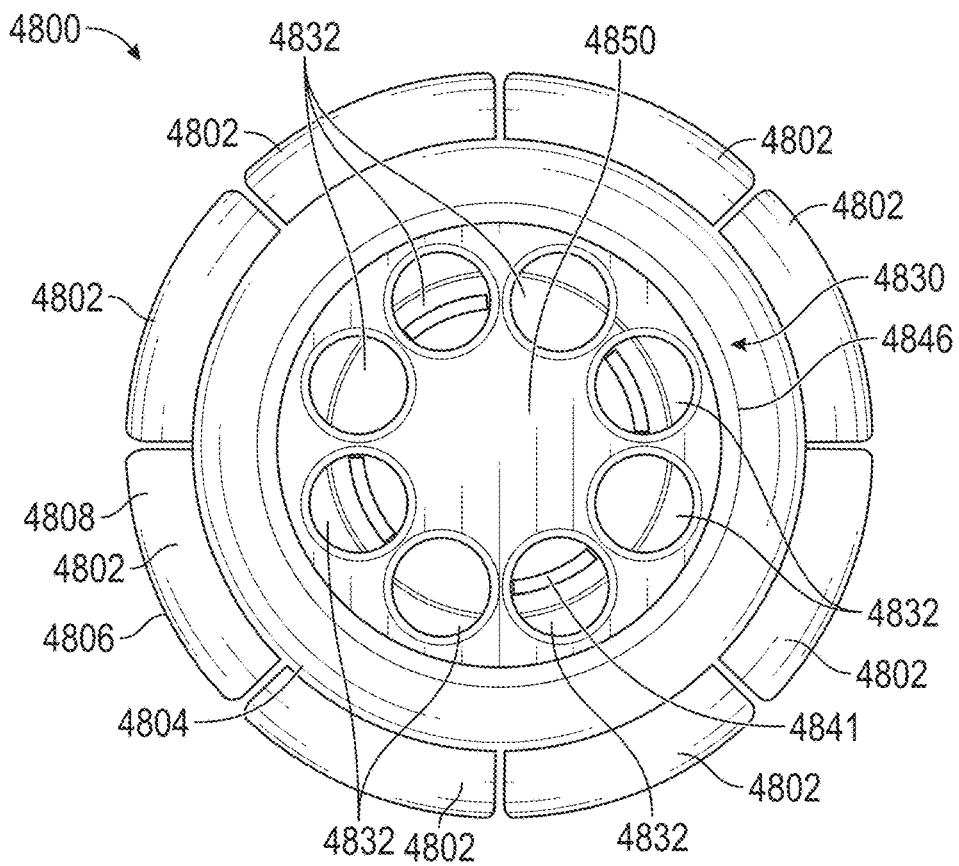
FIG. 48B illustrates a top view of the aircraft of FIG. 48A, including one or more ducts and one or more airfoils.
Figure 48C:
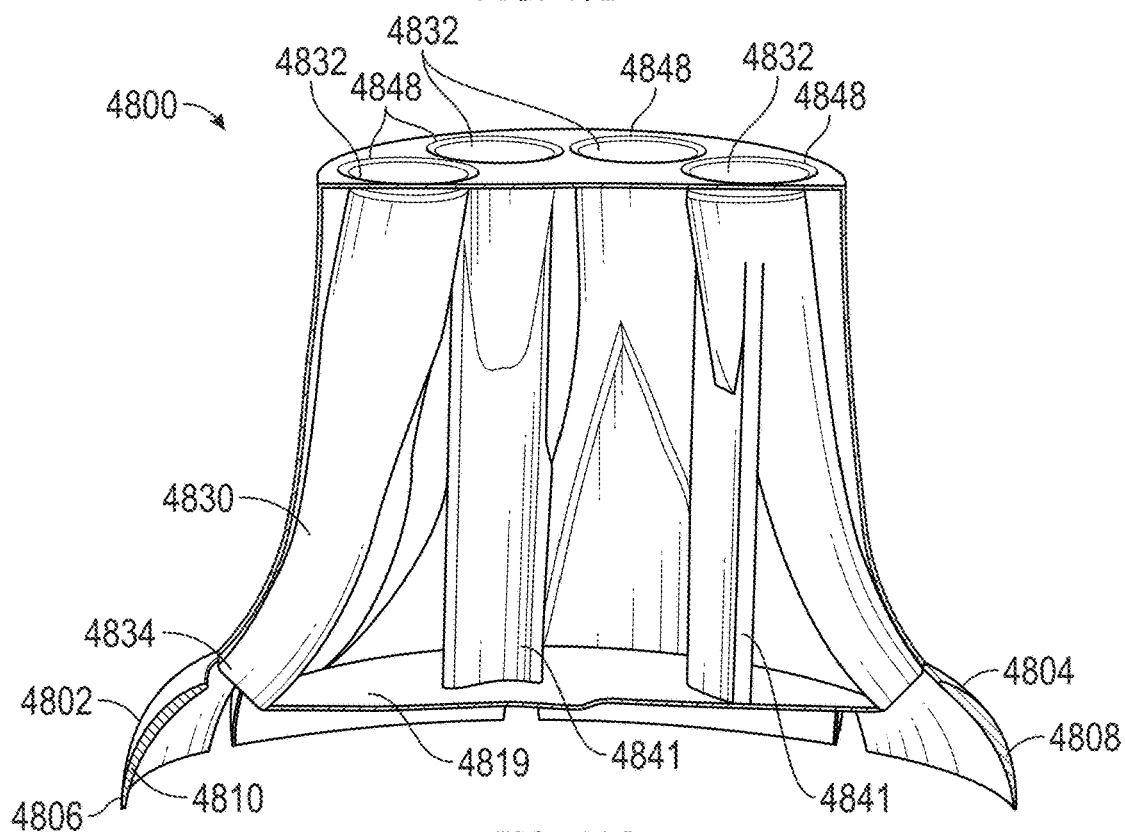
FIG. 48C illustrates a cross-sectional view of the aircraft of FIG. 48A, including the one or more ducts and one or more airfoils.

FIGS. 48A-48C illustrate bottom perspective, top end, and side cross-sectional views respectively, of an additional embodiment of an aircraft 4800 and components thereof having the aerolift system. The aircraft 4800 may have many or all of the same or similar features as aircraft 100, or any other aircraft disclosed herein, and the same or similar reference numbers are used refer to the same or similar features. The aircraft 4800 may have a plurality of ducts 4830 and a central body shown as a payload 4850 which may be empty, or which may contain a payload compartment, passenger area, cockpit, and/or the like. In the aircraft 4800 one or more openings or bypass vents 4841 may be connected (e.g., extending from) the ducts 4830 which may be able to direct a flow of air outside of the ducts 4730 before the flow of air reaches the outlet end 4734 of the ducts 4730.

A flow of air (e.g., flow of environmental air) may be delivered to the leading edge 4804 of the lifting body shown as the wing 4802 from the outlet end 4834 of each of the ducts 4830. The flow of air may first be delivered to the leading edge 4804 and travel over the top surface 4808 and the bottom surface 4810. The flow of air traveling from the leading edge 4804 to the trailing edge 4806 along the top surface 4808 may flow at a relatively greater speed, compared to air flowing along the bottom surface 4810. The flow of air from the leading edge 4804 to the trailing edge 4806 along the bottom surface 4810 may flow at a relatively lower speed, compared to air flowing along the top surface 4808. The pressure differential between the bottom surface 4810 and the top surface 4808 may cause a lifting force to be applied upward to the wing 4802, which is transferred to the aircraft 4800.

The ducts 4830 may have an opening or bypass vent 4841 which may extend from an upper portion of the ducts 4830 (e.g., adjacent to the inlet end 4832) and to an external region of the ducts 4830 (e.g., to or outside a bottom portion 4819 of the aircraft 4800). The bypass vents 4841 may be positioned on the ducts 4830 in order to direct a flow of air downward and outside of the ducts 4830 before reaching the outlet end 4834 and the leading edge 4804 of the wing 4802. The bypass vents 4841 may prevent pressure buildup which may occur at the outlet end 4834. Additionally, the bypass vents 4841 may prevent the flow of air leaving the outlet end 4834 from circling around (e.g., recirculation) at the outlet end 4834 which may also lead to increased pressure at the outlet end 4834. Advantageously, positioning bypass vents 4841 along the ducts 4830 can improve the lift characteristics of the aircraft 4800. These "upper" vents 4841 may be used in combination with, or alternatively to, the "lower" vents 4741 shown in FIGS. 47A and 47B. Further, the various vents 4841 and 4741 etc. may be valves that are independently or collectively controlled to adjust the openings of each vent and thus control the amount of air that can flow through the vents. The plurality of ducts 4830 may also have an outer wall. The inlet end 4832 of the ducts 4830 may also have an inlet lip 4848. The inlet lip 4848 may be rounded, for example elliptical or circular, as described above.

Figure 49A:
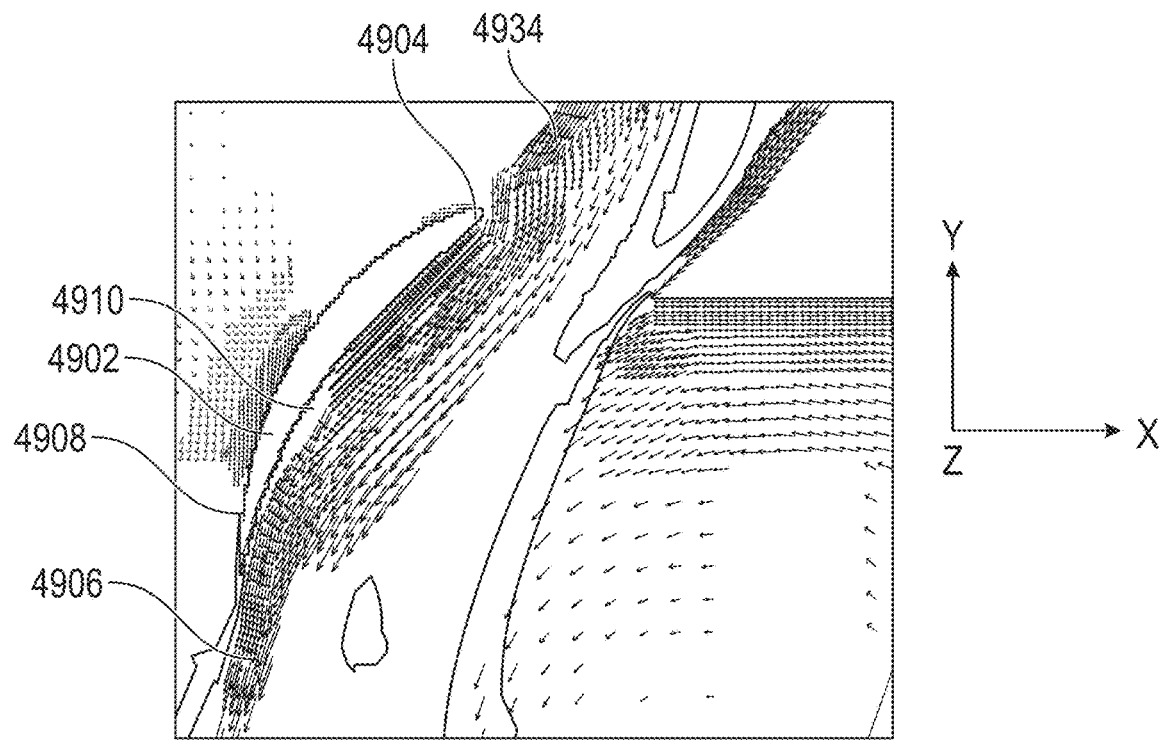
FIG. 49A illustrates a cross-sectional view of an airflow duct without a bypass vent delivering a flow of air to one or more airfoils.
Figure 49B:
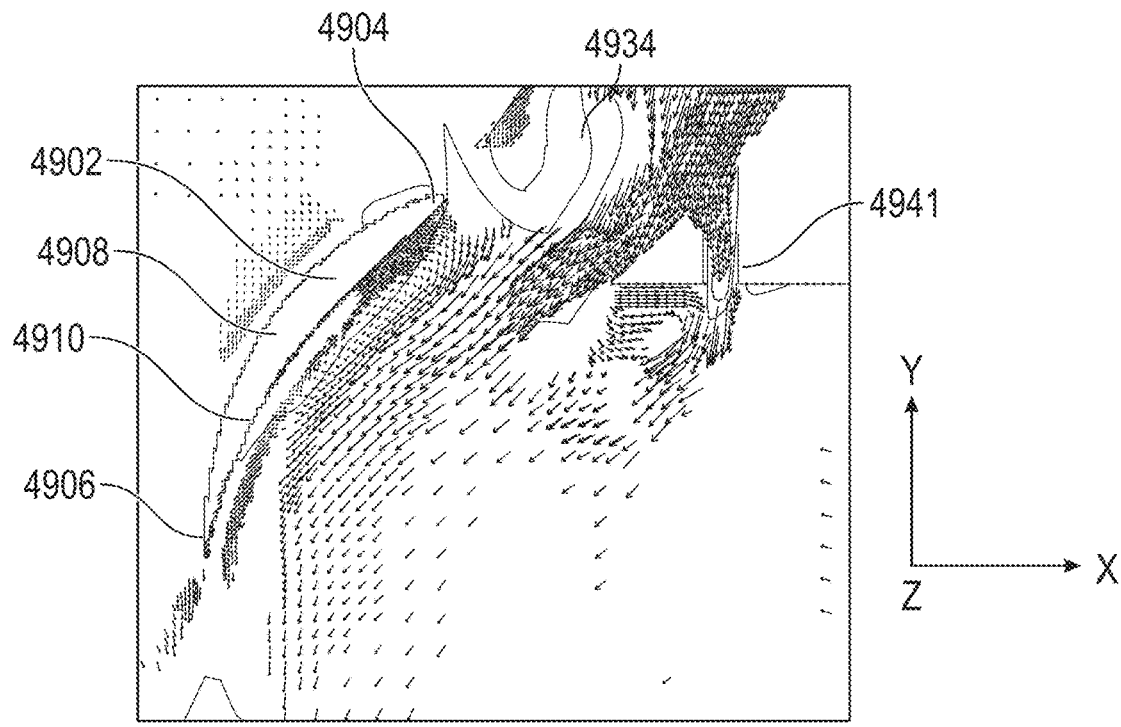
FIG. 49B illustrates a cross-sectional view of an airflow duct having a bypass vent delivering a flow of air to one or more airfoils.

FIGS. 49A-49B show example analytical results for airflow characteristics of the one or more ducts 4930. The duct 4930 may have many or all of the same or similar features as ducts 130, or any other ducts disclosed herein, and the same or similar reference numbers are used refer to the same or similar features. FIG. 49A depicts airflow characteristics at the outlet end 4934 of the one or more ducts 4930, where there is no bypass vent. FIG. 49B depicts airflow characteristics at the outlet end 4934 of the one or more ducts 4930, where there is a bypass vent 4941.

A flow of air (e.g., flow of environmental air) may be delivered to the leading edge 4904 of a lifting body shown as the wing 4902 from the outlet end 4934 of each of the ducts 4930. The flow of air may first be delivered to the leading edge 4904 and travel over the top surface 4908 and the bottom surface 4910. The flow of air traveling from the leading edge 4904 to the trailing edge 4906 along the top surface 4908 may flow at a relatively greater speed, compared to air flowing along the bottom surface 4910. The flow of air from the leading edge 4904 to the trailing edge 4906 along the bottom surface 4910 may flow at a relatively lower speed, compared to air flowing along the top surface 4908.

Advantageously, by positioning the bypass vent 4941 along the one or more ducts 4930, a pressure buildup may not occur at the outlet end 4934. Additionally, by not placing a bypass vent along the one or more ducts 4930, the flow of air may exit at the outlet end 4934 at a faster velocity, which may increase the amount of lift generated at the wing 4902 after the flow of air travels over the leading edge 4904. Further, by using the vent 4941 the pressure below the aircraft between the ducts may not be a dead zone or low pressure zone. The vents 4941 may thus increase the pressure in this area relative to systems without the vent 4941, thus increasing the lift of the system.

Figure 50:
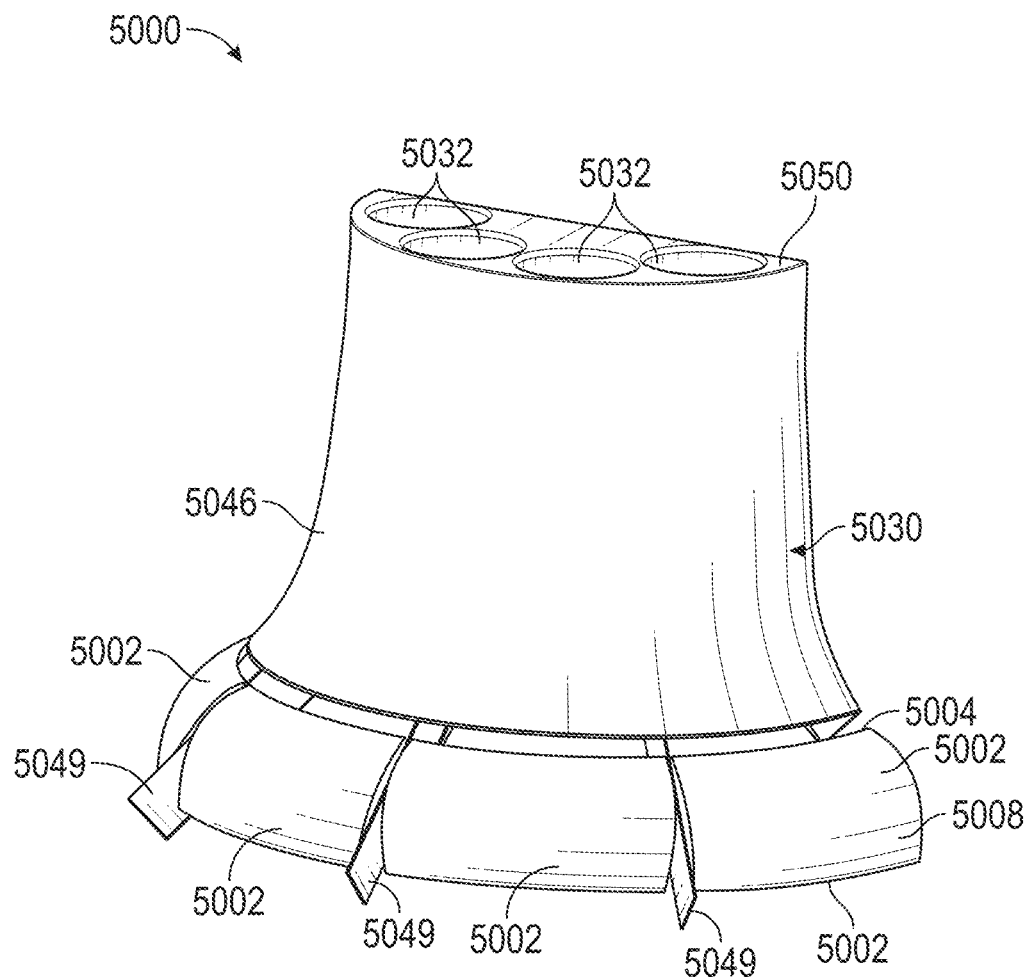
FIG. 50 illustrates a partial perspective view of an additional embodiment of an aircraft having one or more airfoils and one or more separators positioned between each of the one or more airfoils.

FIG. 50 illustrates an additional embodiment of an aircraft 5000 and components thereof having the aerolift system. The aircraft 5000 may have many or all of the same or similar features as aircraft 5000, or any other aircraft disclosed herein, and the same or similar reference numbers are used refer to the same or similar features. The aircraft 5000 may have a plurality of ducts 5030, a plurality of lifting bodies shown as airfoils 5002, and a payload 5050. In aircraft 5000, one or more dividers 5049 can be spaced around (e.g., annularly spaced, spaced about a central axis) the aircraft 5000 between adjacent duct outlets, as further described.

A flow of air may be delivered through the plurality of ducts 5030 from the inlet end 5032 and to the outlet end 5034. The flow of air may be delivered to the leading edge 5004 of the plurality of airfoils 5002 from the end 5034 of the plurality of ducts 5030. The flow of air may first be delivered to the leading edge 5004 and travel over the top surface 5008 and over the trailing edge 5006.

The plurality of ducts 5030 may also have an outer wall 5046. The outer wall 5046 may define an outer boundary for the flow of air through the duct 5030. The outer wall 5046 may define a profile. The profile may be configured to maintain or optimize the airflow velocity at the outlet end 5034 (e.g., reduce the amount of airflow, thrust, and/or power lost due to the plurality of ducts 5030 turning between the inlet end 5032 and the outlet end 5034). For example, the outer wall 5046 may have a curved profile which may be designed to reduce frictional forces exerted on the flow of air (e.g., which may reduce the airflow velocity at the outlet end 5034 and which may deliver a slower flow of air to the airfoil 5002). The outer wall 5046 may cause a middle area of the plurality of ducts 5030 to have a smaller width or area than the inlet end 5032 and/or the outlet end 5034.

One or more of the dividers 5049 may be spaced about the aircraft 5000. The one or more dividers 5049 may fence or contain a flow of air exiting an individual outlet end 5034 from leaving the area between two dividers 5049 positioned on opposing lateral sides of the outlet end 5034. The one or more dividers 5049 may be positioned adjacent to each of the plurality of airfoils 5002. The one or more dividers 5049 may extend from the outlet end 5034 and beyond the trailing edge 5006 of the plurality of airfoils 5002. Advantageously, the one or more dividers 5049 may prevent a flow of air which exits one of the plurality of ducts 5030 at the outlet end 5034 from interfering with another flow of air exiting another outlet end 5034 (e.g., adjacent outlet end 5034). The one or more dividers 5049 may provide a more controlled flow to the leading edge 5004 of the plurality of airfoils 5002 by blocking interfering flows of air. Since the one or more dividers 5049 may extend from the outlet end 5034 and beyond the trailing edge 5006 of the plurality of airfoils 5002, the flow of air from the leading edge 5004 to the trailing edge 5006 may be less turbulent. The dividers 5049 may be rigid planar members configured to withstand aerodynamic forces, such as structural walls or stiff sheets.

Figure 51A:
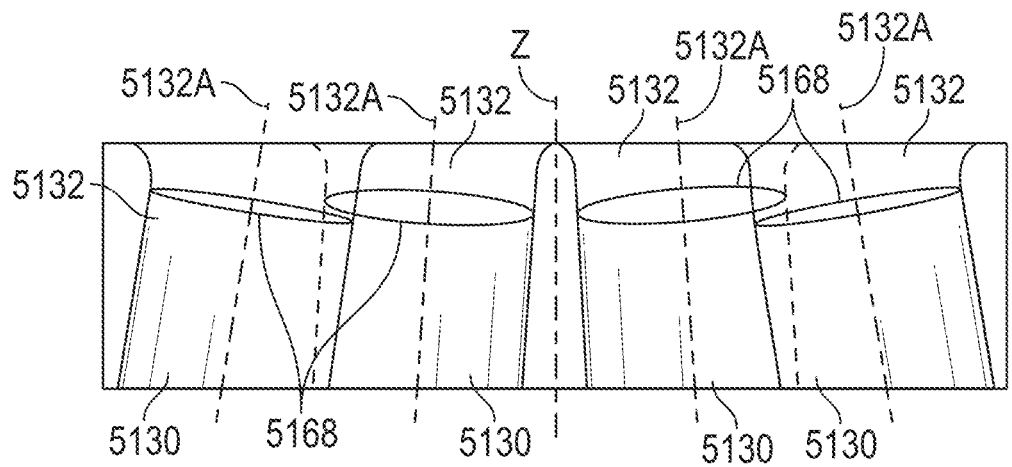
FIG. 51A illustrates a partial side cross-sectional view of part of multiple canted duct inlets.
Figure 51B:
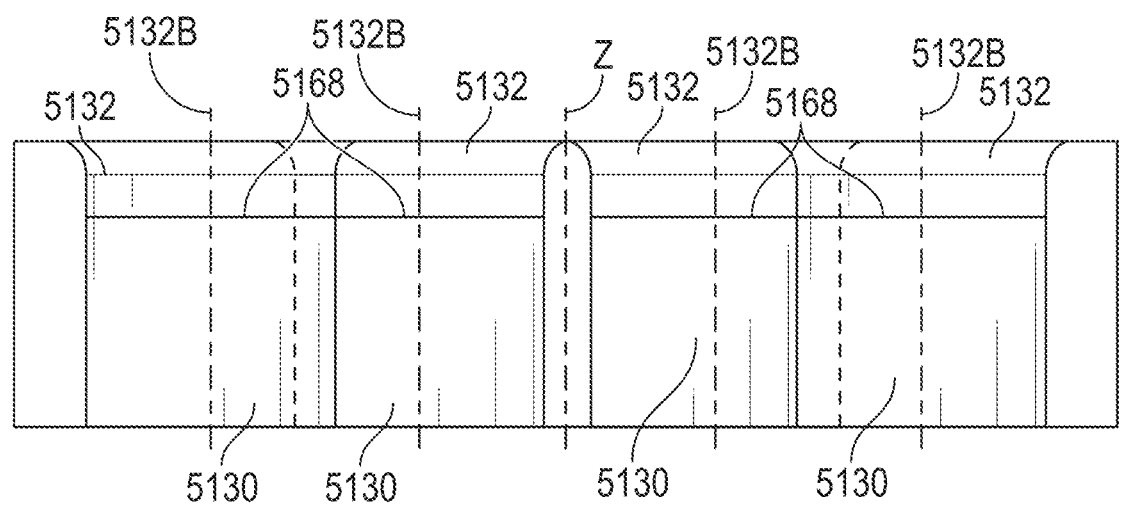
FIG. 51B illustrates a partial side cross-sectional view of multiple vertical duct inlets.

FIGS. 51A-51B illustrate inlet portions of multiple ducts 5130 that may be used in the various aerolift systems described herein. The one or more airflow ducts 5130 may have many or all of the same or similar features as ducts 130, or any other ducts disclosed herein, and the same or similar reference numbers are used refer to the same or similar features. In the one or more ducts 5130 (as shown in FIG. 51A) the inlet ends 5132 may extend along an axis 5132A that is "canted" or angled relative to a reference axis such as the central axis Z of the vehicle. The reference axis may be a vertical axis, or an axis parallel with a gravity vector, or the central axis Z. The axis 5132A may thus be angled relative to the central axis Z of an aircraft that the one or more ducts 5130 are connected to. Additionally, the canted openings 5168 located at the inlet end 5132 may each be angled towards (e.g., tilted towards) the central axis Z. The axes 5132A may be angled relative to the central axis Z no more than 30 degrees, no more than 25 degrees, no more than 20 degrees, no more than 15 degrees, no more than 10 degrees, no more than 5 degrees, or zero degrees (i.e. parallel). Advantageously, the canted openings 5168 (which are formed by angling the inlet end 5132 such that the inlet end 5132 extend about the axis 5132A) can reduce an amount of suction generated at the inlet end 5132 so that flow is more laminar and has less tendency to separate from the wall of the ducts and become turbulent. In some embodiments, the propulsion units may be canted with respect to the inlet axis. Thus the electric motor or fan or other propulsion unit may be angled with respect to the inlet end 5132. In some embodiments, both the inlet end 5132 and the propulsion unit may be canted. In some embodiments, only the inlet end 5132 or only the propulsion unit may be canted. The propulsion units may be configured to rotate between canted and uncanted configurations. FIG. 51B illustrates the one or more ducts 5130, where the one or more ducts 5130 may have straight or vertical openings 5168B, where the angle between the inlet end and the reference axis is zero degrees. The one or more ducts 5130 may extend along and define an axis 5132B which is parallel to the central axis Z. The propulsion unit may be straight, or may be canted in the vertical openings 5168B with respect to the axis 5132B. The "canted" orientation of the propulsion unit may be referring to an orientation of an axis of the propulsion unit, for example a central propulsion unit axis, which may be defined in some embodiments by rotating blades that rotate about the central propulsion unit axis. Thus the central propulsion unit axis may be canted with respect to the inlet axis, or with respect to the reference axis, etc., as described.

Figure 52A:
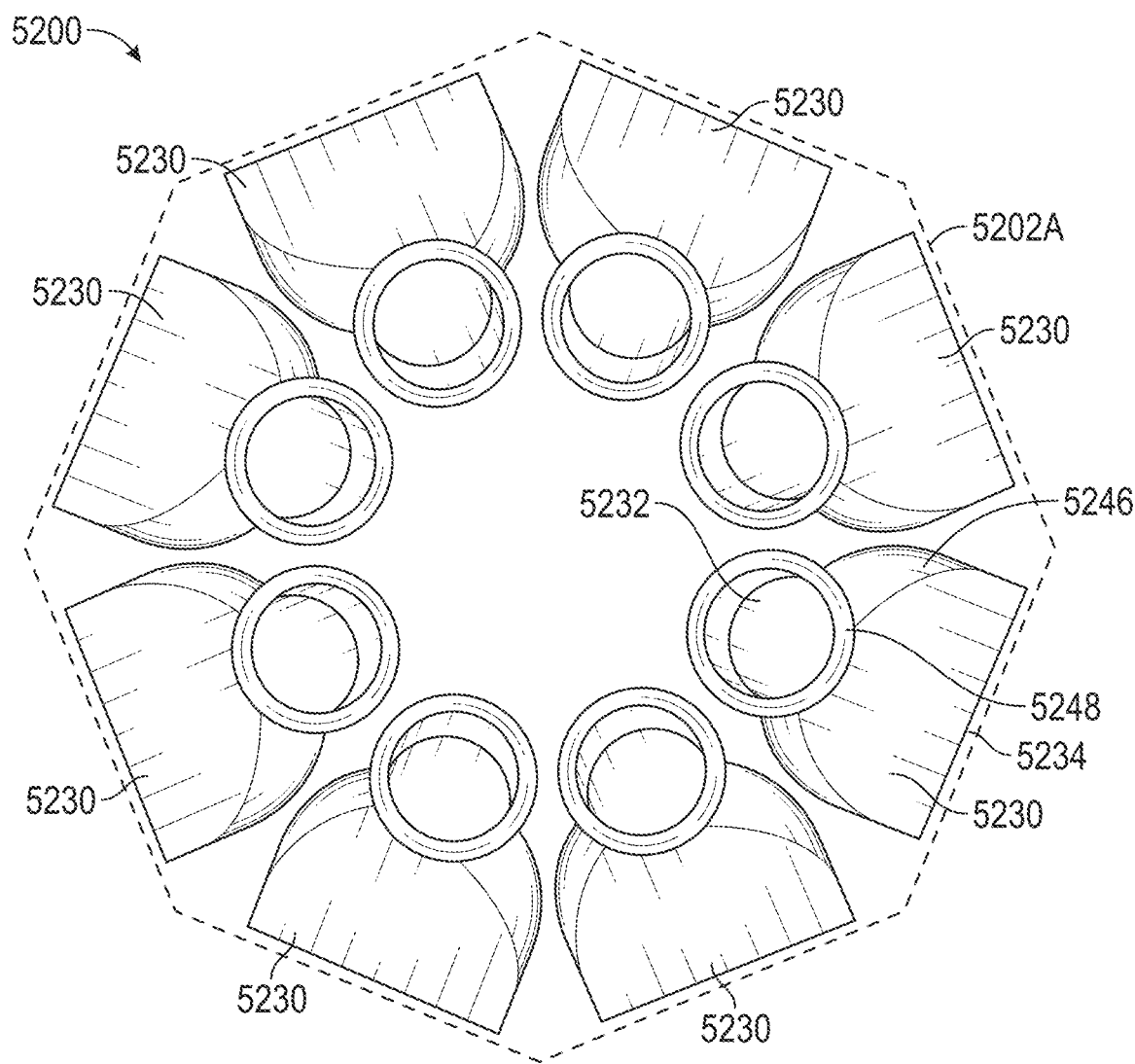
FIG. 52A illustrates a top view of another embodiment of an aircraft having aerolift systems arranged about a central axis forming an octagonal contour and configured to have a central body at least partially in between the aerolift systems.
Figure 52B:
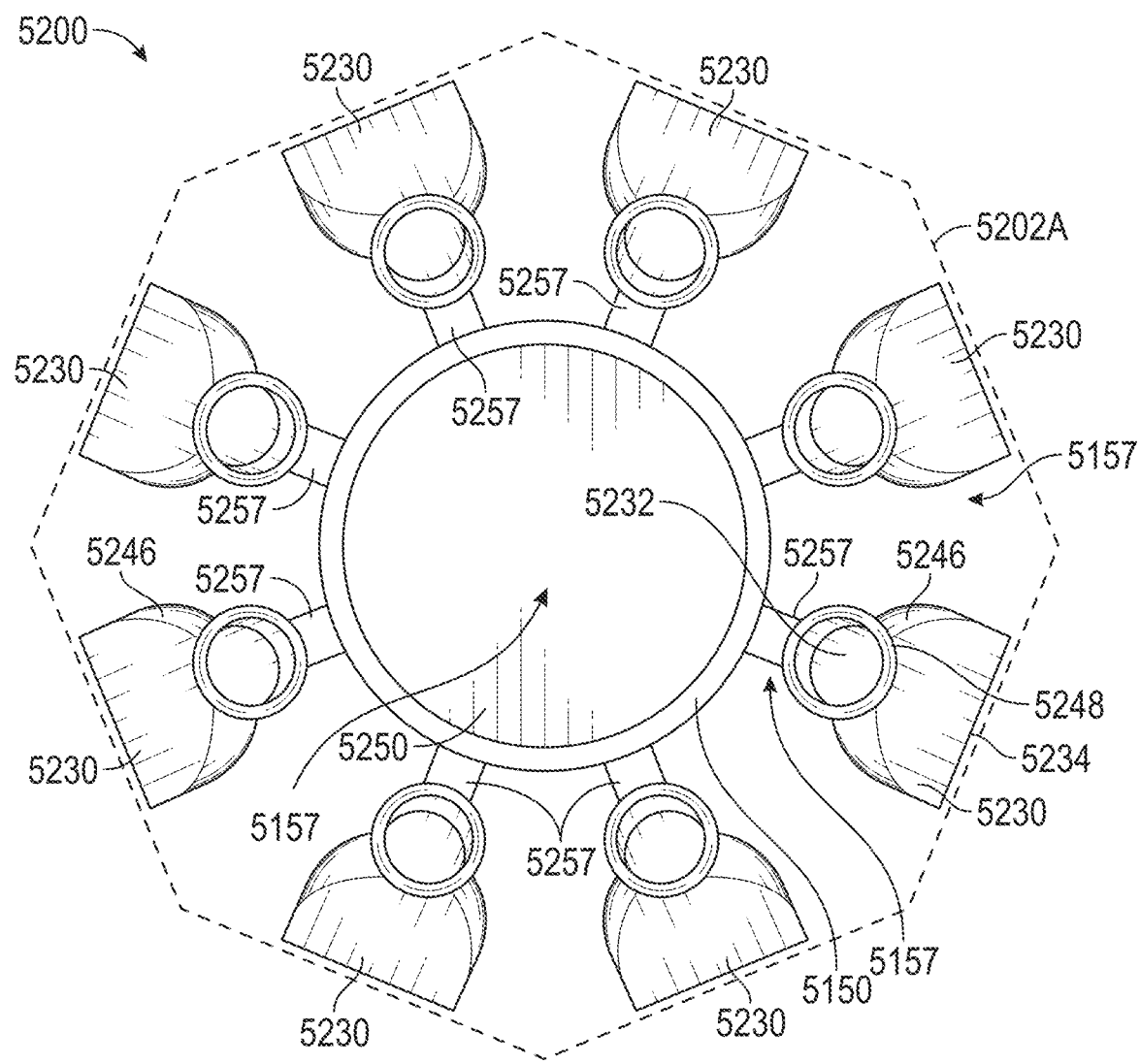
FIG. 52B illustrates a top view of the aircraft of FIG. 52A including the central body positioned at least partially in between the aerolift systems.
Figure 52C:
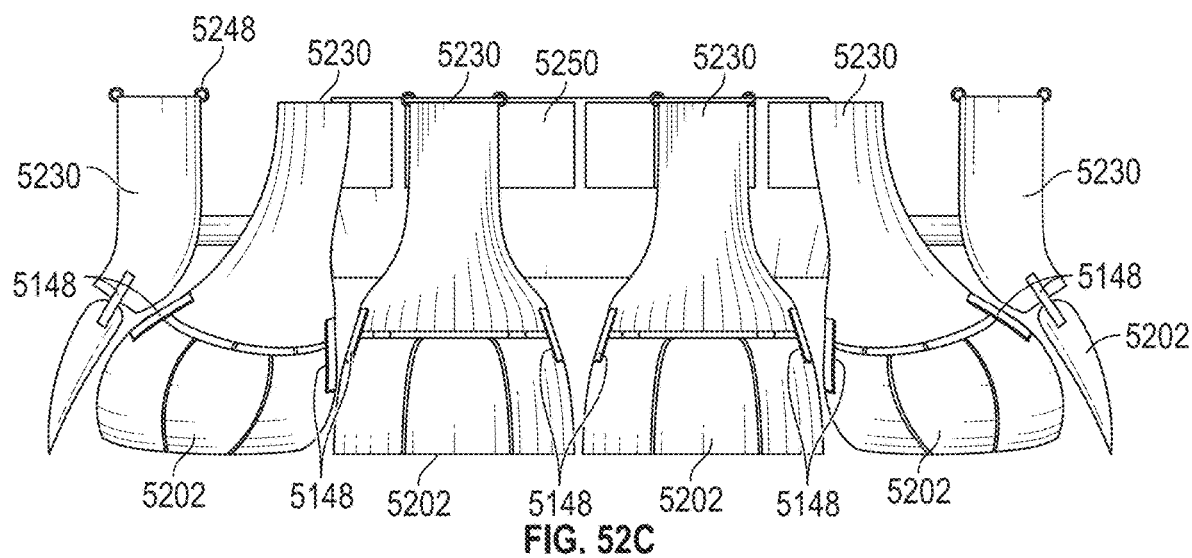
FIG. 52C illustrates a partial side view of the aircraft of FIG. 52B.
Figure 52D:
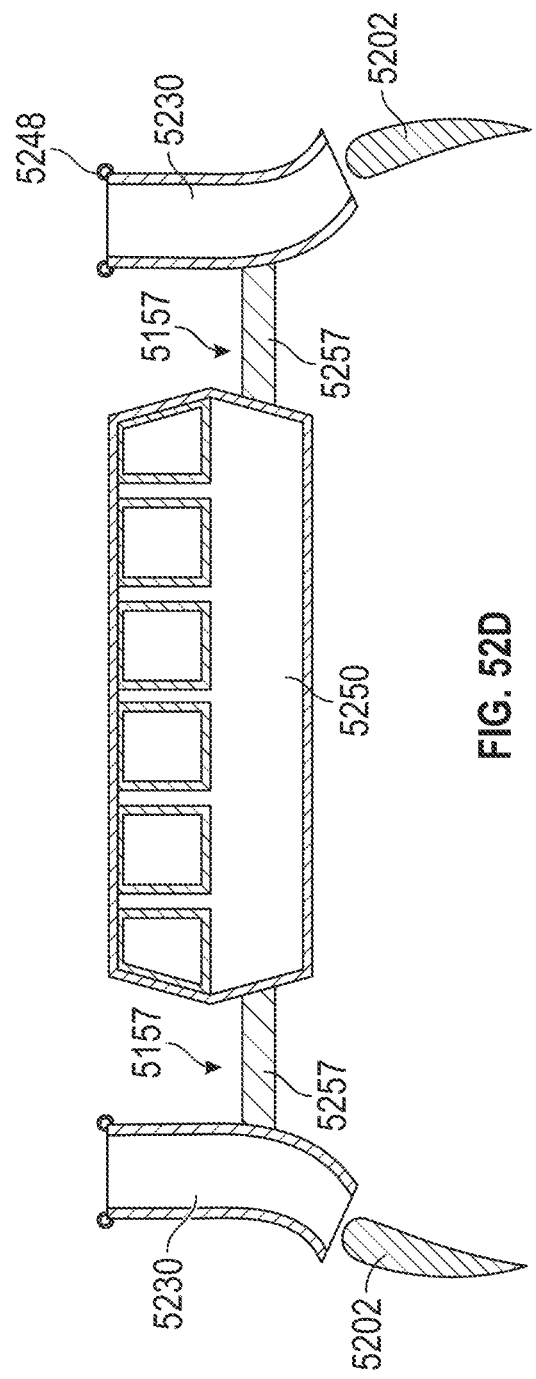
FIG. 52D illustrates a partial cross-sectional view of the aircraft of FIG. 52C including the aerolift systems supported radially away from the central body.

FIGS. 52A-52D illustrate additional embodiments of an aircraft 5200 having the aerolift system. FIG. 52A is a partial top view of the aircraft 5200 showing the ducts. FIG. 52B is a partial top view of the aircraft 5200 showing the ducts and a central body. FIG. 52C is a partial side view of the aircraft 5200 and FIG. 52D is a partial side cross-sectional view of the aircraft 5200. The aircraft 5200 may have many or all of the same or similar features as aircraft 100, or any other aircraft disclosed herein, and vice versa, and the same reference numbers are used to refer to the same features. In the aircraft 5200, the one or more ducts 5230 are arranged to form an outer profile 5202A which may be octagonal as shown, or other polygonal shapes. The outer profile 5202A is a geometric reference only, to show the basic shape or outline. The aircraft 5200 can include the propulsion units, lifting bodies, etc. as described herein along with each duct to form a plurality of aerolift systems surrounding the center.

A flow of air may travel from the inlet end 5232 of the one or more ducts 5230 and to an outlet end 5234. The inlet end 5232 may have an inlet lip 5248. The inlet lip 5248 may be an elliptic lip (see FIG. 31C). Additionally, the inlet lip 5248 may be an inwardly curving lip (see FIG. 46A). The aircraft 5200 may include eight of the aerolift systems including eight ducts 5230. In some embodiments, there may be one, two, three, four, five, six, seven, nine, ten, eleven, twelve, thirteen, fourteen, fifteen, sixteen, or more of the aerolift systems. Each of the eight ducts may be spaced about the aircraft 5200. The inlet end of the eight ducts 5230 may each be rotated approximately forty-five degrees relative to each other as viewed from the top. The geometric reference outer profile 5202A of the aircraft 5200 may be polygonal, such as octagonal as shown since each of eight outlet ends 5234 is rotated forty-five degrees relative to one another. The one or more ducts 5230 may also have an outer wall 5246 which may define an outer boundary for the flow of air through the duct 5230. The outlet end may have a rectangular shape or profile. Additionally, the spaces between adjacent ducts 5230 may be hollow or open (e.g., no payload compartment between the one or more ducts 5230) to allow airflow therebetween.

As shown in FIG. 52B, the one or more ducts 5230 may be connected to a central body 5250 which may be a cylindrical payload compartment as shown, or a cargo or passenger compartment, etc., as described herein for example with respect to the main portion 150. The central body 5250 may have the same or similar features as the main portion 150 except as otherwise described. As shown, each of the eight ducts 5230 may be supported radially outwardly away from the central body 5250. There may be one or more spaces 5157 between the central body 5250 and radially inwardly sides of the ducts 5230. There may be multiple spaces 5157 or a continuous space 5157 between each duct 5230 and a respective radially outer side of the central body 5250. There may also be a space 5157 within the central body 5250. The central body 5250 may therefore be hollow to allow airflow vertically therethrough. In some embodiments, there may be one or more fans located within the central body 5250 to blow air therethrough. There may be one continuous space 5157 extending annularly between the ducts 5230 and the central body 5250 except for supports 5257. There may be one or more spaces 5157 located circumferentially between adjacent ducts 5230. The space or spaces 5157 may allow for air to flow vertically through the space 5157 in between the central body 5250 and the ducts 5230 and/or between adjacent ducts 5230. This path for the airflow may prevent a region of low pressure from forming directly under the central body 5250 which could decrease total lift of the system. Further, the ducts 5230 (as viewed from a top side as shown in FIG. 52B) may be angled with respect to each other, for example the ducts 5230 may be angled approximately forty-five degrees relative to each other as shown, or at other angles.

The one or more ducts 5230 may be supported by one or more supports 5257. The supports 5257 may have the same or similar features as the supports 180, and vice versa. The supports 5257 may be elongated structural supports, such as cantilever beams or trusses or the like, that fixedly attach at an inward end to the central body 5250 and fixedly attach at an outward end to the respective duct 5230. In some embodiments, a single support 5257 may carry multiple ducts 5230. The radially inward ends of the supports 5257 may attach to an outer wall of the central body 5250. The supports 5257 may be deployable and stowable. The supports 5257 may stow radially inward to move the aerolift systems radially inward closer to a central reference axis of the system. The system may be transported or stored int eh stowed configuration. The supports 5257 may deploy radially outward to move the aerolift systems radially outward away from the central reference axis of the system. The system may deploy at the launch pad or other area of use. The supports 5257 may form a framework, which may be deployable and stowable.

As shown in FIGS. 52C and 52D, one or more lifting bodies shown as wings 5202 (e.g., eight wings) may be located at the outlets of the one or more ducts 5230 (e.g., eight ducts), and the central body 5250 may be a passenger compartment which may have windows, etc. The central body 5250 may be located at least partially above or below the aerolift systems (see, e.g., FIGS. 55A-56B). The ducts 5230 and wings 5205 may have the same or similar features as any other ducts or lifting bodies described herein, respectively. In FIGS. 52C and 52D, for clarity, some of the features in the rear of the aircraft (as oriented) are not shown. The lifting bodies 5202 are attached to the ducts via supports 5148. The supports 5148 may be structural members that carry and locate the lifting bodies 5202. The supports 5148 may have the same or similar features as the support 148, as described herein for example with respect to FIG. 2. The supports 5148 may be metallic, composite, polymer, or combinations thereof. The supports 5148 may attach to and extend from the duct 5230 to the lifting body 5202. The support 5148 may extend from a lateral or circumferential side of the lifting body 5202 to the lateral or circumferential side of the duct 5230. There may be two supports 5148 for each lifting body as shown, or there may be one, three, four or more supports 5148 for each lifting body. In some embodiments, a single support 5148 may support multiple lifting bodies 5202. In some embodiments, the supports 5148 may attach to the central body 5250. The lifting bodies 5202 may rotate about connections at radially outward ends of the supports 5148, for example to change the angle of attack, or to move a moveable portion such as a flap, etc.

Figure 53A:
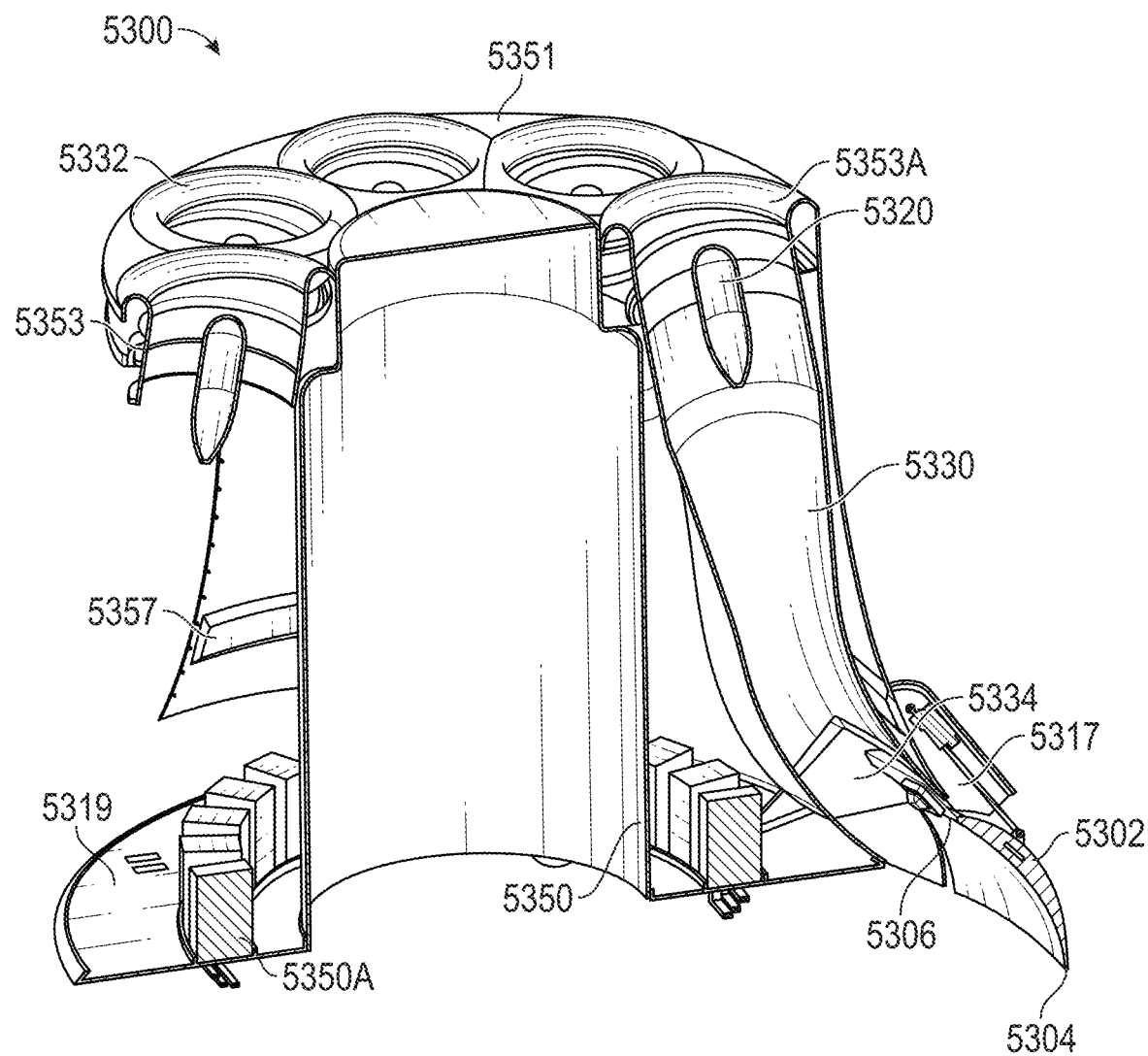
FIG. 53A illustrates cross-sectional view of another embodiment of an aircraft including the aerolift systems and various components of the aircraft.
Figure 53B:
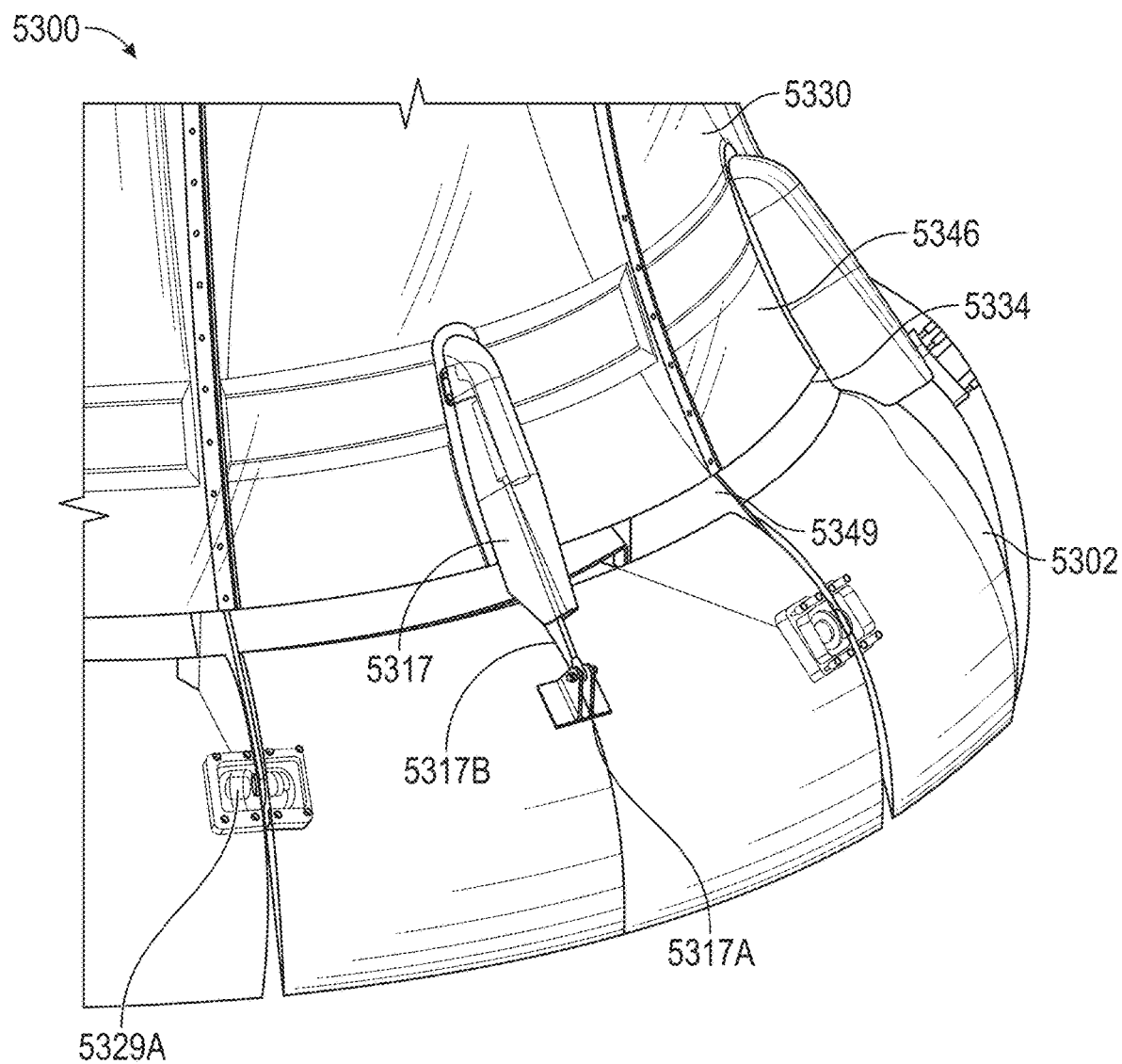
FIG. 53B illustrates a partial perspective view of the aircraft of FIG. 53A, including one or more actuatable hinges to move the one or more movable lifting bodies.

FIGS. 53A-53B illustrate a side cross-sectional view and a partial detail view respectively of additional embodiments of an aircraft 5300. The aircraft 5300 may have many or all of the same or similar features as aircraft 100, or any other aircraft disclosed herein, or vice versa, and the same reference numbers are used to refer to the same features. The aircraft 5300 includes an actuator 5317 positioned on an outside wall 5346 of the aircraft 5300, among other features as further described.

The plurality of propulsion units 5320 are configured to deliver a flow of air from the inlet end 5332 to the outlet end 5334 of the plurality of ducts 5330 and to a lifting body shown as an airfoil 5302. The plurality of propulsion units 5320 may, for example, be from ten inches to thirty inches or from fifteen inches to twenty five inches or a twenty inch diameter, ducted fan (although any other suitable propulsion unit sizes may also be used for a given application). The plurality of propulsion units 5320 may be designed to generate thrust at the inlet end 5332 of the plurality of ducts 5330 to deliver a flow of air to the airfoil 5302, where the flow of air travels to the leading edge 5304 and to the trailing edge 5306.

The aircraft 5300 may also include a composite upper cap 5351, a composite duct inlet bulkhead 5353, and/or a composite upper cap 5353A. The aircraft can include a stiffener 5357 which may be positioned along the outside wall 5346 and which may be coupled to and operate with the actuator 5317. Additionally, the aircraft 5300 can include a base portion 5319 and a batteries 5350A positioned annularly about and along the base portion 5319 and positioned outside of a payload section 5350.

The actuator 5317 may be connected to a hinge point 5317A. The hinge point 5317A may be positioned along the airfoil 5302. The hinge point 5317A may be located a distance equivalent to approximately one-third the length of the chord of the airfoil 5302 measure from the leading edge 5304. As the shaft 5317B extends outwards (e.g., the shaft 5317B extends out of the actuator 5317) the airfoil 5302 may rotate downwards such that the airfoil 5302 is oriented substantially vertically. As the shaft 5317B retracts (e.g., the shaft 5317B extends further into the actuator 5317), the airfoil may rotate upwards such that the airfoil 5302 can be more horizonal.

The aircraft 5300 may include one or more dividers 5349. The one or more dividers 5349 may support the airfoil 5302. The aircraft may also include a bearing 5329A which is positioned along the edges of the airfoils 5302 and coupled one of the dividers 5349. The bearing 5329A may allow the airfoil 5302 to rotate upwards and downwards relative to the one or more dividers 5349. The aircraft 5300 may further include any of the features of other aerolift systems or aircraft as described herein, such as those described with respect to FIGS. 52A-52D, etc.

Figure 54A:
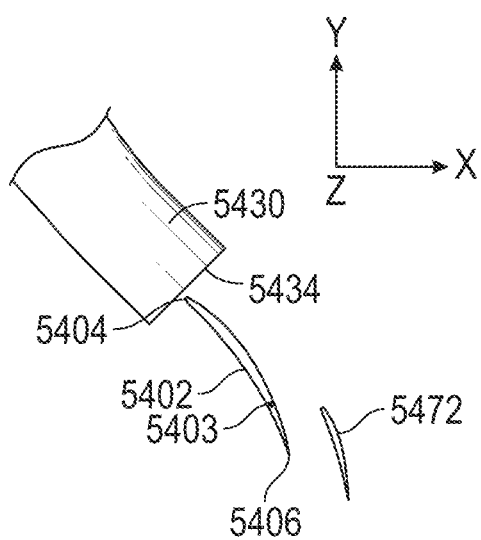
FIG. 54A illustrates a side view of another embodiment of an airflow duct having a first lifting body positioned at the outlet end and a second lifting body positioned radially outward from the first lifting body.
Figure 54B:
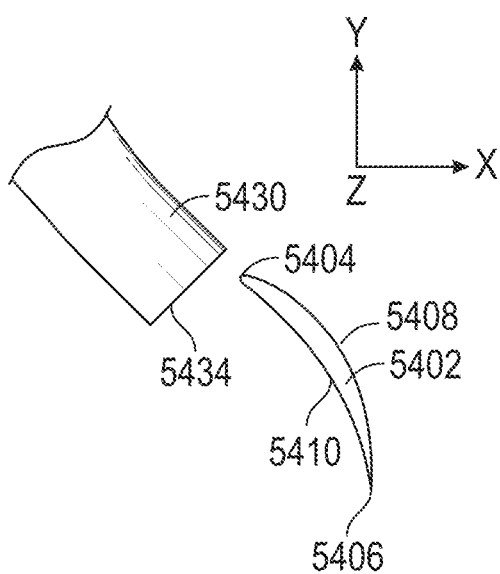
FIG. 54B illustrates a side view of another embodiment of an airflow duct having a lifting body positioned outside of the outlet end of the airflow duct.
Figure 54C:
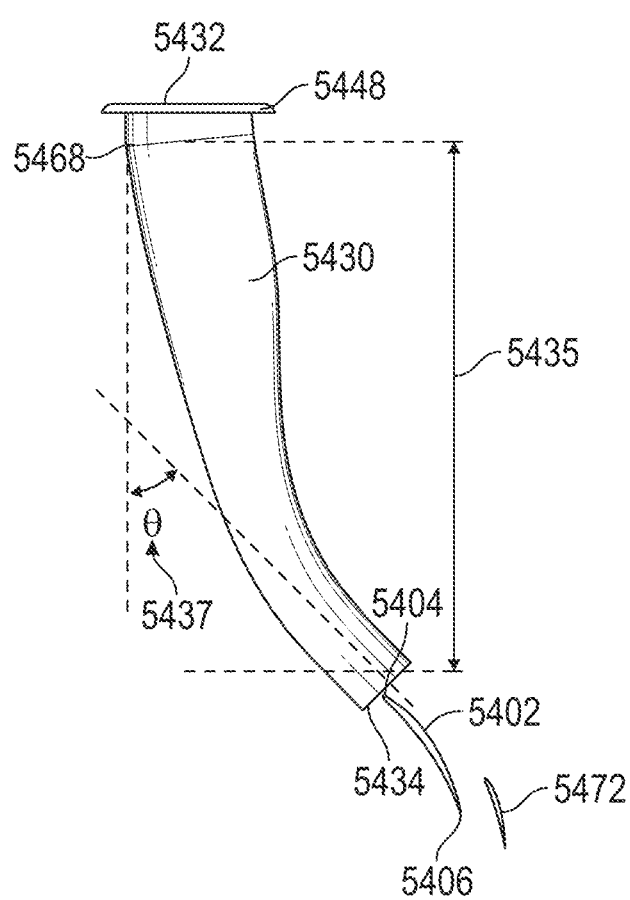
FIG. 54C illustrates a side view of another embodiment of an airflow duct.
Figure 54:
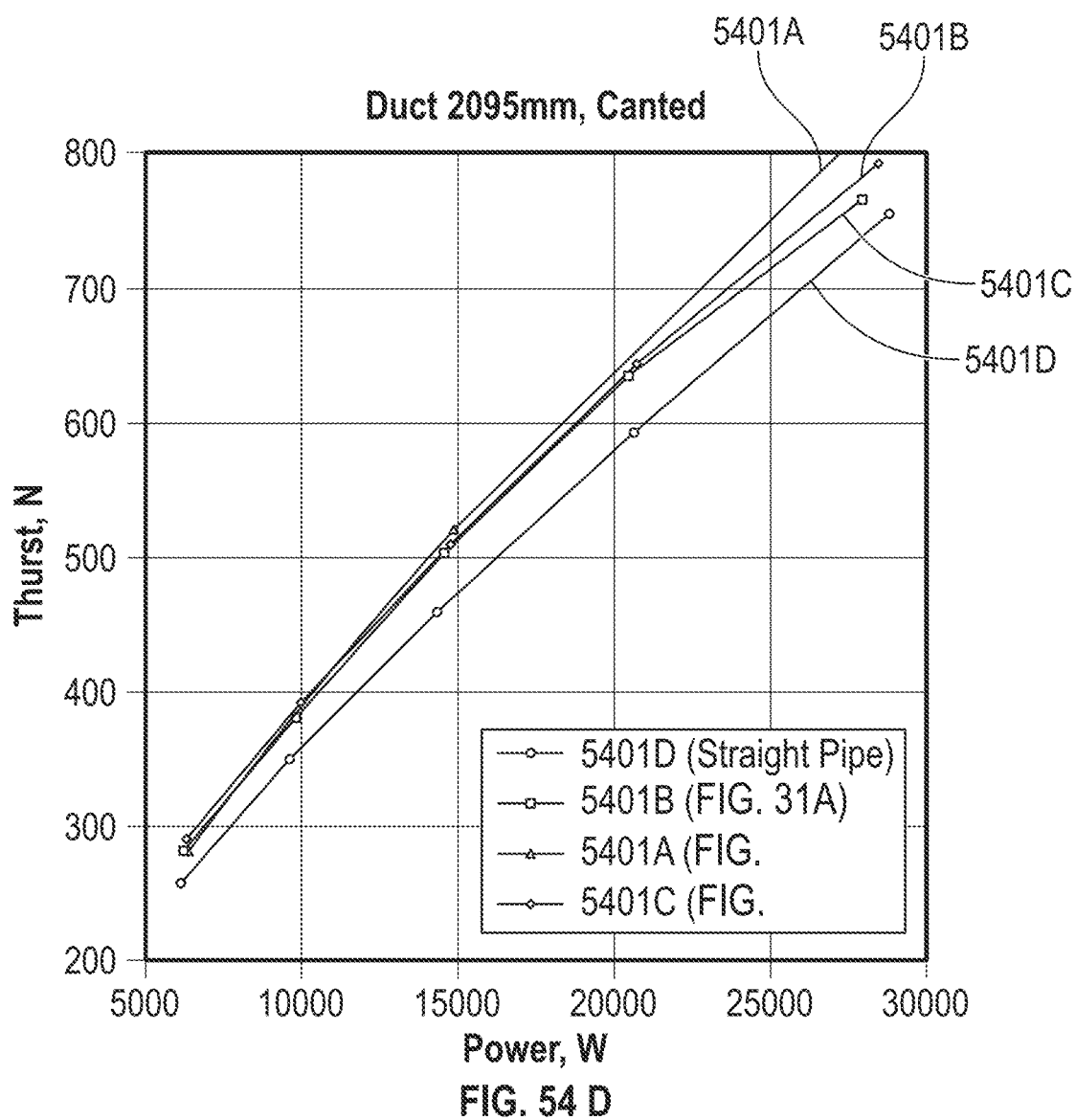

FIGS. 54A-54C illustrates partial side views of outlet ends of various aerolift systems, including ducts 5430 and lifting bodies. The one or more ducts 5430 may have many or all of the same or similar features as ducts 130, or any other ducts disclosed herein, and the same or similar reference numbers are used refer to the same or similar features. The systems may include the one or more ducts 5430 and a lifting body shown as a wing 5402, and in some embodiments one or more additional lifting bodies, positioned outside the outlet end 5434 of the duct 5439, as further described.

FIG. 54A illustrates the outlet end 5434 of the one or more ducts 5430. The leading edge 5404 of the wing 5402 may be positioned outside of the outlet end 5434. A flow of air can leave the one or more ducts 5430 at the outlet end 5434 and travel to the leading edge 5404 and to the trailing edge 5406. Additionally, a multi-component wing may be utilized, where one or more additional wings 5472 is spaced away from the wing 5402. The additional wing 5472 may be spaced upwards and laterally away (e.g., radially outward) from the wing 5402. The additional wing 5472 may be located in any of the various positions as described in further detail herein, for example with respect to FIGS. 27A-27E. In some embodiments, the wing 5402 may include one or more hinges 5403 or other mechanisms to allow the portion aft of the hinge 5403 that includes the trailing edge 5406 to rotate and/or translate about the hinge 5403 relative to the portion of the wing 5402 that is forward of the hinge 5403. The wing 5402 may thus include a moveable flap, aileron, etc.

FIG. 54B is another illustration of the outlet end 5434 of the one or more ducts 5430. The wing 5402 may be positioned away from the outlet end 5434 (e.g., the leading edge 5404 is located outside the outlet end 5434). The wing 5402 may not have an airfoil cross-sectional shape. The wing 5402 may be a regular surface designed to direct air flow downwards. The bottom surface 5410 of the wing 5402 may be curved in the direction of the top surface 5408 of the wing 5402. A majority of the flow of air exiting the outlet end 5434 may travel along the bottom surface 5410 in order to direct a larger amount of flow downwards (e.g., a greater amount of flow travels along the bottom surface 5410 than the top surface 5408). Advantageously, the curved bottom surface 5410 may generate additional lift. The wing 5402 may thus function as a flow diverter, for example as described herein with respect to FIGS. 22B and 22C. The air may mostly impinge upon and flow against, rather than flow over top and bottom sides, of the wing 5402.

FIG. 54C is another illustration the one or more ducts 5430. The one or more ducts 5430 can have an inlet end 5432 and an outlet end 5434. The inlet end 5432 can have a straight end portion that opens to a horizontal, non-canted opening as shown. In some embodiments, the straight end portion may be removed, such that the inlet end 5432 is canted or non-horizontal with respect to a reference axis, where the inlet end 5432 would be canted and have a canted opening 5468 (see also FIG. 51A). Additionally, the one or more ducts 5430, for either the canted or non-canted opening, can have an inlet lip 5448 located adjacent to the inlet end. The outlet end 5434 may include a straight portion. The two straight portions at the inlet and outlet ends may be constant diameter, linear sections of the interior channel of the ducts. Further, the duct can have a total duct length 5435. The total duct length 5435 may be the vertical linear distance from a bottom-most portion of the straight part of the inlet end 5432 to an upper-most portion of the straight part of the outlet end 5434. This total duct length 5435 can be from 2000 millimeters (mm) to 4000 mm, or about 2095 mm. In some embodiments, the total duct length 5435 can be from 500 mm to 5000 mm, from 750 mm to 3500 mm, from 1000 mm to 3000 mm, or from 1500 mm to 2500 mm. The one or more ducts 5430 may have a turn angle 5037 as described herein, for example from 20 to 45 degrees, of approximately 45 degrees, etc.

FIG. 54D is a graphical representation of analytical data of the expected amount of thrust (N, newtons) generated versus fan power (W, watts) for the duct and lifting body designs shown in FIGS. 31A, 54A and 54B. In FIG. 54D, the line 5401A represents the amount of thrust generated when the duct and lifting body (e.g., airfoil) is shaped similarly to the duct 5430, wing 5402, and additional wing 5472 of FIG. 54A (without the hinge 5403). Line 5401B illustrates the amount of thrust generated when the duct and lifting body (e.g., airfoil) is shaped similarly to the duct 3130, airfoil 3102, and additional wing 3172 of FIG. 31A (or FIG. 54A, but with the hinge). Line 5401C illustrates the amount of thrust generated when the duct and lifting body (e.g., airfoil) is shaped similarly to the duct 5430 and wing 5402 of FIG. 54B. Line 5401D illustrates the amount of thrust generated when the duct is a straight pipe or modified duct and without any lifting body, such as in fan systems that simply blow air straight downward to generate thrust. As shown in FIG. 54D, all three of the aerolift designs for FIGS. 31A, 54A (hinged and unhinged) and 54B generate more thrust than the straight pipe for a given fan power input. In some embodiments, the aerolift system with the duct and multicomponent airfoil of FIG. 54B generates the greatest amount of thrust for a given fan power input. Thus, the aerolift system, when designed properly as described herein with appropriate turn angle, lifting body placement, lifting body angular orientation, and overall duct angular orientation relative to gravity, produces more lift than merely blowing air downward to generate thrust.

Figure 54E:
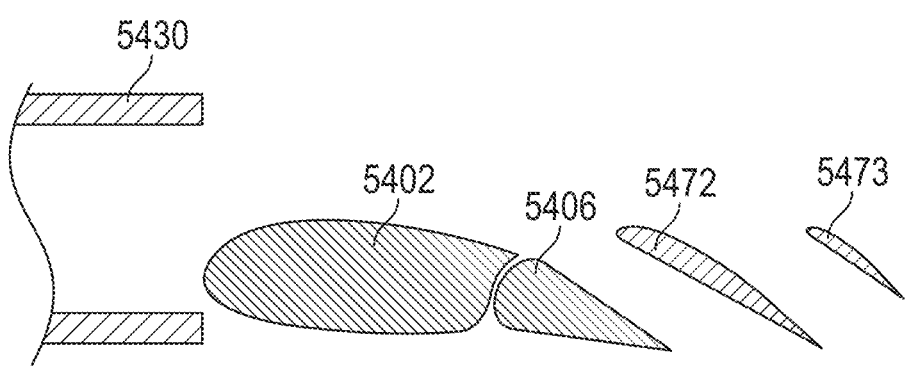

FIG. 54E illustrates a side view of another embodiment of an airflow duct having the first lifting body 5402 positioned at the outlet end of the duct 5430, the second lifting body 5472 positioned radially outward (rearward) from the first lifting body 5402, and a third lifting body 5473 positioned radially outward from the second lifting body 5402. The first lifting body 5402 and the second lifting body may have any of the features as described herein, for example with respect to FIGS. 54A-54C. The third lifting body 5473 may have any of the same or similar features as the first and second lifting bodies. The third lifting body 5473 may be thinner and positioned relatively higher than the first lifting body 5402. The third lifting body 5473 may be positioned level or higher than the second lifting body 5472. The first lifting body 5402 may or may not include the moveable trailing edge 5406. Each of the three lifting bodies may be supported by one or more supports 5148 (see, e.g., FIG. 52C). In some embodiments the first lifting body 5402 may be attached to the duct 5430 via one or more of the supports 5148. The second lifting body 5472 may be attached to the first lifting body 5402 and/or to the duct 5430 (for example, to the outlet end) via one or more of the supports 5148. The third lifting body 5473 may be attached to the first lifting body 5402, to the second lifting body 5472, and/or to the duct 5430 via one or more of the supports 5148. The supports 5148 may rotatably support the one or more lifting bodies, such that the lifting bodies may rotate relative to the support 5148.

Figure 55A:
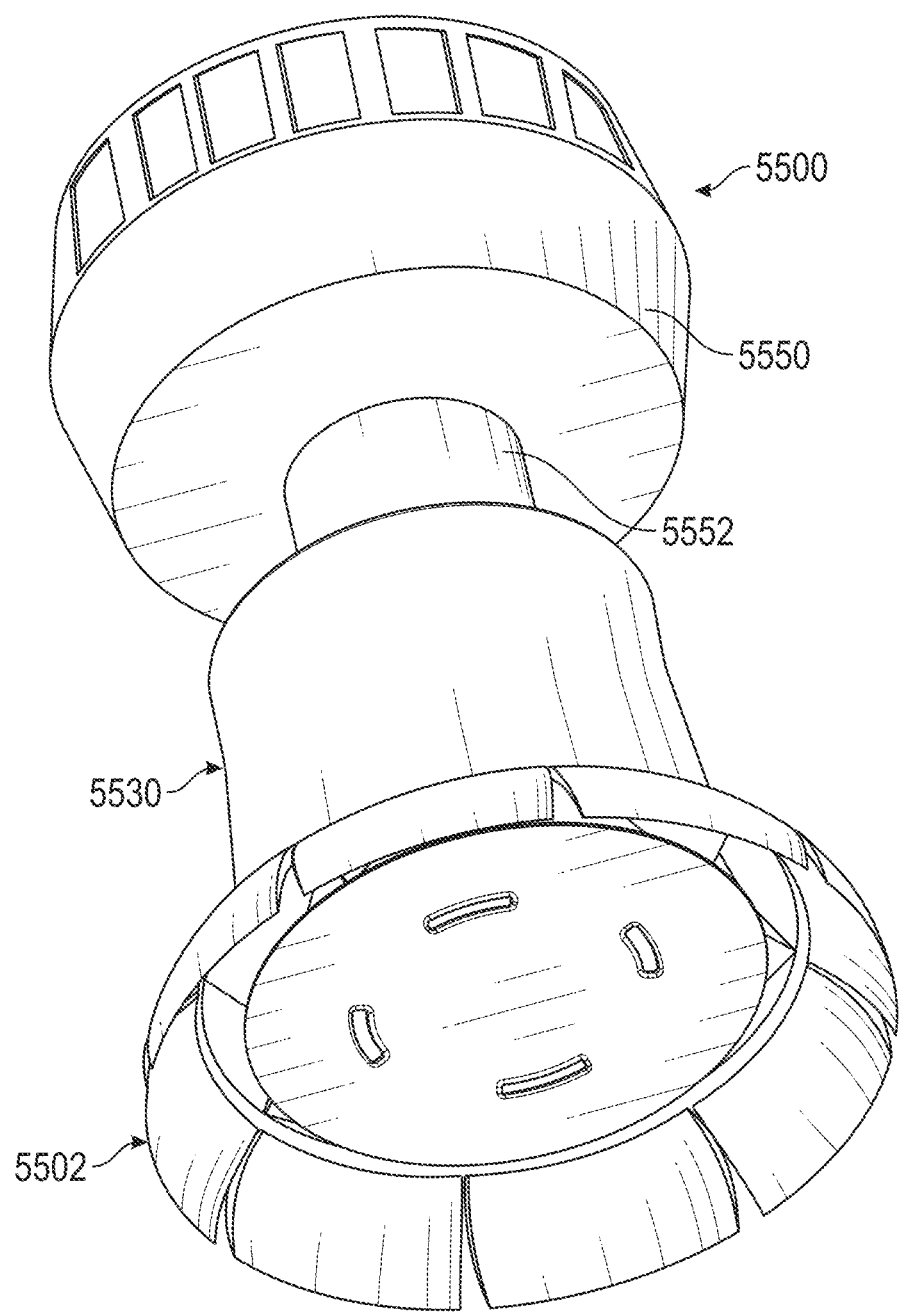
Figure 55B:
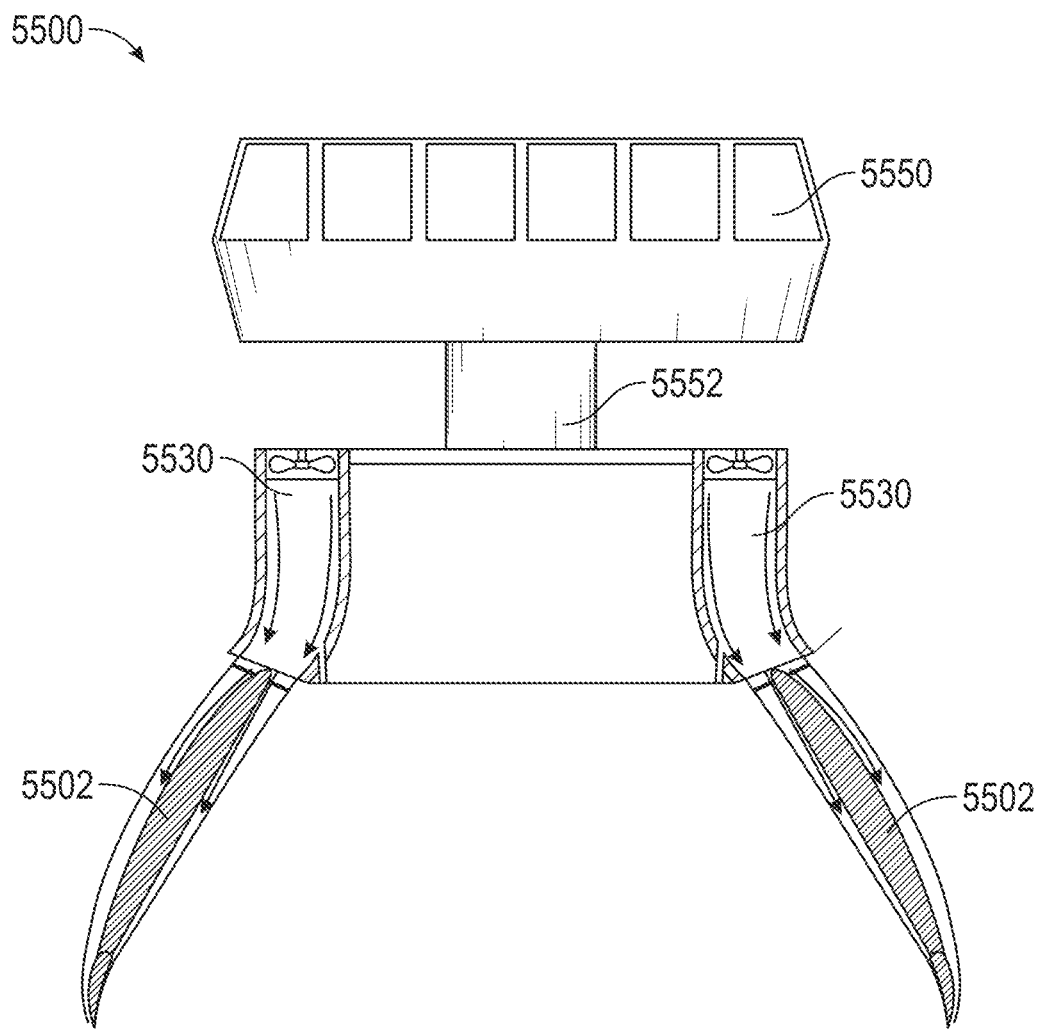

FIGS. 55A and 55B illustrate another embodiment of an aircraft 5500 having the aerolift system. The aircraft 5500 may have many or all of the same or similar features as aircraft 100, or any other aircraft disclosed herein, and vice versa, and the same reference numbers are used to refer to the same features. The aerolift systems may be located below or at least partially below the central body 5550. In the aircraft 5500, the one or more lifting bodies 5502 (e.g., airfoil or wing or wing segments, etc.) and one or more ducts 5530 are positioned below the central body 5550 (such as a payload, etc.) and attached by one or more structural supports 5552, shown as a cylindrical support. The structural support 5552 may be a truss, elongated beams, or other structures. The structural support 5552 may include a fan or it may be empty except for electronics, wiring, etc. In some embodiments, the space between the ducts 5530 may be empty to allow for vertical airflow therethrough. In some embodiments, the space between the ducts 5530 may include one or more fans to blow air therethrough.

Figure 56A:
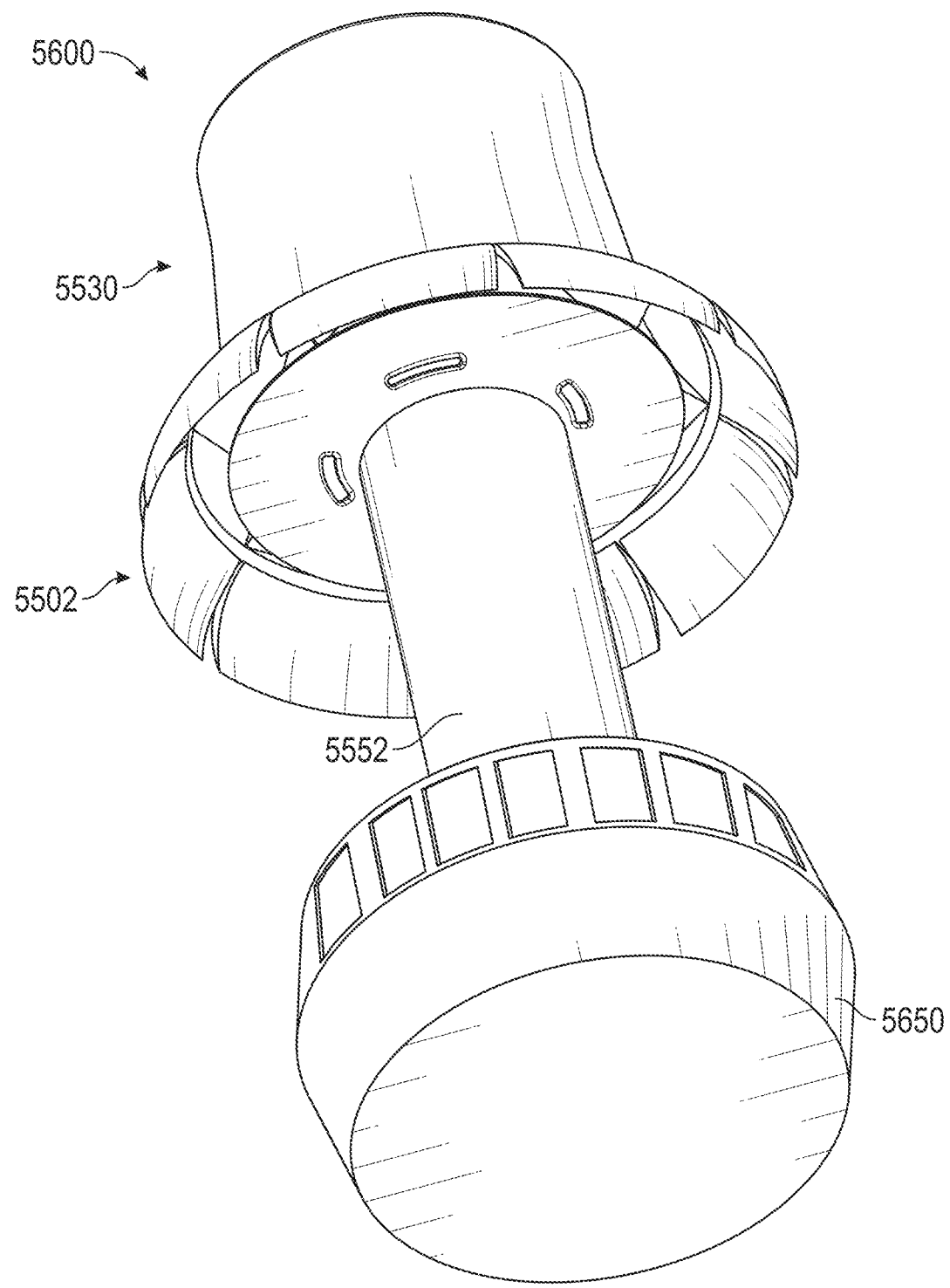
Figure 56B:
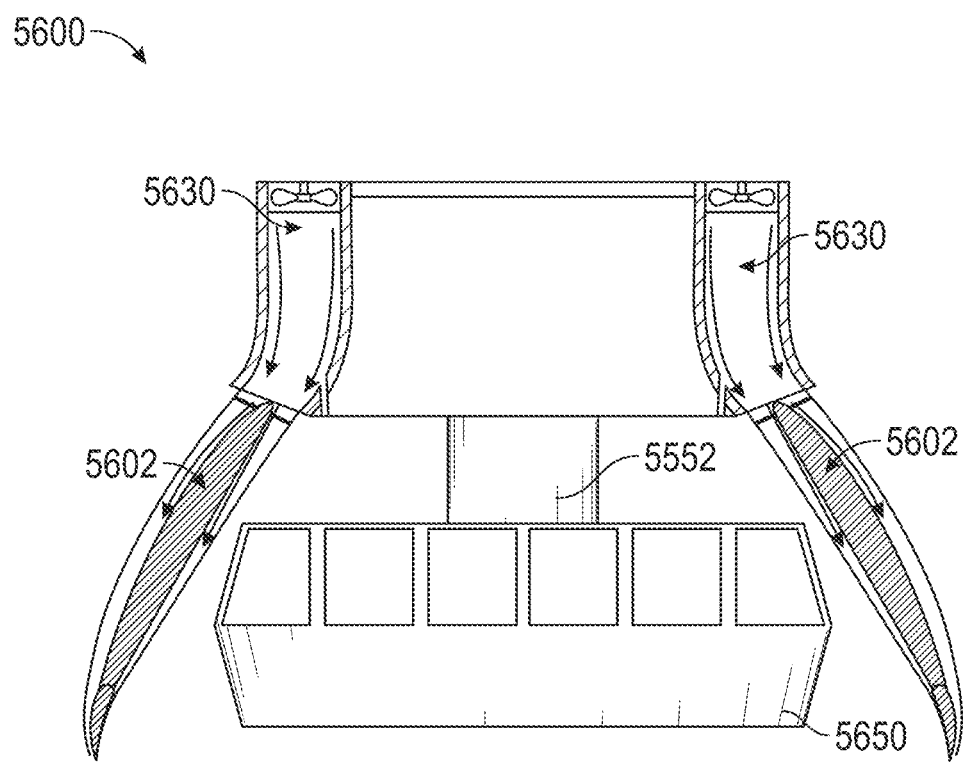

FIGS. 56A and 56B illustrate another embodiment of an aircraft 5600. The aircraft 5600 may have many or all of the same or similar features as aircraft 100, or any other aircraft disclosed herein, and vice versa, and the same reference numbers are used to refer to the same features. The aerolift systems may be located above or at least partially above the central body 5650. In the aircraft 5600, the one or more lifting bodies 5602 (e.g., airfoil or wing or wing segments, etc.) and one or more ducts 5630 are positioned above the central body 5650. The structural support 5552 may include a fan or it may be empty except for electronics, wiring, etc. In some embodiments, the space between the ducts 5530 may be empty to allow for vertical airflow therethrough. In some embodiments, the space between the ducts 5530 may include one or more fans to blow air therethrough.

NUMBERED EXAMPLE EMBODIMENTS (NEE)

The following are numbered example embodiments (NEE) of the technology described herein. This list is exemplary only and is not exhaustive.

NEE 1. An aircraft comprising: a lifting body extending circumferentially about a central axis, the lifting body comprising: a leading edge located at a radially inside portion of the lifting body; and a trailing edge located at a radially outside portion of the lifting body; wherein a cross-sectional profile of the lifting body forms an airfoil capable of producing lift responsive to air flowing from the leading edge to the trailing edge; one or more propulsion units; and one or more ducts each comprising: an inlet configured to receive a flow of air from one or more of the one or more propulsion units; and an outlet configured to direct the flow of air towards the leading edge of the lifting body.

NEE 2. The aircraft of NEE 1, wherein the lifting body is annularly shaped.

NEE 3. The aircraft of any of the preceding NEEs, wherein the outlets of the one or more ducts are positioned below the inlets of the one or more ducts.

NEE 4. The aircraft of any of the preceding NEEs, wherein the one or more ducts are spaced around the inside portion of the lifting body.

NEE 5. The aircraft of any of the preceding NEEs, wherein at least one of the one or more ducts has an L-shape.

NEE 6. The aircraft of any of the preceding NEEs, wherein at least one of the one or more ducts has a C-shape.

NEE 7. The aircraft of any of the preceding NEEs, wherein the one or more ducts are equidistantly spaced around a longitudinal axis of the inside portion of the lifting body.

NEE 8. The aircraft of any of the preceding NEEs, wherein the one or more ducts are separated by one or more walled structures or connecting ducts.

NEE 9. The aircraft of any of the preceding NEEs, wherein the one or more ducts have grooves or air guides to streamline the airflow.

NEE 10. The aircraft of NEE 8, wherein the one or more walled structures are collapsible or moveable.

NEE 11. The aircraft of any of the preceding NEEs, wherein at least one of the one or more ducts includes a selectively openable flap that allows at least a portion of the flow of air to exit the at least one of the one or more ducts through an opening before reaching the leading edge of the lifting body.

NEE 12. The aircraft of NEE 11, wherein the opening is configured to flow air from the at least one of the one or more ducts to provide thrust to the aircraft in a horizontal direction.

NEE 13. The aircraft of any of the preceding NEEs, wherein a cross-sectional area of the inlet of the one or more ducts is greater than that of the outlet of the one or more ducts, and/or wherein the cross-sectional area of the one or more ducts is tapered and continually decreases along at least a portion of the one or more ducts from a larger area to a smaller area from the inlet towards the outlet.

NEE 14. The aircraft of CLAIM 13, wherein the tapered cross-sectional area of the one or more ducts is configured to increase speed of the flow of air from the inlet towards the leading edge of the lifting body.

NEE 15. The aircraft of any of the preceding NEEs, wherein the one or more propulsion units each comprise a motor and at least one propellor.

NEE 16. The aircraft of CLAIM 15, wherein the at least one propellor comprises a hub coupled to a plurality of blades, and wherein the hub is coupled to a motor configured to rotate the hub and the plurality of blades.

NEE 17. The aircraft of any of the preceding NEEs, wherein the one or more propulsion units blows a direct air flow into the leading edge of the lifting body.

NEE 18. The aircraft of any of the preceding NEEs, wherein the one or more propulsion units blows a direct air flow into the leading edge of the lifting body through a duct.

NEE 19. The aircraft of any of the preceding NEEs, wherein the one or more propulsion units comprises at least four propulsion units, wherein the at least four propulsion units are equidistantly spaced along a circular path of the inside portion of the annular shape.

NEE 20. The aircraft of any of the preceding NEEs, wherein the one or more propulsion units comprises at least six propulsion units, wherein the at least six propulsion units are equidistantly spaced along a circular path of the inside portion of the annular shape.

NEE 21. The aircraft of any of the preceding NEEs, wherein the one or more propulsion units are each configured to be independently controlled, such that adjustments to individual output levels of each propulsion unit selectively causes the aircraft to ascend, descend, hover, tilt, rotate, or translate.

NEE 22. The aircraft of any of the preceding NEEs, wherein a number of the one or more propulsion units is equal to a number of the one or more ducts.

NEE 23. The aircraft of any of the preceding NEEs, wherein the one or more propulsion units are powered by electricity.

NEE 24. The aircraft of any of the preceding NEEs, wherein the one or more propulsion units are powered by a battery.

NEE 25. The aircraft of any of the preceding NEEs, wherein the one or more propulsion units are powered by fossil fuel.

NEE 26. The aircraft of any of the preceding NEEs, wherein the lifting body is segmented into a plurality of discrete lifting body sections independently rotatable.

NEE 27. The aircraft of any of the preceding NEEs, wherein the lifting body is coupled to a main body.

NEE 28. The aircraft of NEE 27, wherein the main body comprises a structural beam configured to support the lifting body.

NEE 29. The aircraft of any of NEEs 27-28, wherein the main body is configured to contain cargo.

NEE 30. The aircraft of any of NEEs 27-29, wherein the main body is configured to contain a payload between 50 lbs. and 2500 lbs.

NEE 31. The aircraft of any of NEEs 27-30, wherein the main body is configured to contain a vehicle.

NEE 32. The aircraft of any of NEEs 27-31, wherein the main body is configured to contain a cockpit, and wherein the cockpit comprises flight instruments for a user to command to fly the aircraft.

NEE 33. The aircraft of any of NEEs 27-32, wherein the lifting body is coupled to the main body with a plurality of supports, wherein a first end of the plurality of supports extend from a portion of the main body, and wherein a second end of the plurality of supports is connected to the lifting body.

NEE 34. The aircraft of NEE 33, wherein the plurality of supports comprises tie rods configured to change position, wherein changing the position of the plurality of the tie rods changes an angle of attack of the lifting body relative to air exiting the duct.

NEE 35. The aircraft of any of the preceding NEEs, further comprising a landing gear, wherein the landing gear comprises one or more legs configured to extend from a retracted position to an extended position to support the aircraft when landing.

NEE 36. The aircraft of any of the preceding NEEs, further comprising a sleeve covering a bottom area of the lifting body and positioned such that a portion of the flow of air will pass between the bottom area of the lifting body and the sleeve.

NEE 37. The aircraft of any of the preceding NEEs, further comprising a sleeve covering a top area of the lifting body and positioned such that a portion of the flow of air will pass between the top area of the lifting body and the sleeve.

NEE 38. The aircraft of any of the preceding NEEs, further comprising a control system configured to adjust an operation of the one or more propulsion units.

NEE 39. The aircraft of NEE 38, wherein the control system comprises an autonomous control system that creates a flight plan based on destination input and data gathered at least one of a sensor, a weather report, a traffic report, a GPS, or an air traffic control communication.

NEE 40. The aircraft of any of NEEs 38-39, wherein the control system is configured to control a motor of the one or more propulsion units.

NEE 41. The aircraft of any of NEEs 38-40, wherein the control system is configured to cause the aircraft to fly based at least in part on flight control data.

NEE 42. The aircraft of NEE 41, further comprising one or more flight control inputs configured to send flight control data to the aircraft to cause the aircraft to fly.

NEE 43. The aircraft of any of NEEs 38-42, further comprising a plurality of sensors, wherein the plurality of sensors are configured to deliver flight control inputs.

NEE 44. The aircraft of any of NEEs 38-43, wherein the control system is configured to perform a flight sequence, wherein the flight sequence includes delivering power to at least one of the one or more propulsion units, wherein delivering power causes the aircraft to lift from a ground position to an aerial position.

NEE 45. An aircraft comprising: a plurality of lifting bodies arranged in a generally annular shape about a longitudinal axis, each of the plurality of lifting bodies comprising: a cross-sectional profile in a shape of an airfoil; a leading edge positioned radially on an inside of the generally annular shape; and a trailing edge positioned radially an on outside of the generally annular shape; a plurality of propulsion units each configured to generate forced air; and a plurality of ducts having an inlet and an outlet, the outlet positioned to direct the forced air from one or more of the plurality of propulsion units towards the leading edge of one or more of the plurality of lifting bodies.

NEE 46. The aircraft of NEE 45, further comprising a body that comprises a payload compartment, wherein the payload compartment is positioned radially inward of the plurality of propulsion units and the plurality of ducts.

NEE 47. The aircraft of NEE 46, wherein the payload compartment comprises a passenger area.

NEE 48. The aircraft of any of NEEs 45-47, wherein each of the plurality of lifting bodies is in a fixed orientation with respect to a main body of the aircraft.

NEE 49. The aircraft of any of NEEs 45-48, wherein at least some of the plurality of lifting bodies are movable with respect to a main body of the aircraft.

NEE 50. The aircraft of any of NEEs 45-49, wherein the plurality of ducts are configured such that the plurality of propulsion units receive environmental air for use in generating the forced air from an area above the aircraft.

NEE 51. The aircraft of any of NEEs 45-50, wherein the plurality of propulsion units are each configured to be independently controlled, such that adjustments to individual output levels of each propulsion unit selectively causes the aircraft to ascend, descend, hover, tilt, rotate, or translate.

NEE 52. The aircraft of any of NEEs 45-51, wherein a number of the plurality of propulsion units is equal to a number of the plurality of ducts.

NEE 53. The aircraft of any of NEEs 45-52, wherein the plurality of lifting bodies are coupled to a main body.

NEE 54. The aircraft of NEE 53, wherein the main body comprises a structural beam configured to support the plurality of lifting bodies.

NEE 55. The aircraft of any of NEEs 53 or 54, wherein the plurality of lifting bodies are coupled to the main body with a plurality of supports, wherein a first end of the plurality of supports extend from a portion of the main body, wherein a second end of the plurality of supports is connected to the plurality of lifting bodies.

NEE 56. A method for flying an aircraft, the method comprising: providing an aircraft comprising an annular lifting body having a cross-sectional profile of an airfoil, one or more ducts having an inlet end and outlet end positioned at a leading edge of the annular lifting body, one or more propulsion units coupled to the inlet end of the one or more ducts, and a control system; operating the control system to direct a flow of air from the one or more propulsion units to the leading edge of the annular lifting body; lifting the aircraft from a landed position to an aerial position based on lift generated by the flow of air across the annular lifting body; and adjusting a speed of the flow of air from at least one of the one or more propulsion units to tilt the aircraft to move the aircraft horizontally.

NEE 57. An aircraft comprising: a body; one or more lifting bodies positioned about a periphery of the body, the one or more lifting bodies each extending radially outward from a leading edge to a trailing edge; a plurality of propulsion units; and a plurality of ducts each comprising: an inlet positioned to receive a flow of air from at least one of the plurality of propulsion units; and an outlet positioned to direct the flow of air toward the leading edge of at least one of the one or more lifting bodies.

NEE 58. The aircraft of NEE 57, wherein the one or more lifting bodies comprises a single annular lifting body.

NEE 59. The aircraft of NEE 57, wherein the one or more lifting bodies comprises a plurality of lifting bodies, or a single lifting body comprising a plurality of lifting body sections.

NEE 60. The aircraft of any of NEEs 57-59, wherein the one or more lifting bodies are arranged in a circular shaped arrangement.

NEE 61. The aircraft of any of NEEs 57-59, wherein the one or more lifting bodies are arranged in a triangular shaped arrangement.

NEE 62. The aircraft of any of NEEs 57-59, wherein the one or more lifting bodies are arranged in a polygonal shaped arrangement.

NEE 63. The aircraft of any of NEEs 57-62, wherein the body comprises a payload compartment radially inward of the plurality of propulsion units and the plurality of ducts.

NEE 64. The aircraft of NEE 63, wherein the payload compartment comprises a passenger area.

NEE 65. The aircraft of any of NEEs 57-64, wherein each of the one or more lifting bodies are in a fixed orientation with respect to the body.

NEE 66. The aircraft of any of NEEs 57-65, wherein at least one of the one or more lifting bodies are movable with respect to the body.

NEE 67. The aircraft of any of NEEs 57-66, wherein the plurality of ducts are configured such that the plurality of propulsion units receive environmental air for use in generating the flow of air from an area above the aircraft.

NEE 68. The aircraft of any of NEEs 57-67, wherein the plurality of propulsion units are each configured to be independently controlled, such that adjustments to individual output levels of each propulsion unit selectively causes the aircraft to ascend, descend, hover, tilt, rotate, or translate.

NEE 69. The aircraft of any of NEEs 57-68, wherein a number of the plurality of propulsion units is equal to a number of the plurality of ducts.

NEE 70. The aircraft of any of NEEs 57-69, wherein the one or more lifting bodies are coupled to a main body.

NEE 71. The aircraft of NEE 70, wherein the main body comprises a structural beam configured to support the one or more lifting bodies.

NEE 72. The aircraft of any of NEEs 70 or 71, wherein the one or more lifting bodies are coupled to the main body with a plurality of cables, wherein a first end of the plurality of cables extend from a portion of the main body, wherein a second end of the plurality of cables is connected to the one or more lifting bodies.

NEE 73. The aircraft or method of any of the preceding NEEs, wherein the one or more lifting bodies are circular, elliptical, rounded, triangular, square, pentagonal, hexagonal, other polygonal shapes, longitudinal, linear, crescent, or any combination thereof.

NEE 74. The aircraft of NEEs 57-73, wherein the one or more lifting bodies are stacked on top of each other.

NEE 75. The aircraft of NEEs 57-74, further comprising one or more flow diverters, the one or more flow diverters are configured to direct a flow of air in an upwards or downwards direction.

NEE 76. The aircraft of NEEs 57-75, wherein the one or more lifting bodies have an aileron mounted adjacent to the trailing edge, wherein the aileron is configured to deflect upwards and downwards.

NEE 77. The aircraft of NEEs 57-76, wherein one or more flaps are positioned on the one or more lifting bodies, the one or more flaps are configured to retract and extend.

NEE 78. The aircraft of NEEs 57-77, further comprising one or more solar panels, wherein the one or more solar panels are configured to provide additional power to the aircraft.

NEE 79. The aircraft of NEE 78, wherein the one or more solar panels are positioned on the one or more lifting bodies.

NEE 80. The aircraft of NEEs 57-79, further comprising one or more proximity sensors, wherein the one or more proximity sensors are configured to determine a location of the aircraft with respect to another object or obstacle.

NEE 81. The aircraft of NEEs 57-80, further comprising a parachute, wherein the parachute is configured to deploy to safely land the aircraft.

NEE 82. The aircraft of NEEs 57-81, further comprising an inflatable landing gear, wherein the inflatable landing gear is configured to expand from a bottom surface of the aircraft.

NEE 83. The aircraft of NEEs 57-82, wherein the plurality of ducts has a larger outlet than inlet, wherein the one or more lifting bodies are completely contained within the outlet.

NEE 84. An aircraft comprising: a longitudinal body; one or more lifting bodies positioned about a periphery of the longitudinal body, the one or more lifting bodies each extending laterally outward from a leading edge to a trailing edge; a plurality of propulsion units; and a plurality of ducts each comprising: an inlet positioned to receive a flow of air from at least one of the plurality of propulsion units; and an outlet positioned to direct the flow of air toward the leading edge of at least one of the one or more lifting bodies, wherein one of the plurality of propulsion units is positioned on a rear end of the longitudinal body and configured to deliver a flow of air in a rearward direction to thrust the aircraft forward.

NEE 85. The aircraft of NEE 84, further comprising one or more rotors are positioned on a top portion of the longitudinal body, the one or more rotors are configured to deliver a flow of air to one of the plurality of propulsion units positioned on the rear end of the longitudinal body.

NEE 86. The aircraft of NEEs 84-85, wherein the one or more lifting bodies are stacked on top of each other.

NEE 87. The aircraft of NEEs 84-86, further comprising one or more flow diverters, the one or more flow diverters are configured to direct a flow of air in an upwards or downwards direction.

NEE 88. The aircraft of NEEs 84-87, wherein the one or more lifting bodies have an aileron mounted adjacent to the trailing edge, wherein the aileron is configured to deflect upwards and downwards.

NEE 89. The aircraft of NEEs 84-88, wherein one or more flaps are positioned on the one or more lifting bodies, the one or more flaps are configured to retract and extend.

NEE 90. The aircraft of NEEs 84-89, further comprising one or more solar panels, wherein the one or more solar panels are configured to provide additional power to the aircraft.

NEE 91. The aircraft of NEE 90, wherein the one or more solar panels are positioned on the one or more lifting bodies.

NEE 92. The aircraft of NEEs 84-91, further comprising one or more proximity sensors, wherein the one or more proximity sensors are configured to determine a location of the aircraft with respect to another object or obstacle.

NEE 93. The aircraft of NEEs 84-92, further comprising a parachute, wherein the parachute is configured to deploy to safely land the aircraft.

NEE 94. The aircraft of NEEs 84-93, further comprising an inflatable landing gear, wherein the inflatable landing gear is configured to expand from a bottom surface of the aircraft.

NEE 95. The aircraft of NEEs 84-94, wherein the plurality of ducts has a larger outlet than inlet, wherein the one or more lifting bodies are completely contained within the outlet.

NEE 96. An aircraft comprising: a main body; a plurality of crescent shaped lifting bodies positioned about a periphery of the main body, the plurality of crescent shaped lifting bodies each extending radially outward from a leading edge to a trailing edge; a plurality of propulsion units; and a plurality of ducts each comprising: an inlet positioned to receive a flow of air from at least one of the plurality of propulsion units; and an outlet positioned to direct the flow of air toward the leading edge of at least one of the plurality of crescent shaped lifting bodies; wherein one of the plurality of propulsion units is positioned on a rear end of the main body and configured to deliver a flow of air in a rearward direction to thrust the aircraft forward.

NEE 97. The aircraft of NEEs 96, wherein the plurality of crescent shaped lifting bodies are stacked on top of each other.

NEE 98. The aircraft of NEEs 96-97, further comprising one or more flow diverters, the one or more flow diverters are configured to direct a flow of air in an upwards or downwards direction.

NEE 99. The aircraft of NEEs 96-98, wherein the plurality of crescent shaped lifting bodies have an aileron mounted adjacent to the trailing edge, wherein the aileron is configured to deflect upwards and downwards.

NEE 100. The aircraft of NEEs 96-99, wherein one or more flaps are positioned on the plurality of crescent shaped lifting bodies, the one or more flaps are configured to retract and extend.

NEE 101. The aircraft of NEEs 96-100, further comprising one or more solar panels, wherein the one or more solar panels are configured to provide additional power to the aircraft.

NEE 102. The aircraft of NEE 101, wherein the one or more solar panels are positioned on the plurality of crescent shaped lifting bodies.

NEE 103. The aircraft of NEEs 96-102, further comprising one or more proximity sensors, wherein the one or more proximity sensors are configured to determine a location of the aircraft with respect to another object or obstacle.

NEE 104. The aircraft of NEEs 96-103, further comprising a parachute, wherein the parachute is configured to deploy to safely land the aircraft.

NEE 105. The aircraft of NEEs 96-104, further comprising an inflatable landing gear, wherein the inflatable landing gear is configured to expand from a bottom surface of the aircraft.

NEE 106. The aircraft of NEEs 96-105, wherein the plurality of ducts has a larger outlet than inlet, and wherein the plurality of crescent shaped lifting bodies are completely contained within the outlet.

NEE 107. An aircraft comprising: a main body; one or more lifting bodies positioned about a periphery of the main body, the one or more lifting bodies each extending radially outward from a leading edge to a trailing edge; one or more propulsion units; and one or more ducts, the one or more ducts comprising: an inlet positioned to receive a flow of air from the one or more propulsion units; and an outlet positioned to direct the flow of air toward the leading edge of at least one of the one or more lifting bodies.

NEE 108. The aircraft of NEEs 107, wherein the one or more lifting bodies are stacked on top of each other.

NEE 109. The aircraft of NEEs 107-108, further comprising one or more flow diverters, the one or more flow diverters are configured to direct a flow of air in an upwards or downwards direction.

NEE 110. The aircraft of NEEs 107-109, wherein the one or more lifting bodies have an aileron mounted adjacent to the trailing edge, wherein the aileron is configured to deflect upwards and downwards.

NEE 111. The aircraft of NEEs 107-110, wherein one or more flaps are positioned on the one or more lifting bodies, the one or more flaps are configured to retract and extend.

NEE 112. The aircraft of NEEs 107-111, further comprising one or more solar panels, wherein the one or more solar panels are configured to provide additional power to the aircraft.

NEE 113. The aircraft of NEE 112, wherein the one or more solar panels are positioned on the one or more lifting bodies.

NEE 114. The aircraft of NEEs 107-113, further comprising one or more proximity sensors, wherein the one or more proximity sensors are configured to determine a location of the aircraft with respect to another object or obstacle.

NEE 115. The aircraft of NEEs 107-114, further comprising a parachute, wherein the parachute is configured to deploy to safely land the aircraft.

NEE 116. The aircraft of NEEs 107-115, further comprising an inflatable landing gear, wherein the inflatable landing gear is configured to expand from a bottom surface of the aircraft.

NEE 117. The aircraft of NEEs 107-116, wherein the one or more ducts has a larger outlet than inlet, wherein the one or more lifting bodies are completely contained within the outlet.

NEE 118. The aircraft of NEEs 107-117, wherein the one or more ducts include a first section of ducts and a second section of ducts, wherein the second section of ducts is positioned radially outwards from the first section of ducts.

NEE 119. The aircraft of NEE 118, wherein a first outlet end of the first section of ducts is coupled to a first lifting body, wherein a second outlet end of the second section of ducts is coupled to a second lifting body.

NEE 120. The aircraft of NEEs 118-119, wherein a first inlet end of the first section of ducts is positioned above a second inlet end of a second section of ducts.

NEE 121. The aircraft of NEEs 118-119, wherein a first inlet end of the first section of ducts is positioned at a same height in a longitudinal direction as a second inlet end of a second section of ducts.

NEE 122. An aircraft comprising: a main body; one or more airfoils positioned about a periphery of the main body, the one or more airfoils each extending radially outward from a leading edge to a trailing edge; one or more second airfoils positioned radially outwards from the one or more airfoils, the one or more second airfoils extending from a second leading edge to a second trailing edge; one or more propulsion units; and one or more ducts, the one or more ducts comprising: an inlet positioned to receive a flow of air from one or more of the one or more propulsion units; and an outlet positioned to direct the flow of air toward the leading edge of one or more of the one or more airfoils; wherein the one or more second airfoils are positioned such that at least a portion of the flow of air will travel from the leading edge of the one or more airfoils to the second leading edge of the one or more second airfoils.

NEE 123. The aircraft of NEE 122, wherein the one or more airfoils have an aileron mounted adjacent to the trailing edge, wherein the aileron is configured to deflect upwards and downwards.

NEE 124. The aircraft of NEEs 122-123, wherein the one or more ducts have a turn angle of 32 degrees or more.

NEE 125. The aircraft of NEEs 122-123, wherein the one or more ducts have a turn angle of 45 degrees or less.

NEE 126. The aircraft of NEEs 122-125, wherein the one or more airfoils have a thickness to chord ratio of 0.12.

NEE 127. The aircraft of NEEs 122-126, wherein the one or more ducts have a turn angle from 32 degrees to 45 degrees.

NEE 128. The aircraft of NEEs 122-127, wherein the one or more airfoils have a thickness to chord ratio between 0.06 and 0.12.

NEE 129. The aircraft of NEEs 122-128, wherein a thickness to chord ratio of the one or more second airfoils is less than a thickness to chord ratio of the one or more airfoils.

NEE 130. The aircraft of NEEs 122-126, wherein the leading edge of the one or more airfoils are tilted at an angle relative to the second leading edge of the one or more second airfoils.

NEE 131. The aircraft of NEE 130, wherein the angle the one or more second airfoils are tilted is 10 degrees.

NEE 132. The aircraft of NEEs 122-131, wherein the one or more airfoils have a first attack angle and the one or more second airfoils have a second attack angle, wherein the first attack angle is lower than the second attack angle.

NEE 133. The aircraft of NEEs 122-132, wherein the second leading edge is positioned radially outward of the leading edge.

NEE 134. The aircraft of NEEs 122-133, wherein the second leading edge is positioned radially outward of the trailing edge.

NEE 135. The aircraft of NEEs 122-134, wherein the second trailing edge is positioned radially outward of the trailing edge.

NEE 136. The aircraft of NEEs 122-135, wherein a distance between the leading edge of the one or more airfoils and the second leading edge of the one or more second airfoils is greater than a chord length of the one or more second airfoils.

NEE 137. The aircraft of NEEs 122-136, wherein a distance between the trailing edge of the one or more airfoils and the second trailing edge of the one or more second airfoils is less than a chord length of the one or more second airfoils.

NEE 138. An aircraft comprising: a main body; one or more airfoils positioned about a periphery of the main body, the one or more airfoils each extending radially outward from a leading edge to a trailing edge; one or more second airfoils positioned radially outwards from the one or more airfoils, the one or more second airfoils extending from a second leading edge to a second trailing edge; one or more propulsion units; and one or more ducts, the one or more ducts comprising: an inlet positioned to receive a flow of air from the one or more propulsion units; an outlet positioned to direct the flow of air toward the leading edge of the one or more airfoils spaced away from the outlet; a turn angle between the inlet and the outlet configured to cause the flow of air from the one or more propulsion units to be delivered to the leading edge of the one or more airfoils along a different direction than the direction in which the flow of air enters the inlet; wherein the one or more second airfoils are positioned such that at least a portion of the flow of air will travel from the leading edge of the one or more airfoils to the leading edge of the one or more second airfoils.

NEE 139. The aircraft of NEE 138, wherein the one or more ducts have a turn angle of 32 degrees.

NEE 140. The aircraft of NEE 138, wherein the one or more ducts have a turn angle of 45 degrees.

NEE 141. The aircraft of NEEs 138-140, wherein a ratio between a height of the outlet of the one or more ducts and a chord of the one or more airfoils is 0.25.

NEE 142. The aircraft of NEEs 138-140, wherein a ratio between a height of the outlet of the one or more ducts and a chord of the one or more airfoils is 0.4.

NEE 143. The aircraft of NEEs 138-140, wherein a ratio between a height of the outlet of the one or more ducts and a chord of the one or more airfoils is 0.8.

NEE 144. The aircraft of NEEs 138-143, wherein a position of the one or more airfoils is configured to reduce an airflow pressure buildup at the outlet of the one or more ducts.

NEE 145. The aircraft of NEE 144, wherein the position of the one or more airfoils is a ratio between a distance the one or more airfoils is offset from the outlet and a chord of the one or more airfoils, wherein the ratio is between 0 to 1.

NEE 146. The aircraft of NEE 145, wherein the ratio is 0.9.

NEE 147. The aircraft of NEEs 138-144, wherein the turn angle is configured to reduce an airflow pressure buildup at the outlet of the one or more ducts.

NEE 148. The aircraft of NEEs 138-147, wherein the turn angle is configured to deliver a laminar airflow and deliver an increased lift to the one or more airfoils.

NEE 149. The aircraft of NEEs 138-148, wherein the second leading edge is positioned radially outward of the leading edge.

NEE 150. The aircraft of NEEs 138-149, wherein the second leading edge is positioned radially outward of the leading edge and radially inward of the trailing edge.

NEE 151. The aircraft of NEEs 138-149, wherein the second leading edge is positioned radially outward of the leading edge and the trailing edge.

NEE 152. The aircraft of NEEs 138-151, wherein the one or more ducts have a turn angle between 32 degrees and 45 degrees.

NEE 153. The aircraft of NEEs 138-152, wherein the one or more airfoils have a thickness to chord ratio between 0.06 and 0.12.

NEE 154. The aircraft of NEEs 138-153, further comprising one or more deswirling vanes positioned on the one or more ducts.

NEE 155. An aircraft comprising: a main body; one or more lifting bodies positioned about a periphery of the main body, the one or more lifting bodies each extending radially outward from a leading edge to a trailing edge; one or more second lifting bodies positioned radially outwards from the one or more lifting bodies, the one or more second lifting bodies extending from a second leading edge to a second trailing edge; one or more propulsion units; and one or more ducts, the one or more ducts comprising: an inlet positioned to receive a flow of air from the one or more propulsion units; and an outlet positioned to direct the flow of air toward the leading edge of the one or more lifting bodies; wherein the flow of air is configured to travel from the leading edge of the one or more lifting bodies to the leading edge of the one or more second lifting bodies.

NEE 156. An aircraft comprising: a main body; one or more lifting bodies positioned about a periphery of the main body, the one or more lifting bodies each extending radially outward from a leading edge to a trailing edge; one or more propulsion units; and one or more ducts, the one or more ducts comprising: an inlet positioned to receive a flow of air from the one or more propulsion units, the inlet including one or more vanes to optimize the flow of air through the one or more ducts; and an outlet positioned to direct the flow of air toward the leading edge of at least one of the one or more lifting bodies.

NEE 157. An aircraft comprising: a main body; one or more lifting bodies positioned about a periphery of the main body, the one or more lifting bodies each extending radially outward from a leading edge to a trailing edge; one or more propulsion units; and one or more ducts, the one or more ducts comprising: an inlet positioned to receive a flow of air from the one or more propulsion units; and an outlet positioned to direct the flow of air toward the leading edge of at least one of the one or more lifting bodies, the outlet including one or more deswirling features configured to deliver an optimized flow of air to the leading edge.

NEE 158. An aircraft comprising: a main body; one or more lifting bodies positioned about a periphery of the main body, the one or more lifting bodies each extending radially outward from a leading edge to a trailing edge; one or more propulsion units; and one or more ducts, the one or more ducts comprising: an inlet positioned to receive a flow of air from the one or more propulsion units; and an outlet positioned to direct the flow of air toward the leading edge of at least one of the one or more lifting bodies wherein the one or more lifting bodies are poisoned in the outlet to direct the flow of air leaving the trailing edge downwards.

NEE 159. A system for generating movement via aerodynamic lifting forces, the system comprising: a machine structure having a moveable component; and an aerolift system attached to the moveable component, the aerolift system comprising: a propulsion unit configured to move air; a duct configured to receive the air moved by the propulsion unit; and a lifting body configured to receive the air moved through the duct, wherein the air imparts a lifting force on the lifting body to thereby cause the moveable component to move.

NEE 160. The system of NEE 159, wherein the machine structure includes a supporting structure, and wherein the movable component is configured to move relative to the supporting structure.

NEE 161. The system of NEE 160, wherein the supporting structure is an elevator shaft.

NEE 162. The system of NEE 160, wherein the supporting structure is a body of a construction vehicle.

NEE 163. The system of NEE 160, wherein the supporting structure is a vehicle body.

NEE 164. The system of NEE 160, wherein the supporting structure is a wall of a building.

NEE 165. The system of NEEs 159-164, wherein the moveable component is a cargo area.

NEE 166. The system of NEEs 159-164, wherein the moveable component is an elevator cab.

NEE 167. The system of NEEs 159-164, wherein the moveable component is a lifting arm.

NEE 168. The system of NEEs 159-167, wherein the propulsion unit is configured to lift and lower the system in a vertical direction.

NEE 169. An elevator lift system, comprising: an elevator comprising a moveable cab configured to move along a supporting structure; and an aerolift system attached to the moveable cab of the elevator, the aerolift system comprising: a lifting body comprising a leading edge located at an inside portion of the lifting body and a trailing edge located at an outside portion of the lifting body, wherein a cross-sectional profile of the lifting body forms an airfoil capable of producing lift responsive to air flowing from the leading edge to the trailing edge; one or more propulsion units configured to cause an air flow; and one or more ducts each comprising an inlet configured to receive the air flow from the one or more propulsion units and an outlet configured to direct the air flow towards the leading edge of the lifting body.

NEE 170. The system of NEE 169, wherein the one or more propulsion units are configured to applying varying amounts of airflow to cause the moveable cab to rise and lower in a vertical direction.

NEE 171. The system of NEEs 169-170, wherein the supporting structure comprises a central member coupled to the one or more ducts, wherein the elevator lift system is configured to travel along the central member.

NEE 172. The system of NEE 171, wherein the central member is positioned in a vertical direction.

NEE 173. The system of NEEs 171-172, wherein the aerolift system is slidably coupled to the supporting structure.

NEE 174. The system of NEE 171, wherein the central member is coupled to the one or more ducts via a geared system.

NEE 175. The system of NEE 171 wherein the central member is coupled to the one or more ducts via a belt.

NEE 176. The system of NEEs 169-170, further comprising a connector coupling the elevator lift system to an external surface.

NEE 177. The system of NEE 176, wherein the external surface is a building.

NEE 178. The system of NEE 176, wherein the external surface is a wall.

NEE 179. The system of NEE 176, wherein the connector is coupled to the external surface via a trolley.

NEE 180. The system of NEE 176, wherein the connector is coupled to the external surface via a railing.

NEE 181. A method of generating movement of a moveable component of a machine via aerodynamic lifting forces, the method comprising: operating a fan to cause an air flow; receiving the air flow into a duct; flowing the air flow over a lifting body; generating a lifting force on the lifting body in response to the air flow over the lifting body; and causing the moveable component of the machine to move relative to a supporting structure of the machine in response to the air flow over the lifting body.

NEE 182. The method of NEE 181, wherein the moveable component moves in a vertical direction.

NEE 183. The method of NEEs 181-182, wherein the moveable component is a cargo area.

NEE 184. The method of NEEs 181-182, wherein the moveable component is an elevator cab.

NEE 185. The method of NEEs 181-182, wherein the moveable component is a lifting arm.

NEE 186. The method of NEEs 181-185, wherein the supporting structure is an elevator shaft.

NEE 187. The method of NEEs 181-185, wherein the supporting structure is a body of a construction vehicle.

NEE 188. The method of NEEs 181-185, wherein the supporting structure is a vehicle body.

NEE 189. The method of NEEs 181-185, wherein the supporting structure is a wall of a building.

NEE 190. The method of NEEs 181-189, further comprising a control system.

NEE 191. The method of NEE 190, further comprising operating the control system to vary an amount of air flow to thereby vary the lifting force.

NEE 192. The method of NEEs 190-191, further comprising operating the control system to adjust a speed of the air flow.

NEE 193. A method for controlling an elevator lift system, comprising:
providing an elevator lift system comprising a lifting body having a cross-sectional profile of an airfoil, one or more ducts having an inlet end and an outlet end positioned at a leading edge of the lifting body, one or more propulsion units coupled to the inlet end of the one or more ducts, and a control system; operating the control system to direct a flow of air from the one or more propulsion units to the leading edge of the lifting body; lifting the elevator lift system vertically from a first position to a second position based on lift generated by the flow of air across the lifting body; and adjusting a speed of the flow of air from at least one of the one or more propulsion units to slow a lifting speed of the elevator lift system.

NEE 194. The method of NEE 193, further comprising a central member, wherein the elevator lift system travels along the central member.

NEE 195. The method of NEE 194, wherein the central member is positioned vertically.

NEE 196. The method of NEEs 194-195, wherein the central member is slidably coupled to the elevator lift system.

NEE 197. The method of NEEs 194-196, wherein the central member is coupled to the elevator lift system at a position interior to the one or more ducts.

NEE 198. The method of NEEs 194-197, wherein the central member is coupled to the one or more ducts via a geared system.

NEE 199. The method of NEEs 194-198, wherein the central member is coupled to the one or more ducts via geared belt.

NEE 200. The method of NEE 193, further comprising a connector coupling the elevator lift system to an external surface.

NEE 201. The method of NEEs 193-200, wherein the elevator lift system is positioned within a building.

NEE 202. The aircraft or method of any preceding NEE, wherein one or more ducts of each aerolift system may be connected to each other to cause airflow amongst them.

NEE 203. The aircraft or method of any preceding NEE, wherein one or more ducts of each aerolift system may be shared or fused together.

NEE 204. The aircraft or method of any preceding NEE, wherein one or more propulsion units may be shared amongst one or more aerolift systems.

NEE 205. The aircraft or method of any preceding NEE, wherein one or more lifting body of each aerolift system may be shared or fused together.

NEE 206. The aircraft or method of any preceding NEE, wherein the central framework and/or the central body may be shared amongst one or more groups of aerolift systems.

NEE 207. The aircraft or method of any preceding NEE further comprising one or more additional propulsion units (e.g. open rotor, ducted fan) to assist in forward flight or lift or for any other general reason.

NEE 208. The aircraft or method of any preceding NEE, further comprising one or more landing gear (e.g. skid, motored or un-motored wheels, retractable or fixed).

NEE 209. The aircraft or method of any preceding NEE, further comprising one or more parachutes.

NEE 210. The aircraft or method of any preceding NEE, further comprising one or more control surfaces (e.g. wings, spoilers, flaps).

NEE 211. The aircraft or method of any preceding NEE, further comprising one or more solar panels.

NEE 212. The aircraft or method of any preceding NEE, further comprising one or more floatation device.

NEE 213. The aircraft or method of any preceding NEE, wherein the aircraft is configured to be operated by a controller (e.g. onboard, fly by wire, remote or autonomous) or processor system to individually or collectively control aerolift systems and the aircraft in general.

NEE 214. The aircraft or method of any preceding NEE, where the supporting structure is configured to expand or collapse based on use or purpose (e.g. storage, in-flight, hover, forward flight etc.).

Implementations and Language

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions, and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described may be incorporated in the example methods and processes. For example, one or more additional operations may be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems may generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications may be made without departing from the spirit and scope of the present invention. Moreover, the devices described herein need not feature all of the objects, advantages, features and aspects discussed above. Thus, for example, those of skill in the art will recognize that the invention may be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments may be combined with or substituted for one another in order to form varying modes of the discussed devices.

What is claimed is:

1. An aerolift system comprising:
   a propulsion unit configured to move air;
   a duct configured to receive the air moved by the propulsion unit into an inlet of the duct, to move the air along a channel of the duct, and to expel the air out of an outlet of the duct, wherein the air is received into the inlet along an inlet axis defined by a first closed cross-sectional profile of the channel at the inlet and the air is expelled through the outlet along an outlet axis defined by a second closed cross-sectional profile of the channel at the outlet, and wherein the inlet axis and the outlet axis define a turn angle therebetween; and
   a lifting body configured to receive the air expelled from the outlet of the duct such that the air imparts a lifting force on the lifting body.

2. The aerolift system of claim 1, wherein the inlet axis is angled no more than 45 degrees relative to a reference axis, wherein the reference axis is parallel to a gravity vector.

3. The aerolift system of claim 1, wherein the turn angle is from 20 degrees to 45 degrees.

4. The aerolift system of claim 1, wherein the lifting body defines a chord that is angled no more than 45 degrees relative to a reference axis, wherein the reference axis is parallel to a gravity vector.

5. The aerolift system of claim 1, wherein the inlet axis is parallel with a reference axis, wherein the reference axis is parallel to a gravity vector.

6. The aerolift system of claim 1, wherein the lifting body comprises an airfoil cross-sectional shape.

7. The aerolift system of claim 1, wherein the lifting body does not comprise an airfoil cross-sectional shape.

8. The aerolift system of claim 1, wherein the propulsion unit comprises an electric motor configured to rotate one or more blades.

9. The aerolift system of claim 1, wherein a reference axis is parallel with a gravity vector.

10. The aerolift system of claim 1, wherein the outlet extends from a vertically lower portion to a vertically higher portion, and wherein the lifting body comprises a leading edge positioned closer to the vertically lower portion than to the vertically higher portion.

11. The aerolift system of claim 1, wherein the outlet extends from a vertically lower portion to a vertically higher portion, and wherein the lifting body comprises a leading edge positioned closer to the vertically higher portion than to the vertically lower portion.

12. The aerolift system of claim 1, wherein a cross-sectional area of the outlet of the duct is greater than a cross-sectional area of the inlet of the duct.

13. The aerolift system of claim 1, wherein a cross-sectional area of the duct increases along at least one section of the duct in a direction from the inlet to the outlet of the duct.

14. The aerolift system of claim 1, wherein the outlet of the duct comprises a width that is greater than a height of the outlet.

15. The aerolift system of claim 14, wherein the outlet of the duct is rectangular or rounded.

16. The aerolift system of claim 1, wherein the lifting body is a first lifting body, and further comprising a second lifting body configured to receive the air expelled from the outlet of the duct such that the air imparts a lifting force on the second lifting body.

17. The aerolift system of claim 16, wherein the second lifting body is positioned farther away from the outlet of the duct than the first lifting body.

18. The aerolift system of claim 16, further comprising a third lifting body configured to receive the air expelled from the outlet of the duct such that the air imparts a lifting force on the third lifting body, wherein the third lifting body is positioned farther away from the outlet of the duct than the second lifting body.

19. The aerolift system of claim 16, wherein the outlet of the duct extends from a vertically lower portion to a vertically higher portion, and wherein the first lifting body comprises a leading edge positioned closer to the vertically lower portion than to the vertically higher portion.

20. The aerolift system of claim 1, wherein the lifting body comprises a stationary inward portion and a moveable outward portion rotatably attached to the stationary inward portion.

21. The aerolift system of claim 1, the duct comprising one or more vents along a portion thereof between the inlet and the outlet and configured to expel part of the air through the one or more vents.

22. The aerolift system of claim 1, the duct comprising a series of openings along a bottom portion thereof at the outlet of the duct.

23. The aerolift system of claim 1, further comprising one or more vanes within the inlet of the duct.

24. The aerolift system of claim 1, further comprising a sleeve on a top and/or bottom of the lifting body.

25. The aerolift system of claim 1, wherein the inlet of the duct comprises a rounded lip.

\* \* \* \* \*